US007747457B2

(12) United States Patent
Cullen, III et al.

(10) Patent No.: US 7,747,457 B2
(45) Date of Patent: Jun. 29, 2010

(54) COMPUTER SYSTEM AND METHOD FOR FACILITATING AND MANAGING THE PROJECT BID AND REQUISITION PROCESS

(75) Inventors: Andrew A. Cullen, III, Succasunna, NJ (US); Ivan Danilov, Staten Island, NY (US); Leonid Zilberman, Brooklyn, NY (US)

(73) Assignee: Volt Information Sciences, Inc., New York, NY (US)

( * ) Notice: Subject to any disclaimer, the term of this patent is extended or adjusted under 35 U.S.C. 154(b) by 0 days.

(21) Appl. No.: 11/354,367

(22) Filed: Feb. 14, 2006

(65) Prior Publication Data

US 2006/0173775 A1     Aug. 3, 2006

Related U.S. Application Data

(63) Continuation of application No. 10/262,487, filed on Sep. 30, 2002.

(60) Provisional application No. 60/371,488, filed on Apr. 10, 2002.

(51) Int. Cl.
    *G06F 9/44*           (2006.01)
    *G06F 15/02*         (2006.01)

(52) U.S. Cl. ........................................... 705/9
(58) Field of Classification Search ........................ 705/9
See application file for complete search history.

(56) References Cited

U.S. PATENT DOCUMENTS 4,799,156 A     1/1989    Shavit et al.
4,937,743 A     6/1990    Rassman et al.
4,992,940 A     2/1991    Dworkin
5,117,353 A     5/1992    Stipanovich et al.
5,164,897 A    11/1992    Clark et al.
5,291,397 A     3/1994    Powell
5,381,332 A     1/1995    Wood (Continued)

FOREIGN PATENT DOCUMENTS

WO     WO-/00/50970     8/2000

(Continued)

OTHER PUBLICATIONS

Herman, Susan J. Hiring Right: A Practical Guide. SAGE. 1994. pp. 23-25.*

(Continued)

*Primary Examiner*—Jason M Borlinghaus
(74) *Attorney, Agent, or Firm*—Winstead PC

(57) ABSTRACT

A comprehensive, web-enabled computer system and method is provided for facilitating and managing all aspects of project work, while synchronizing communications, data and transaction processing across multiple user platforms. To implement the computer system and method, a bid item list is utilized to create configurable and scalable customized bid templates premised on the specific type of project work required. Bid requests are generated from the customized bid templates for solicitation of vendor bid responses to the selected bid items provided by the bid template. One or more bid items within the vendor bid responses can be selected for vendor grading purposes, and comparison of the vendor bid responses can be conducted using the graded bid item responses. In addition, project tracking parameters can be entered into the computer system for tracking the performance of the project.

17 Claims, 60 Drawing Sheets

U.S. PATENT DOCUMENTS

| | | | |
|---|---|---|---|
| 5,416,694 A | 5/1995 | Parrish et al. | |
| 5,493,490 A | 2/1996 | Johnson | |
| 5,592,375 A | 1/1997 | Salmon et al. | |
| 5,600,554 A | 2/1997 | Williams | |
| 5,664,115 A | 9/1997 | Fraser | |
| 5,715,402 A | 2/1998 | Popolo | |
| 5,758,328 A | 5/1998 | Giovannoli | |
| 5,794,212 A | 8/1998 | Mistr, Jr. | |
| 5,802,493 A | 9/1998 | Sheflott et al. | |
| 5,842,178 A | 11/1998 | Giovannoli | |
| 5,862,223 A | 1/1999 | Walker et al. | |
| 5,907,490 A | 5/1999 | Oliver | |
| 5,913,202 A | 6/1999 | Motoyama | |
| 5,915,086 A | 6/1999 | Buzsaki et al. | |
| 5,960,407 A | 9/1999 | Vivona | |
| 5,970,475 A | 10/1999 | Barnes et al. | |
| 5,978,768 A | 11/1999 | McGovern et al. | |
| 5,987,464 A | 11/1999 | Schneider | |
| 5,991,735 A | 11/1999 | Gerace | |
| 5,995,951 A | 11/1999 | Ferguson | |
| 6,014,644 A | 1/2000 | Erickson | |
| 6,038,547 A | 3/2000 | Casto | |
| 6,041,303 A | 3/2000 | Mathews | |
| 6,049,776 A | 4/2000 | Donnelly et al. | |
| 6,058,373 A | 5/2000 | Blinn et al. | |
| 6,058,379 A | 5/2000 | Odom et al. | |
| 6,070,143 A | 5/2000 | Barney et al. | |
| 6,088,678 A | 7/2000 | Shannon | |
| 6,092,050 A | 7/2000 | Lungren et al. | |
| 6,092,197 A | 7/2000 | Coueignoux | |
| 6,112,189 A | 8/2000 | Rickard et al. | |
| 6,115,642 A | 9/2000 | Brown et al. | |
| 6,131,087 A | 10/2000 | Luke et al. | |
| 6,141,653 A | 10/2000 | Conklin et al. | |
| 6,157,808 A * | 12/2000 | Hollingsworth | 434/350 |
| 6,158,044 A | 12/2000 | Tibbetts | |
| 6,161,099 A | 12/2000 | Harrington et al. | |
| 6,189,003 B1 | 2/2001 | Leal | |
| 6,199,050 B1 | 3/2001 | Alaia et al. | |
| 6,266,659 B1 | 7/2001 | Nadkarni | |
| 6,272,467 B1 | 8/2001 | Durand et al. | |
| 6,275,812 B1 | 8/2001 | Haq et al. | |
| 6,289,340 B1 | 9/2001 | Puram et al. | |
| 6,302,695 B1 | 10/2001 | Rtischev et al. | |
| 6,324,522 B2 | 11/2001 | Peterson et al. | |
| 6,349,238 B1 | 2/2002 | Gabbita et al. | |
| 6,356,909 B1 | 3/2002 | Spencer | |
| 6,370,510 B1 | 4/2002 | McGovern et al. | |
| 6,385,620 B1 | 5/2002 | Kurzius et al. | |
| 6,408,337 B1 * | 6/2002 | Dietz et al. | 709/229 |
| 6,442,528 B1 | 8/2002 | Notani et al. | |
| 6,480,857 B1 | 11/2002 | Chandler | |
| 6,529,909 B1 | 3/2003 | Bowman-Amuah | |
| 6,556,976 B1 | 4/2003 | Callen | |
| 6,647,300 B1 | 11/2003 | Balasubramanian et al. | |
| 6,658,400 B2 | 12/2003 | Perell et al. | |
| 7,054,821 B1 | 5/2006 | Rosenthal et al. | |
| 7,089,203 B1 | 8/2006 | Crookshanks | |
| 7,107,268 B1 | 9/2006 | Zawadzki et al. | |
| 7,275,039 B2 | 9/2007 | Setteducati | |
| 7,305,392 B1 | 12/2007 | Abrams et al. | |
| 7,386,475 B2 | 6/2008 | Parasnis et al. | |
| 7,430,523 B1 | 9/2008 | Khalidi | |
| 7,437,304 B2 | 10/2008 | Barnard et al. | |
| 7,457,764 B1 | 11/2008 | Bullock et al. | |
| 7,533,033 B1 | 5/2009 | Unite et al. | |
| 2001/0044768 A1 | 11/2001 | Wares | |
| 2001/0051913 A1 | 12/2001 | Vashistha et al. | |
| 2002/0002479 A1 | 1/2002 | Almog et al. | |
| 2002/0046147 A1 | 4/2002 | Livesay et al. | |
| 2002/0072946 A1 | 6/2002 | Richardson | |
| 2002/0073082 A1 | 6/2002 | Duvillier et al. | |
| 2002/0087382 A1 | 7/2002 | Tiburcio | |
| 2002/0103687 A1 | 8/2002 | Kipling | |
| 2002/0152133 A1 | 10/2002 | King et al. | |
| 2002/0161619 A1 * | 10/2002 | Ham et al. | 705/9 |
| 2002/0198766 A1 * | 12/2002 | Magrino et al. | 705/11 |
| 2003/0004850 A1 | 1/2003 | Li et al. | |
| 2003/0018481 A1 | 1/2003 | Zhou et al. | |
| 2003/0055694 A1 | 3/2003 | Menninger | |
| 2003/0055754 A1 | 3/2003 | Sullivan | |
| 2003/0083910 A1 | 5/2003 | Sayal et al. | |
| 2003/0101114 A1 | 5/2003 | Delapass et al. | |
| 2003/0101127 A1 | 5/2003 | Cornelius | |
| 2003/0135401 A1 | 7/2003 | Parr | |
| 2003/0145006 A1 | 7/2003 | Dalfsen et al. | |
| 2003/0177051 A1 | 9/2003 | Driscoll et al. | |
| 2003/0200150 A1 | 10/2003 | Westcott et al. | |
| 2003/0200168 A1 | 10/2003 | Cullen, III et al. | |
| 2003/0204439 A1 | 10/2003 | Cullen, III | |
| 2003/0208434 A1 | 11/2003 | Posner | |
| 2003/0212604 A1 | 11/2003 | Cullen, III | |
| 2003/0216986 A1 | 11/2003 | Hassan | |
| 2004/0030566 A1 | 2/2004 | Brooks Rix | |
| 2004/0030590 A1 | 2/2004 | Swan et al. | |
| 2004/0039681 A1 | 2/2004 | Cullen, III et al. | |
| 2004/0068728 A1 | 4/2004 | Blevins | |
| 2004/0107125 A1 | 6/2004 | Guheen et al. | |
| 2004/0107405 A1 | 6/2004 | Schein | |
| 2004/0158513 A1 | 8/2004 | Musacchio | |
| 2004/0205519 A1 | 10/2004 | Chapel et al. | |
| 2004/0210490 A1 | 10/2004 | Almstead et al. | |
| 2004/0210510 A1 | 10/2004 | Cullen, III et al. | |
| 2004/0215467 A1 | 10/2004 | Coffman et al. | |
| 2004/0260601 A1 | 12/2004 | Brief | |
| 2004/0267606 A1 | 12/2004 | Brishke et al. | |
| 2005/0114829 A1 | 5/2005 | Robin | |
| 2005/0262008 A1 | 11/2005 | Cullen, III et al. | |
| 2005/0288993 A1 | 12/2005 | Weng et al. | |
| 2007/0124196 A1 | 5/2007 | Brief et al. | |

FOREIGN PATENT DOCUMENTS

| | | |
|---|---|---|
| WO | WO-01/48656 | 7/2001 |
| WO | WO-02/08868 | 1/2002 |
| WO | WO-02/25544 | 3/2002 |

OTHER PUBLICATIONS

U.S. Appl. No. 11/351,835, Cullen et al.

www.marketing.ebreviate.com; "Overview"; Company Information of eBreviate; Feb. 11, 2002; pp. 1-16.

www.chimes.net; "Chimes Streamlines & Digitizes RFP Administration and Project Management with Launch of Chimes PM"; Press Release from Chimes, Inc.; Feb. 25, 2002; pp. 1-4.

www.chimes.net; "Chimes, Inc. Extends Human Capital Management Solution Beyond Contingent Workforce with Launch of Centralized Applicant Management -CAM- Program"; News Room from Chimes, Inc.; Jun. 28, 2001; pp. 1-2.

www.emptoris.com; "Overview"; Company Overview of Emptoris; Apr. 15, 2002; pp. 1-18.

Screenshots of Volt Information Sciences, www.volt.com, Feb. 21, 1999, pp. 1-24, retrieved from: Google.com and archive.org.

Torres, Giselle; "High-Voltage Staffing Service Arrives in Puerto Rico"; Caribbean Business; Oct. 23, 1997, p. 1 (retrieved from: Dialog, file 16).

"Volt Information Sciences-Facilities & Equipment", Annual Report, 1989, p. 1 (retrieved from : Dialog, file 160.

"Volt Information Sciences to Purchase Portions of Two Lucent Technologies Subsidiaries", PR Newswire, Nov. 17, 1999, pp. 1-3, (retrieved from: Dialog, file 16.

U.S. Appl. No. 11/885,090, Cullen et al.

Dysart, J., "The Data Exchange,"DG Review, vol. 11, No. 9, p. 37, Mar. 11, 1991.

Anon., "Primavera Systems; Primavera, PurchasePro.Com Create E-Commerce Marketplace for Construction Industry," M2 Presswire, Sep. 22, 1999.

Rawdon, S., "Online Bidding Options May Be Web's Best Secret," Business First-Columbus, vol. 18, No. 33, p. B11, Apr. 5, 2002.

U.S. Appl. No. 12/492,438, Cullen.

Cullen, A., Suppliers of Technical Nonpayroll Workers, (2 pages), Dec. 31, 1997.

Cullen, A., Skills Questionnaire, (5 pages), May 21, 1998.

Cullen, A., Skills Environment, (1 page), Jul. 2, 1998.

Cullen, A., Jobs Listing, (31 pages), Feb. 24, 1999.

Brief, V., Overview of Volt's HRP Application, (3 pages), Feb. 1999.

U.S. Appl. No. 12/692,937, Cullen.

Consol (www.procurestaff.com via http://web.archive.org, copyright 2003) pp. (1-31).

Cullen, Andrew A. III, "Declaration of Andrew A. Cullen III", 41 pages, Jun. 18, 2008.

"nextSource Announces Launch of its Multiple Listing Staffing Association." Business Wire, p. 2196, Apr. 16, 2002.

Definition of prose from Dictionary.com, retrieved from [http://dictionary.reference.com/browse/prose] on Aug. 7, 2008 (5 pages).

U.S. Appl. No. 12/342,116, Cullen.

Bajari et al. (Bajari), "Incentives versus transaction cost: a theory of procurement contracts", Rand Journal of Economics, vol. 32, No. 3, Autumn 2001, pp. 387-407.

* cited by examiner

SAP Functional Lead Developer Details

*Profile Details:*

Business Sector: Technical
Business Arena: Enterprise Resource Applications
Business Family: SAP
General Functions: Functional Lead, SAP Functional Configuration

*Skill Set:*

| | |
|---|---|
| Education Level: | Post Graduate Work |
| Enterprise Software Module: | Production Planning<br>Sales Distribution |
| Functional Development Specialties: | As is to be Modeling<br>Configuration<br>GAP Analysis<br>Process Design<br>Work Flow |
| Industry Background: | Manufacturing<br>Retail<br>Transportation |
| Required Industry Experience: | Greater than 10 years |

BID RESPONSE GRADING CRITERIA

BID ID : XYZ BID

BID TRACKING # : 10001

| Select | Bid Item Selections — 235 | Weighting Percentage (%) Enter Whole Number — 850 |
|---|---|---|
| • | Proposal_Narrative — 236 | 10% |
| ☐ | Project_Planning/Strategy | |
| ☐ | Project_Phasing | |
| • | Resource_Model | 15% |
| ☐ | Knowledge_Transfer_Plan | |
| ☐ | Deployment_Plan | |
| ☐ | Customer_Acceptance_Model | |
| ☐ | Anticipated_Margin | |
| • | Resource_Labor_Pricing_Amount | 25% |
| • | Material_Cost | 20% |
| ☐ | Equipment/Tooling_Pricing_Amount | |
| ☐ | Physical_Site_Pricing_Amount | |
| ☐ | Project_Management_Premium_Amount | |
| ☐ | Intellectual_Property_Premium_Amount | |
| • | Miscellaneous_Project_Expenses_Amount | 5% |
| • | Total_Bid_Price | 25% |

Total: 100%

Accept Selections

Bid Summary

| Bid Tracking: | 10001 |
| Bid Template: | PROJECT X |
| Bid ID: | XYZ BID |
| Accepted Bid Vendor: | VENDOR A |

870

Requisition Summary

| Req Create Date | Requisition Amount | Project Start Date |
| Requisition Status | Requisition Currency | Project End Date |

Project Terms & Conditions

| Statement of Work(SOW) | Contract | Project Phasing Schedule |
| Project Goods Deliverables | Project Materials | Phased Resources Billable Rates and Expenses |
| Project Service Unit Completion Deliverables | Project Resources | |
| | Project Expenses (Miscellaneous) | |

User Role Management
Search for authorized users by linking on the Position Role Name

| Financial_Approvers | MA_Financial_Approval_Level | NULL |
| Non-Financial_Approvers | Non-Financial_Approver_1 | NULL |

Project Finance/Accounting

| Account Assignments | Cost Centers/Department Codes | Tax Codes |
| Ledger Codes | Project Codes/IDs | Accounting Plants |

| Temporarily Save | Submit for Processing | Route for Approval | Back |

COMPUTER SYSTEM AND METHOD FOR FACILITATING AND MANAGING THE PROJECT BID AND REQUISITION PROCESS

CROSS REFERENCE TO RELATED APPLICATIONS

This patent application is a continuation of U.S. patent application Ser. No. 10/262,487, filed on Sep. 30, 2002. U.S. patent application Ser. No. 10/262,487 claims priority from U.S. Provisional Patent Application No. 60/371,488, filed on Apr. 10, 2002. This patent application incorporates by reference the entire disclosure of U.S. patent application Ser. No. 10/262,487 and U.S. Provisional Patent Application No. 60/371,488.

BACKGROUND

1. Technical Field

The present invention relates to a computer system and method for electronically facilitating the project bid and requisition process, and specifically to electronically managing all aspects of the project bid and requisition process.

2. Description of Related Art

Corporations, businesses and other types of enterprises regularly utilize third party providers (vendors) to handle various business functions, such as providing a good or service. Typically, these outsourced business functions are performed under a "project," "staff supplementation" or "consulting" (hereinafter collectively referred to as "project work") agreement between the buyer and the vendor. The various tasks involved in project work, such as vendor engagement, project administration, resource management and project accounting, can be extremely complex, entailing the convergence of numerous buyer organizational departments, such as purchasing, finance, operations, legal, human resources, security and the project management organization.

Due to the complexity of project work, it has become standard in today's business environment to employ multiple systems and processes to facilitate the management of project work. For example, typically, separate systems and processes are used for one or more aspects of project work, such as vendor qualification, bid solicitation, bid response, bid evaluation, contract administration, milestone/deliverable administration, payment vouchering and quality control. Currently, there exists on-line "bid" and "auction" systems for handling the bid solicitation and bid response processes, project management tracking systems for providing the milestone/deliverable administration process and financial processing systems for administering the payment vouchering process. However, there does not exist a single system for managing all aspects of project work.

SUMMARY OF THE INVENTION

To overcome the deficiencies of the prior art, embodiments of the present invention provide a comprehensive, web-enabled computer system and method for facilitating and managing all aspects of project work, while synchronizing communications, data and transaction processing across multiple user platforms. To implement the web-embedded computer system and method, a bid item list is utilized to create configurable and scalable customized bid templates premised on the specific type of project work required. Bid requests are generated from the customized bid templates for solicitation of vendor bid responses to the selected bid items included within the bid template.

In further embodiments, utilizing a bid template for generation of buyer bid requests and associated vendor bid responses enables efficient and effective analysis and comparison of vendor bid responses. One or more bid items within the vendor bid responses can be selected for vendor grading purposes, and comparison of the vendor bid responses can be conducted using the graded bid item responses.

In still further embodiments, upon award of the bid, project tracking parameters can be entered into the computer system for tracking the performance of the project. For example, the project tracking parameters can provide the ability to track project milestones/deliverables, time keeping, expense/payment vouchering, project accounting and project close out. Advantageously, the computer system of the present invention facilitates the entire project work bid process, optimizes the project engagement and administrative processes and protects the legal, business and financial interests of the buyer.

BRIEF DESCRIPTION OF THE DRAWINGS

The disclosed invention will be described with reference to the accompanying drawings, which show important sample embodiments of the invention and which are incorporated in the specification hereof by reference, wherein:

FIGS. 26-28 are screen shots illustrating the vendor bid response process;

FIGS. 34A-34E are screen shots illustrating a sample bid response grading process;

FIG. 39 is a screen shot illustrating exemplary buyer project administration features;

FIGS. 44-46 are screen shots illustrating a sample time keeping process;

DETAILED DESCRIPTION OF EXEMPLARY EMBODIMENTS

The numerous innovative teachings of the present application will be described with particular reference to exemplary embodiments. However, it should be understood that these embodiments provide only a few examples of the many advantageous uses of the innovative teachings herein. In general, statements made in the specification of the present application do not necessarily delimit any of the various claimed inventions. Moreover, some statements may apply to some inventive features, but not to others.

In accordance with embodiments of the present invention, a vendor is any provider of goods and/or services, a buyer is any purchaser of goods and/or services, a contractor is a resource employed by a vendor for project work and an administrator is a third-party system administrator or buyer-employed project administrator. Buyers can solicit bids from vendors for a particular good and/or service (hereinafter referred to as a project) in a form specified by the buyer using a bid request generated from a pre-established list of bid items related to the project type. Therefore, the bid responses submitted from vendors all have the same form, enabling efficient and effective evaluation of the bid responses. Embodiments of the present invention further combine the bid process with project management to enable the buyer, vendor, contractor and administrator to track the performance of the project after the bid is awarded.

Figure 1:
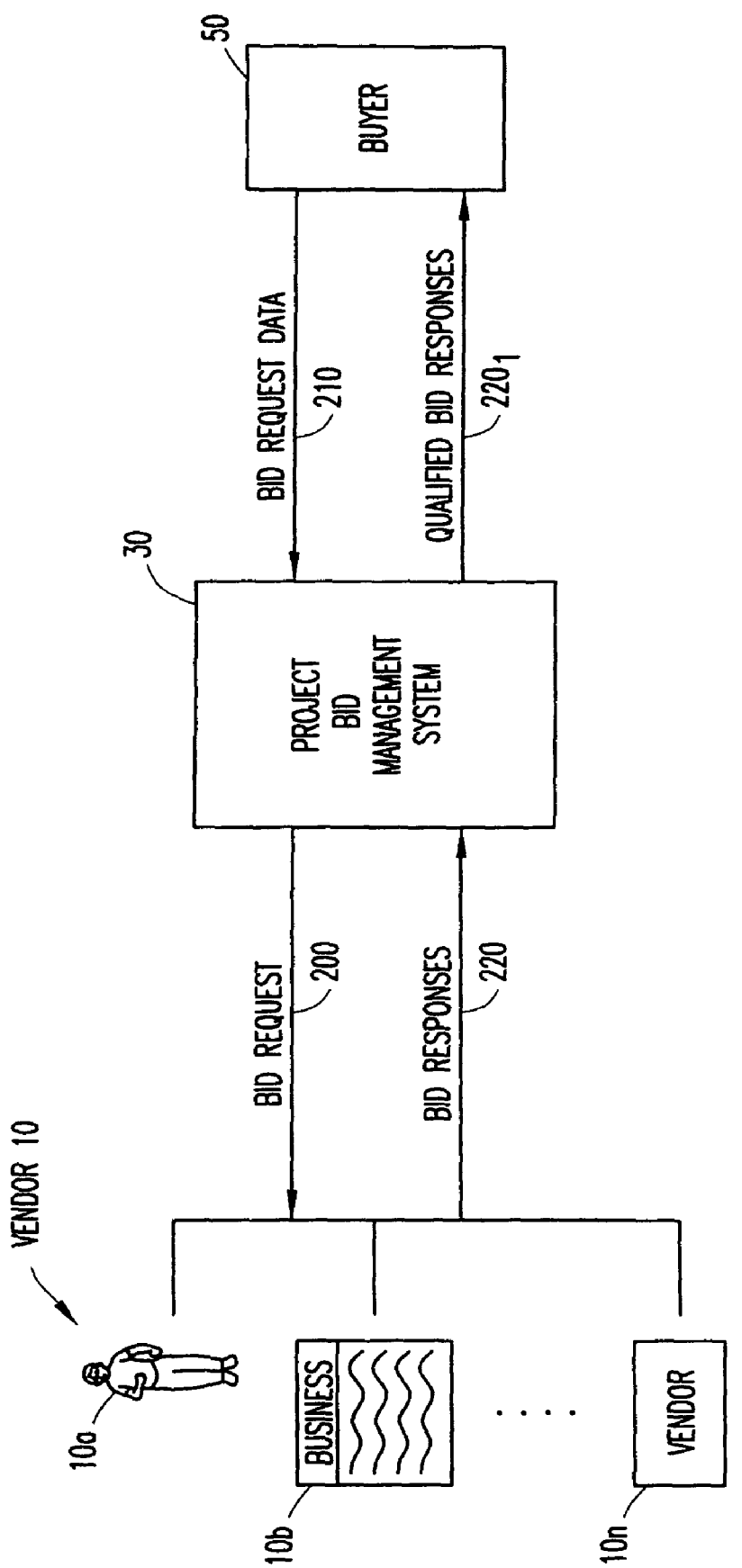
FIG. 1 is a high-level functional view of the project work bid process involved in the present invention.

FIG. 1 is a high-level functional view of the bid process involved in the present invention. Bid request data 210 associated with a particular bid request 200 is provided from a buyer 50 to a project bid management system 30. The buyer 50 can be an individual, business entity or any other type of buyer 50 that requires performance of a project. The bid request data 210 received at the project bid management system 30 is in a form pre-designated by the buyer 50. For example, the form can include one or more bid items selected from a configurable pre-established list of bid items for the particular project type, and the bid request data 210 can be related to one or more of these selected bid items.

The bid request data 210 is formatted by the project bid management system 30 and transmitted as a bid request 200 to one or more vendors 10a . . . 10n for solicitation of respective bid responses 220. For example, the vendor 10 can be an individual 10a, business entity 10b or any other vendor 10n that is capable of performing the requested project. Bid responses 220 are submitted from the vendors 10 to the project bid management system 30 for review prior to forwarding qualified bid responses $220_1$ to the buyer 50. For example, the project bid management system 30 may be pre-configured to force vendor completion of required bid response items in a specific data format to enable the system 30 to perform some filtering of vendor bid responses 220. In this way, the system 30 can ensure that the buyer 50 only receives the bid responses 220 that have the necessary data for bid evaluation.

Figure 2A:
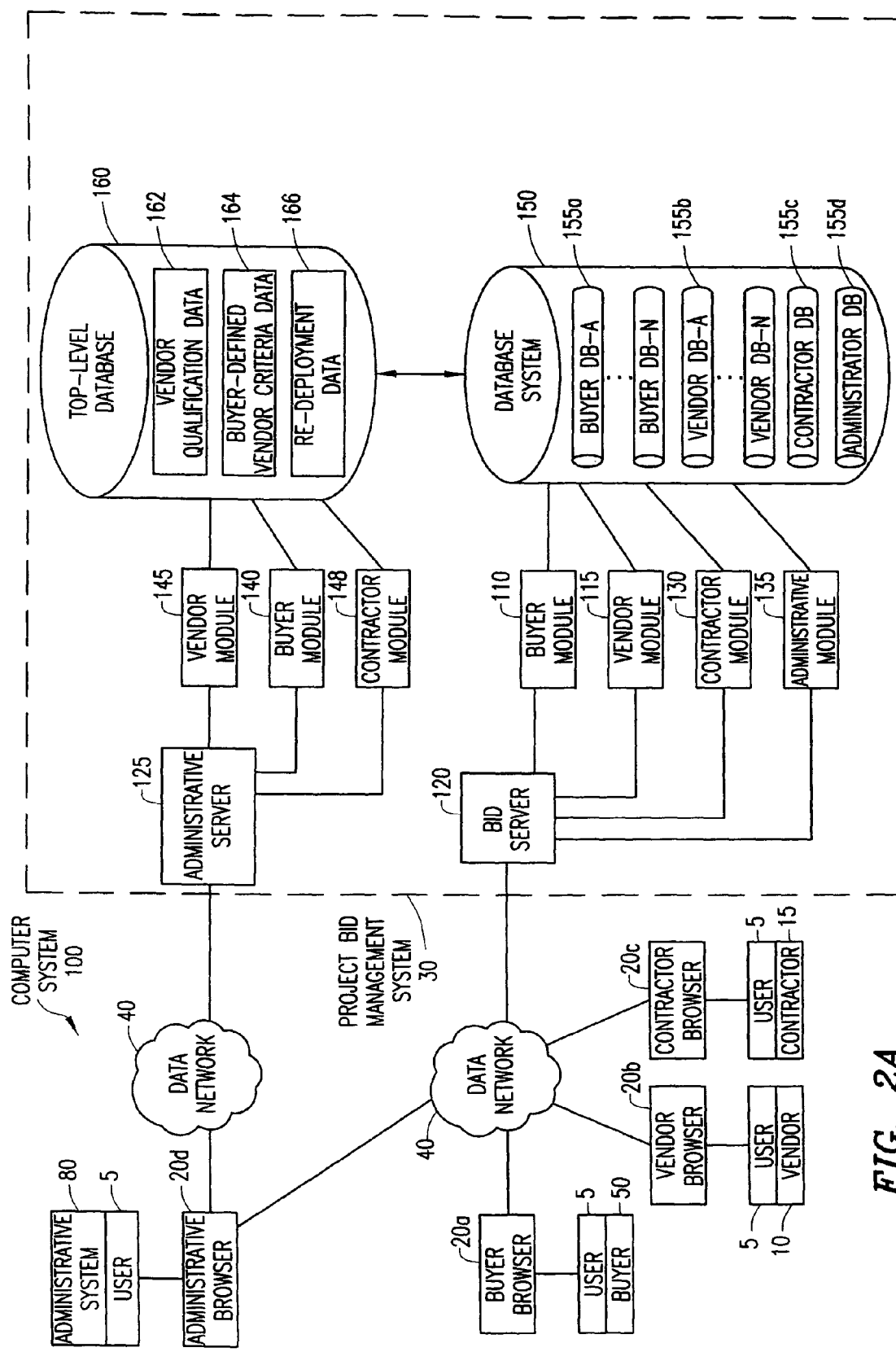
FIG. 2A is a network diagram of the computer system of the present invention.

In accordance with embodiments of the present invention, the project bid management system 30 can be implemented within a computer system 100, as is shown in FIG. 2A. A user 5 enters the computer system 100 through a data network 40 via a web browser 20. A user 5 includes any person associated with a vendor 10, buyer 50, administrator 80 (e.g., a third-party or buyer-employed administrator) or contractor 15 assigned to a project. By way of example, but not limitation, the data network 40 can be the Internet or an Intranet and the web browser 20 can be any available web browser or any type of Internet Service Provider (ISP) connection that provides access to the data network 40. Vendor users 5 access the computer system through a vendor browser 20b, buyer users 5 access the computer system via a buyer browser 20a, contractor users 5 access the computer system via a contractor browser 20c and administrative users 5 access the computer system through an administrative browser 20d. The users 5 access the computer system 100 through a web server 120 or 125 capable of pushing web pages to the vendor browser 20a, buyer browser 20b, contractor browser 20c and administrative browser 20d, respectively.

A bid web server 120 enables vendors 10, buyers 50, contractors 15 and administrators 80 to interface to a database system 150 maintaining data related to the vendors 10, buyers 50, contractors 15 and administrators 80. The data related to each of the vendors 10, buyers 50, contractors 15 and administrators 80 can be stored in a single database 155, in multiple shared databases 155 or in separate databases 155 within the database server 150 for security and convenience purposes, the latter being illustrated. For example, the database system 150 can be distributed throughout one or more locations, depending on the location and preference of the buyers 50, vendors 10, administrators 80 and contractors 15.

The user interface to the vendor users 5 is provided by the bid web server 120 through a vendor module 115. For example, the vendor module 115 can populate web pages pushed to the vendor browser 20b using the data stored in the particular vendor database 155b. The user interface to the buyer users 5 is provided by the bid web server 120 through a buyer module 110. For example, the buyer module 110 can populate web pages pushed to the buyer browser 20a using the data stored in the particular buyer database 155a. The user interface to the contractor users 5 is provided by the web server 120 through a contractor module 130. For example, the contractor module 130 can populate web pages pushed to the contractor browser 20c using the data stored in the contractor database 155c. The user interface to the administrative users 5 is provided by the bid web server 120 through an administrative module 135. For example, the administrative module 135 can populate web pages pushed to the administrative browser 20d using the data stored in the administrator database 155d. It should be noted that the vendor module 115, buyer module 110, contractor module 130 and administrative module 135 can each include any hardware, software and/or firmware required to perform the functions of the vendor module 115, buyer module 110, contractor module 130 and administrative module 135, and can be implemented as part of the bid web server 120, or within an additional server (not shown).

The computer system 100 further provides an additional user interface to administrative users 5 through an administrative web server 125. The administrative web server 125 enables administrators 80 to interface to a top-level database 160 maintaining data related to the vendors 10, buyers 50 and contractors 15 registered with the computer system 100. For example, the top-level database 160 can maintain vendor qualification data 162, buyer-defined vendor criteria data 164 and contractor re-deployment data 166.

To access information related to vendors 10, the administrative web server 125 uses a vendor module 145 to push web pages to the administrative browser 20d related to vendors 10. For example, the vendor module 145 can access vendor qualification information 162 to qualify vendors 10 for a particular buyer 50 or for a particular industry. Likewise, the administrative web server 125 can push web pages to the administrative browser 20d related to the buyer-defined vendor criteria information 164 through a buyer module 140 in order to qualify vendors 10 for a particular buyer 50. A contractor module 148 enables administrators 80 to access contractor re-deployment data 166 entered by contractors 15 through the bid server 120 and retrieved into the top-level database 160 from a contractor database 155. The re-deployment data 166 can include, for example, an indication of the mobility of the contractor, desired geographical areas, contractor skills, desired pay and other contractor information that can be used to assist administrators 80 in qualifying vendors 10 for buyers 50.

Figure 2B:
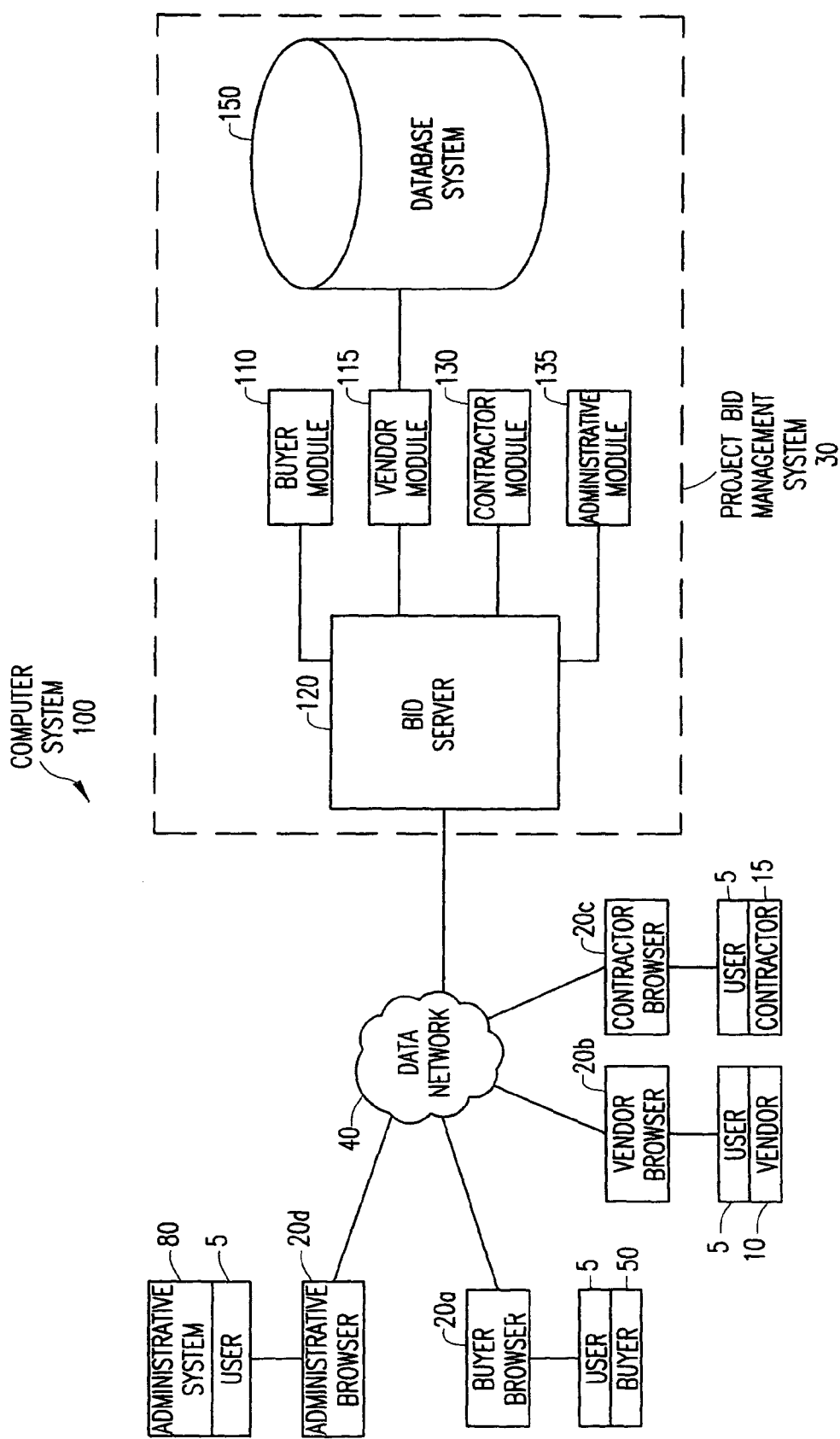
FIG. 2B is an alternate network diagram of the computer system of the present invention implemented at the buyer network.

In another embodiment, as shown in FIG. 2B, the computer system 100 can be implemented solely at the buyer network. In FIG. 2B, vendor users 5 enter the computer system 100 via a data network 40 through a vendor browser 20b, as in FIG. 2A. However, the web server 120 in FIG. 2B is a buyer web server controlled and operated by a single buyer. The database system 150 stores only the buyer data related to that particular buyer and only the vendor, contractor and administrator data pertinent to that particular buyer. For example, the vendor qualification data for only those vendors that are qualified by the buyer is stored in the database system 150.

Figure 3A:
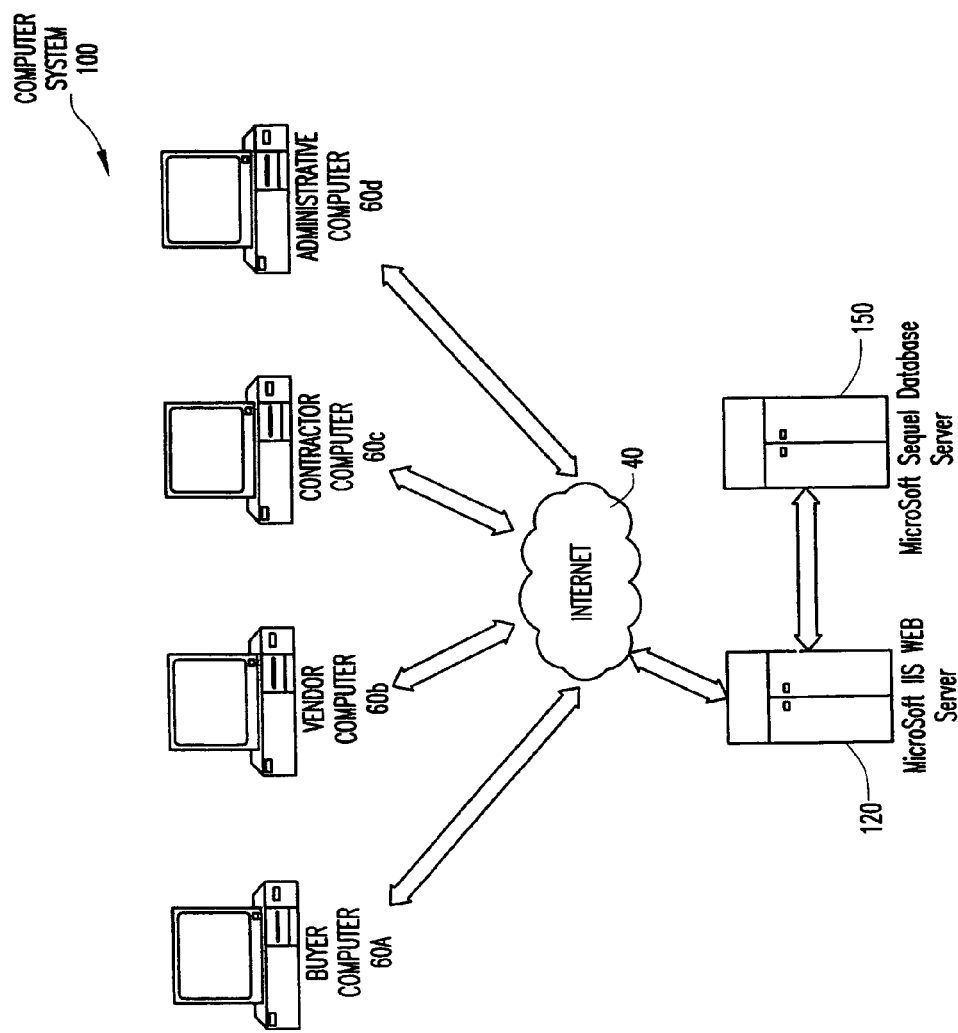
FIGS. 3A and 3B illustrate the physical network architecture of the computer system of the present invention.

Referring now to FIG. 3A, exemplary physical network equipment for implementing the computer system 100 is shown. A vendor user, a buyer user, contractor user or an administrative user accesses the web server 120 of the computer system 100 by connecting a computer 60a, 60b, 60c or 60d, respectively, to a data network 40. Each computer 60a-60d can be, for example, a personal computer, a laptop computer, a computer connected to a wireless device for remote access to the data network, a handheld wireless device providing a web browser capable of accessing the data network or other type of machine implementing a web browser. The web server 120 can be, for example, a Microsoft Internet Information Services (IIS) server. The web server 120 connects to an appropriate database system 150, depending on the type of user. The database system 150 can be implemented in, for example, one or more SQL servers.

Figure 3B:
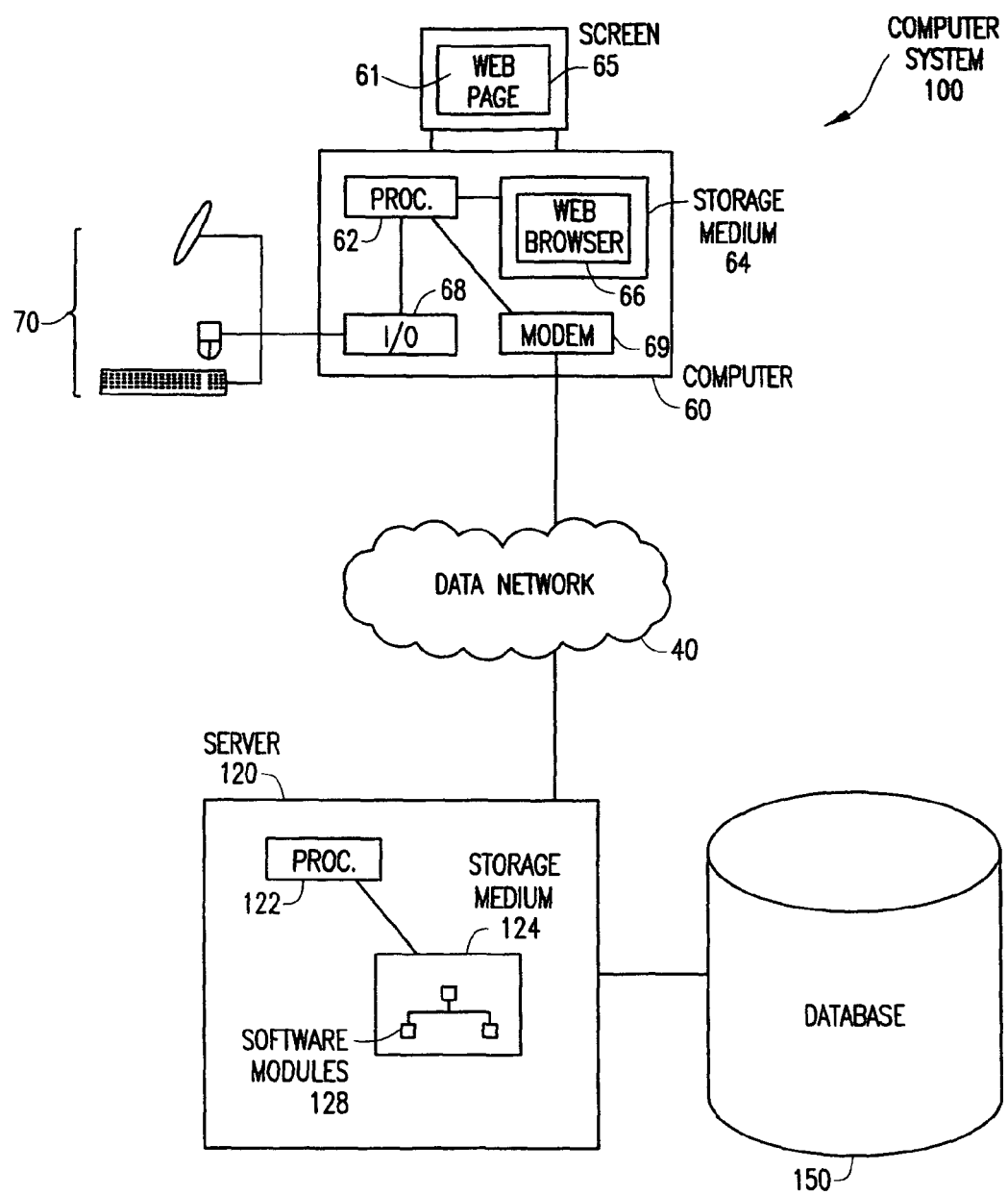

Turning now to FIG. 3B, exemplary functionality implemented in the physical network equipment of the computer system 100 is shown. A user computer 60 can access the data network 40 using a web browser 66 resident within a storage medium 64 of the computer. For example, the storage medium can be a disk drive, random access memory (RAM), read-only memory (ROM), compact disk, floppy disk, tape drive or any other type of storage medium. A processor 62 (e.g., a microprocessor or microcontroller) within the computer 60 loads and runs the web browser 66 to access the data network 40.

Upon entering the Uniform Resource Locator (URL) of the web server 120 into a computer, a connection between the computer 60 and the web server 120 is created. The web server 120 pushes web pages 61 to the computer 60 for viewing by the user on a user interface device 65. In one embodiment, the user interface device 65 is a computer screen 15 connected to the computer 60. For example, once a user has been validated (e.g., by entering a user name and password), the user can view one or more web pages 61 on the computer screen 65, each containing prompts for the user to enter various information into the computer system 100. The user can enter the information into the computer 60 for transmission via the data network 40 to the web server 120 via an I/O interface 68 and any type of input device 70, such as, for example, a mouse, keyboard, light pen, touch screen (not shown) or voice recognition software (not shown).

At the web server 120, a processor (e.g., a microprocessor or microcontroller) loads and executes computer instructions resident in software modules 128 stored within a storage medium 124, which can be any type of storage medium, as discussed above in connection with storage medium 64. The computer instructions can be created using any type of programming technique, including object-oriented programming techniques. For example, the software modules 128 may contain the computer instructions for the vendor modules, buyer modules, contractor modules and administrative modules (shown in FIGS. 2A and 2B) for populating web pages 61 for vendor users, buyer users, contractor users and administrative users, respectively. Based on the computer user log-in to the web server 120, the processor 122 accesses the appropriate software module 128 to determine the database system 150 associated with the computer user and retrieves the data related to the computer user for population in web pages 61 for display on the computer screen 65 of the computer 60. In addition, the software modules 128 may further be configured to store data received from the computer user within the database system 150.

Figure 4A:
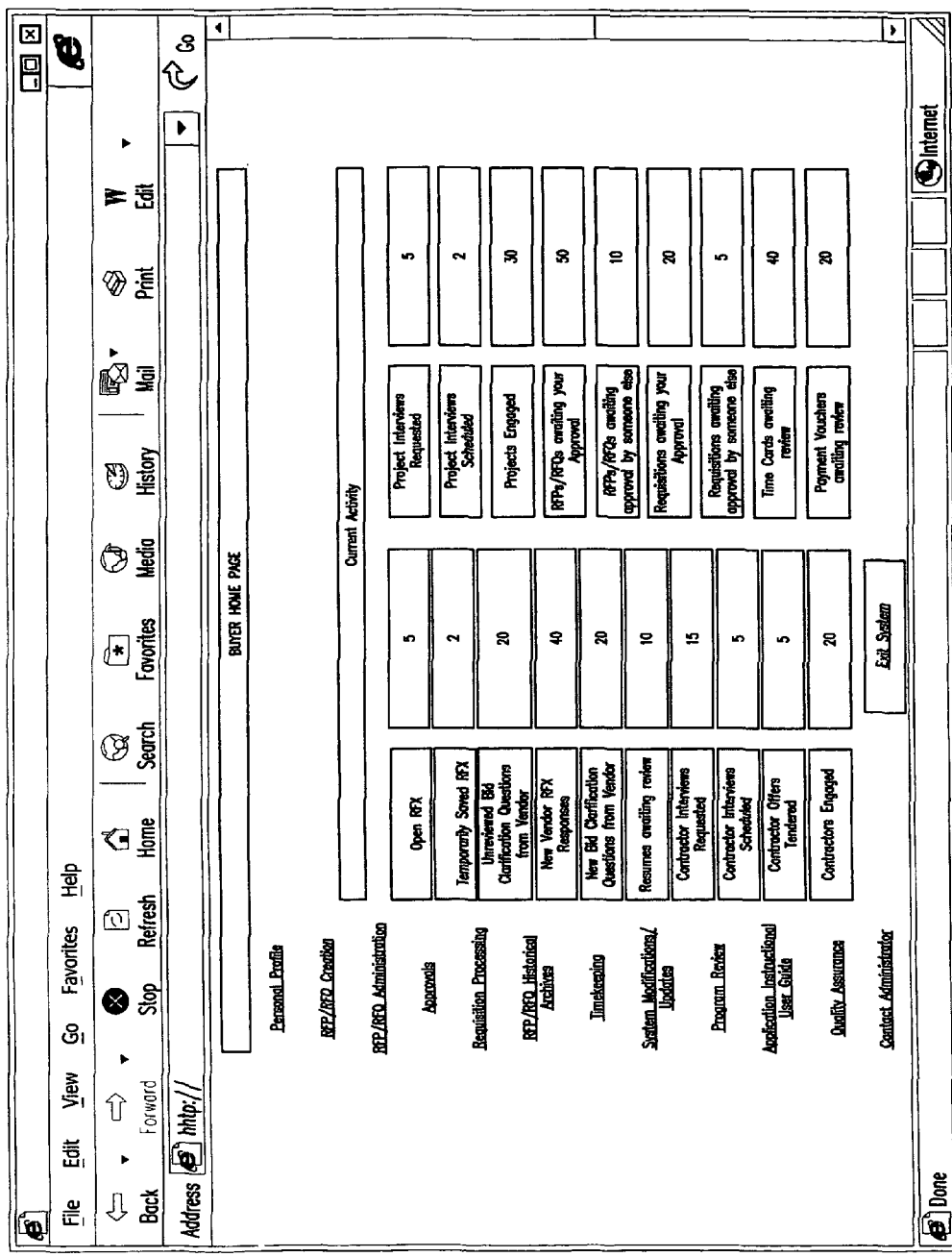
FIGS. 4A-4D are exemplary home web pages associated with each of the user modules shown in FIGS. 2A and 2B.

Examples of web pages 61 displayed to buyer users, vendor users, contractor users and administrative users are shown in FIGS. 4A-4D, respectively. FIG. 4A illustrates a sample buyer home page 61a displayed to a buyer user upon log-in and authentication (e.g., a challenge and response authentication) of the buyer user. As can be seen in FIG. 4A, there are a number of system features available to the buyer user at the buyer home page 61a. For example, the buyer user can be provided links to update their personal profile in the system, create an RFP/RFQ (referred to herein as a bid request), administer current bid requests, approve a vendor bid response to award the bid (project) to a particular vendor, process a current project, view historical bid requests or access a voucher processing system to view various project related event tracking requests, such as contractor time cards. The buyer user can further remain updated as to system modifications, receive instructions on how to maneuver through the system and contact a system administrator (e.g., a third-party administrator or buyer-employed administrator) for assistance through the buyer home page 61a.

In FIG. 4A, the buyer user is further provided with the current status of pending bids and projects at the home page 61a. However, it should be understood that the current activities can be displayed in subsequent web pages, instead of at the home page 61a. For example, the buyer user can be provided with the number of open bid requests (submitted bid requests) and the number of temporarily saved bid requests (created but not yet submitted bid requests). By clicking on the open bid request button, the buyer user can be linked to another web page displaying a list of the open bid requests with subsequent links to web pages that contain the actual open bid requests. Therefore, from the buyer home page 61a, the buyer user can link to any information pertaining to bids or projects that the buyer user has access to.

Figure 4B:
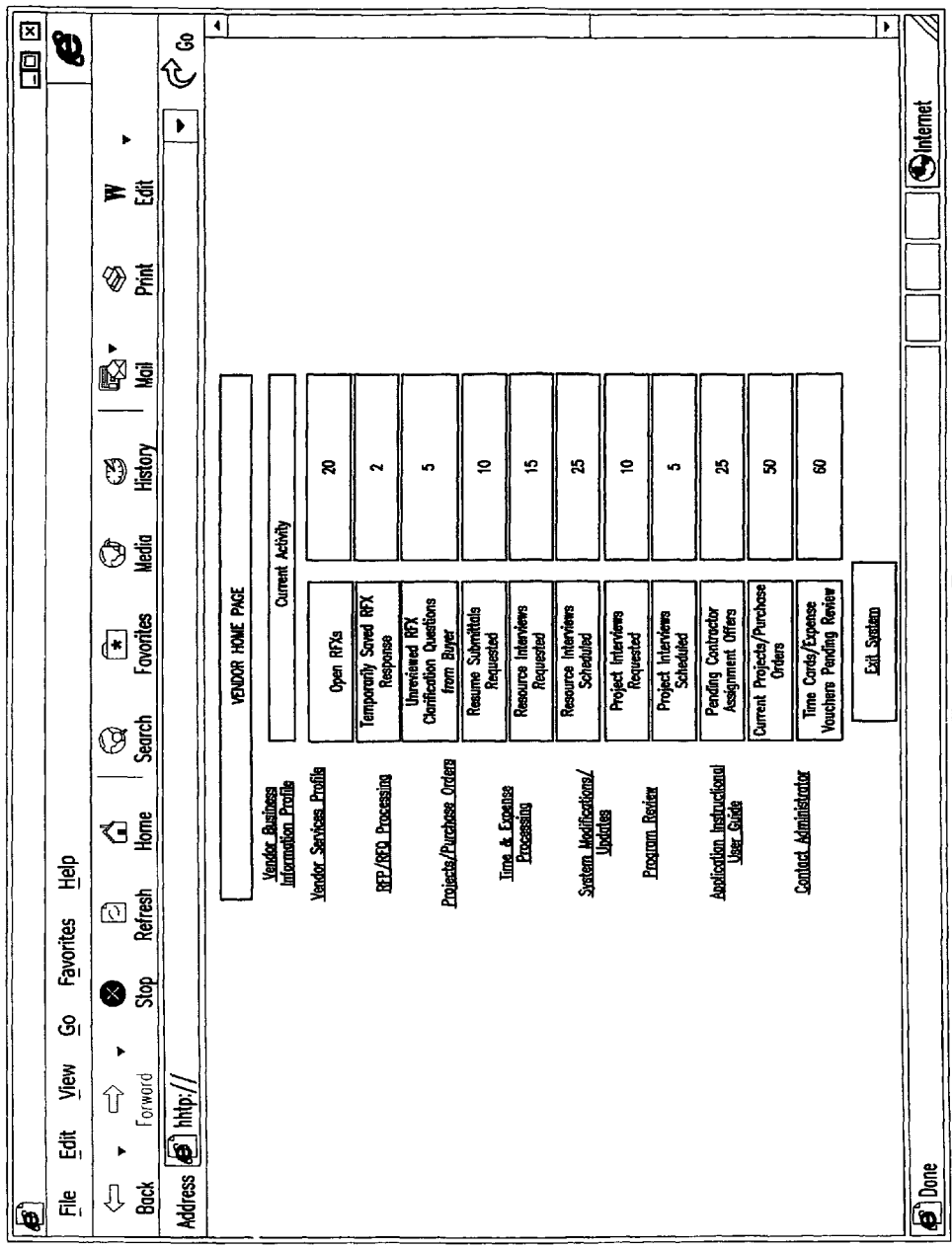

FIG. 4B illustrates a sample vendor home page 61b containing a number of system features available to the vendor user. For example, the vendor home page 61b can provide links to update the vendor profile (e.g., the types of goods and/or services the vendor provides), respond to received bid requests, process current projects or access a voucher processing system to view existing project event completion requests or process new project event completion requests. In FIG. 4B, the vendor user is also provided with the current status of pending bids and projects. For example, the vendor user can determine the number of bid requests that the vendor needs to respond to and the number of temporarily saved bid responses that the vendor has not yet completed. From the vendor home page 61b, the vendor user can link to additional web pages to complete vendor bid responses or access a newly received bid request to begin the vendor bid response.

Figure 4C:
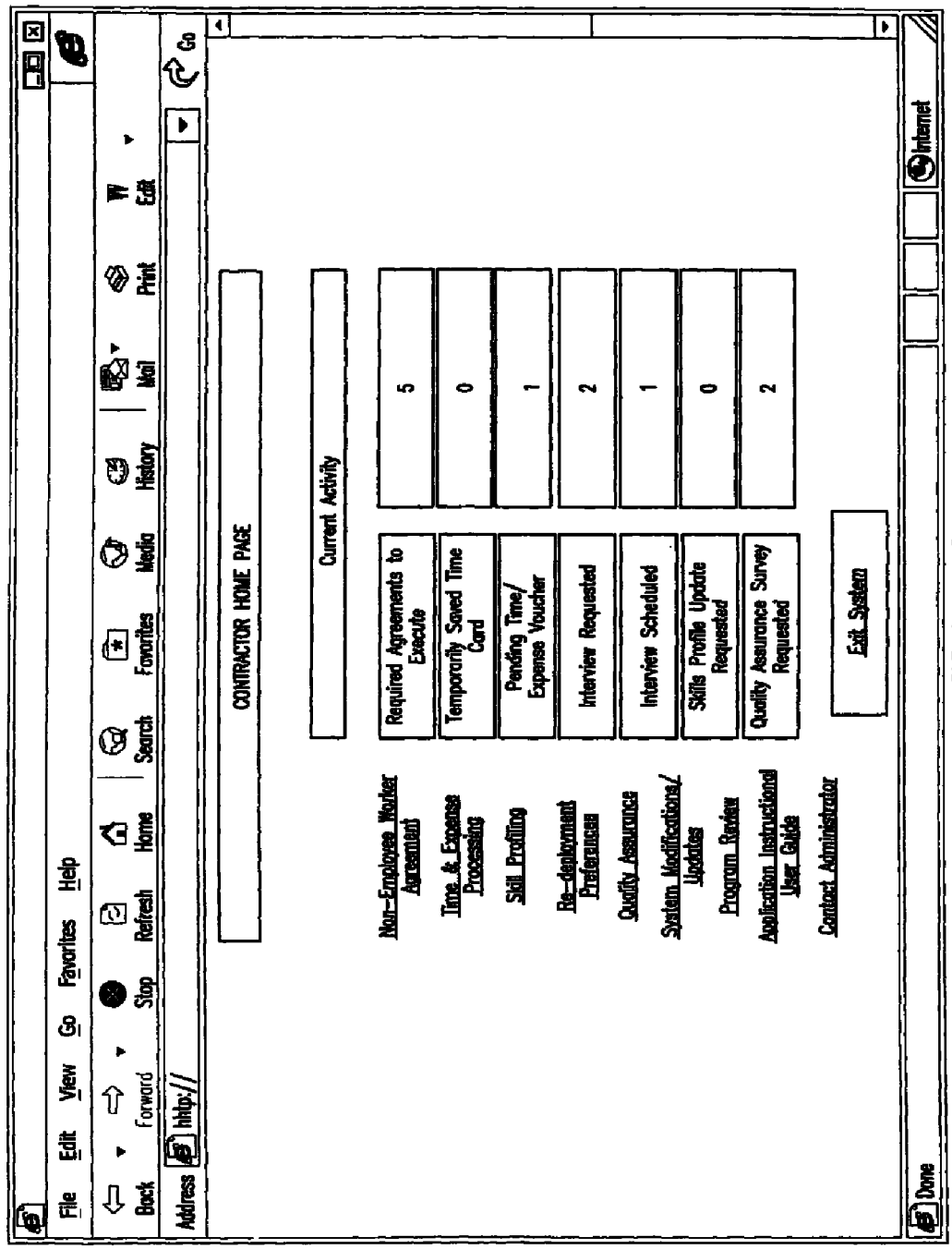

FIG. 4C illustrates a sample contractor home page 61c containing a number of system features available to the contractor. For example, the first time a contractor user enters the contractor home page 61c, the contractor user may be directed to agree to various non-employee worker agreements before accessing any other information in the system. Each of the non-employee worker agreements can be displayed to the contractor user, and the contractor user can be prompted to agree to or otherwise accept the terms of the agreements before continuing. Once the contractor user has completed all of the agreements, the contractor user can access the time keeping system to enter contractor time, update their skills profile or provide re-deployment preferences. In addition, current activities associated with the contractor user may also be displayed to the contractor user at the contractor home page 61c, such as the number of interviews requested or interviews scheduled for additional projects.

Figure 4D:
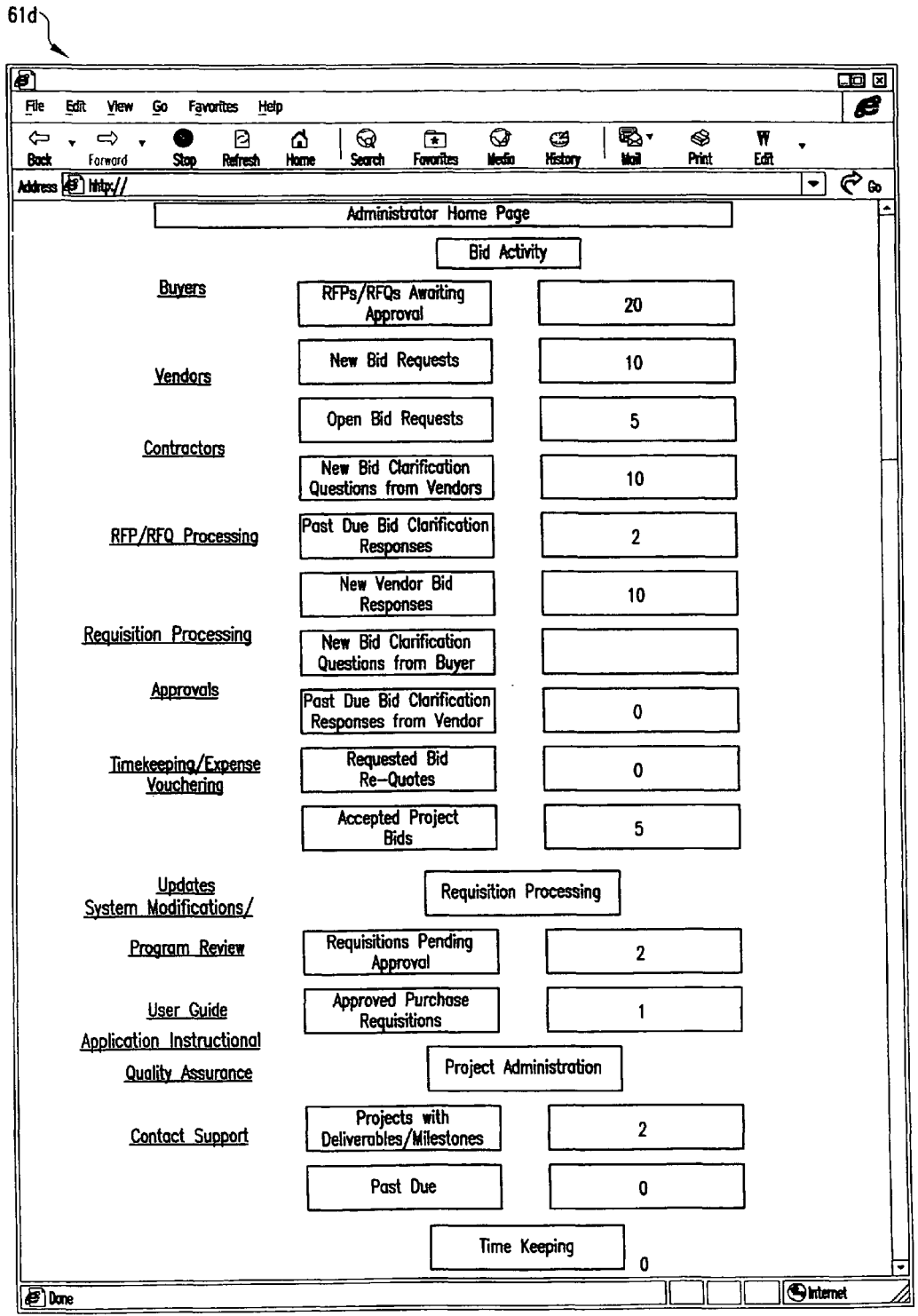

FIG. 4D illustrates a sample administrator home page 61d containing a number of features available to an administrative user. For example, the administrative user can access information on buyers, vendors or contractors, link to web pages containing bid requests that need to be approved, approve a bid response to award the bid to a particular vendor, process a current project or access a voucher processing system to view existing vendor/contractor requests for project activity approval, such as contractor time cards. In addition, the current activities of the administrative user can also be displayed on the administrator home page 61d. For example, the number of bid requests awaiting approval, the number of new bid requests and the number of new vendor responses can be displayed to the administrative user. From the administrator home page 61d, the administrative user can link to any information pertaining to the bid process or project management that the administrative user has access to. For example, if the administrative user is a third-party administrator, the administrative user may have access to the bids and projects of all buyers and vendors registered with the system. However, if the administrative user is a buyer-employed administrator, the administrative user may only have access to bids and projects associated with the particular buyer.

Figure 5:
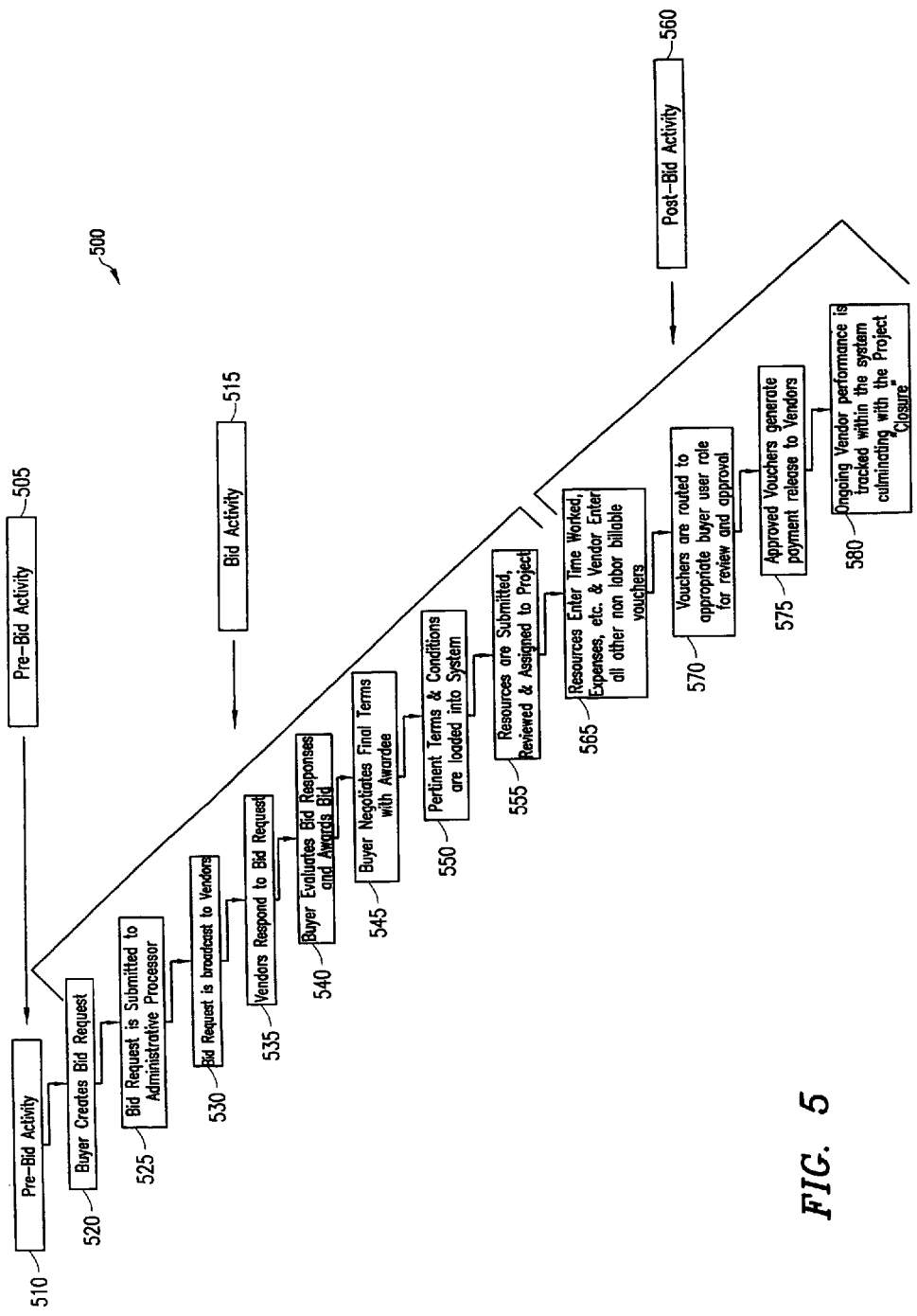
FIG. 5 is a flowchart illustrating exemplary steps for engaging in a project work bid process, in accordance with embodiments of the present invention.

Exemplary steps in the bid/project process 500 handled by the project bid management system of the present invention are shown in FIG. 5. There are several aspects of the bid/project process that are handled prior to any bid requests being submitted (step 505). For example, a buyer may want to create a list of qualified vendors for particular bid requests types to reduce processing time during bid solicitation, as will be described in more detail below in connection with FIGS. 6 and 7. As another example, buyers, vendors and administrators may want to designate particular personnel to handle different components of the bid/project process for efficient routing of messages and information during the bid/project process, as will be described in more detail below in connection with FIGS. 8-14.

Once all of the pre-bid activity is completed (step 510), a buyer can create a bid request for a project (step 520), as will be described in more detail below in connection with FIGS. 15-29, and submit the bid request to an administrator for approval (step 525), if necessary, as will be described in more detail below in connection with FIG. 20. Most companies require approval of bid requests for budgetary purposes. However, if the buyer is an individual or small business, the buyer user creating the bid request may not need approval from any other party to submit the bid request.

Once the bid request has been approved, the bid request is broadcast (e.g., made available to vendors via the system with optional notification via electronic mail) to qualified vendors (step 530), as will be described in more detail below in connection with FIG. 23, to solicit a bid response from the vendors (step 535). Each of the bid responses is evaluated by the buyer, as will be described in more detail below in connection with FIGS. 32 and 33, to determine which vendor bid response is the most qualified (step 540). After the buyer selects a particular vendor for the project, the buyer and vendor negotiate the final terms and conditions of the contract (step 545) and these terms and conditions can be loaded into the system for project tracking purposes (step 550), as will be described in more detail below in connection with FIG. 37. Thereafter, the vendor selects the specific resources (contractors) for the project, and if the terms of the project require buyer approval of resources, the buyer approves all of the assigned resources before the project ensues (step 555), as will be described in more detail below in connection with FIG. 38.

Once all of the bid activity is completed (step 515), the system is further capable of handling post-bid activity (step 560) to track the performance of the project and payment of vouchers during the course of the project. For example, the vendor and contractors assigned to the project can enter time worked and expenses into the system (step 565) for the generation of payable vouchers to be submitted to the buyer through the system, as will be described in more detail below in connection with FIG. 43. Upon receipt of the vouchers, the buyer and/or administrator can review and approve the vouchers for payment to the vendor (steps 570 and 575), as will be described in more detail below in connection with FIG. 49. Other project tracking parameters can also be entered into the system to track the performance of the vendor through project closure (step 580), as will be described in more detail below in connection with FIGS. 39 and 40. Each of the main components of the bid/project process (pre-bid activity, bid activity and post-bid activity) will now be discussed separately hereinbelow.

Pre-Bid Activity

Figure 6:
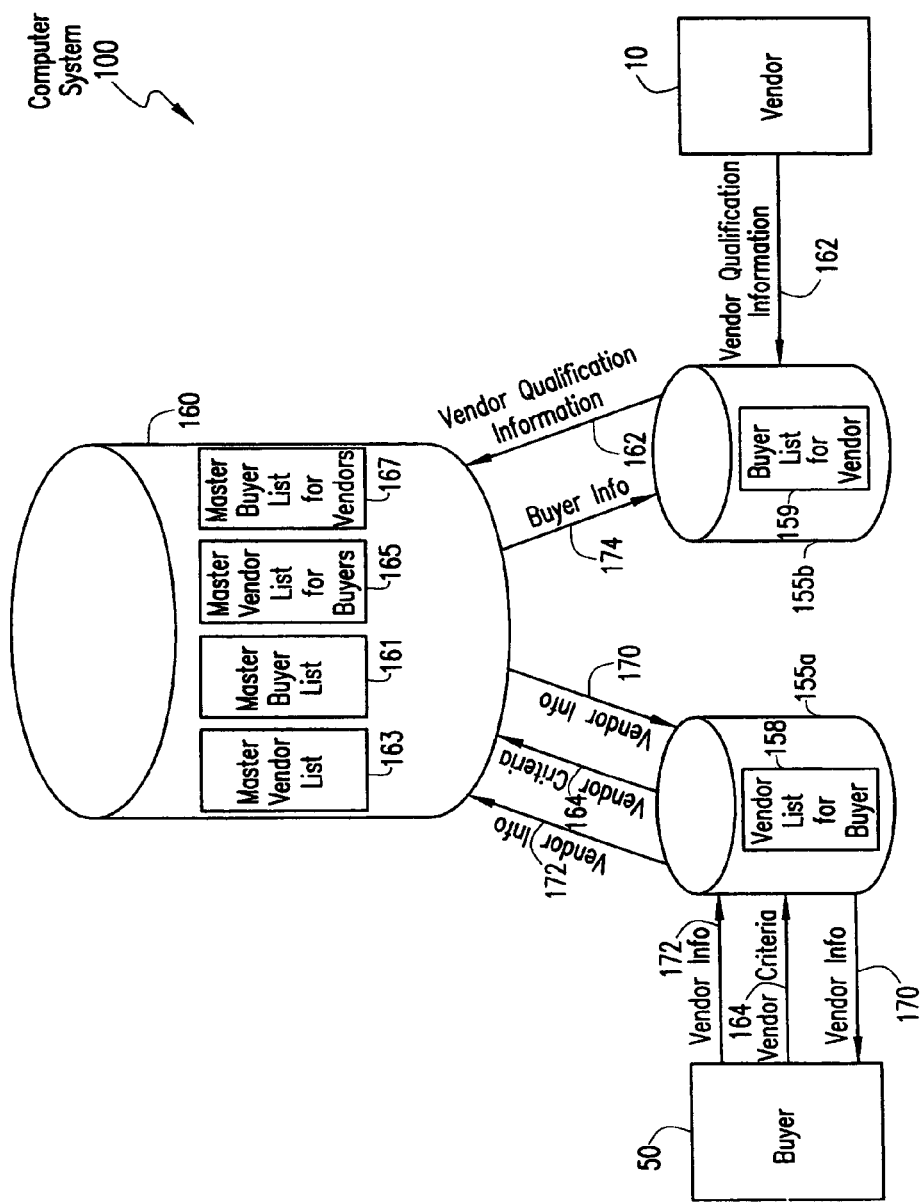
FIG. 6 illustrates the electronic facilitation of a vendor qualification process for defining the type of project work a vendor provides and/or a buyer requires and qualifying vendors for buyers, in accordance with embodiments of the present invention.

As discussed above, a buyer 50 may want to pre-qualify vendors 10 for particular project types to reduce the amount of processing required for each bid request submitted. Referring now to FIG. 6, to facilitate vendor qualification for buyers, the computer system 100 can enable buyers 50 to establish buyer-defined vendor criteria data 164 for vendors and store the buyer-defined vendor criteria data 164 within the top-level database 160 in a master buyer list 161. The computer system 100 can further acquire pertinent vendor qualification data 162 from vendors 10 and store the vendor qualification data 162 in the top-level database 160 in a master vendor list 163.

For example, the vendor qualification data 162 can identify the specific goods and/or services that the vendor 10 provides and the specific geographical areas that the vendor 10 is capable of supplying these goods and/or services, along with other vendor information, such as the size of the vendor, whether the vendor has insurance, whether the vendor is certified in certain industries, etc. The buyer-defined vendor criteria data 164 can identify the specific goods and/or services that the buyer 50 desires, the specific geographical areas that the buyer 50 wants the goods and/or services and other buyer constraints, such as the preferred size of the vendor, requisite vendor insurance needs, requisite vendor certifications, etc.

Based on the vendor qualification data 162 and buyer-defined vendor criteria data 164, the computer system 100 can determine which vendors 10 have the requisite qualifications for buyers 50 and provide qualified vendor information 170 (e.g., name, address, and any other vendor information that the buyer needs) to the buyer 50 for review. If the buyer 50 or optionally the administrator 80 approves of the vendor 10, the buyer 50 can add the vendor information 170 to a vendor list 158, which is stored in the buyer database 155a. In addition, vendor information 172 for those vendors 10 that the buyer 50 previously qualified can also be stored in the vendor list 158. Furthermore, a master copy of the vendor list 158 (i.e., Master Vendor List for Buyers 165) can be stored in the top-level database 160 for redundancy and updating purposes.

Buyer information 174 (e.g., name, address and other information that the buyer agrees to provide) can also be downloaded to the vendor database 155b for storage in a buyer list 159 therein. In addition, a master copy of the buyer list 159 (i.e., Master Buyer List for Vendors 167) can be stored in the top-level database 160 for redundancy and updating purposes. However, it should be understood that if the computer system 100 is implemented solely at the buyer network, the top-level database 160 would not store master copies 165 and 167, and the buyer 50 would perform vendor qualification using only the vendor information 172 known to the buyer 50 or provided directly to the buyer 50 by the vendor 10. For a complete discussion of qualifying vendors 10 for buyers 50 based on vendor qualification data 162 and buyer-defined vendor criteria data 164, reference is made to co-pending and commonly-assigned U.S. patent application Ser. No. 10/141,801, which is hereby incorporated by reference in its entirety herein.

Figure 7:
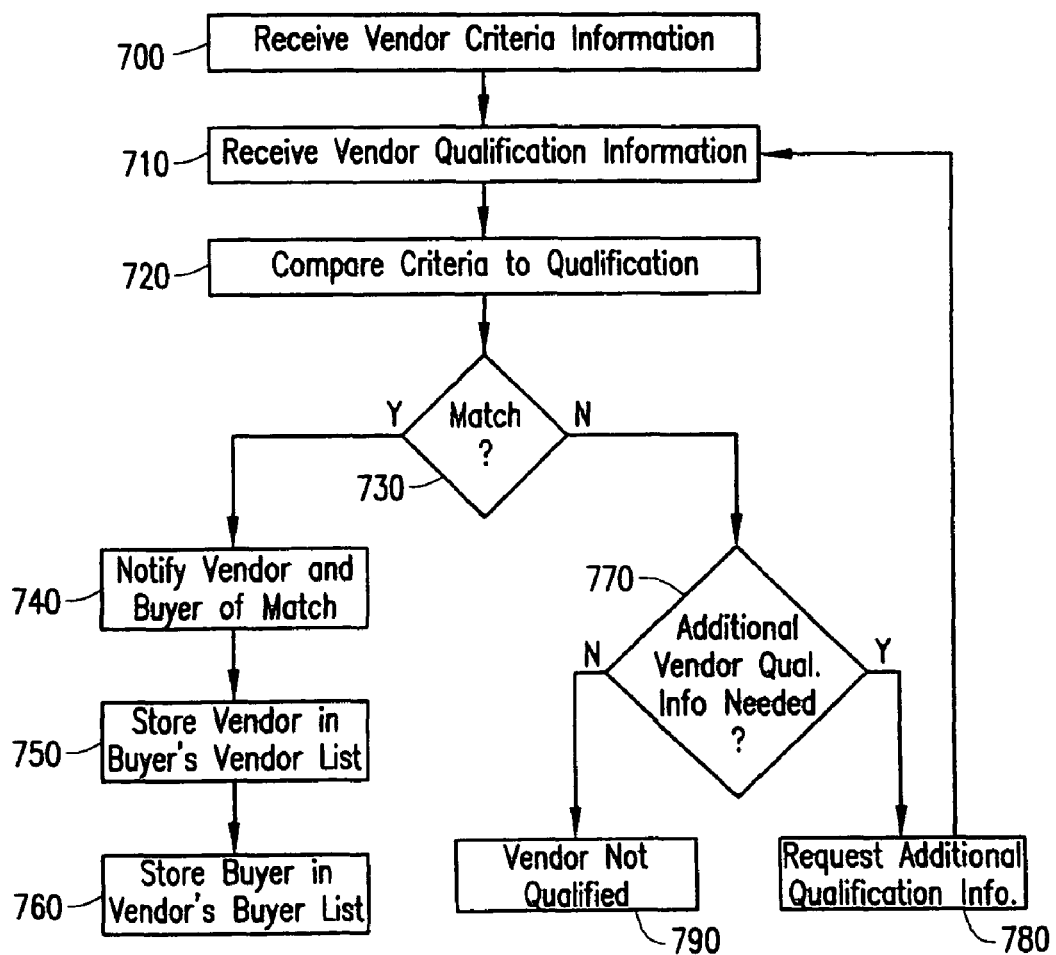
FIG. 7 is a flow chart illustrating exemplary steps for qualifying a vendor for a buyer, in accordance with embodiments of the present invention.
Figure 8:
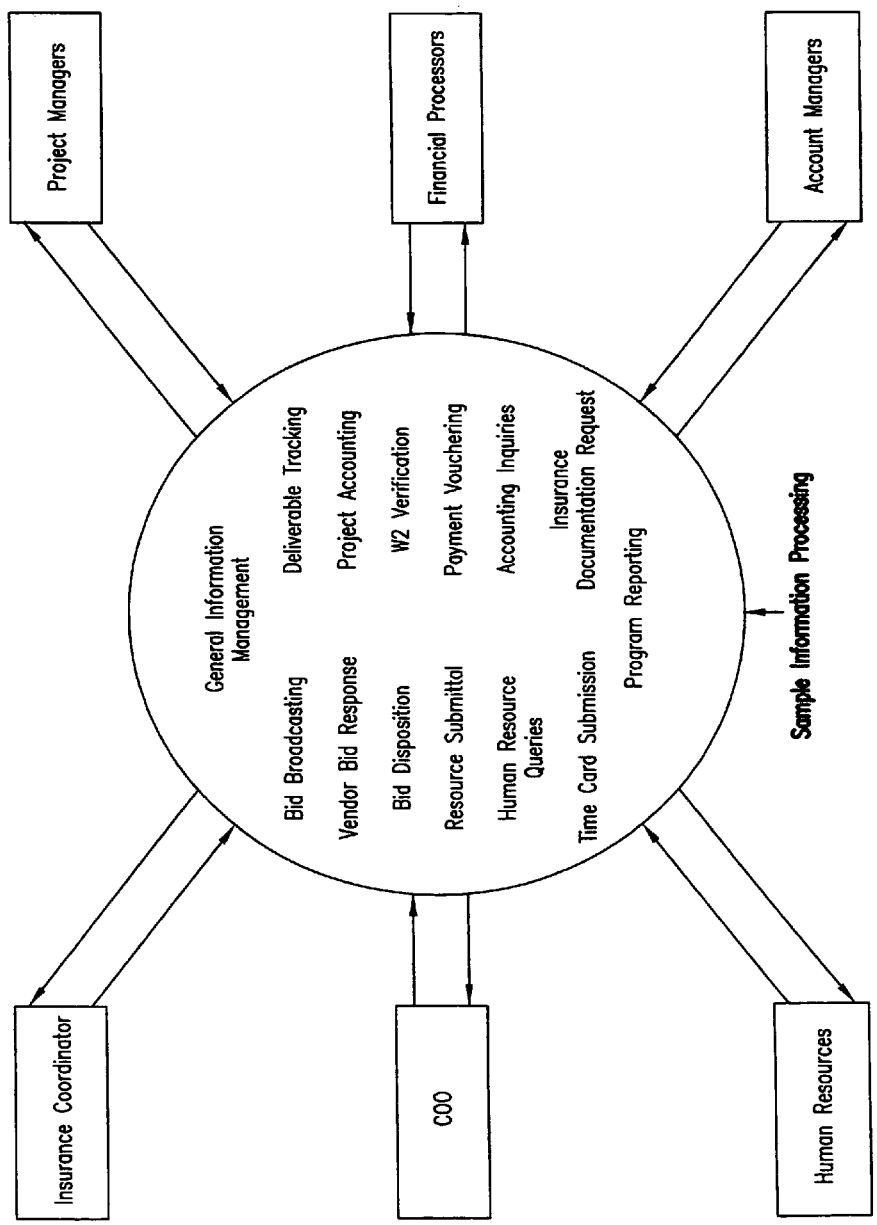
FIG. 8 illustrates sample information processing involved in responding to a bid request and various user roles responsible for the information processing.

Exemplary steps for qualifying vendors for buyers are shown in FIG. 7. Once the buyer-defined vendor criteria information is established (step 700) and vendor qualification information from a vendor is received (step 710), the buyer-defined vendor criteria information is compared to the vendor qualification information (step 720) to determine whether the vendor qualification information matches the buyer-defined vendor criteria information (step 730). If so, the vendor and buyer are notified of the match (step 740), and if the buyer approves of the vendor, the vendor information associated with the vendor is stored in the buyer's vendor list for later use in preparing bid requests (step 750). In addition, the buyer information can be stored in the vendor's buyer list for reference when receiving bid requests and preparing bid responses (step 760).

However, if the vendor qualification information does not match the buyer-defined vendor criteria information (step 730), the system determines whether additional vendor qualification information is needed to qualify the vendor for the buyer (step 770). If so, the vendor is requested to provide this additional vendor qualification information (step 780) to qualify the vendor for the buyer (step 710). If not, the vendor is not qualified for the buyer (step 790), and the vendor is not added to the buyer list.

In addition to qualifying vendors for buyers, vendors, buyers and administrators may want to designate certain personnel to handle various aspects of the bid/project process to synchronize communications, data and transaction processing across multiple user platforms. For example, referring now to FIG. 8, the bid/project process typically requires the inclusion of a broad spectrum of information processing and functional departments to facilitate the administration and management of the bid/project process. Such information processing can include, for example, bid request broadcasting, vendor bid responses, bid disposition (evaluation and award), resource submittal, time card submission, deliverables tracking and payment vouchering. Each of these information processing components may be handled by one or more different individuals or departments, such as the COO, Human Resources department, Project Manager and Financial Processor. To meet this functional need, the computer system of the present invention can enable a shared work environment, where the buyer, vendor and/or administrator can specify multiple custom user roles that need to participate in the bid/project process and designate personnel (resources) to each of the user roles for all bid/projects or for particular bid/projects.

Figure 9:
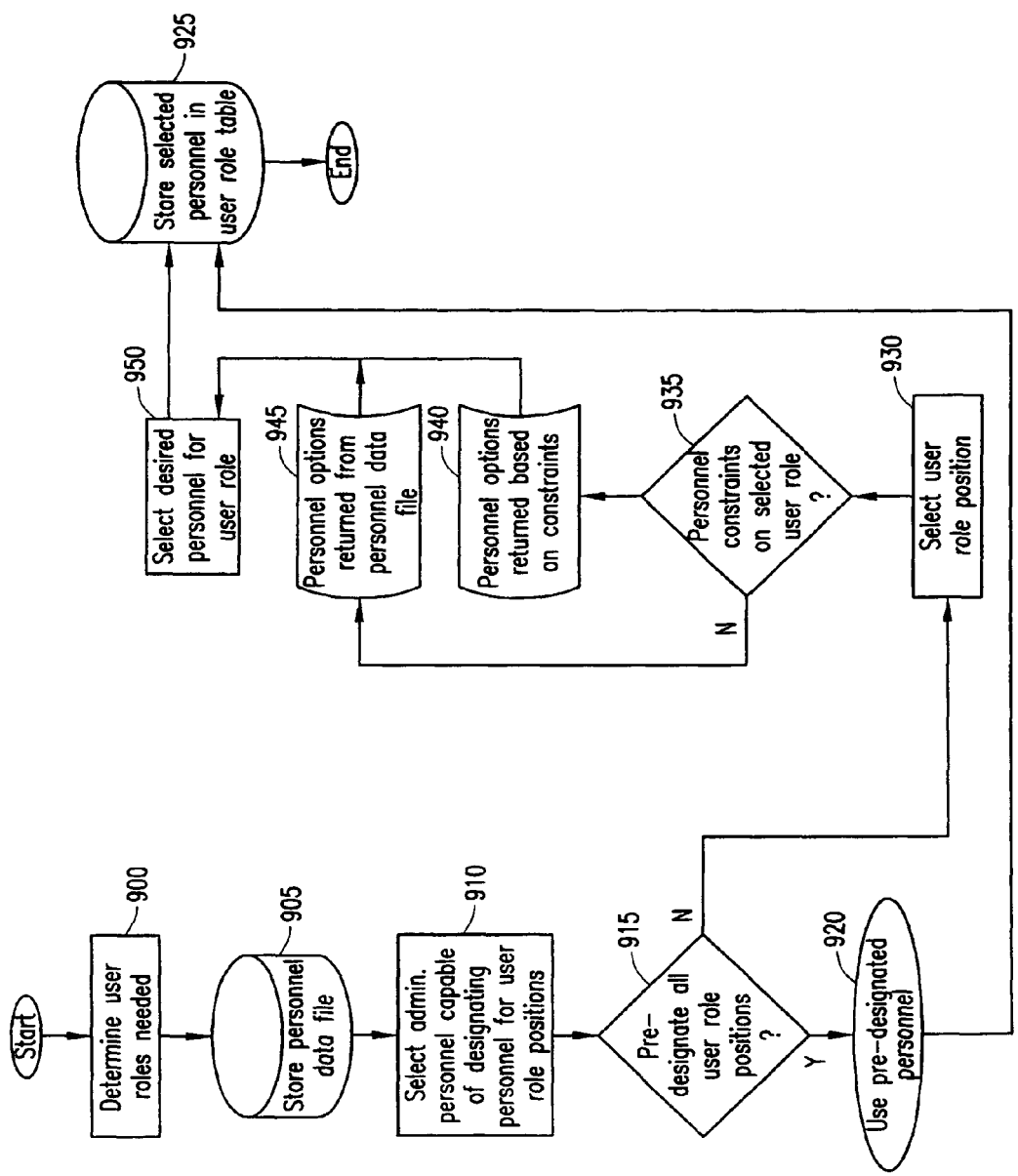
FIG. 9 is a flowchart illustrating exemplary steps for defining and assigning the various resources involved in the project work process, in accordance with embodiments of the present invention.
Figure 11:
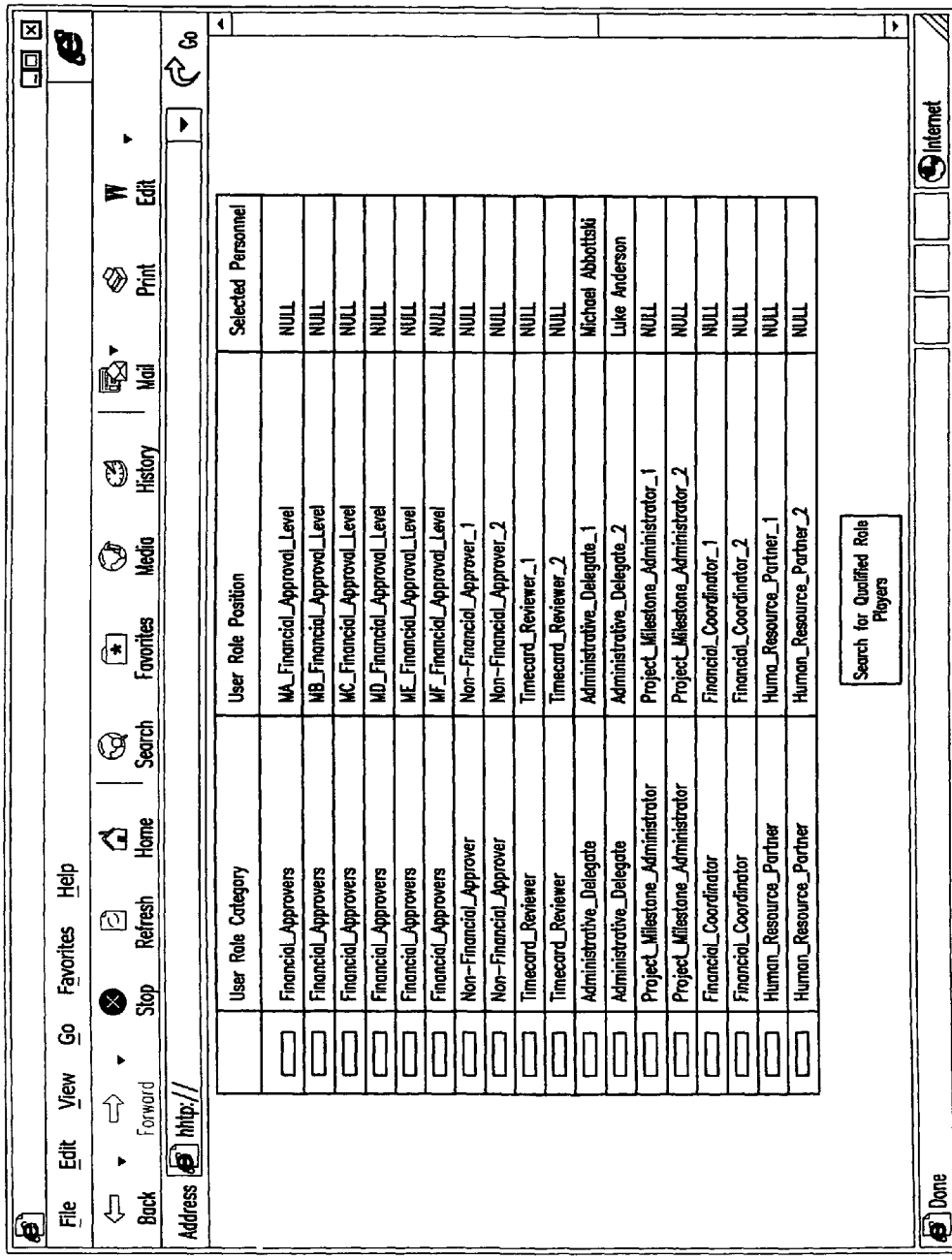
FIG. 11 is an exemplary screen shot of the assignment of resources to user roles.

Referring now to FIG. 9, there is illustrated exemplary steps for specifying user role positions and assigning personnel to the user role positions for a vendor, buyer or administrator. Initially, the vendor, buyer or administrator determine the specific user role positions that are needed for the bid/project process (step 900). For example, as shown in the sample buyer web page of FIG. 11, the buyer may determine that there is a need for several different user role categories, such as financial approvers, non-financial approvers, time card reviewers, administrate delegates, project milestone administrators, financial coordinators and human resource partners during the project/bid process. The vendor, buyer or administrator may further determine that multiple user role positions within one or more of the user role categories are needed for the bid/project process. For example, as shown in FIG. 11, the buyer may determine that there is a need for six financial approvers and two non-financial approvers.

Referring again to FIG. 9, once the user role positions are determined, a data file for the pertinent personnel of the vendor, buyer or administrator is stored for use in selecting appropriate personnel for each of the user role positions (step 905). One or more key personnel of the vendor, buyer or administrator (e.g., the COO, Project Manager, etc.) can be selected to designate the particular personnel to be assigned to each of the user role positions (step 910), or alternatively, the system can assign personnel to user role positions based on the information contained in the personnel data file. In some companies, user role positions are pre-designated (step 915), and in this case, the pre-designated personnel can be loaded into the system (step 920) and stored in a user role table (step 925). For example, for most vendors, personnel is pre-assigned to various user role positions for all projects. In other companies, one or more of the user role positions may not be pre-designated at all or not pre-designated for a particular project (step 915), and in this case, the selected key personnel or the system can assign specific personnel to the user role positions.

To assign specific personnel to user role positions, the specific user role position is selected (step 930), and a list of personnel that can be assigned to that user role position, depending upon user role constraints, is determined from the personnel data file (steps 935, 940 and 945). For example, if a user role position requires a particular level manager, only those personnel at the particular manager level or higher are included on the list. From the list of personnel for the user role position, one of the personnel is selected for the particular user role position (step 950) and the selected personnel is stored in the user role table (step 925). For example, as shown in FIG. 11, upon selecting a particular user role position (e.g., clicking on a user role position), the system can search for qualified personnel for the user role position, and after a selection has been made, the selected personnel for the user role position can be displayed.

Examples of data structures for selecting and assigning user role positions for a buyer are shown in Tables 1-9 hereinbelow. The data structures are illustrated for simplicity as being organized in a table format, with each table including all of the fields necessary for defining and assigning user role positions for the buyer. The tables are related in a hierarchical and/or relational manner, so that all of the necessary information for user role positions can be accurately stored and accessed, as will be described hereinbelow in connection with the exemplary database table structure 300 of FIG. 10. However, it should be understood that other buyer user role configurations can be included, and the system is not limited to the specific buyer user role configurations listed in Tables 1-9 or FIG. 10.

Figure 10:
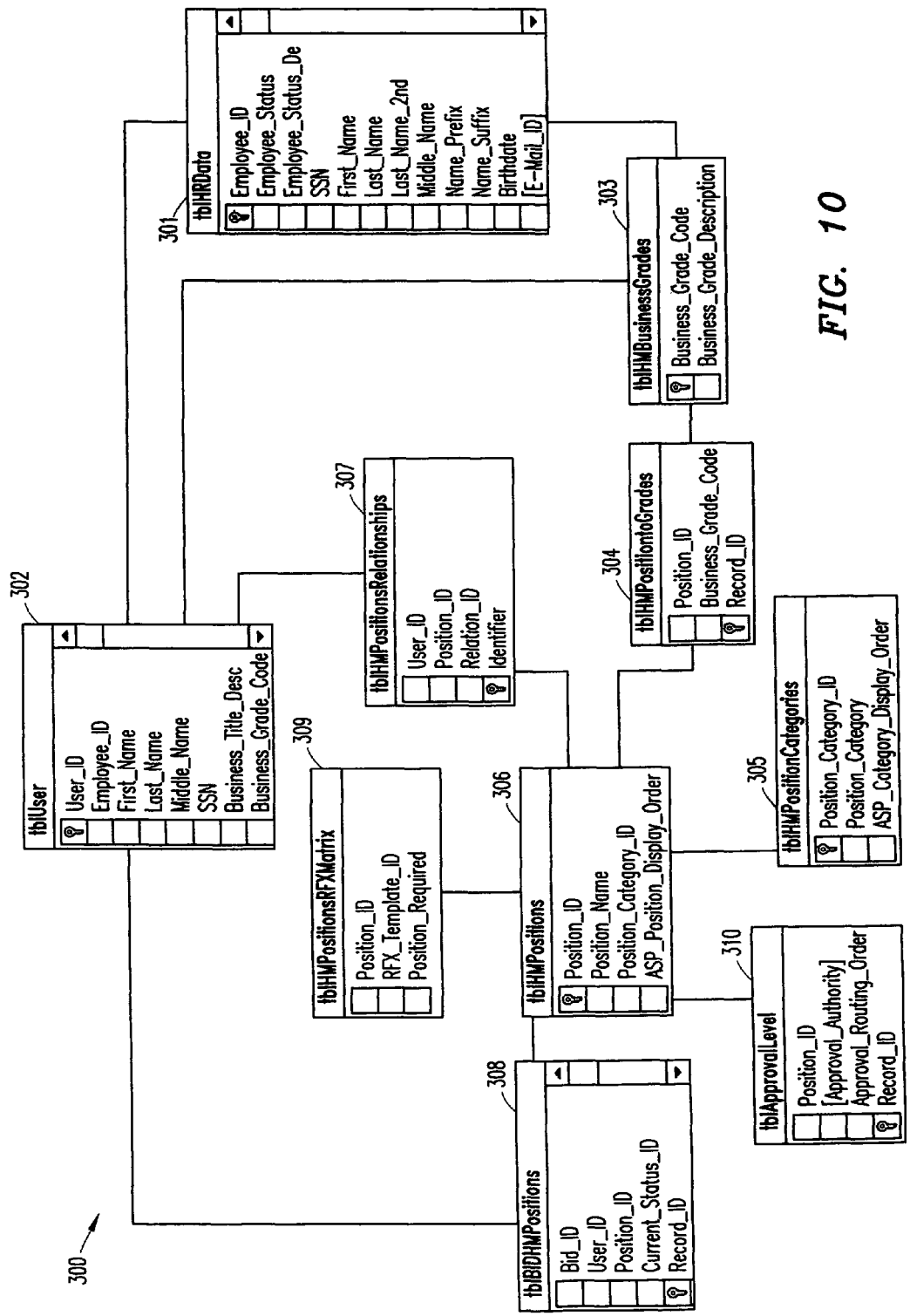
FIG. 10 is a database table view illustrating the definition and assignment of user roles, in accordance with embodiments of the present invention.

Tables 1 and 2 below illustrate sample user role categories and user role positions within each of the user role categories, respectively, which can be stored in the database in tables "tblHMPositionCategories" 305 and "tblHMPositions" 306, respectively, as shown in FIG. 10. In Table 1, each user role category is assigned an identification number and a display order for display on a web page. The user role category identification numbers are used within the user role positions table (Table 2) to correlate the user role positions with the specific user role categories. However, it should be understood that there could be numerous additional categories and positions, depending on the needs of the buyer. When initially selecting the user role positions, the user role categories can be displayed for the user to select from, with links to the specific user role positions within each of the categories. After all user role positions have been selected for the particular buyer, the selected user role positions and assigned personnel can be displayed as in FIG. 11.

TABLE 1

Exemplary User Role Categories (tblHMPositionCategories)

| Position_Category_ID | Position_Category_Name | ASP_Category_Display_Order |
|---|---|---|
| 1 | Financial_Approvers | 1 |
| 2 | Non-Financial_Approvers | 2 |
| 3 | Timecard_Reviewers | 3 |
| 4 | Administrative_Delegates | 4 |
| 5 | Project_Milestone_Administrators | 5 |
| 6 | Financial_Coordinators | 6 |

TABLE 1-continued

Exemplary User Role Categories (tblHMPositionCategories)

| Position_Category_ID | Position_Category_Name | ASP_Category_Display_Order |
|---|---|---|
| 7 | Human_Resource_Partners | 7 |
| 8 | Security_Partners | 8 |
| 9 | Regulatory_Compliance_Partners | 9 |

TABLE 2

Exemplary User Role Positions (tblHMPositions)

| Position_ID | Position_Name | Position_Category_ID |
|---|---|---|
| 1 | MA_Financial_Approval_Level | 1 |
| 2 | MB_Financial_Approval_Level | 1 |
| 3 | MC_Financial_Approval_Level | 1 |
| 4 | MD_Financial_Approval_Level | 1 |
| 5 | ME_Financial_Approval_Level | 1 |
| 6 | MF_Financial_Approval_Level | 1 |
| 7 | Non-Financial_Approver_1 | 2 |
| 8 | Non-Financial_Approver_2 | 2 |
| 9 | Timecard_Reviewer_1 | 3 |
| 10 | Timecard_Reviewer_2 | 3 |
| 11 | Administrative_Delegate_1 | 4 |
| 12 | Administrative_Delegate_2 | 5 |
| 13 | Project_Milestone_Administrator_1 | 5 |
| 14 | Project_Milestone_Administrator_2 | 5 |
| 15 | Financial_Coordinator_1 | 6 |
| 16 | Financial_Coordinator_2 | 6 |
| 17 | Human_Resource_Partner_1 | 7 |
| 18 | Human_Resource_Partner_2 | 7 |
| 19 | Project_Bid_Originator | 4 |
| 20 | Security_Administrator | 8 |
| 21 | Regulatory_Compliance_Administrator | 9 |

Table 3 below illustrates sample data stored within the personnel date file for each user of the system, which can be stored in the database in table "tblUser" 302, as shown in FIG. 10. From this user data, the qualified personnel for each user role position can be determined, and the requisite information for each assigned user for each user role position can be ascertained. One of the fields within Table 3 is the business grade assigned to the particular user. The business grade indicates the particular level of the user in the business system. For example, the user may be a level 3 manager, and this information would be stored in the user table. The available business grades can be mapped to the user role positions, as shown in Tables 4 and 5 below to indicate the business grade required for the user assigned to each user role position which can be stored in the database in tables "tblHMBusinessGrades" 303 and "tblHMPositiontoGradeMap" 304, as shown in FIG. 10.

TABLE 3

Base System User Table (tblUser)

| Column | Data Type | Length |
|---|---|---|
| User_ID | int | 4 |
| Employee_ID | nvarchar | 10 |
| First_Name | nvarchar | 50 |
| Last_Name | nvarchar | 50 |
| Last_Name_2$^{nd}$ | nvarchar | 50 |
| Middle_Name | nvarchar | 10 |
| SSN | nvarchar | 50 |
| Business_Title_Description | nvarchar | 50 |
| Business_Grade_Code | nvarchar | 10 |
| Business_Grade_Description | nvarchar | 50 |
| Financial_Approval_Level | int | 4 |
| Birthdate | datetime | 8 |
| Business_Unit_Name | nvarchar | 100 |
| [Dept/Cost_Center] | nvarchar | 10 |
| Dept_Name | nvarchar | 50 |
| Work_Location_Code | numeric | 9 |
| Location_Type | nvarchar | 50 |
| Location_Address1 | nvarchar | 50 |
| Location_Address2 | nvarchar | 50 |
| Location_City | nvarchar | 50 |
| Location_State | nvarchar | 50 |
| Location_Country | nvarchar | 50 |
| Location_Zip | nvarchar | 4 |
| Country_ID | int | 4 |
| Work_Phone_Number | nvarchar | 50 |
| Fax_Number | nvarchar | 50 |
| [E-Mail] | nvarchar | 50 |
| User_Name | nvarchar | 50 |
| Password | nvarchar | 50 |
| Active | bit | 1 |
| Last_Logged_In | datetime | 8 |
| Date_Updated | datetime | 8 |
| US_Date_Format | bit | 1 |
| Currency_ID | int | 4 |

TABLE 4

Base Business Grade Table (tblHMBusinessGrades)

| Column Name | Data Type | Length |
| --- | --- | --- |
| Business_Grade_Code | nvarchar | 10 |
| Business_Grade_Description | nvarchar | 50 |

TABLE 5

User Role to Business Grade Mapping Table (tblHMPositiontoGradeMap)

| Column Name | Data Type | Length |
| --- | --- | --- |
| Position_ID | int | 4 |
| Business_Grade_Code | nvarchar | 10 |
| Record_ID | int | 4 |

Tables 6-9 shown below will be described in more detail hereinbelow in connection with FIG. 10.

TABLE 6

Position/Role to Bid Template Mapping Table (tblHMPositionsRFXMatrix)

| Column Name | Data Type | Length |
| --- | --- | --- |
| Position_ID | int | 4 |
| RFX_Template_ID | int | 4 |
| Position_Required | char | 1 |

TABLE 7

Default User Role Mapping Table (tblHMPositionsRelationships)

| Column Name | Data Type | Length |
| --- | --- | --- |
| User_ID | int | 4 |
| Position_ID | int | 4 |
| Relation_ID | int | 4 |
| Identifier | int | 4 |

TABLE 8

User Role to Bid Request Mapping Table (tblBidHMPositions)

| Column Name | Data Type | Length |
| --- | --- | --- |
| Bid_Tracking_ID | int | 4 |
| User_ID | int | 4 |
| Position_ID | int | 4 |
| Relation_ID | int | 4 |
| Current_Status_ID | int | 4 |
| Record_ID | int | 4 |

TABLE 9

User Position/Role to Approval Level and Hierarchy Mapping (tblApprovalLevel)

| Column Name | Data Type | Length |
| --- | --- | --- |
| Position_ID | int | 4 |
| [Approval_Authority] | money | 8 |
| Approval_Routing_Order | numeric | 9 |
| Record_ID | int | 4 |

As can be seen in FIG. 10, there is a concise relationship between all the fields necessary to enable configurable work sharing and specific workflow components for the buyer. The database structure 300 is scalable and configurable, so that even when operating within a less sophisticated database environment, the functionality still exists as long as user role positions are specified and a personnel data file is available. It should be understood that similar database table structures are available to the vendor and administrator, which will be discussed in more detail hereinbelow.

The database table structure 300 for the buyer takes as input personnel data ("tblHRdata" 301) from the buyer and creates a personnel data file ("tblUser" 302) including the specific personnel that may be involved in the shared work environment. The personnel data is shown as table "tblHRdata" 301 for simplicity purposes. However, it should be understood that the personnel data may be in any form, depending on the buyer database system. Periodic downloads from the table "tblHRdata" 301 to the table "tblUser" 302 can be performed to update the system as to the current employees of the buyer to ensure that user role positions are properly assigned. The various business grades designated by the buyer can also be stored in table "tblHMBusinessGrades" 303 and mapped to table "tblUser" 302 for individual assignment of business grades, as discussed above in connection with Tables 3 and 4. In addition, the business grades can be mapped to the selected user roles in table "tblHMPositiontoGrade" 304, as discussed above in connection with Tables 4 and 5.

The user role categories table ("tblHMPositionCategories" 305) and user role positions table ("tblHMPositions" 306), and their interrelation to the position grades and assigned personnel are also shown in FIG. 10. For example, table "tblHMPositionsRelationship" 307 includes the user ID of the assigned personnel to each user role position. If user role positions are associated with specific bid template types (as described in more detail hereinbelow in connection with FIG. 15), the user role positions for each bid template type can be stored in table "tblHMPositionsRFXMatrix" 309. Furthermore, if user role positions are assigned specific to each bid transaction, the user ID of the assigned personnel to each user role position for a specific transaction can be stored in table "tblBidHMPositions" 308.

Figure 12:
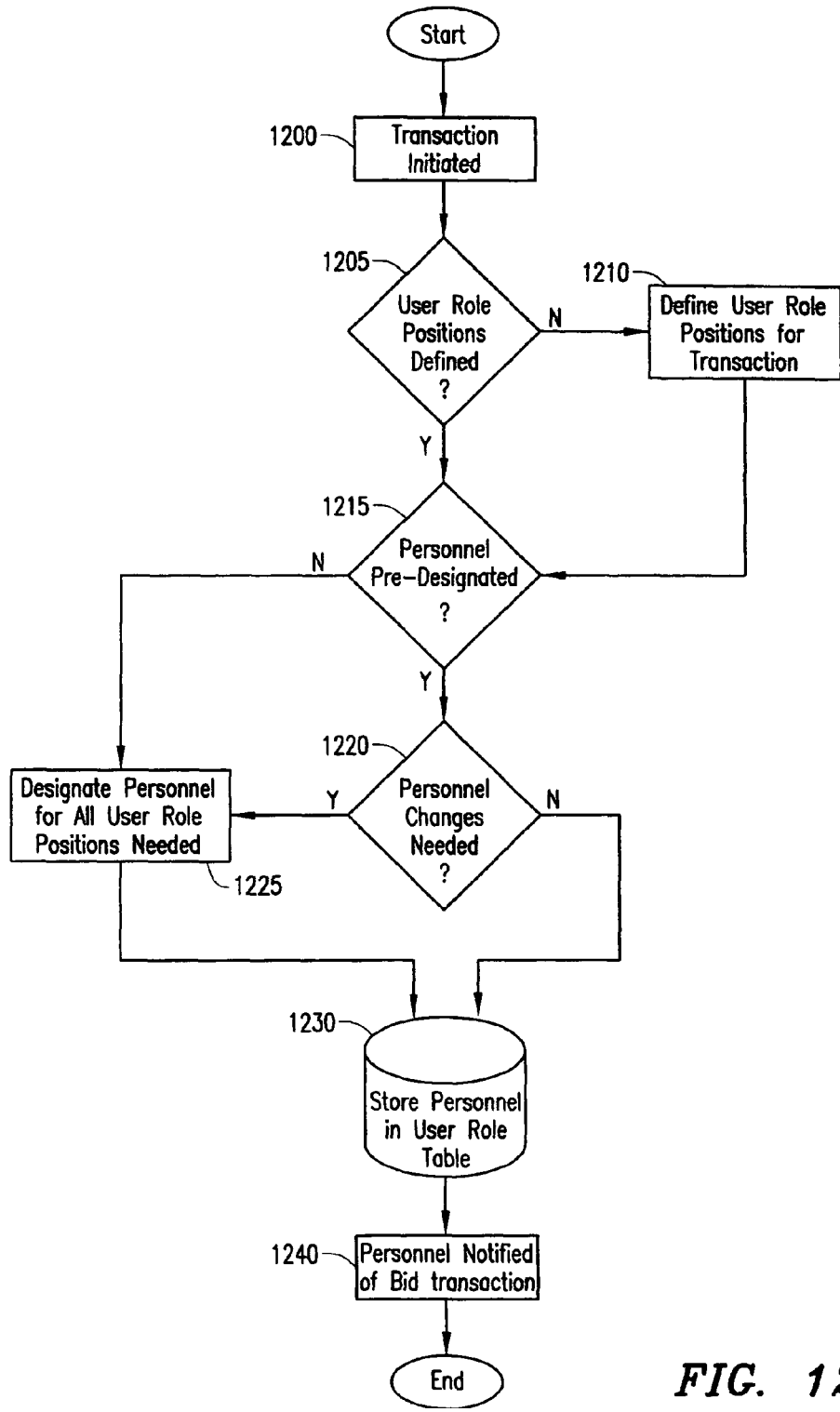
FIG. 12 is a flowchart illustrating exemplary steps for defining and assigning user roles during a bid or project transaction, in accordance with embodiments of the present invention.

Exemplary steps for a buyer to assign personnel to user role positions during a transaction are shown in FIG. 12. Upon initiation of a transaction (step 1200) (e.g., creation of a bid template or bid request, broadcasting of the bid request, receipt of bid response, evaluation of bid response, awarding of bid, payment of voucher, etc.), the system and/or key personnel determines whether all of the required user role positions for the transaction have been defined (step 1205). If not, the system and/or key personnel define the user role positions necessary for the transaction (step 1210).

Once the user role positions have been ascertained, the system and/or key personnel determines whether specific personnel (also referred to herein as users) have been pre-designated for the user role positions (step 1215) and whether any of the pre-designated users need to be changed for the transaction (step 1220). If one or more user role positions do not have a pre-designated user or if one or more pre-designated users should be changed, the system and/or key personnel designates the appropriate user for all user role positions (step 1225) and stores the identity of the designated users for the user role positions in the user role table (step 1230) (e.g., "tblBidHMPositions" in FIG. 10). If all users are pre-designated, the system stores the pre-designated personnel (step 1230), and if applicable, notifies the appropriate personnel of the transaction (step 1240).

Referring again to FIG. 10, in addition to assigning users to specific user role positions for a bid/project process, the database table structure 300 further provides the ability to designate transactions that require approving and specific approvers for a variety of reasons. Therefore, within a table "tblApprovalLevel" 310, certain user role positions can be classified as approval positions, and for each approval position, the routing order for approval can be specified. For example, a user role position approver (Approver A) can be designated to approve all transactions generated by another user role position (User B), so that the system automatically routes all transactions from User B to Approver A.

In addition, each user can be provided access rights to view and modify data within the system. For example, one user role position may have the authority to modify or enter data in the system through a first web page, while another user role position may only have the authority to view the data through a second web page. Thus, although the information displayed on the web page may be the same to both users, the actual web pages are different, depending on the approval level of the user role position. When a user logs in to the system, the system determines the approval level of the user and pushes the appropriate web pages to the user. An example of a data structure implementing user role to web page access mapping is shown below in Table 10.

TABLE 10

User Role to Web Page Access Mapping Table

| Column Name | Data Type | Length |
| --- | --- | --- |
| ASP_Object_ID | int | 4 |
| Position_ID | int | 4 |
| Read_Access | char | 1 |
| Write_Access | char | 1 |
| Record_ID | int | 4 |

Figure 14:
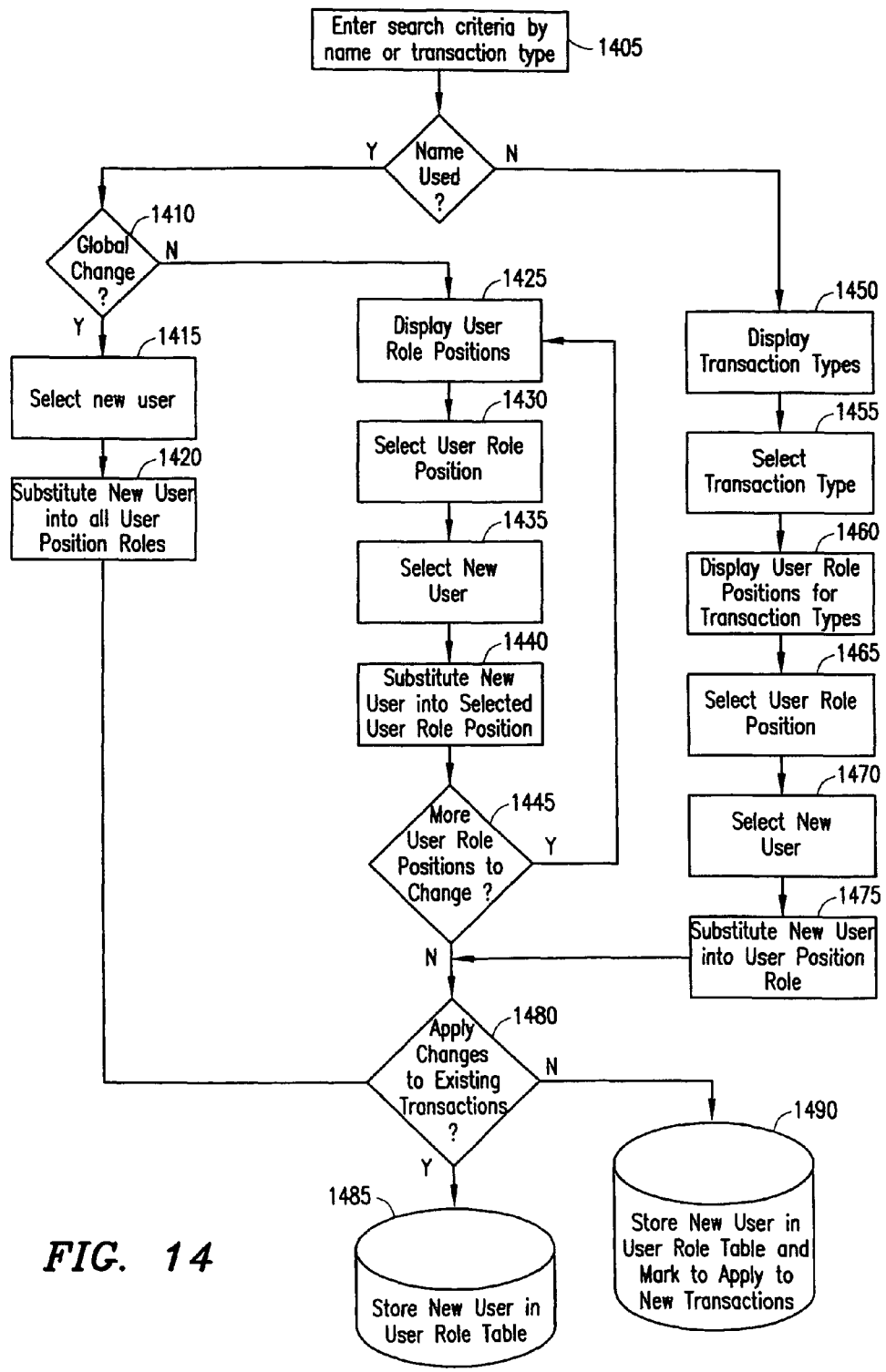
FIG. 14 is a flowchart illustrating exemplary steps for modifying user role assignments, in accordance with embodiments of the present invention.

In order to maintain the relationship between user role positions, internal personnel and specific transactions in an ongoing manner, the system of the present invention is further designed to account for shifts in organizational personnel and the business level and user authority of personnel. Referring now to FIG. 14, there is illustrated exemplary steps for modifying user role position assignments, in accordance with embodiments of the present invention. A user role position can be re-assigned based on the user name or the transaction type (step 1400). If the modification is made based on the user name (step 1405), the change can be made globally to all user role positions held by the user or to only specific user role positions held by the user. For global changes (step 1410), a new user is selected (step 1415) and the new user is substituted for the previous user for all user role positions held by the previous user (step 1420). This type of global change is necessary, for example, when an employee leaves the company, and a new employee takes the exiting employee's position within the company.

For specific user role position changes (step 1410), all of the user role positions held by the user can be displayed (step 1425), and one of the user role positions can be selected for changes (step 1430). A new user is chosen for that selected user role position (step 1435) and the new user is substituted for the previous user for that selected user role position (step 1440). This process can be repeated for each user role position that requires a change (step 1445). Specific user role position changes may occur for a number of reasons, such as promotion, reorganization, employee status changes (e.g. full-time to part-time), etc.

If the modification is made based on the transaction type (step 1405), a listing of all transaction types (e.g., bid request creation, bid request broadcasting, bid request receipt, bid response generation, bid response receipt, bid evaluation, bid award, time keeping, vouchering payment, etc.) can be displayed (step 1450), and a particular transaction type is selected (step 1455). All of the user role positions associated with that particular transaction type can be displayed (step 1460) and the particular user role position to be modified is selected (step 1465). A new user is chosen for that selected user role position (step 1470), and the new user is substituted for the previous user for that selected user role position (step 1475). Transaction type modifications may be beneficial, for example, when the particular user for a user role position is unknown, but a change is required due to customer complaints.

The user role position modifications can be applied to existing transactions or only to new transactions (step 1480), depending on the reason for the modification and the need for continuity in existing transactions. If the modification is to be applied to existing transactions, the user role table is updated with the new user and the previous user record is modified to "outdated" (step 1485). However, if the modification is only to be applied to new transactions, the user role table is updated with the new user, but the previous user is not deleted, and the new user is marked for new transactions only (step 1490).

For the vendor, user role positions are typically pre-designated to limit access to qualified personnel. Examples of data structures implementing vendor user roles are shown in Tables 11-13 hereinbelow. As can be seen, the vendor personnel can be assigned a vendor contact type, which can be mapped to access rights to view and modify data within the system, similar to that described above for the buyer in connection with Table 10. However, it should be understood that other vendor user role configurations can be included, and the system is not limited to the specific configurations listed in Tables 11-13.

TABLE 11

Exemplary Vendor Roles (tblVendorRoles)

| VendorContactTypeID | Description | ASP Display Order |
| --- | --- | --- |
| 1 | CEO | 1 |
| 2 | CFO | 2 |
| 3 | COO | 3 |
| 4 | Financial Processing Supervisor | 6 |
| 5 | Staffing Personnel | 7 |
| 6 | Account Manager | 5 |
| 7 | Project Manager | 8 |
| 8 | Chief Counsel | 4 |

TABLE 12

Exemplary Vendor Contacts (tblVendorContacts)

| Column Name | Data Type | Length |
| --- | --- | --- |
| VendorContactID | int | 4 |
| vcVendorContactGUID | uniqueidentifier | 16 |
| vcPermissionLevel | int | 4 |
| vcContactTypeID | int | 4 |
| vcFirstName | varchar | 50 |
| vcLastName | varchar | 50 |

TABLE 12-continued

Exemplary Vendor Contacts (tblVendorContacts)

| Column Name | Data Type | Length |
|---|---|---|
| vcPositionTitle | varchar | 100 |
| vcSalutation | varchar | 50 |
| vcAddress1 | varchar | 50 |
| vcAddress2 | varchar | 50 |
| vcCity | varchar | 50 |
| vcState | varchar | 50 |
| vcCountryID | varchar | 50 |
| vcPostalCode | varchar | 20 |
| vcEmail | varchar | 50 |
| vcVendorID | int | 4 |
| vcLoginName | varchar | 50 |
| vcPassword | varchar | 50 |
| vcStatusID | int | 4 |
| vcDateExpire | datetime | 8 |
| vcInternationalFlag | varchar | 50 |

TABLE 13

Exemplary Vendor Roles Permissions (tblVendorRolePermissions)

| Column Name | Data Type | Length |
|---|---|---|
| ASP_Object_ID | int | 4 |
| VendorContactTypeID | int | 4 |
| Write_Access | char | 1 |
| Read_Access | char | 1 |
| Current_Status_ID | int | 4 |
| Record_ID | int | 4 |

Figure 13A:
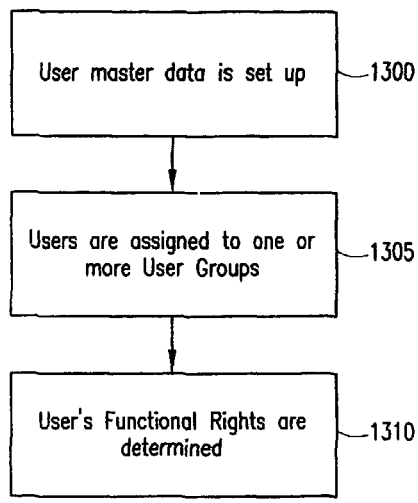
FIGS. 13A and 13B are flowcharts illustrating exemplary steps for managing workflow pertaining to a bid or project transaction based on user roles, in accordance with embodiments of the present invention.
Figure 13B:
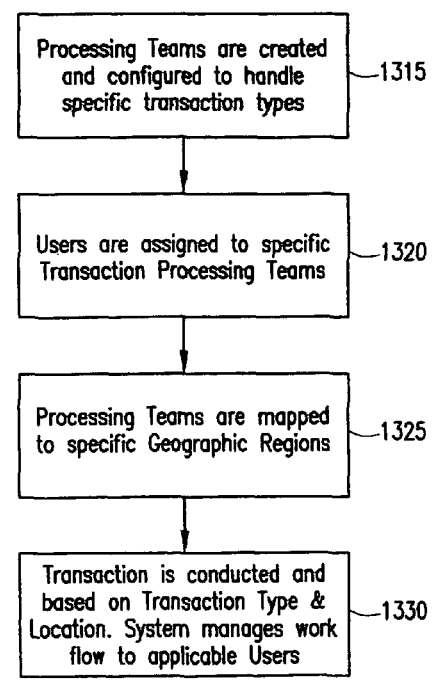

For the administrator, user role positions can be defined to enable entire processing teams and team members to be specified in order to administer transactional activity associated with specific bid types and for specific locations. Referring now to FIGS. 13A-13B, exemplary steps for implementing an administrative processing team are shown. Initially, an administrative user table for the administrator is established containing administrative user master data (step 1300). From the user table, various users can be assigned to one or more user groups and the mapping of users to user groups can be stored in a user group mapping table (step 1305). The user groups can be associated with business units within a company or transaction types or both. For each of the user groups, the functional rights and responsibilities of each user within the user group can be defined in a user group rights table (step 1310). For example, each user can be assigned access rights (as discussed above in connection with FIG. 10) for the user group. Examples of data structures implementing user groups and user group rights for the administrator are shown in Tables 14-19 hereinbelow. However, it should be understood that other administrator user role configurations can be included, and the system is not limited to the specific administrator user role configurations listed in Tables 14-19.

TABLE 14

Exemplary Administrative User Table

| Column Name | Data Type | Length |
|---|---|---|
| Administrative_ID | int | 4 |
| mLastName | varchar | 50 |
| mFirstName | varchar | 50 |
| Middle_Initial | varchar | 50 |
| Job_Title_ID | int | 4 |
| mloginName | varchar | 10 |

TABLE 14-continued

Exemplary Administrative User Table

| Column Name | Data Type | Length |
|---|---|---|
| mPassword | varchar | 10 |
| Permission | varchar | 50 |
| Phone | varchar | 50 |
| Fax | varchar | 50 |
| mEmail | varchar | 50 |
| Home_Address1 | varchar | 50 |
| Home_Address2 | varchar | 50 |
| City | varchar | 50 |
| State | varchar | 50 |
| Zip | varchar | 20 |
| Home_Phone | varchar | 50 |
| Mobile_Phone | varchar | 50 |
| Location_ID | int | 4 |
| Date_of_Birth | smalldatetime | 4 |
| Social_Security_No | varchar | 20 |
| Date_Start_with_Administrator | smalldatetime | 4 |
| Date_Start_with_Buyer | smalldatetime | 4 |
| Schooling_ID | int | 4 |
| Technical_Certifications | varchar | 50 |
| Primary_Language_ID | int | 4 |
| Secondary_Language_ID | int | 4 |
| MS_Excel_Proficiency | int | 4 |
| MS_Access_Proficiency | int | 4 |
| MS_Word_Proficiency | int | 4 |
| MS_PowerPoint_Proficiency | int | 4 |
| Application_Efficiency | int | 4 |
| Communication_Skills_ID | int | 4 |
| mActive | char | 1 |
| Supervisor | int | 4 |
| Last_Eval_Date | smalldatetime | 4 |
| Next_Eval_Date | smalldatetime | 4 |
| Employee_Type_ID | int | 4 |

TABLE 15

Exemplary Administrative User Group Table Values

| Admin_User_Group_ID | Admin_User_Group_Name |
|---|---|
| 1 | General_Administration |
| 2 | Business_Support |
| 3 | Customer_Service |
| 4 | Requisition_Transaction_Processors |
| 5 | Staff_Management |
| 6 | Staff_Professional |
| 7 | Supplier_Management |
| 8 | Systems_Admin |
| 9 | Application_Support |
| 10 | Financial_Processors |
| 12 | RFX_Transaction_Processors |

TABLE 16

Exemplary Administrative User to User Group Mapping Table

| Column Name | Data Type | Length |
|---|---|---|
| Administrative_ID | Int | 4 |
| User_Group_ID | Int | 4 |
| Record_ID | int | 4 |
| Date_Created | datetime | 8 |
| Creator_ID | int | 4 |
| Current_Status_ID | int | 4 |
| Last_Edit_Date | datetime | 8 |
| Last_Edited_By | int | 4 |

TABLE 17

Exemplary Administrative User Group Rights Table

| Column Name | Data Type | Length |
| --- | --- | --- |
| ASP_Page_ID | int | 4 |
| User_Group_ID | int | 4 |
| Record_ID | int | 4 |
| Read_Access | char | 1 |
| Write_Access | char | 1 |

Once the user groups have been ascertained, as shown in FIG. 13B, processing teams can be created within the user groups to handle specific transaction types (step 1315). All of the users within a particular user group can be mapped to specific processing teams and assigned a routing order for the particular transaction type (step 1320). Exemplary data structures for creating and mapping users to processing teams are shown in Tables 18 and 19 hereinbelow.

TABLE 18

Exemplary Administrative Processing Teams Table

| Column Name | Data Type | Length |
| --- | --- | --- |
| Team_ID | int | 4 |
| Team_Name | varchar | 50 |
| Staff_Supplementation | char | 1 |
| Project_Work | char | 1 |
| RFX_Processing | char | 1 |
| Requisition_Processing | char | 1 |
| Invoice_Processing | Char | 1 |
| Help_Desk_Processing | Char | 1 |
| Quality_Assurance_Processing | Char | 1 |
| Created_By | Int | 4 |
| Last_Edited_By | Int | 4 |
| Last_Edit_Date | Datetime | 8 |
| Current_Status_ID | Int | 4 |

TABLE 19

Exemplary Administrative Processing Teams to User Mapping Table

| Column Name | Data Type | Length |
| --- | --- | --- |
| Administrative_ID | Int | 4 |
| Team_ID | int | 4 |
| Date_Created | datetime | 8 |
| Record_ID | int | 4 |
| Created_By | int | 4 |
| Current_Status_ID | int | 4 |
| Last_Edited_By | int | 4 |
| Last_Edit_Date | datetime | 8 |

In addition, processing teams can be mapped to specific geographic regions, so that different processing teams can handle the same type of transaction in different regions (step 1325). Therefore, when a particular type of transaction is conducted in a particular location, the system can manage the workflow to the appropriate users based on the transaction type and location (step 1330). For example, the appropriate users can be notified of the transaction via an e-mail and/or dashboard update.

Thus, the user role management supported by the system of the present invention provides a flexible, scalable and robust work-sharing environment for the entire bid/project process from bid creation to project completion. In addition, the system enables secure communications and transaction processing based upon user roles, which enables users to interface with the correct personnel at the right times while insuring that data view and access rights are limited to those users that have a functional need for the access.

Bid Activity

After the pre-bid activity is completed, a buyer can create and transmit a bid request to one or more vendors to solicit a bid response from the vendors for a particular project. To facilitate the bid process in the context of a complete bid/project process, bid templates can be used for specific project types to solicit the requisite information from vendors for the specific project type in a uniform and comprehensive manner to enable efficient and effective evaluation of bid responses.

Figure 15:
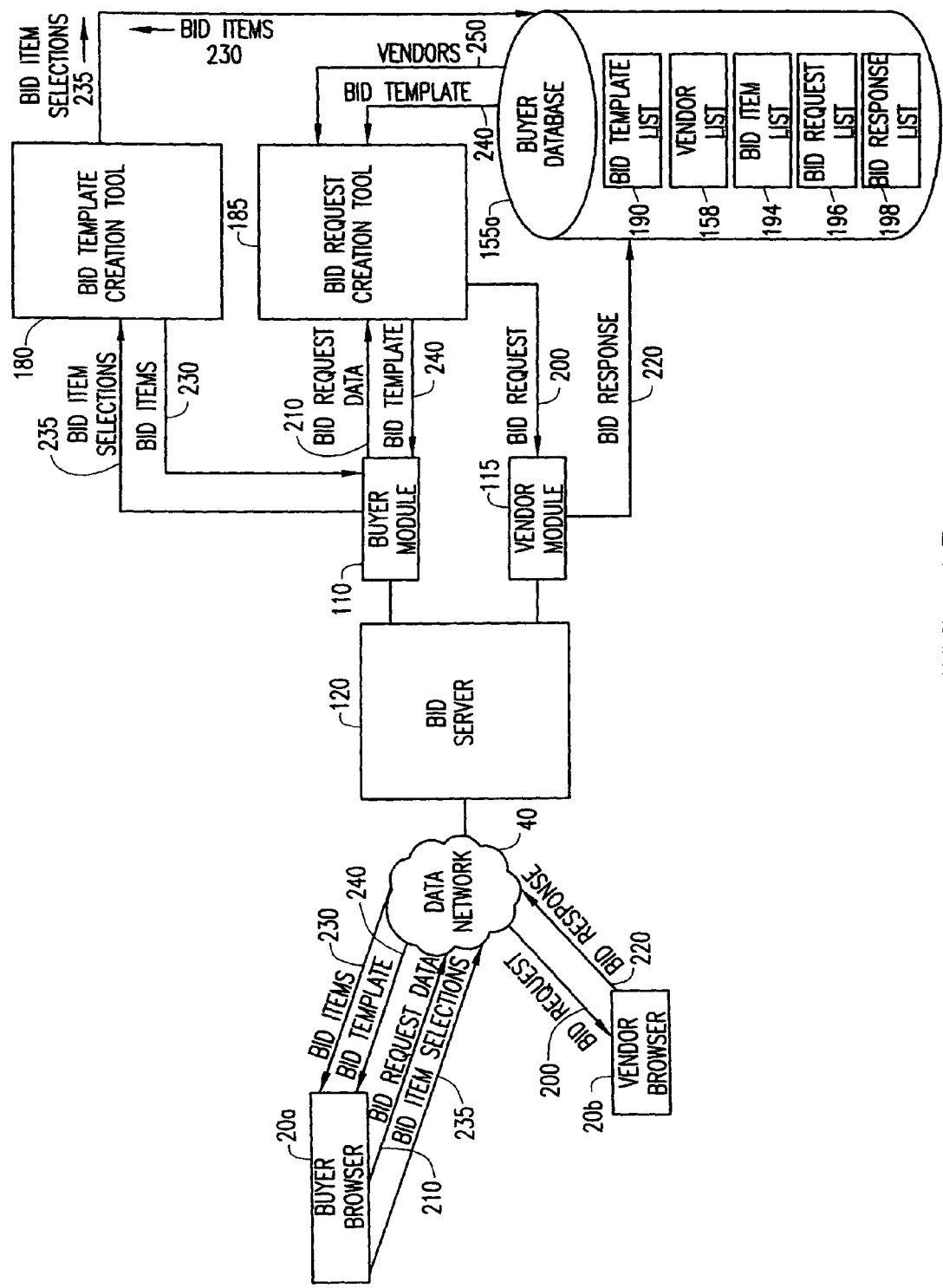
FIG. 15 a data flow diagram illustrating a bid template creation tool and bid request creation tool for generating a bid request for a particular project, in accordance with embodiments of the present invention.
Figure 16:
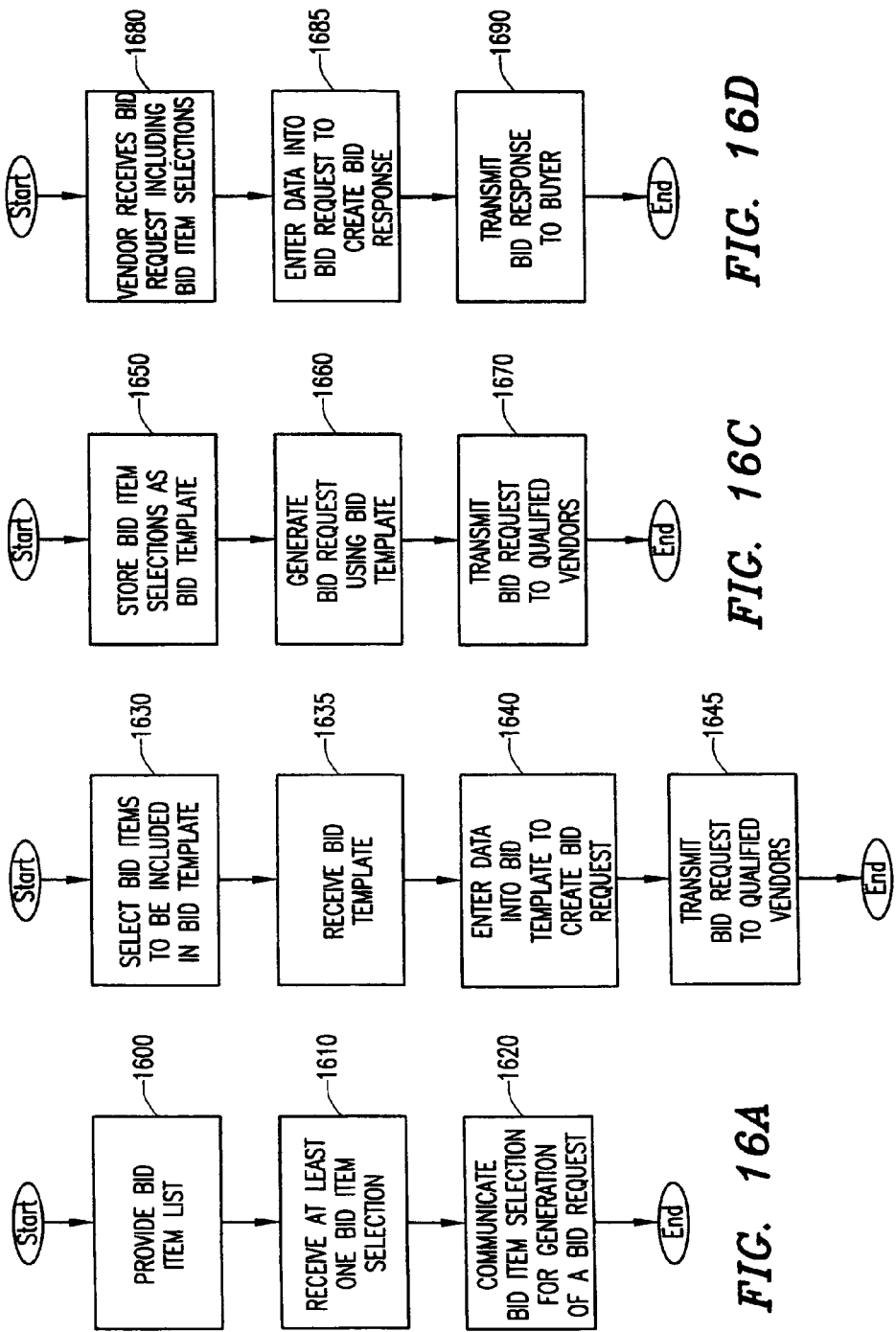
FIGS. 16A-16D are flowcharts illustrating exemplary steps for creating a bid template, a bid request from the bid template and a bid response from the bid request.

Exemplary functionality for creating a bid request utilizing a bid template is shown in FIG. 15. A bid template creation tool 180 and bid request creation tool 185 are illustrated in FIG. 15 for the creation of bid templates 240 and bid requests 200 from the bid templates 240, respectively, in accordance with embodiments of the present invention. The bid template creation tool 180 and bid request creation tool 185 can include any hardware, software and/or firmware required to perform the functions of the tools, and can be implemented within the web server 120 or an additional server (not shown). Each buyer can create one or more bid templates 240, depending on the nature of project work outsourced by the buyer. For example, if the buyer has a need for staff supplementation in only one department, the buyer may create only one bid template 240 to handle the staff supplementation bid requests 200.

To create a bid template 240, the bid template creation tool 180 accesses the buyer database 155a to retrieve bid items 230 within a bid item list 194 and provides the buyer with the bid item list 230 via the buyer module 110, web server 120, data network 40 and buyer browser 20a for the buyer to choose from. The bid items 230 are associated with specific types of information to be solicited from the buyer, vendor or both. From the list of bid items 230, the buyer selects and provides one or more bid item selections 235 for inclusion in a bid template 240. Depending on buyer configurations, one or more of the bid items 230 may be mandatory for the bid template 240, such as the name of the buyer, location of the work to be performed and type of project work requested. For one or more of the mandatory bid items 230, in addition to including the mandatory bid items 230 in the bid template 240, the specific information associated with each of the mandatory bid items 230 can also be included in fields associated with the mandatory bid items 230 within the bid template 240. For example, the buyer name and project work type can be stored in the bid template 240 for that project work type. Each bid template 240 created by the buyer is stored in the buyer database 155a within a bid template list 190 for later use in creating a bid request 200.

To create a bid request 200, the bid request creation tool 185 accesses the buyer database 155a to retrieve the bid templates 240 stored within the bid template list 190 and provides a list of bid templates 240 to the buyer via the buyer module 110, web server 120, data network 40 and buyer browser 20a for the buyer to choose from. Upon selecting an appropriate bid template 240, the buyer provides bid request data 210 to the bid request creation tool 185 for inclusion in a bid request 200 of the bid template 240 type. For example, the buyer can enter bid request data 210 into provided fields for each bid item selection 235 that requires information from the buyer within the bid template 240. By way of example, but not limitation, the bid request data 210 could include the location of work to be performed, the timing of the project and the specific vendor qualifications necessary for the project.

The bid request creation tool 185 further interfaces with the buyer database 155a to access the vendor list 158 for the buyer and determine the appropriate vendors to receive the bid request. The appropriate vendors can be selected based on the bid template 240 type and any other vendor qualifications included within the bid request 200 itself. Thus, the vendor list 158 can be separated into pre-qualified vendors for bid template 240 types to further reduce processing time when submitting bid requests 200. The bid request creation tool 185 further uses vendor contact information 250 associated with the selected vendors to broadcast (transmit) the bid request 200 to the appropriate vendors (as shown in FIGS. 1 and 2) via the vendor module 115, web server 120, data network 40 and vendor browser 20b, and stores the submitted bid request 200 in a bid request list 196 for the buyer.

Vendor bid responses 220 received from solicited vendors (as shown in FIGS. 1 and 2) can further be stored in the buyer database 155a in a bid response list 198 for later use in comparing and grading vendor bid responses 220. The vendor bid responses 220 are generated from the bid items included in the bid request 200. Specifically, the vendor populates data associated with the vendor and the bid response in data fields within enabled bid items in the bid request 200. Vendors access the bid request 200 via the vendor module 115 to view the bid request and complete the vendor response and submit completed bid responses 220 via the vendor module 115 for storage in the buyer database 155a via the buyer module 110 (step not shown). The bid response 220 can include data retrieved from a vendor database 115b (not shown) and can be stored in the vendor database 155b during and after the bid response creation.

Exemplary steps for creating a bid template, a bid request from the bid template and a bid response from the bid request from various system perspectives are shown in FIGS. 16A-16D. The main processing steps performed at the system for bid template creation are shown in FIG. 16A. The system creates a bid template by providing a buyer user a list of predetermined bid items (step 1600). In response thereto, the system receives one or more bid item selections from the bid item list for inclusion within a bid template stored within the system (step 1610). To create a bid request from the bid template, the system communicates the bid item selections within the bid template to the buyer user for generation of the bid request using the bid item selections (step 1620).

In FIG. 16B, at the buyer side, upon receipt of the bid item list, to create the bid template, the buyer user selects one or more bid items to be included in the bid template (step 1630). For subsequent generation of a bid request, the buyer user receives the bid template including the bid item selections (step 1635) and enters bid request data into fields associated with the bid item selections in the bid template to create the bid request (step 1640). After all applicable bid item selection fields have been completed by the buyer user, the bid request is transmitted to the system for broadcasting to qualified vendors (step 1645).

The main processing steps performed by the system for bid request generation and broadcasting are shown in FIG. 16C. After the creation of a bid template and the storage of the bid item selections for the bid template (step 1650), the system generates a bid request using bid request data entered by the buyer user for the bid request of the bid template type (step 1660). Thereafter, the system transmits the generated bid request to qualified vendors for solicitation of a bid response of the bid template type (step 1670).

In FIG. 16D, at the vendor side, the vendor receives the bid request including the enabled bid item selections selected by the buyer (step 1680). To create a bid response, a vendor user enters bid response data into fields associated with the bid item selections included in the bid request (step 1685) to create the bid response. After all applicable bid item selection fields have been completed by the vendor user, the bid response is transmitted to the system for forwarding to the buyer (step 1690).

Examples of data structures used for creating the bid templates are shown in Tables 20-25 hereinbelow. The data structures are illustrated for simplicity as being organized in a table format, with each table including all of the fields necessary for displaying bid items to the buyer user to select from and storing bid item selections for bid templates. The tables are related in a hierarchical and relational manner, as will be described hereinbelow in connection with FIG. 17. However, it should be understood that other bid template configurations can be included, and the system is not limited to the specific bid template configuration shown in Tables 20-25 and FIG. 17.

TABLE 20

Base Bid Items Section Table (tblRFXBidSections)

| Column Name | Data Type | Length |
|---|---|---|
| RFX_Section_ID | Int | 4 |
| RFX_Section | Varchar | 255 |
| ASP_Section_Display_Order | Numeric | 9 |
| Label_Comments | Varchar | 1000 |

TABLE 21

Base Bid Items Category Table (tblRFXBidCategories)

| Column Name | Data Type | Length |
|---|---|---|
| RFX_Category_ID | Int | 4 |
| RFX_Category | Varchar | 255 |
| RFX_Section_ID | Int | 4 |
| ASP_Category_Display_Order | Numeric | 9 |
| Label_Comments | Varchar | 1000 |

TABLE 22

Base Bid Items Table (tblRFXBidItems)

| Column Name | Data Type | Length |
|---|---|---|
| RFX_Item_ID | Int | 4 |
| RFX_Item | Varchar | 255 |
| Disablement_Allowed | Char | 1 |
| Supplier_Bid_Display | Char | 1 |
| Supplier_Response_Item | Char | 1 |
| RFX_Category_ID | Int | 4 |
| HM_Data_Type | Varchar | 255 |
| HM_Field_Length | Varchar | 255 |
| ASP_Item_Display_Order | Numeric | 9 |
| AV_Response_Data_Type | Varchar | 255 |
| AV_Field_Length | Varchar | 255 |

TABLE 23

Base Bid Template Type Table (tblRFXBidTemplates)

| RFX_Template_ID | RFX_Template |
|---|---|
| 1 | Project_RFP |
| 2 | Project_RFQ |
| 3 | Bulk_Staffing_RFQ |
| 4 | Regular_Staff_Supplementation |

TABLE 24

Base Bid Template To Bid Items Mapping Table
(tblFRXTemplateItemMatrix)

| Column Name | Data Type | Length |
|---|---|---|
| RFX_Item_ID | Int | 4 |
| RFX_Template_ID | int | 4 |

TABLE 25

Base Client Bid Item Default Values Table (tblRFXBidItemsCDV)

| Column Name | Data Type | Length |
|---|---|---|
| RFX_Item_ID | int | 4 |
| Client_Default_Value | varchar | 7500 |

Figure 17:
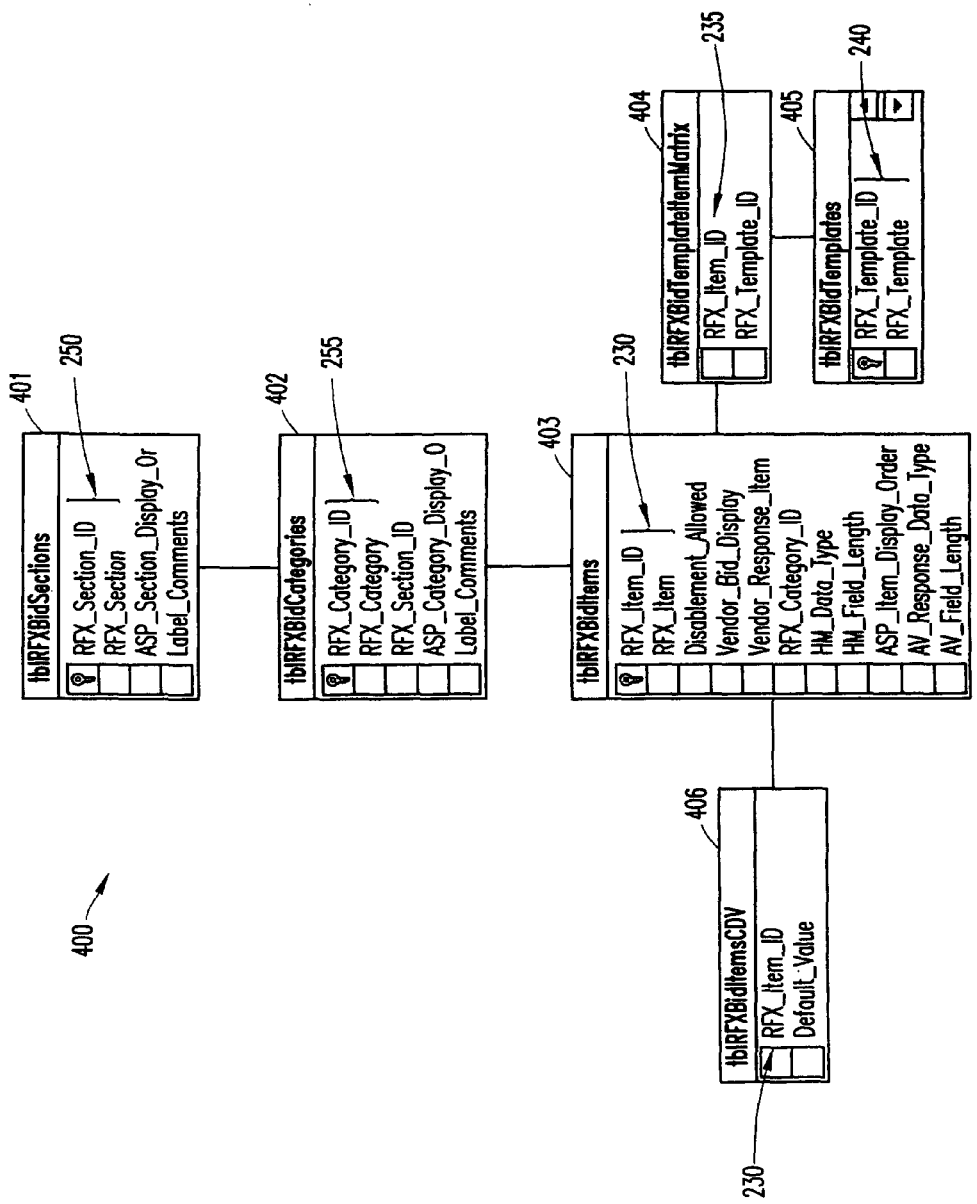
FIG. 17 is a database table view illustrating a hierarchical bid item list from which bid templates can be created

Referring now to FIG. 17, a database table structure 400 illustrating the interrelation between each of the above Tables 20-25 is shown. The bid items 230 are shown organized into bid sections and bid categories for convenience and logical business information processing segmentation when creating the bid templates 240. Thus, the buyer user is presented with bid sections 250, from which the buyer user can select a bid category 255 to display the bid items 230 associated with that bid category 255. Breaking the bid items 230 down into bid categories 255 and bid sections 250 fosters a compartmentalized format that is easily understood by the buyer user, thereby enabling a more efficient and effective bid template creation process.

The table "tblRFXBidSections" 401, which has the form of Table 20 above, includes the bid section name and identification of each section 250 of bid items 230, along with an indication of the display order for each bid section 250 on a web page and any comments to be included with the bid section 250 on the web page. Each bid section 250 can be stored as a separate record in table "tblRFXBidSections" 401, with each record having the form of Table 20. Within each bid section 250 are one or more bid categories 255. The table "tblRFXBidCategories" 402, which has the form of Table 21 above, includes the category name, the identification number of each bid category 255 and the associated bid section 250 for each bid category 255. In addition, the table "tblRFxBidCategories" 402 further includes the display order for each bid category 255 on a web page and any comments to be included with the bid category 255 on the web page. Each bid category 255 can be stored as a separate record in table "tblRFXBidCategories" 402, with each record having the form of Table 21.

Each bid category 255 further includes one or more bid items 230 associated with the bid category 255. Therefore, the table "tblRFXBidItems" 403, which has the form of Table 22 above, includes the bid item name and identification number, along with the bid category 255 associated with the bid item 230. A separate record for each bid item 230 can be stored in table "tblRFXBidItems" 403, with each record having the form of Table 22 above. The table "tblRFXBidItems" 403 further includes additional information pertaining to the bid item 230, such as whether or not disablement of the bid item 230 is allowed, whether the bid item 230 is displayed to the vendor, whether the bid item 230 requires a vendor response, the type of data entered by the buyer for the bid item 230, the field length for the data entered by the buyer for the bid item 230, the type of data entered by the vendor for the bid item 230 and the field length for the data entered by the vendor for the bid item 230. For example, the following Table 26 illustrates sample bid items 230 in the table "tblRFXBidItem" 403 making up a bid item list 194, as shown in FIG. 15.

TABLE 26

| RFX_Item_ID | RFX_Item | Disablement_Allowed | Vendor_Bid_Display | Vendor_Response_Item |
|---|---|---|---|---|
| 1 | Company/Organization_Information | N | Y | N |
| 2 | Purpose_of_the_RFP | N | Y | N |
| 3 | Business_Strategy/Objectives | N | Y | N |
| 4 | Business_Infrastructure | Y | Y | N |
| 5 | Business_Processes | Y | Y | N |
| 6 | Business_Systems | Y | Y | N |
| 7 | Internal/External_Clients | Y | Y | N |
| 8 | Affected_Departments | Y | Y | N |
| 9 | Project_Ownership/Management_Considerations | N | Y | N |
| 10 | Product_Ownership/Licensing_Considerations | N | Y | N |
| 11 | Project_Work_Location_Considerations | N | Y | N |
| 12 | Project_Phasing_Consdierations | Y | Y | N |
| 13 | Project_Phasing_Schedule | Y | Y | N |
| 14 | Project_Resource_Considerations | Y | Y | N |
| 15 | HM_Staffing_Resource_Profiles | N | Y | N |
| 16 | Resource_Backfill_Considerations/Requirements | N | Y | N |
| 17 | Project_Resource_Travel_Considerations | N | Y | N |
| 18 | Handling_Of_Project_Resource_Expenses_Considerations | N | Y | N |
| 19 | Regulatory/Industry_Standards_Compliance_Considerations | Y | Y | N |
| 20 | Specific_Equipment/Tooling_Considerations | Y | Y | N |
| 21 | Specific_Economic_Considerations | Y | Y | N |
| 22 | Statement_Of_Work | N | Y | N |
| 23 | Non-Deliverable_Penalties | N | Y | N |
| 24 | Supplier_Incentive_Bonus | Y | Y | N |
| 25 | Statement_of_Confidentiality | N | Y | N |
| 26 | RFP_Organization/Contacts | Y | Y | N |
| 27 | RFP_Response_Requirements | N | Y | N |
| 28 | RFP_Supplier_Issuance_Date | N | Y | N |
| 29 | Supplier_Acknowledgment_of_Confidentiality_Date | N | Y | N |
| 30 | Supplier_Acknowledgment_of_Response_Intent_Date | Y | Y | N |

TABLE 26-continued

| | | | | |
|---|---|---|---|---|
| 31 | Supplier_Submission_of_RFX_Questions_Date | Y | Y | N |
| 32 | Client_Posting_of_Answers_Date | Y | Y | N |
| 33 | Supplier_Submission_of_Completed_RFP_Response_Date | N | Y | N |
| 34 | Client_Submission_of_RFP_Response_Questions_Date | Y | Y | N |
| 35 | Supplier_Posting_of_Answers_Date | Y | Y | N |
| 36 | Client_RFX_Evaluation_Completion_Date | N | Y | N |
| 37 | Client_Disposition_to_Suppliers_Date | N | Y | N |
| 38 | RFX_Instructions | N | Y | N |
| 39 | Company_History | Y | Y | Y |
| 40 | Competitive_Analysis | Y | Y | Y |
| 41 | Product/Services_Heritage_Review | Y | Y | Y |
| 42 | Product/Services_Strategy | Y | Y | Y |
| 43 | Technology_Vision | Y | Y | Y |
| 44 | Strategic_Technology_Partners | Y | Y | Y |
| 45 | Track_Record | Y | Y | Y |
| 46 | Project_Management_Philosophy | Y | Y | Y |
| 47 | PMI_Certified_FTEs | Y | Y | Y |
| 48 | Customer_References | Y | Y | Y |
| 49 | Proposal_Narrative | N | Y | Y |
| 50 | Project_Planning/Strategy | N | Y | Y |
| 51 | Project_Phasing | N | Y | Y |
| 52 | Resource_Model | N | Y | Y |
| 53 | Knowledge_Transfer_Plan | Y | Y | Y |
| 54 | Deployment_Plan | N | Y | Y |
| 55 | Customer_Acceptance_Model | N | Y | Y |
| 56 | Resource_Labor_Pricing | N | Y | Y |
| 57 | Resource_Labor_Pricing_Amount | N | Y | Y |
| 58 | Equipment/Tooling_Pricing_Comments | N | Y | Y |
| 59 | Equipment/Tooling_Pricing_Amount | N | Y | Y |
| 60 | Physical_Site_Pricing_Comments | N | Y | Y |
| 61 | Physical_Site_Pricing_Amount | N | Y | Y |
| 62 | Project_Management_Premium_Comments | N | Y | Y |
| 63 | Project_Management_Premium_Amount | N | Y | Y |
| 64 | Intellectual_Property_Premium_Comments | N | Y | Y |
| 65 | Intellectual_Property_Premium_Amount | N | Y | Y |
| 66 | Miscellaneous_Project_Expenses_Comments | N | Y | Y |
| 67 | Miscellaneous_Project_Expenses_Amount | N | Y | Y |
| 68 | Anticipated_Margin | N | Y | Y |
| 69 | Total_Bid_Price | N | Y | Y |
| 70 | Resource_Travel_Expenses_Comments | N | Y | Y |
| 71 | Resource_Living_Expenses_Comments | N | Y | Y |
| 72 | Resource_Per_Diem_Comments | N | Y | Y |
| 73 | Resource_Mileage_Expense_Comments | N | Y | Y |
| 74 | Reimbursable_Miscellaneous_Expense_Comments | N | Y | Y |
| 75 | Capital_Risk_Model_Comments | N | Y | Y |
| 76 | Capital_Risk_Model_Amount | N | Y | Y |
| 77 | Rebate_Model_for_non-deployed_investment | N | Y | Y |
| 78 | Supplier_Payment_Release_Schedule | N | Y | Y |
| 79 | Notes_to_MSP | Y | N | N |
| 80 | Notes_to_Supplier | Y | Y | N |
| 81 | Project_Phasing_Acceptance | N | Y | Y |
| 82 | Statement_Of_Work_Acceptance | N | Y | Y |
| 83 | Statement_Of_Work_Proposed_Changes | N | Y | Y |
| 84 | Non-Deliverable_Penalties_Acceptance | Y | Y | Y |
| 85 | Non-Deliverable_Penalties_Proposed_Changes | Y | Y | Y |
| 86 | Customer_Acceptance_Model_Agreement | Y | Y | Y |
| 87 | Customer_Acceptance_Model_Proposed_Changes | Y | Y | Y |
| 88 | Preferred_Customer_Acceptance_Model | Y | Y | N |
| 89 | Agree_To_Confidentiality_Terms | N | Y | Y |
| 90 | Intent_To_Respond | N | Y | Y |
| 91 | Materials_List | Y | Y | Y |
| 92 | Materials_Cost | Y | Y | Y |
| 93 | Desired_Assignment_Start_Date | N | Y | N |
| 94 | Desired_Assignment_End_Date | N | Y | N |

| RFX_Item_ID | RFX_Category_ID | HM_Data_Type | HM_Field_Length | Item_Display_Order | AV_Response_Data_Type | AV_Field_Length |
|---|---|---|---|---|---|---|
| 1 | 1 | LongText | 5000 | 5 | | |
| 2 | 2 | LongText | 5000 | 5 | | |
| 3 | 3 | LongText | 5000 | 5 | | |
| 4 | 4 | LongText | 5000 | 5 | | |
| 5 | 4 | LongText | 5000 | 10 | | |
| 6 | 4 | LongText | 5000 | 15 | | |
| 7 | 4 | LongText | 5000 | 20 | | |
| 8 | 4 | LongText | 5000 | 25 | | |
| 9 | 5 | LongText | 5000 | 5 | | |
| 10 | 5 | LongText | 5000 | 10 | | |

TABLE 26-continued

| | | | | | | |
|---|---|---|---|---|---|---|
| 11 | 5 | LongText | 5000 | 15 | | |
| 12 | 5 | LongText HM Hyperlink to Sub-Table | 5000 | 20 | | |
| 13 | 5 | ASP | | 25 | | |
| 14 | 5 | Long Text HM Hyperlink to Sub-Table | 5000 | 30 | | |
| 15 | 5 | ASP | | 35 | | |
| 16 | 5 | Text | 1000 | 40 | | |
| 17 | 5 | Text | 1000 | 45 | | |
| 18 | 5 | LongText | 5000 | 50 | | |
| 19 | 5 | LongText | 5000 | 55 | | |
| 20 | 5 | LongText | 5000 | 60 | | |
| 21 | 5 | LongText | 5000 | 5 | | |
| 22 | 6 | LongText | 5000 | 5 | | |
| 23 | 7 | LongText | 5000 | 5 | | |
| 24 | 8 | LongText | 5000 | 5 | | |
| 25 | 9 | LongText | 5000 | 5 | | |
| 26 | 10 | LongText | 5000 | 5 | | |
| 27 | 11 | LongText | 5000 | 5 | | |
| 28 | 12 | date time | | 5 | | |
| 29 | 12 | date time | | 10 | | |
| 30 | 12 | date time | | 15 | | |
| 31 | 12 | date time | | 20 | | |
| 32 | 12 | date time | | 25 | | |
| 33 | 12 | date time | | 30 | | |
| 34 | 12 | date time | | 35 | | |
| 35 | 12 | date time | | 40 | | |
| 36 | 12 | date time | | 45 | | |
| 37 | 12 | date time | | 50 | | |
| 38 | 13 | LongText | 5000 | 5 | | |
| 39 | 14 | Text | 1000 | 5 | Long Text | 5000 |
| 40 | 14 | Text | 1000 | 10 | Long Text | 5000 |
| 41 | 14 | Text | 1000 | 15 | Long Text | 5000 |
| 42 | 14 | Text | 1000 | 20 | Long Text | 5000 |
| 43 | 14 | Text | 1000 | 25 | Long Text | 5000 |
| 44 | 14 | Text | 1000 | 30 | AV Hyper link to Sub-Table ASP | |
| 45 | 14 | Text | 1000 | 35 | AV Hyper link to Sub-Table ASP | |
| 46 | 14 | Text | 1000 | 40 | Long Text | 5000 |
| 47 | 14 | Text | 1000 | 45 | Long Text | 5000 |
| 48 | 14 | Text | 1000 | 50 | AV Hyper link to Sub-Table ASP | |
| 49 | 15 | Text | 1000 | 5 | Long Text | 5000 |
| 50 | 15 | Text | 1000 | 10 | Long Text | 5000 |
| 51 | 15 | Text | 1000 | 15 | AV Hyper link to Sub-Table ASP | |

TABLE 26-continued

| | | | | | | |
|---|---|---|---|---|---|---|
| 52 | 15 | Text | 1000 | 20 | AV Hyper link to Sub- Table ASP | |
| 53 | 15 | Text | 1000 | 25 | Long Text | 5000 |
| 54 | 15 | Text | 1000 | 30 | Long Text | 5000 |
| 55 | 15 | Text | 1000 | 35 | Long Text | 5000 |
| 56 | 16 | Text | 1000 | 5 | AV Hyper link to Sub- Table ASP | |
| 57 | 16 | Text | 1000 | 10 | Currency | |
| 58 | 16 | Text | 1000 | 15 | Long Text | 5000 |
| 59 | 16 | Text | 1000 | 20 | Currency | |
| 60 | 16 | Text | 1000 | 25 | Long Text | 5000 |
| 61 | 16 | Currency | | 30 | Currency | |
| 62 | 16 | Text | 1000 | 35 | Long Text | 5000 |
| 63 | 16 | Currency | | 40 | Currency | |
| 64 | 16 | Text | 1000 | 45 | Long Text | 5000 |
| 65 | 16 | Currency | | 50 | Currency | |
| 66 | 16 | Text | 1000 | 55 | Long Text | 5000 |
| 67 | 16 | Text | | 60 | Currency | |
| 68 | 16 | Text | 1000 | 65 | Currency | |
| 69 | 16 | Text | 1000 | 70 | Currency | |
| 70 | 17 | Text | 1000 | 5 | Long Text | 5000 |
| 71 | 17 | Text | 1000 | 10 | Long Text | 5000 |
| 72 | 17 | Text | 1000 | 15 | Long Text | 5000 |
| 73 | 17 | Text | 1000 | 20 | Long Text | 5000 |
| 74 | 17 | Text | 1000 | 25 | Long Text | 5000 |
| 75 | 18 | Long Text | 5000 | 5 | Long Text | 5000 |
| 76 | 18 | | | 10 | Currency | |
| 77 | 19 | | | 5 | Long Text | 5000 |
| 78 | 20 | Text | 1000 | 5 | Long Text | 5000 |
| 79 | 21 | Long Text | 5000 | 5 | | |
| 80 | 22 | Long Text | 5000 | 5 | | |
| 81 | 15 | | | 16 | Char | 1 |
| 82 | 15 | | | 11 | Char | 1 |
| 83 | 15 | | | 12 | Long Text | 5000 |
| 84 | 15 | | | 40 | Char | 1 |
| 85 | 15 | Long Text | 5000 | 45 | Long Text | 5000 |
| 86 | 15 | | | 36 | Char | 1 |
| 87 | 15 | Long Text | 5000 | 37 | Long Text | 5000 |
| 88 | 6 | Long Text | 5000 | 6 | Long Text | 5000 |
| 89 | 14 | Text | 1000 | 1 | Char | 1 |
| 90 | 14 | Text | 1000 | 2 | Char | 1 |
| 91 | 16 | Text | 1000 | 16 | AV Hyper link to Sub- Table ASP | |
| 92 | 16 | Text | 1000 | 17 | Currency | |

TABLE 26-continued

| 93 | 12 | date time | 51 |
|----|----|-----------|----|
| 94 | 12 | date time | 52 |

Referring again to FIG. 17, each of the bid items 230 can be disabled or enabled for a particular bid template 240, depending on the type of project work that the bid template 240 is created for. However, as discussed above in connection with FIG. 15, there may be some bid items 230 that are required to be included in one or more bid template 240 types. Therefore, for the required bid items 230, disablement is not allowed. If an entire bid section 250 or bid category 255 is not applicable to a particular bid template 240, the database table structure 400 can be configured to allow the bid items 230 within entire bid sections 250 or bid categories 255 to be disabled, if all of the bid items 230 within that bid section 250 or bid category 255 can be disabled.

Once all of the bid items 230 have been disabled or enabled (bid item selections 235 are enabled bid items) for a particular bid template 240, the bid template 240 and associated bid item selections 235 can be stored in the database table structure 400. The table "tblRFXBidTemplates" 405, which has the form of Table 23 above, includes the bid template name and bid template identification number for use in associating bid item selections 235 with the bid template 240 in the table "tblRFXTemplateItemMatrix" 404, which has the form of Table 24 above. A separate record for each bid template 240 can be stored in table "tblRFxBidTemplates" 405, with each record having the from of Table 23. In addition, a separate record for each bid item selection 235 included within a particular bid template 240 can be stored in table "tblRFX-TemplateItemMatrix" 404, with each record having the form of Table 24.

If there are specific bid items 230 that have a default value applicable to all bid templates 240, such as the buyer name, the default value for that particular bid item 230 can be stored in the table "tblRFXBidItemsCDV" 406, which has the form of Table 25. A separate record for each default value associated with each bid item 230 can be stored in table "tblRFX-BidItemsCDV" 406, with each record having the form of Table 25. By providing selectable bid items in a structured, configurable and scalable format, any bid item 230 can be added or removed at any time depending on the specific needs of the buyer.

Figure 18:
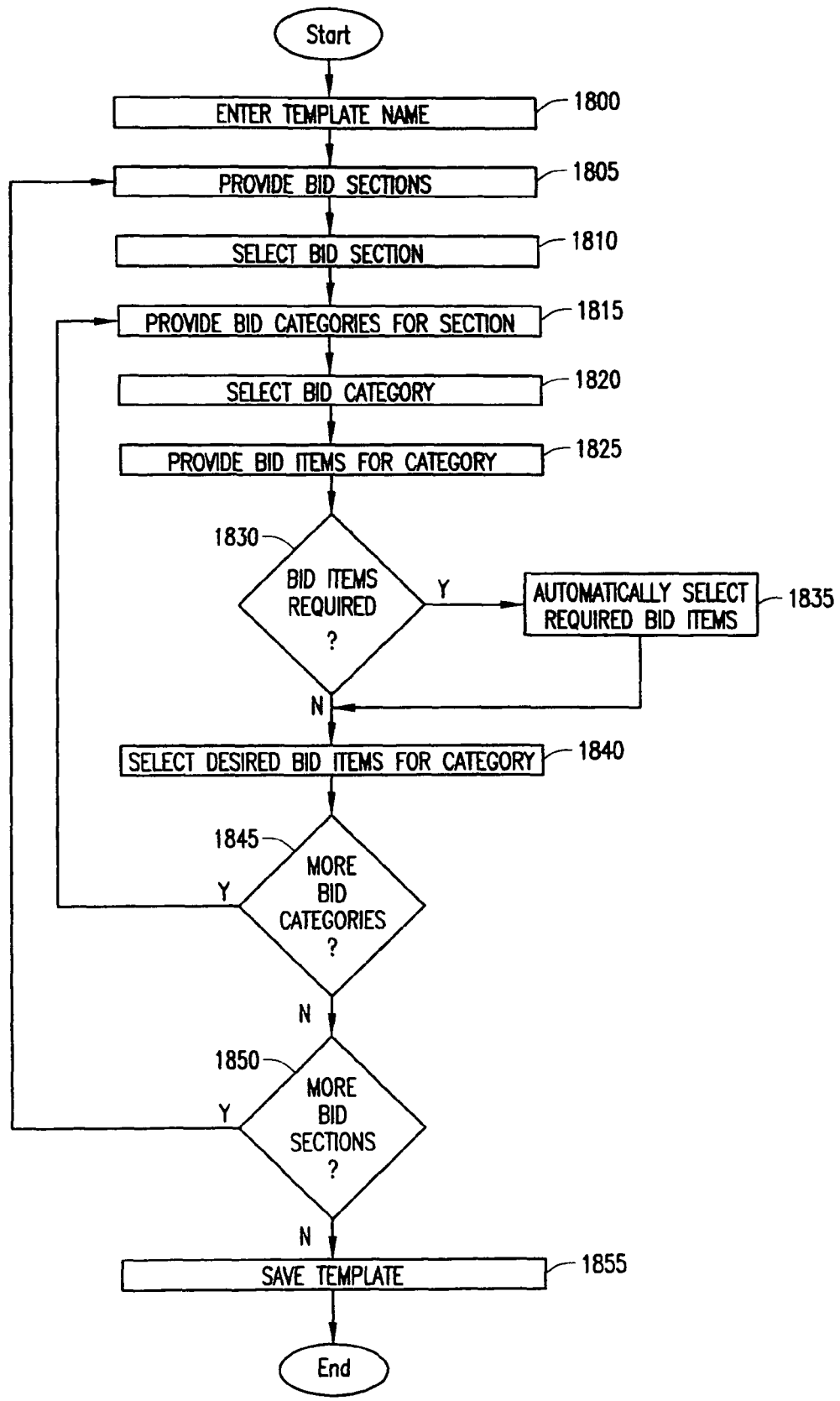
FIG. 18 is a flowchart illustrating exemplary steps for accessing the hierarchical bid item list to create a bid template.

Exemplary steps for creating a bid template using the hierarchical and relational database table structure are illustrated in FIG. 18. To create a bid template, a buyer user enters a name for the template to create a record for the template in the database table structure (step 1800). Thereafter, the buyer user selects a particular bid section from a list of bid sections (steps 1805 and 1810) and a particular bid category from a list of bid categories (steps 1815 and 1820) to begin the process of selecting bid items for inclusion in the bid template (step 1825).

If one or more of the bid items in the selected bid category are required (step 1830), the required bid selections are automatically included in the bid template (step 1835). Other bid items are selected based on the needs of the buyer user for the particular type of bid template (step 1840). This process is repeated for each bid category within the selected bid section (step 1845) and for each bid section within the list of bid sections (step 1850), until all bid items have been reviewed and either enabled (selected) or disabled for the bid template. As discussed above, in other embodiments, all bid items within a bid section or bid category may be able to be disabled without individual bid item review if disablement of all of those bid items is allowed. Once the bid item selections have been made for the bid template, the bid template is stored in the bid template list (step 1855) for later use in creating a bid request.

Figure 19:
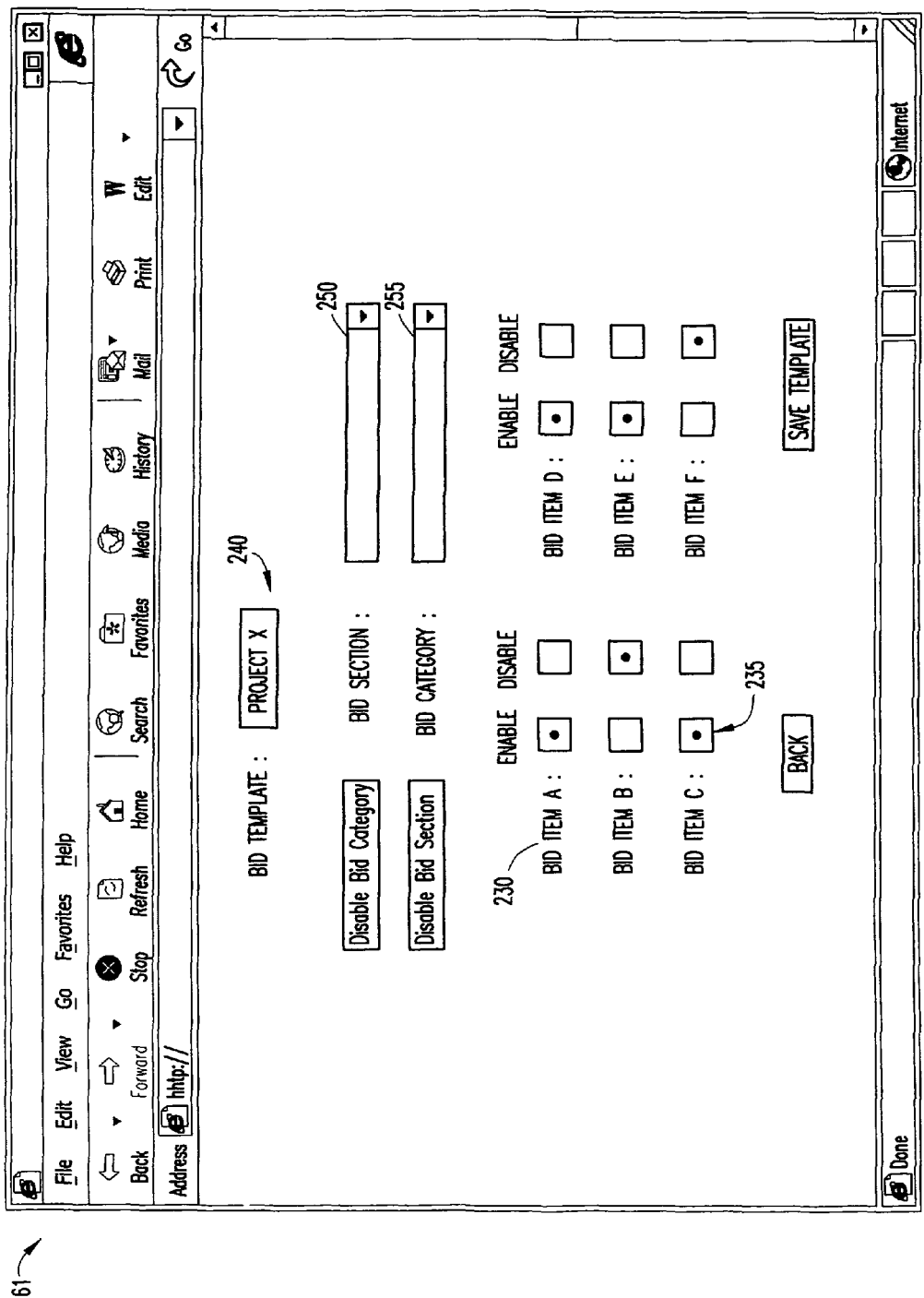
FIG. 19 is a screen shot illustrating the creation of a bid template.

A screen shot of an exemplary web page for creating a bid template is shown in FIG. 19. Using one or more web pages (only one of which is shown), the buyer user can enter the bid template name 240, select a bid section 250 and select a bid category 255 to display specific bid items 230 within the bid category 255 that may be included in the bid template 240. For each bid item 230 within a displayed bid category 255, the buyer user can select to either enable or disable that bid item 230. However, if a particular bid item 230 cannot be disabled, the disable button is ghosted to prevent the buyer user from disabling the bid item 230. In addition, if the option is available, the buyer user may also be allowed to disable all bid items 230 within a particular bid section 250 or bid category 255 by clicking on a disable button next to the bid section 250 or bid category 255 currently displayed. Once all of the bid items 230 have been enabled or disabled for the bid template 240, the buyer user can save the bid template 240. In some embodiments, the buyer user may be able to temporarily save the bid template 240 if all bid items selections 235 have not yet been completed. In other embodiments, the save button is ghosted until all bid items 230 have been enabled or disabled.

Figure 20:
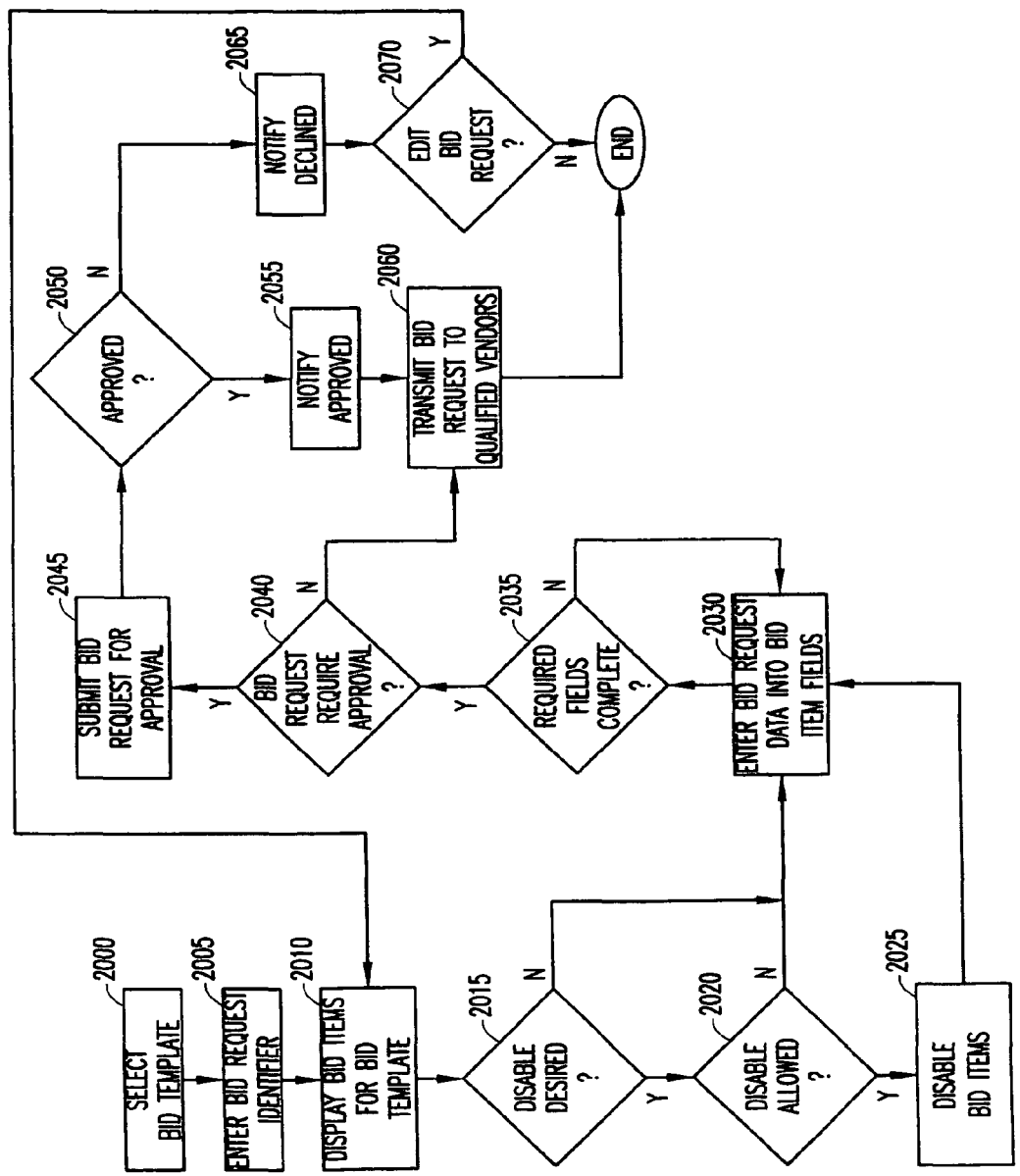
FIG. 20 is a flow chart illustrating exemplary steps for generating a bid request utilizing a bid template, in accordance with embodiments of the present invention.

FIG. 20 illustrates exemplary steps for creating a bid request from a bid template, as shown in FIG. 15, using bid items organized in a hierarchical and relational format, as shown in FIG. 17. Initially, a bid template is selected by a buyer user from the bid template list for the bid request (step 2000). It should be understood that the bid template can be created immediately prior to generation of the bid request or the bid template can be created well in advance of the bid request. After the particular bid template for the bid request is selected, the buyer user enters a bid request identifier for the bid request (step 2005), such as a bid request name or number. In addition, the system will assign a bid tracking number to refer to the bid as it applies throughout the system to the vendor, buyer, contractor and administrator.

All of the bid item selections in the bid template are displayed by bid section and bid category to the buyer user for review (step 2010). If one or more of the bid item selections in the bid template are not applicable to the particular bid request (step 2015), and the undesired bid item selections can be disabled (step 2020), the buyer user can disable those bid item selections that are not needed for the particular bid request (step 2025). Thereafter, the buyer user enters the requisite bid request data into appropriate fields for the bid item selections enabled in the bid request (step 2030). For example, one or more bid item selections may contain a field for the buyer to enter data, such as the location of the work to be performed or the type of project work. These fields can be variable type data fields, such as text-entry fields or selectable options fields with links to other web pages containing the selectable option.

An example of a selectable option field that may be displayed involves the selection of a particular type of project work for the bid request from a number of pre-established project types. To implement the project type selection process, a configurable and scalable database structure can be provided that enables the buyer's specific project work business requirements to be classified in a non-prose fashion. By selecting from pre-established project work types, the buyer can ensure that vendor bid responses are synchronous with the buyer's project work requirements. The project work types can also be selected by the vendor when completing vendor qualification data (shown in FIG. 2) for selecting of vendors to receive the bid request. Examples of data structures used for selecting the project work type are shown in Tables 27-29 hereinbelow. The data structures are illustrated for simplicity as being organized in a table format, with each table including all of the fields necessary for displaying the project work types to the buyer user to select from and storing the selected project work type within the field of the associated bid item selection of the bid request. The tables are related in a hierarchical and relational manner, such that the tables are accessed in a particular order for displaying the project work types to the buyer user.

Table 27 below illustrates sample project services types, such as consulting, staff supplementation and other project services. Within each of the project services types may be one or more project sectors, as shown in Table 28, and within each of the project sectors may be one or more project families, as shown in Table 29. Therefore, to select a particular project work type (project family) for the bid request, the buyer user can select a project services type and project sector type to display a list of project families to select from. It should be understood that other configurations and project types can be included and the system is not limited to the specific configurations and information listed in Tables 27-29.

TABLE 27

Project Services Type Table

| Project_Work_Type_Name | Services_Type_ID | ASP_Display_Order |
|---|---|---|
| Consulting | 1 | 2 |
| Staff_Supplementation | 2 | 3 |
| Project_Services | 3 | 1 |

TABLE 28

Project Sector Type Table

| Project_Section_ID | Project_Sector_Name | ASP_Display_Order | Project_Services_ID |
|---|---|---|---|
| 1 | Consulting/Professional Services | 2 | 1 |
| 2 | Engineering/Construction | 3 | 1 |
| 3 | Technology | 1 | 1 |

TABLE 29

Project Family Type Table

| Project_Family_ID | Project_Family_Name | ASP_Display_Order | Project_Sector_ID |
|---|---|---|---|
| 7 | Enterprise_Resource_Solutions | 5 | 3 |
| 8 | E-Business_Solutions | 10 | 3 |
| 9 | Telecommunications_Solutions | 15 | 3 |
| 10 | Technical_Integration_Solutions | 15 | 3 |
| 11 | Network_Management_Solutions | 25 | 3 |
| 12 | Custom_Software_Development/Engineering | 30 | 3 |
| 13 | Business_Strategy/Planning_Solutions | 5 | 1 |
| 14 | Human_Resource_Solutions | 10 | 1 |
| 15 | Audit/Assurance_Solutions | 15 | 1 |
| 16 | Financial_Advisory_Solutions | 20 | 1 |
| 17 | Tax_Solutions | 25 | 1 |
| 18 | Risk_Management_Solutions | 30 | 1 |
| 19 | Real_Estate_Services | 35 | 1 |
| 20 | Legal_Services | 40 | 1 |
| 21 | Engineering_Services | 5 | 2 |
| 22 | Building/Construction_Services | 10 | 2 |
| 23 | Product_Development | 15 | 2 |

Referring again to FIG. 20, once the buyer user has entered the bid request data into all of the required bid item fields (step 2035), the bid request is complete. It should be understood that not all of the bid item fields require the user to enter bid request data. For example, one or more of the bid item selections may be a vendor bid response bid item selection that only the vendor responds to. For the vendor bid response bid item selections, the buyer user can enable or disable that bid item selection, and does not enter any data into the field for that bid item selection except data that may assist the vendor in completing the bid response for that bid item. For bid request completeness, every enabled bid item selection where the buyer user can enter bid request data is preferably filled out by the buyer user before the bid request is submitted.

In many companies, bid requests must be approved prior to transmission to vendors. Therefore, if the bid request requires approval (step 2040), the originator of the bid request submits the bid request to the appropriate approvers (step 2045). In exemplary embodiments, as discussed above in connection with FIGS. 9-14, the approval user role positions are pre-designated for all bid requests or for the particular bid request, so that the bid request is automatically routed to the appropriate approver. If the bid request is approved (step 2050), the originator is informed of the bid request approval (step 2055), and the bid request is transmitted to qualified vendors (step 2060). However, if the bid request is not approved (step 2050), the originator is notified of the bid request declination (step 2065), and provided the opportunity to edit the bid request (step 2070), if possible. For example, the originator may have disabled one or more bid item selections that need to be included in the bid request for approval purposes, or left blank one or more buyer-required data fields. If approval of the bid request is not required (step 2040), the bid request is transmitted to the qualified vendors for the bid request (step 2060).

Figure 21:
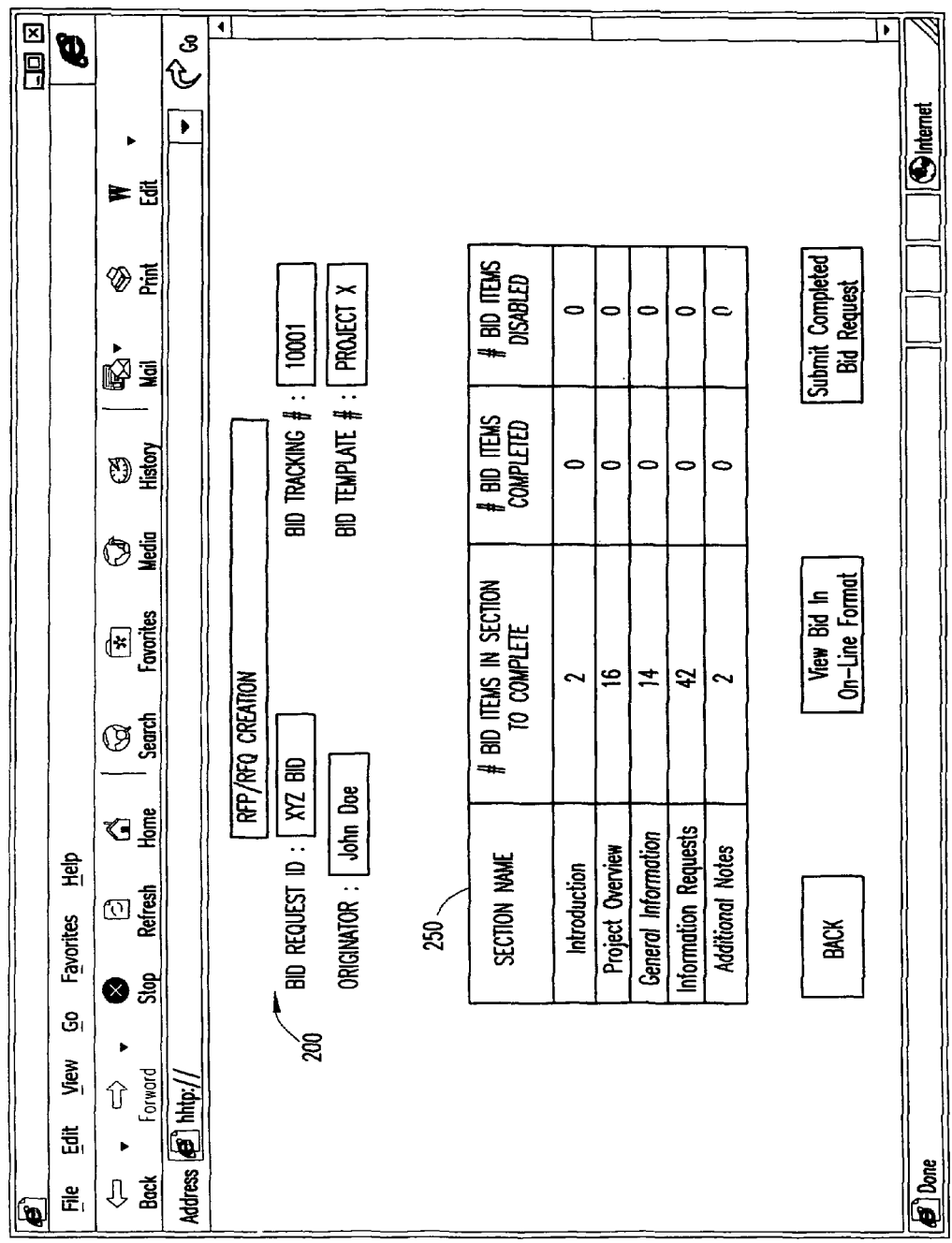
FIGS. 21-22 are screen shots illustrating various types of bid items associated with the particular bid template that can be selected from to include in a bid of the bid template type.
Figure 22:
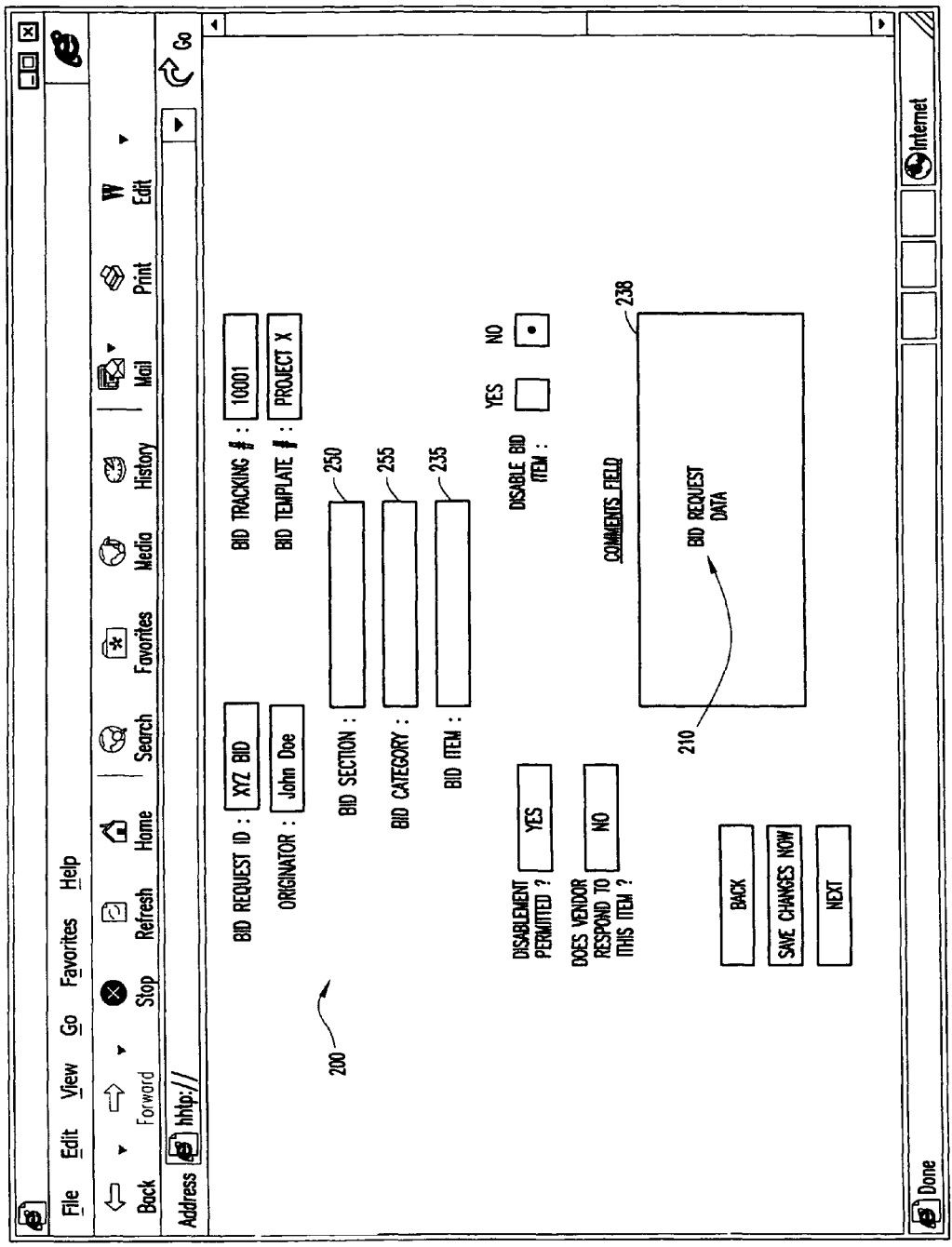

FIGS. 21 and 22 are screen shots of exemplary web pages that can be provided to the buyer user for bid request creation. Using one or more web pages, the buyer user can enter the bid request name 200, select a bid section 250 and select a bid category 255 to display specific bid item selections 230 within the bid category 255 that may be included in the bid request 200. FIG. 21 shows an overview of the status of the bid request 200 listing the number of bid item selections 235 in each section 250 and the number of bid item selections 235 in each section 250 that are completed or disabled. To complete or disable a bid item selection 235, the buyer user can click on the bid section 250 to display the bid categories 255 and bid item selections 235 within each of the bid categories 255. Once all of the bid item selections 235 have been completed or disabled, the buyer user can click on a submit completed bid request button for approval and/or transmission to qualified vendors.

As shown in FIG. 22, each bid item selection 235 in each bid category 255 within each bid section 250 can be reviewed to determine whether or not the bid item selection 235 should be disabled. Some of the bid item selections 235 in one or more of the categories 255 may also require bid request data 210 from the buyer user. For each bid item selection 235 within a bid category 255, the buyer user can either enable or disable that bid item selection 235. However, if a particular bid item selection 235 cannot be disabled, the disable button is ghosted to prevent the buyer user from disabling the bid item selection 235. In addition, if the option is available, the buyer user may also be allowed to disable all bid item selections 235 within a particular bid section 250 or bid category 255. If a bid item selection 235 is enabled and has a field 238 for entering bid request data 210, the buyer user can enter bid request data 210 into the associated data field 238. In addition, if the bid template contains default bid request data 210 for a particular bid item selection 235, the default data 210 can be displayed in the data field 238 and may or may not be allowed to be changed, depending on the template settings.

Figure 23:
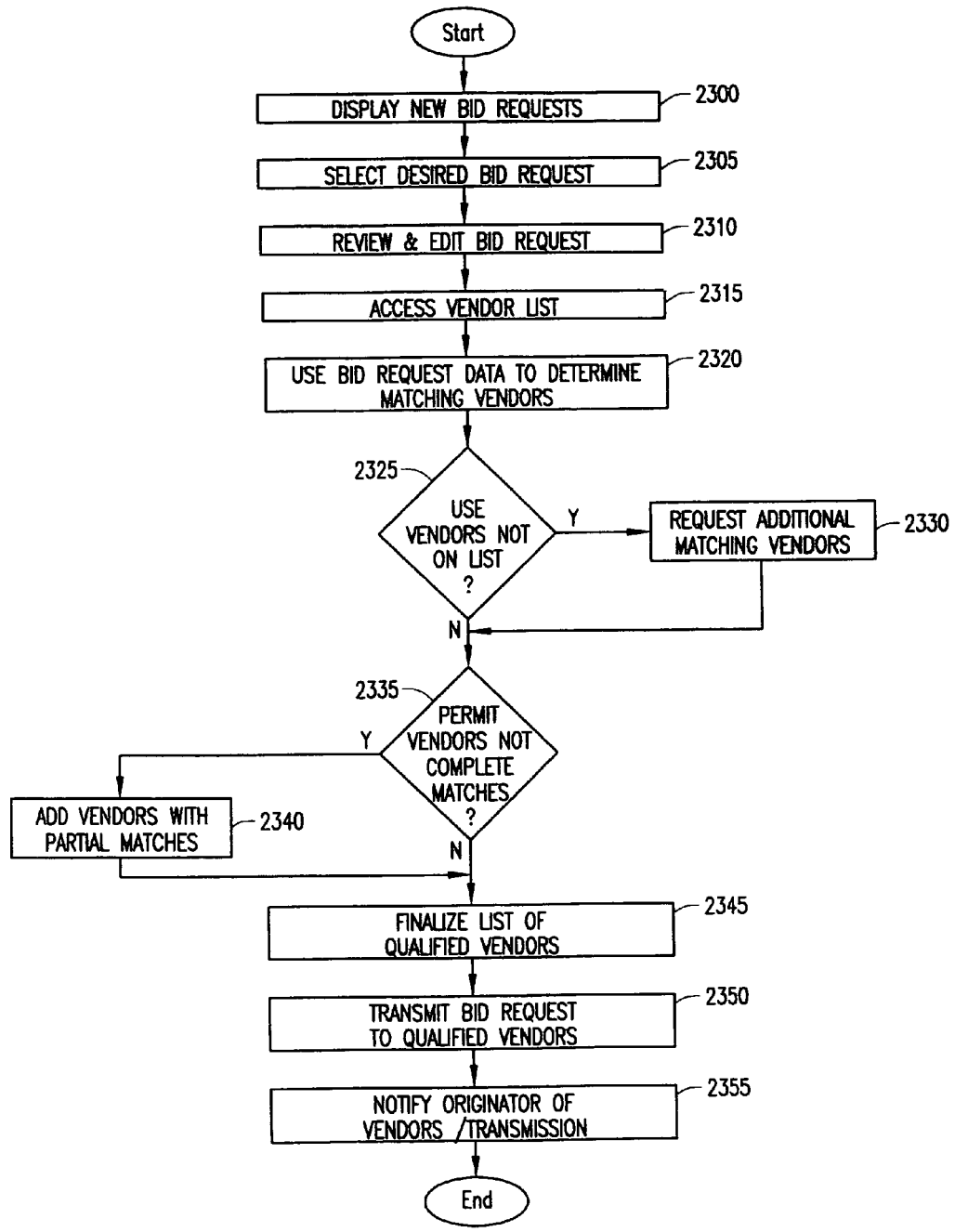
FIG. 23 is a flowchart illustrating exemplary steps for administering the communication of a bid request to qualified vendors.

FIG. 23 illustrates exemplary steps for reviewing and transmitting bid requests to qualified vendors, as shown in FIG. 15. The originator of the bid request can select appropriate qualified vendors from the vendor list based on bid template type and entered bid request data or the bid request can be submitted to a project administrator to choose the qualified vendors, depending on buyer constraints. If the latter, the new bid requests can be displayed to an administrative user (step 2300) to select the desired bid request for review and transmission (step 2305). During the review process, the administrative user may be allowed to edit the bid request for quality control purposes or may request the originator of the bid request to edit the bid request, if significant changes are necessary (step 2310).

Once the bid request is in a completed form, the administrative user accesses the vendor list (step 2315) to determine qualified vendors for the bid request based on the bid template type and entered bid request data (step 2320) (e.g., based on the project family in conjunction with the anticipated geographic work location). If the list of qualified vendors is insufficient (step 2325), the administrative user may also query the top-level database (as shown in FIG. 6) for additional matching vendors to add to the qualified vendor list (step 2330). In addition to or instead of supplementing the qualified vendor list with matching vendors from the top-level database, the administrative user may also be provided the option to include vendors that do not completely match all of the bid request data (steps 2335 and 2340).

Figure 24:
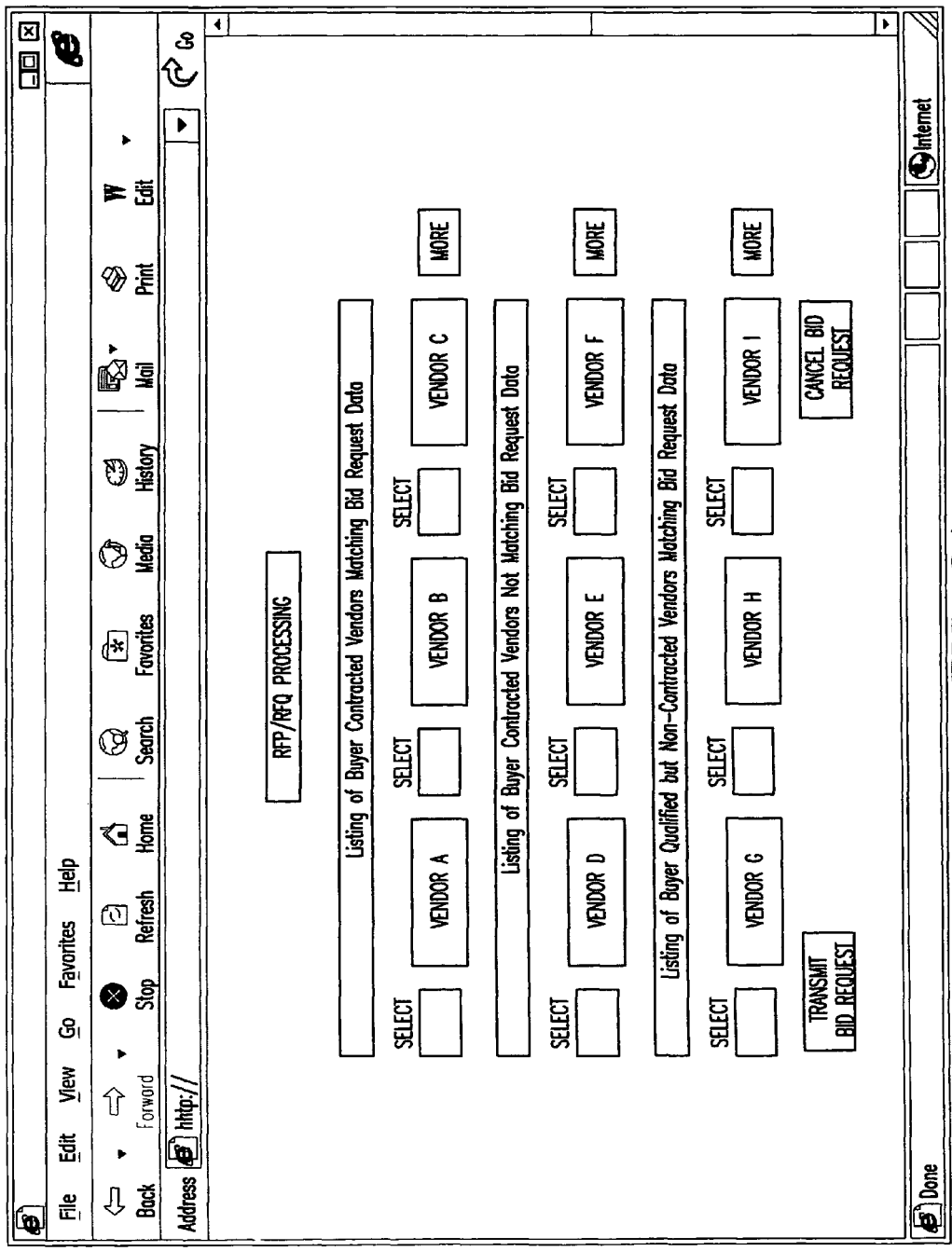
FIG. 24 is a screen shot illustrating the selection of qualified vendors to receive the bid request.

A screen shot of an exemplary web page displaying all of the potential vendors to be selected from to include on the qualified vendor list is shown in FIG. 24. The administrative user can select from buyer-contracted vendors that match the bid request data, buyer-contracted vendors that do not completely match the bid request data and non-contracted vendors that match the bid request data provided by the top-level database. The administrative user can select vendors for inclusion in the vendor qualification list based on any number of factors, including previous contract experience with the vendor, vendor reputation and vendor availability.

Turning back to FIG. 23, once the list of qualified vendors is finalized (step 2345), the administrative user transmits the bid request to the qualified vendors (step 2350) and notifies the originator of the bid request of the bid request status (step 2355). For example, the originator can be notified of the particular vendors that received the bid request and any modifications made to the bid request prior to transmission.

Figure 25:
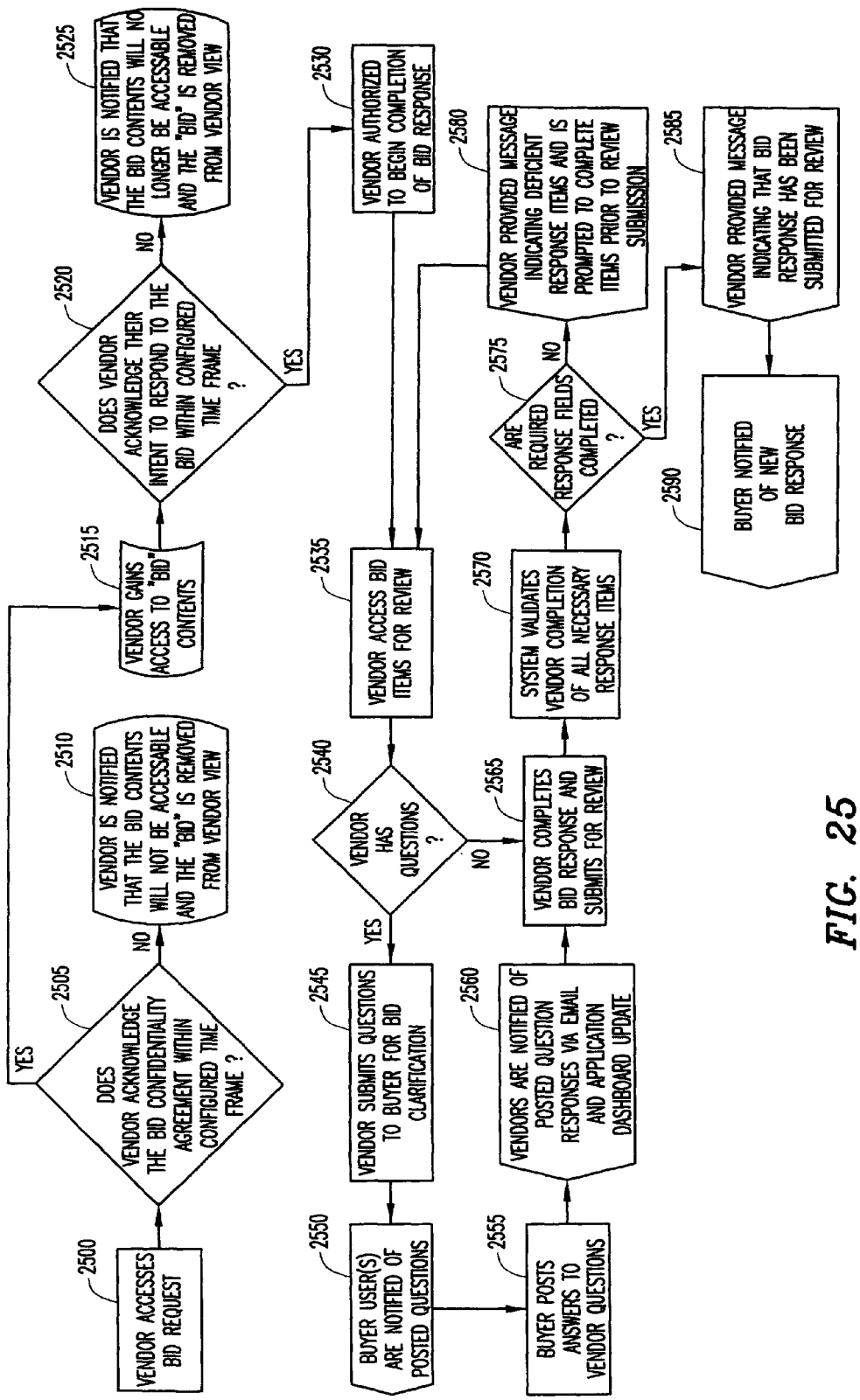
FIG. 25 is a flowchart illustrating exemplary steps in a vendor bid response process, in accordance with embodiments of the present invention.

Exemplary steps for generation and transmission of a vendor bid response, as shown generally in FIGS. 1 and 15 at 220, to a received bid request are shown in FIG. 25. In exemplary embodiments, bid requests are transmitted to vendors and routed to the appropriate vendor users, based on vendor user role configurations, as discussed above in connection with FIGS. 9-14. Upon receipt of a bid request, an appropriate vendor user can access the bid request via a menu or dashboard control notification (step 2500). In further exemplary embodiments, the bid request is submitted with a bid confidentiality agreement binding the vendor user to maintain the contents of the bid request in confidence prior to displaying the bid request contents to the vendor user. If the vendor user acknowledges the confidentiality agreement (e.g., by clicking on an accept button) (step 2505), the vendor user can gain access to the contents of the bid request (step 2515). Otherwise, the vendor user is notified that the bid contents will not be accessible and the bid request is removed from the vendor user's view (step 2510).

To limit the amount of time that vendors have to submit vendor bid responses, the bid request may also include a time frame that the vendor must agree to respond within. If the vendor user cannot agree to respond within the time frame (e.g., by clicking on an accept button) (step 2520), the vendor user is notified that the contents of the bid request will no longer be available to the vendor user and the bid request is removed from the vendor user's view (step 2525). The buyer or project administrator is also notified of the vendors that do not acknowledge the confidentiality agreement or time frame constraints, and based on the number of non-acknowledged vendors, the buyer or project administrator can add vendors to the qualified vendor list and transmit the bid request to the additional vendors to ensure that a sufficient number of vendor bid responses are received.

If the vendor user does agree to respond within the time frame (step 2520), the vendor is authorized to begin completion of the vendor bid response (step 2530). To respond to the bid request, the vendor user accesses the bid item selections by bid section and bid category that require vendor response data for review (step 2535). If the vendor user has any questions regarding the bid request (e.g., the type or amount of vendor response data that is required) (step 2540), the vendor user can submit questions to the buyer for bid clarification within a buyer-configured time frame (step 2545). An appropriate buyer user (e.g., the bid request originator or project administrator) is notified of each question submitted by a vendor via e-mail and/or dashboard update (step 2550) and that buyer user is responsible for providing an answer to the submitted questions within applicable time constraints (step 2555). The vendors are notified of the buyer answers via e-mail and/or dashboard update (step 2560).

Figure 27:
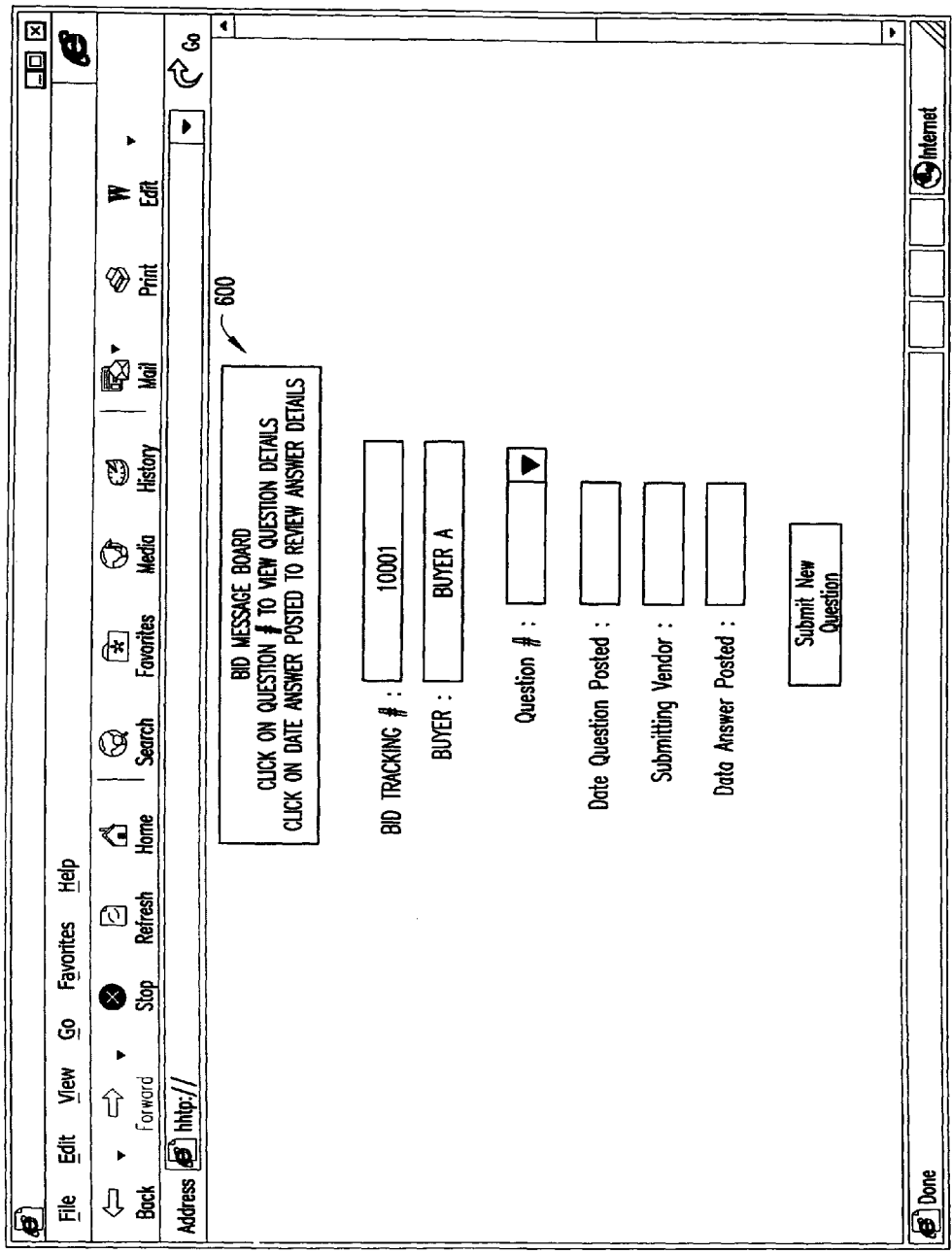

For example, a bid message board can be provided by the system that both the vendors and the buyer can access for a particular bid request. A screen shot of an exemplary bid message board 600 is shown in FIG. 27. Only the buyer and the vendors responding to a particular bid request can access the bid message board 600. All of the vendors may be provided access to all of the submitted questions and buyer answers, or only the vendor that submitted the question may be allowed to view the buyer answer, depending on the buyer settings. In addition, the vendor questions may be anonymous to the vendors and the buyer or only to the vendors, depending on the vendor and/or buyer preferences.

Turning back to FIG. 25, if the vendor user does not have any questions (step 2540) or all of the vendor questions have been answered (step 2560), the vendor user enters the requisite vendor response data into appropriate fields for the required bid item selections in the bid (step 2565). The vendor response data can include costing information including costing elements (e.g., resource requirements, expense types, etc.) and associated pricing information (e.g., resource rates, expense amounts, etc.) and deliverables information including deliverables types (e.g., number of units to be completed, phasing information, etc.) and completion information (e.g., project end date, phase end dates, etc.). Each of the costing elements and deliverables types is associated with a different bid item selection to enable effective comparison and grading of vendor bid responses.

The bid item fields can be of various data types, such as text/currency/numeric-entry fields and/or selectable options fields. In addition, the fields can have multiple levels of detail associated with a singular bid response item for different aspects of the project. For example, if a project has several phases, as determined by the buyer and/or vendor, the vendor response fields can include a separate section for each phase of the project. Upon attempted submission of the vendor bid response, the system validates vendor completion of all necessary data fields for bid item selections in the vendor bid response (step 2570). If all required data fields are not completed (step 2575), the vendor user is provided a system message indicating the deficient vendor response bid item selections, and is prompted to complete the required bid item selections prior to submitting the vendor bid response (step 2580). Once all required data fields for bid item selections are completed in a bid response (step 2575), the vendor (upon submission) is provided a message indicating that the vendor bid response has been submitted to the buyer or project administrator for review (step 2585) and the appropriate buyer user is notified of a new vendor bid response via e-mail and/or dashboard update (step 2590).

Figure 26A:
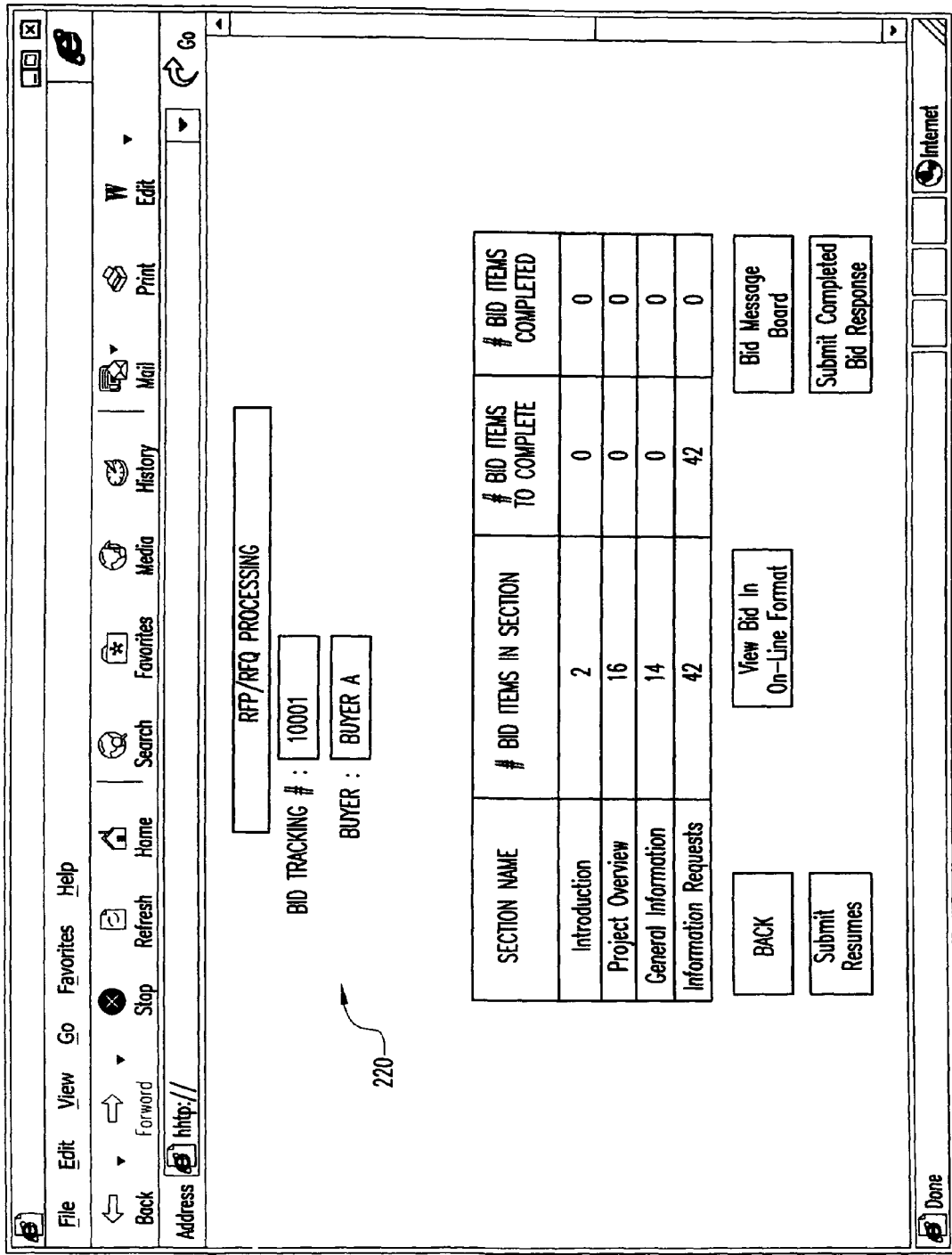
Figure 26B:
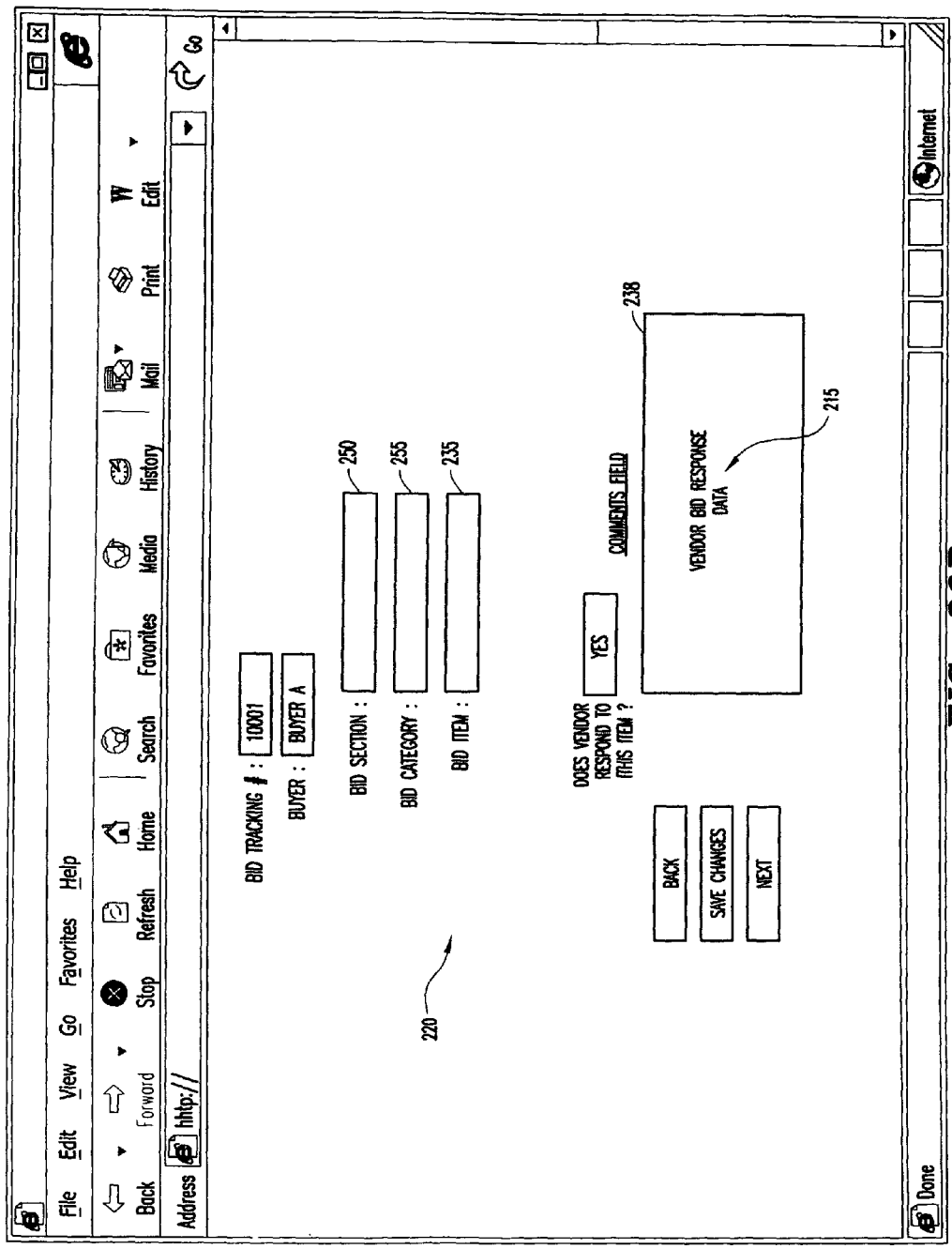

FIGS. 26A and 26B are screen shots of exemplary web pages that can be provided to the vendor user for bid response generation. The vendor user is provided with web pages displaying the bid item selections within the bid request that require vendor response data. For example, as shown in FIG. 26A, the status of the vendor bid response can be displayed to the vendor user listing the number of bid item selections 235 in each section 250, the number of bid item selections 235 in each section that the vendor user must complete and the number of bid item selections 235 in each section 250 that have been completed. In addition, the vendor user can access the bid message board to post vendor questions, view the bid response in an on-line format that is easily readable or submit resumes of potential contractors to be included in the vendor bid response. Furthermore, once the vendor responses to all of the bid item selections 235 have been completed, the vendor user can click on the submit completed bid response button for approval and/or transmission to the buyer or project administrator.

To complete a vendor response to a bid item selection 235, as shown in FIG. 26B, the vendor user can click on the bid section 250 to display the bid categories 255 and bid item selections 235 within each of the bid categories 255. If a vendor response to a particular bid item selection is required, the vendor user can enter the vendor response data 215 into a data field 238 for the bid item selection 235. As discussed above, the data field 238 can be a direct text-entry field or include links to other web pages for selection of the appropriate vendor response data 215 from pre-established vendor responses. In addition, the data field 238 can have multiple levels, with links to web pages for each level. Furthermore, the data field 238 may be able to be directly populated from the vendor database with default vendor response data 215, such as vendor name and vendor address. For example, upon receipt of a bid request, the vendor module can search for particular bid item selections 235 and populate the data fields 238 for those bid item selections 235 with the appropriate vendor response data 215.

An example of vendor response data selected from pre-established vendor responses is shown in FIG. 28. If the bid request includes a bid item selection requiring the vendor to provide resource requirement information for the project, along with, for example, the resource rates associated with the resource requirement information, the data field 238 can provide links to other web pages for selection of pre-established resource profile parameters. For example, each resource profile can indicate a particular resource type and associated skills needed for the resource profile. To facilitate effective comparison of resource profiles and rates by the buyer, the vendor can select from a number pre-established resource types and associated skills. To implement the resource type and skills selections, a configurable and scalable database structure can be provided that enables the vendor's specific resource requirements to be classified in non-prose fashion.

Examples of data structures used for selecting the resource type and associated skills are shown in Tables 30-37 hereinbelow. The data structures are illustrated for simplicity as being organized in a table format, with each table including all of the fields necessary for displaying the resource types and associated skills to the vendor user to select from and storing the selected resource profile within the data field of the associated bid item selection. The tables are related in a hierarchical and relational manner, such that the tables are accessed in a particular order for displaying the resource types and associated skills to the vendor user, as will be described hereinbelow in connection with FIG. 29, which illustrates a database table structure 800 representing an exemplary data scheme associated with a complete vendor bid response the interrelation between the vendor bid response and the buyer bid request.

Table 30 below illustrates sample business sector categories, such as light industrial, management/professional, office and technical. Within each of the business sector categories are one or more business arenas, as shown in Table 31, and within each of the business arenas are one or more business families, as shown in Table 32. Therefore, to select a particular business family associated with the resource type for the bid response, the vendor user can select a business sector category and business arena to display a list of business families to select from. Once the business family is selected, the various skills (general functions and business skills) associated with the resource type can be selected and mapped to the particular resource type, as shown in Tables 33-37. For example, the general functions can identify the level of skill associated with the resource type, the skills category can identify the types of skills, training and experience that the resource type possesses and one or more skills sets associated with each skills category can identify the specific experience associated with the resource type. In addition, certain skills sets can be emphasized over other skills sets by establishing a priority level for each of the skills sets of the resource type. It should be understood that other resource type and skill selections can be provided, and the system is not limited to the particular configuration and information shown in Tables 30-37. For a more complete discussion of resource profiling, reference is made to co-pending and commonly assigned U.S. patent application Ser. No. 10/128,751, which is hereby incorporate by reference in its entirety herein.

TABLE 30

Exemplary Business Sectors Table (tblBusSector)

| Bus_Sector_Name | Bus_Section_ID | ASP_Display_Order |
|---|---|---|
| Light Industrial | 1 | 4 |
| Mgmt/Professional | 2 | 2 |
| Office | 3 | 3 |
| Technical | 4 | 1 |

TABLE 31

Exemplary Business Arenas Table (tblBusArena)

| Bus_Arena_ID | Bus_Arena_Name | Bus_Sector_ID | ASP_Display_Order |
|---|---|---|---|
| 1 | Administrative Support | 3 | 5 |
| 2 | Business Support | 4 | 5 |
| 3 | Communications Software | 4 | 10 |
| 4 | Controller | 2 | 10 |
| 5 | Enterprise Resource Applications | 4 | 15 |
| 6 | Finance | 2 | 15 |
| 7 | General Business Support | 3 | 10 |
| 8 | General Clerical | 3 | 15 |
| 9 | General Support | 1 | 5 |
| 10 | Human Resources | 2 | 20 |
| 11 | Legal | 2 | 25 |
| 12 | Logistics Support | 1 | 10 |
| 13 | Management Information Systems | 4 | 20 |
| 14 | Manufacturing | 2 | 30 |
| 15 | Materials Management | 2 | 35 |
| 16 | Network Engineering | 4 | 25 |
| 17 | Product Development | 4 | 30 |
| 18 | Production | 1 | 15 |
| 21 | Sales | 2 | 40 |
| 22 | Call Center | 2 | 5 |

TABLE 32

Exemplary Business Families Table (tblBusFamily)

| Bus_Family_ID | Bus_Family_Name | Bus_Arena_ID | ASP_Page_Display |
|---|---|---|---|
| 23 | Maintenance | 9 | 5 |
| 24 | Driver/Courier | 9 | 10 |
| 26 | Shipping/Receiving | 12 | 5 |
| 27 | Distribution | 12 | 10 |
| 28 | Inventory Control | 12 | 15 |
| 29 | Light Assembly | 18 | 5 |
| 30 | Electronic Assembly | 18 | 10 |
| 31 | Quality Assurance/Control | 18 | 15 |
| 32 | Assets Management | 4 | 5 |
| 33 | Audit | 4 | 10 |
| 34 | Budgeting | 4 | 15 |
| 35 | Cost Center Accounting | 4 | 20 |
| 36 | Overheads | 4 | 25 |
| 37 | Product Costing | 4 | 30 |
| 38 | Profit Center Accounting | 4 | 35 |
| 39 | Profitability | 4 | 40 |
| 40 | Project Accounting | 4 | 45 |
| 41 | Taxation | 4 | 50 |
| 42 | TreasuryCash Management | 4 | 55 |
| 43 | Accounts Payable | 6 | 5 |
| 44 | Accounts Receivable | 6 | 10 |
| 45 | Capital Investment | 6 | 15 |
| 46 | Consolidation | 6 | 20 |
| 47 | Credit/Collections | 6 | 25 |
| 48 | General Ledger | 6 | 30 |
| 49 | Other Ledgers | 6 | 35 |
| 50 | Benefits | 10 | 5 |
| 51 | Payroll | 10 | 10 |
| 52 | Personnel | 10 | 15 |
| 53 | Services | 10 | 20 |
| 54 | Antitrust Law | 11 | 5 |
| 55 | Contract Law | 11 | 10 |
| 56 | Corporate Law | 11 | 15 |
| 57 | Environmental Law | 11 | 20 |
| 58 | International Law | 11 | 25 |
| 59 | Labor Law | 11 | 30 |
| 60 | Real Estate Law | 11 | 35 |
| 61 | Taxation Law | 11 | 40 |
| 62 | Maintenance in Manufacturing | 14 | 5 |

TABLE 32-continued

Exemplary Business Families Table (tblBusFamily)

| Bus_Family_ID | Bus_Family_Name | Bus_Arena_ID | ASP_Page_Display |
|---|---|---|---|
| 63 | Manufacturing Process | 14 | 10 |
| 64 | Manufacturing Production | 14 | 15 |
| 65 | Manufacturing Quality Control | 14 | 20 |
| 66 | Distribution/Transportation/Warehousing | 15 | 25 |
| 67 | Materials Management | 15 | 30 |
| 68 | Purchasing | 15 | 35 |
| 69 | Sales Management | 21 | 5 |
| 70 | Sales Operations | 21 | 10 |
| 71 | Customer Service | 22 | 5 |
| 72 | Operations | 22 | 10 |
| 73 | Sales/Marketing | 22 | 15 |
| 74 | Bookkeeping | 7 | 5 |
| 75 | Database Support | 7 | 10 |
| 76 | Desk Top Publishing | 7 | 15 |
| 77 | Spreadsheet Support | 7 | 20 |
| 20 | General Clerical Support | 8 | 5 |
| 21 | Administrative Support | 1 | 5 |
| 18 | Business Analysis | 2 | 5 |
| 19 | Business Support | 2 | 10 |
| 1 | Network Design/Planning/Consulting | 16 | 5 |
| 2 | Network Infrastructure | 16 | 10 |
| 3 | Network Operations/Administration | 16 | 15 |
| 4 | OS Programming | 3 | 15 |
| 5 | Application Development | 3 | 5 |
| 6 | Database Development | 3 | 10 |
| 8 | Product Management | 17 | 10 |
| 9 | Product Design/Development | 17 | 5 |
| 10 | OS Programming | 13 | 9 |
| 11 | Network Infrastructure Support | 13 | 15 |
| 12 | Application Development | 13 | 5 |
| 13 | Network Management/Administration | 13 | 20 |
| 14 | SAP | 5 | 20 |
| 15 | PeopleSoft | 5 | 15 |
| 16 | Oracle | 5 | 10 |
| 17 | Baan | 5 | 5 |
| 78 | Database Development | 13 | 10 |

TABLE 33

Exemplary Business General Functions

| Column Name | Data Type | Length | Resource Profile Info |
|---|---|---|---|
| Business_Family_ID | Int | 4 | 78 |
| General_Function_ID | Int | 4 | 3 |
| General_Function_Name | Nvarchar | 100 | Database Admin. |

TABLE 34

Skill Categories Table (tblCategory)

| Column Name | Data Type | Length |
|---|---|---|
| Skills_Category_ID | Int | 4 |
| Skills_Category | Nvarchar | 255 |

TABLE 35

Skills By Category Table (tblSkillsMap)

| Column Name | Data Type | Length |
|---|---|---|
| Skill_ID | int | 4 |
| Skill_Name | nvarchar | 255 |
| Skills_Category | nvarchar | 255 |
| Skills_Category_ID | int | 4 |

TABLE 36

Business Family to Skill Category Map (tblBusFamtoSkillCat)

| Column Name | Data Type | Length |
|---|---|---|
| BusinessFamilyID | int | 4 |
| Skills_Category_ID | int | 4 |
| Skills_Category | nvarchar | 255 |
| Required | char | 1 |
| Record_ID | int | 4 |

TABLE 37

Exemplary Business Skills Priority

| Column Name | Data Type | Length | Resource Profile Info |
|---|---|---|---|
| Skill_Priority_ID | int | 4 | 2 |
| Skill_Priority_Name | varchar | 50 | Critical |

Figure 29:
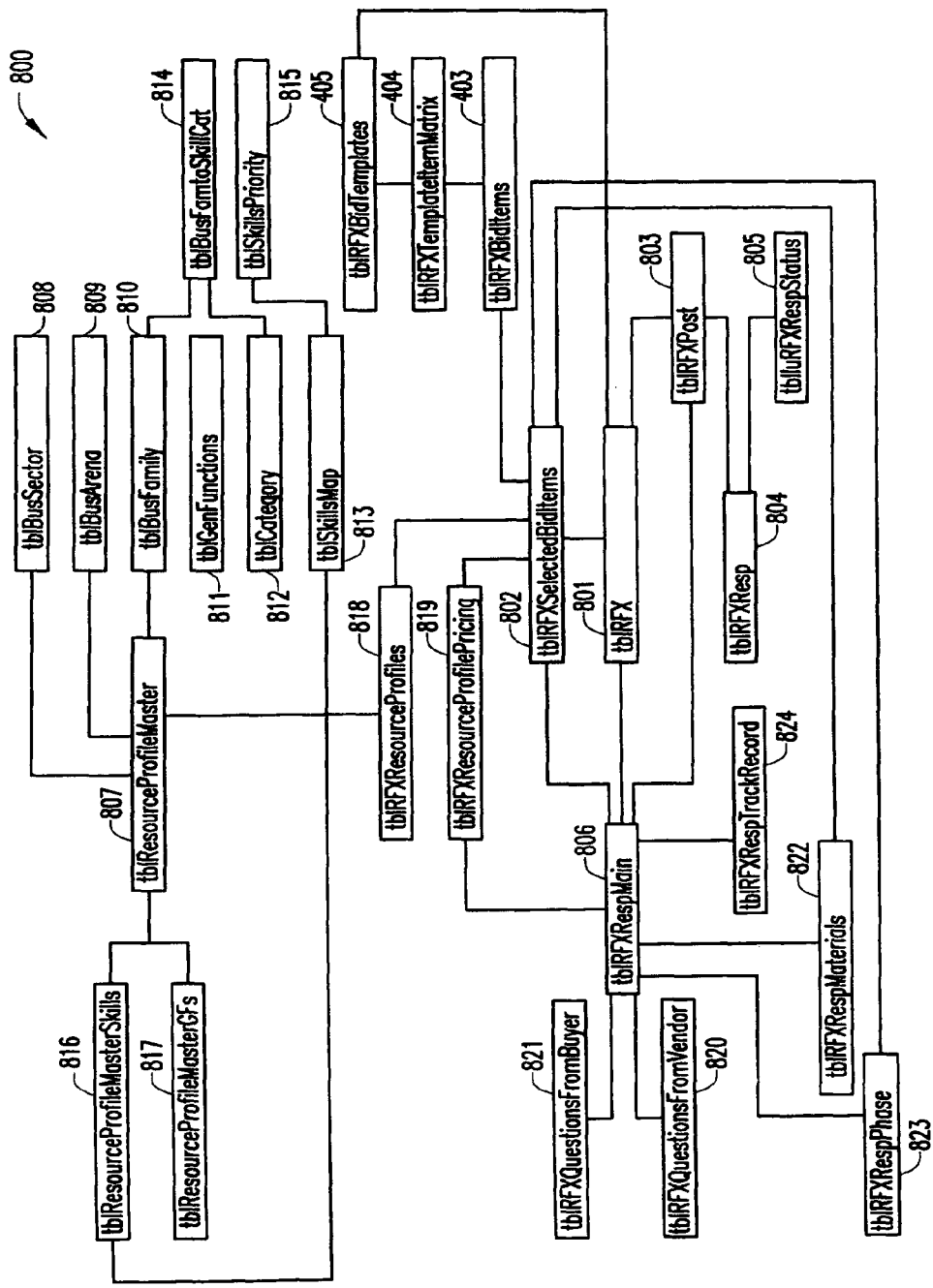
FIG. 29 is a database table view illustrating the interrelation between the bid request and vendor bid response data, in accordance with embodiments of the present invention.

Upon submission of the vendor bid response, all of the bid item selection fields are populated with bid data (either bid request data or vendor response data), which is stored in system (buyer database and vendor database) as a bid in a hierarchical and relational manner, as shown in the database table structure 800 of FIG. 29. Exemplary data structures for storing the bid data are shown hereinbelow in Tables 38-55, which will be discussed in connection with FIG. 29.

Tables 38 and 39 below illustrate sample bid request data associated with a particular bid request that can be stored in the database in tables "tblRFX" 801 and "tblRFXSelectedBidItems" 802, as shown in FIG. 29. For example, in table "tblRFX" 801, general information concerning the bid request can be stored, such as the bid tracking number assigned to the bid request by the system, the bid request name assigned by the originator, the identity of the bid request originator, the bid template type, the project type, project work location, budgeted expenditure amount for the project, the status of the bid request (e.g., new, submitted, evaluated, awarded, etc.), whether or not top-level database vendors received the bid request and whether any approval was required. However, it should be understood that other bid information can also be included, and the system is not limited to the specific information shown in Tables 38 and 39.

The specific bid items selections included within the bid request and the bid request data (buyer comments) entered by the originator for each of the bid item selections can be stored in the table "tblRFXSelectedBidItems" 802. Each bid item selection can be stored as a separate record in "tblRFXSelectedBidItems" 802, with each record containing all of the fields shown in Table 39 below. Table "tblRFXSelectedBidItems" 802 is tied to the general bid request information table "tblRFX" 801. As discussed above in connection with FIG. 10, the bid item selections contained within table "tblRFXSelectedBidItems" 802 are selected from the table "tblRFXBidItems" 403 and associated with a particular bid template type stored within table "tblRFXBidTemplates" 405 through table "tblRFXTemplateItemMatrix" 404.

TABLE 38

Master Bid Table (tblRFX - db structure view)

| Column Name | Data Type | Length |
| --- | --- | --- |
| RFX_Tracking_ID | int | 4 |
| Originator_User_ID | int | 4 |
| RFX_Template_ID | int | 4 |
| Project_Sector_ID | int | 4 |
| Project_Family_ID | int | 4 |
| Project_Type_ID | int | 4 |
| RFX_Status_ID | int | 4 |
| Buyer_Bid_ID | varchar | 100 |
| RFP_Title | varchar | 100 |
| RFX_Administration_Location_ID | numeric | 9 |
| Primary_Work_Location_ID | numeric | 9 |
| External_Work_Location | varchar | 500 |
| Solicit_TLD_Vendors | char | 1 |
| Currency_ID | int | 4 |
| Budgeted_Expenditure | money | 8 |
| Assigned_to_ID | int | 4 |
| RFQ_Team_Member | int | 4 |
| Financial_Approval_Required | char | 1 |
| Non_Financial_Approval_Required | char | 1 |

TABLE 39

RFX Bid Items Table (tblRFXSelectedBidItems)

| Column Name | Data Type | Length |
| --- | --- | --- |
| RFX_Tracking_ID | int | 4 |
| RFX_Item_ID | int | 4 |
| RFX_Item | varchar | 255 |
| Disablement_Allowed | char | 1 |
| HM_Disabled | char | 1 |
| Buyer_Comments | varchar | 8000 |
| Vendor_Bid_Display | char | 1 |
| Vendor_Response_Item | char | 1 |
| Vendor_Response_Required | char | 1 |

TABLE 39-continued

RFX Bid Items Table (tblRFXSelectedBidItems)

| Column Name | Data Type | Length |
| --- | --- | --- |
| Item_Complete | char | 1 |
| Identity_Key | int | 4 |

Sample information pertaining to the posting (transmitting) of the bid request to qualified vendors is shown hereinbelow in Table 40, which can be stored in the database in table "tblRFXPost" 803, as shown in FIG. 29. In exemplary embodiments, posting information is related to each particular vendor that received the bid request, and can include, for example, the date and time the bid request was submitted (posted) to the qualified vendor, the identity of the administrative user that posted the bid request, the identity of the qualified vendor that received the bid request, the vendor bid response identifier and the score assigned to the vendor, as described below in connection with FIGS. 31-35. However, it should be understood that other information can be included, and the system is not limited to the specific information shown in Table 40. A separate record for each vendor that received the bid request can be stored in table "tblRFXPost" 803, with each record including all of the fields shown hereinbelow.

TABLE 40 tblRFXPost

| Column Name | Data Type | Length |
| --- | --- | --- |
| Bid_Tracking_ID | int | 4 |
| Vendor_ID | int | 4 |
| Posting_Record | int | 4 |
| Post_Time | datetime | 8 |
| Admin_Poster_ID | int | 4 |
| Response_ID | int | 4 |
| Score | int | 4 |

Sample information pertaining to the receipt of the bid request by the vendor and the submission of the vendor bid response is shown hereinbelow in Table 41, which can be stored in the database in table "tblRFxResp" 804, as shown in FIG. 29. For example, such response submission information can include the vendor bid response identifier, the status of the vendor bid response, the identity of the vendor, the vendor bid response submission date and the dates the vendor acknowledged the confidentiality and intend to respond agreements. Examples of the types of status information that can be included in the table "tblRFXResp" 804 are shown hereinbelow in Table 42, which can be stored in the database in table "tblRFXRespStatus" 805, as shown in FIG. 29. Tables "tblRFxResp" 804 and "tblRFXRespStatus" 805 are tied to table "tblRFXPost" 803, which in turn, is tied to "tblRFX" 801 to associate the vendor response submission information to the bid posting information for the bid request. However, it should be understood that other information can be included, and the system is not limited to the specific information shown in Tables 41 and 42. A separate record for each vendor bid response can be stored in "tblRFXResp" 804, with each record containing the fields shown in Table 41 below.

TABLE 41 tblRFXResp

| Column Name | Data Type | Length |
| --- | --- | --- |
| Response_ID | int | 4 |
| RFX_Resp_Status_ID | int | 4 |
| Vendor_ID | int | 4 |
| Confidentiality_Acceptance_Date | datetime | 8 |
| Intend_to_Respond_Date | datetime | 8 |
| RFX_Resp_Submit_Date | datetime | 8 |
| Last_Edit_Date | datetime | 8 |

TABLE 42

Exemplary Data from tblRFXRespStatus

1 New
2 Confidentiality_Terms_Accepted
3 Confidentiality_Terms_Not_Accepted
4 Response_Intended
5 Response_Declined
6 Temporarily_Saved
7 Response_Submitted
8 Bid_Not_Accepted
9 Awaiting_Re-Bid
10 Re-Bid_Declined
11 Bid_Accepted
12 Bid_On_Hold
13 Waiting_Bid_Description Table 43 below illustrates sample vendor bid response data submitted in a vendor bid response from a vendor to a buyer, which can be stored in the database in table "tblRFXResp-Main" 806, as shown in FIG. 29. For example, such vendor bid response data can include the bid tracking number, the vendor response identifier, the identity of the vendor, the particular bid item selection the vendor has responded to, the vendor response to that particular bid item selection, any bid request data (buyer comments) associated with that particular bid item selection, the record identifier for the vendor response to the particular bid item selection and any grade given to the vendor response by the buyer, as will be described in more detail hereinbelow in connection with FIGS. 31-35. However, it should be understood that other information can be included, and the system is not limited to the specific information shown in Table 43. A separate record for each bid item selection responded to by the vendor is stored in "tblR-FXRespMain" 806, with each record containing the fields shown in Table 43 below. Table "tblRFXRespMain" 806 is tied to "tblRFX" 801 and "tblRFXPost" 803 to associate the vendor bid response with the bid request.

TABLE 43 tblRFXRespMain

| Column Name | Data Type | Length |
| --- | --- | --- |
| Bid_Tracking_ID | int | 4 |
| Response_ID | int | 4 |
| Vendor_ID | int | 4 |
| Identity_Key | int | 4 |
| RFX_Item_ID | int | 4 |
| RFX_Item | varchar | 50 |
| Vendor_Response | varchar | 7000 |
| Required_Item | char | 1 |
| Buyer_Comments | varchar | 7000 |
| Resp_Record_ID | int | 4 |
| Record_Create_Date | datetime | 8 |

TABLE 43-continued tblRFXRespMain

| Column Name | Data Type | Length |
| --- | --- | --- |
| Last_Save_Date | datetime | 8 |
| Item_Grade | char | 1 |

Associated with one or more of the vendor responses to bid item selections may be one or more resource profiles of the particular resources (contractors) that the vendor identified as necessary to complete the project. The resource profiles can be created in advance or as part of the vendor bid response. The resource profiles are generated using the business sector, business arena, business family, general functions and skills discussed above in connection with FIG. 28 and shown in Tables 30-37 above.

Examples of resource profile information (resource type and skills) for resource profiles are shown hereinbelow in Tables 44-46, which can be stored in the database in tables "tblResourceProfileMaster" 807, "tblResourceProfile Mas-terSkills" 816 and "tblResourceProfileMasterGF's" 817, as shown in FIG. 29. The table "tblResourceProfileMaster" 807 stores the resource type of the resource profile (e.g., business sector, arena and family), while table "tblResourceProfile-MasterSkills" 816 stores the business skills (skills sets and skill sets priorities) associated with the resource type and table "tblResourceProfileMasterGF's" 817 stores the general functions of the resource type. However, it should be understood that other information can be included, and the system is not limited to the specific information shown in Tables 44-46. A separate record for each resource profile is included in tables "tblResourceProfileMaster" 807, "tblResourcePro-fileMasterSkills" 816 and "tblResourceProfileMasterGF's" 817, with each of the records containing all of the fields shown below in Tables 45-46. The table "tblResourceProfile-Master" 807 is tied to tables "tblResourceProfileMaster-Skills" 816 and "tblResourceProfileMasterGF's" 817 to associate the general functions and skills sets with the resource type of each resource profile.

TABLE 44 tblResourceProfileMaster (db structure view)

| Column Name | Data Type | Length |
| --- | --- | --- |
| Resource_Profile_ID | int | 4 |
| Resource_Profile_Name | varchar | 255 |
| User_ID | int | 4 |
| Vendor_ID | int | 4 |
| Bus_Sector_ID | int | 4 |
| Bus_Arena_ID | int | 4 |
| Bus_Family_ID | int | 4 |
| User_Notes | varchar | 1000 |
| Record_Date | datetime | 8 |
| Profile_Status | char | 4 |

TABLE 45 tblResourceProfileMasterGFs (db structure view)

| Column Name | Data Type | Length |
| --- | --- | --- |
| Resource_Profile_ID | Int | 4 |
| General_Function_ID | Int | 4 |
| Record_ID | Int | 4 |

TABLE 46 tblResourceProfileMasterSkills (db structure view)

| Column Name | Data Type | Length |
| --- | --- | --- |
| Resource_Profile_ID | int | 4 |
| Skill_ID | int | 4 |
| Record_ID | int | 4 |
| Skill_Priority | int | 4 |

Sample information relating to the particular selected resource profiles submitted with the vendor bid response is shown in Table 47 below, which can be stored in table "tblRFXResourcePfoiles" 818 in FIG. 29. For example, such selected resource profile information can include the identity of the resource profile and the anticipated quantity of that particular selected resource profile that are needed to complete the project. However, it should be understood that other information can be included, and the system is not limited to the specific information shown in Table 47. A separate record for each selected resource profile for the project is stored in "tblRFXResourceProfiles" 818, with each record containing all of the fields shown in Table 47 below. Table "tblRFXResourceProfiles" 818 is tied to table "tblRFXResourceProfileMaster" 807 to associate the particular resource type, skills and general functions with the selected resource profile. Table "tblRFXResourceProfiles" 818 is further tied to table "tblRFXSelectedBidItems" 802 to associate the selected resource profiles with the particular bid item selections requesting the resource profiles.

TABLE 47 tblRFXResouceProfile (db structure view)

| Column Name | Data Type | Length |
| --- | --- | --- |
| Resource_Profile_ID | int | 4 |
| Anticipated_Quantity | int | 4 |
| User_ID | int | 4 |
| Record_Date | datetime | 8 |
| Identity_Key | int | 4 |
| Record_ID | int | 4 |

Depending on the bid request, as part of the vendor bid response to one or more bid item selections, the vendor may also provide pricing information associated with the particular selected resource profiles for the project. Sample resource pricing information is shown in Table 48 below, which can be stored in the database in table "tblRFXResourcesProfilePricing" 819, as shown in FIG. 29. For example, such resource pricing information can include the resource profile identifier, the identity of the vendor bid response record for the bid item selection requesting the resource profile and pricing information, the anticipated number of hours the resource associated with the resource profile will work, the billing rate associated with the resource profile and the anticipated billing amount of the resource associated with the resource profile. However, it should be understood that other information can be included, and the system is not limited to the specific information shown in Table 48. A separate record for each resource associated with one of the selected resource profiles is stored in table "tblRFxResourcesProfilePricing" 819, with each record containing the fields shown in Table 48 below. Table "tblRFxResourcesProfilePricing" 819 is tied to table "tblRFXResourceProfiles" 818 to associate the resource pricing information for a particular resource to a particular selected resource profile. In addition, table "tblRFXResourcesProfilePricing" 819 is tied to table "tblRFXRespMain" 806 and table "tblRFXSelectedBidItems" to associate the resource pricing information and selected resource profile with the vendor bid response to a particular bid item selection.

TABLE 48 tblRFXResourceProfilesPricing (db structure view)

| Column Name | Data Type | Length |
| --- | --- | --- |
| Resource_Profile_ID | int | 4 |
| Resp_Record_ID | int | 4 |
| Vendor_ID | int | 4 |
| Anticipated_Hours | int | 4 |
| Bill_Rate | money | 8 |
| Anticipated_Billing | money | 8 |
| Record_Date | datetime | 8 |
| Record_ID | int | 4 |
| Identity_Key | int | 4 |

In addition to the particular resource profiles and pricing, the vendor bid response may also include information related to the types of materials needed for the project. Sample material information is shown below in Table 49, which can be stored in the database in table "tblRFXRespMaterials" 822, as shown in FIG. 29. For example, such material information can include the identity of the vendor bid response record for the bid item selection requesting the material information, the type of material and the cost of the material. However, it should be understood that other information can be included, and the system is not limited to the specific information shown in Table 49. A separate record for each type of material is stored in table "tblRFXRespMaterials" 822, with each record containing the fields shown in Table 49 below. Table "tblRFXRespMaterials" 822 is tied to table "tblRFXRespMain" 806 and table "tblRFXSelectedBidItems" to associate the material information with the vendor bid response to a particular bid item selection.

TABLE 49 tblRFXRespMaterials (db structure view)

| Column Name | Data Type | Length |
| --- | --- | --- |
| Resp_Record_ID | int | 4 |
| Material_Name | varchar | 100 |
| Material_Description | varchar | 500 |
| Material_Manufacturer | varchar | 100 |
| Unit_Cost | money | 8 |
| Unit_Count | numeric | 9 |
| Line_Item_Cost | money | 8 |
| Record_Date | datetime | 8 |
| Record_ID | int | 4 |
| Identity_Key | int | 4 |

The vendor bid response may also include information related to the phasing of the project. Sample phasing information is shown below in Table 50, which can be stored in the database in table "tblRFXRespPhase" 823, as shown in FIG. 29. For example, for each phase of the project, the phasing information can include the identity of the vendor bid response record for the bid item selection requesting the phasing information, the number of the particular phase, a description of the phase, the anticipated duration of the phase and the project deliverables at the end of the phase (e.g., number of units to be completed or other project milestones). However, it should be understood that other information can be included, and the system is not limited to the specific information shown in Table 50. A separate record for each phase is stored in table "tblRFXRespPhase" 823, with each record containing the fields shown in Table 50 below. Table "tblRFXRespPhase" 823 is tied to table "tblRFXRespMain" 806 and table "tblRFXSelectedBidItems" to associate the phasing information with the vendor bid response to a particular bid item selection.

TABLE 50 tblRFXRespPhase (db structure view)

| Column Name | Data Type | Length |
|---|---|---|
| Resp_Record_ID | int | 4 |
| User_ID | int | 4 |
| Project_Phase_# | numeric | 9 |
| Project_Phase_Description | varchar | 7000 |
| Project_Phase_Duration_Anticipated | varchar | 1000 |
| Project_Phase_Deliverables | varchar | 7000 |
| Record_Date | datetime | 8 |
| Record_ID | int | 4 |
| Identity_Key | int | 4 |

All of the questions and answers posted by the vendor and buyer on the bid message board and any questions submitted to the vendor from the buyer regarding the vendor bid response can also be stored in the system and associated with the particular vendor bid response. Sample question information is shown in Tables 51 and 52 below, which can be stored in the database in tables "tblRFXQuestionsFromVendor" 820 and "tblRFXQuestionsFromBuyer" 821, as shown in FIG. 29. A separate record for each vendor question/buyer response and buyer question/vendor response is stored in tables "tblRFXQuestionsFromVendor" 820 and "tblRFXQuestionsFromBuyer" 821, with each record containing the fields shown in Tables 51 and 52 below. In addition tables "tblRFXQuestionsFromVendor" 820 and "tblRFXQuestionsFromBuyer" 821 are tied to table "tblRFxRespMain" 806 to associate the questions with the particular vendor bid response.

TABLE 51 tblRFXQuestionsfromVendor (db structure view)

| Column Name | Data Type | Length |
|---|---|---|
| Vendor_ID | int | 4 |
| [Vendor_Question/Comment] | varchar | 8000 |
| Question_Post_Date | datetime | 8 |
| Buyer_Response | varchar | 8000 |
| Buyer_Answer_Post_Date | datetime | 8 |
| Record_ID | int | 4 |
| Resp_Record_ID | int | 4 |

TABLE 52 tblRFXQuestionsfromBuyer (db structure view)

| Column Name | Data Type | Length |
|---|---|---|
| Vendor_ID | Int | 4 |
| Identity_Key | int | 4 |
| [Buyer_Question/Comment] | varchar | 8000 |
| Buyer_Post_Date | datetime | 8 |
| Vendor_Response | varchar | 8000 |
| Vendor_Response_Date | datetime | 8 |
| Record_ID | int | 4 |
| Resp_Record_ID | int | 4 |

The vendor bid response can also be associated with details about previous project work that has been performed by the vendor to aid in bid response process. Sample previous project work details are shown in Table 53 below, which can be stored in the database in table "tblRFXRespTrackRecord" 824, as shown in FIG. 29. For example, such previous project work details can include the vendor bid response identifier, the project name, the name of the buyer, the value of the project, a description of the project, a discussion of deployed resources (contractors) for the project, a discussion of the performance of the vendor, the project start date and the project end date. It should be understood that additional previous project work details can be stored, and the system is not limited to the specific previous project work details shown in Table 53.

TABLE 53 tblRFXRespTrackRecord (db structure view)

| Column Name | Data Type | Length |
|---|---|---|
| Response_ID | Int | 4 |
| Project_Name | Varchar | 255 |
| Buyer_Name | Varchar | 255 |
| Project_Value | money | 8 |
| Project_Description | varchar | 7000 |
| Deployed_Resources | varchar | 7000 |
| Company_Performance | varchar | 7000 |
| Project_Start_Date | datetime | 8 |
| Project_End_Date | datetime | 8 |
| Record_ID | int | 4 |
| Record_Date | datetime | 8 |

Figure 30:
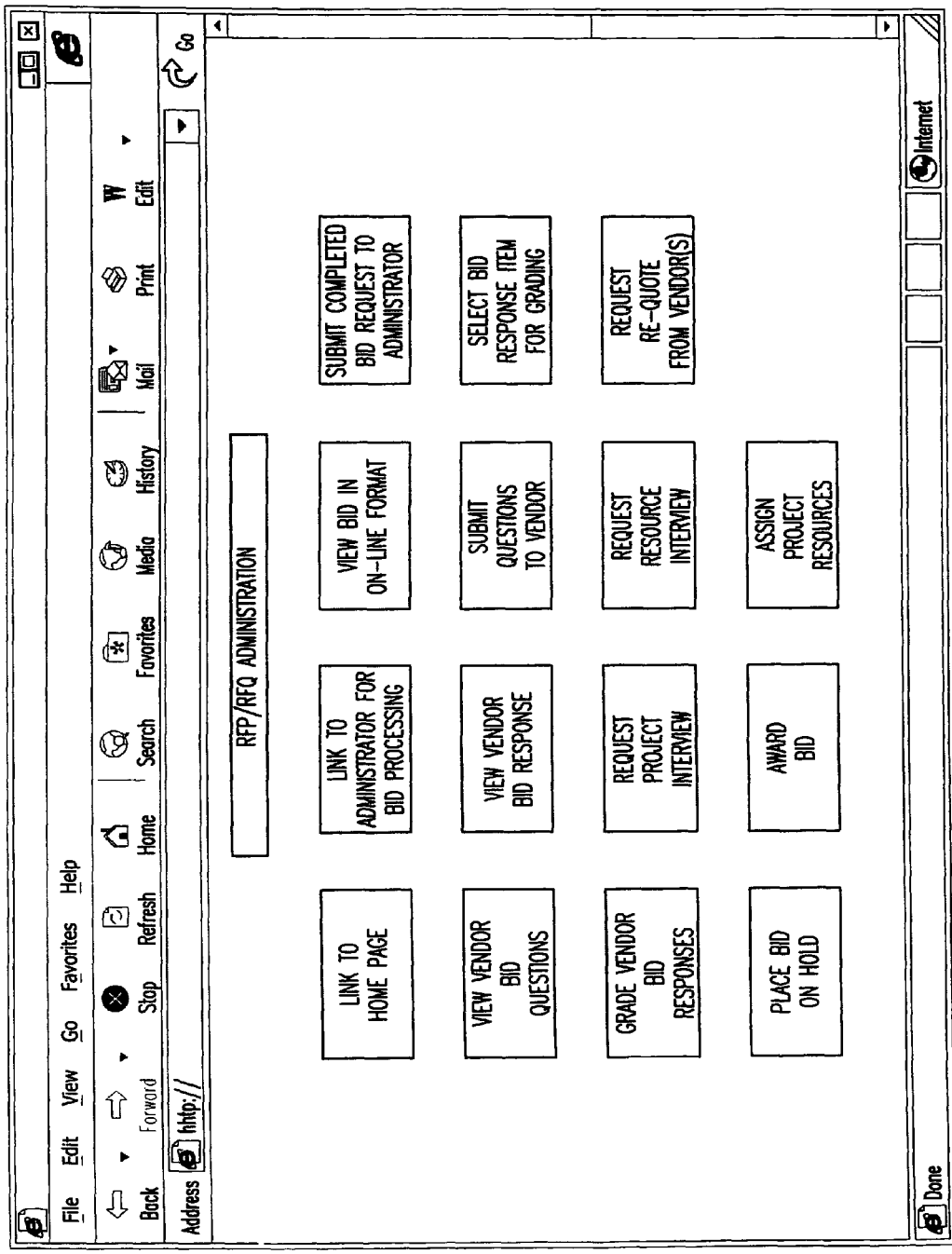
FIG. 30 is a screen shot illustrating the various bid processing features provided to a buyer.

Referring now to FIG. 30, a screen shot of a sample web page displaying options to the buyer for administration of the bid request and vendor bid responses is illustrated. From the bid request administration web page, the buyer user can submit a completed bid request to an administrator (or to qualified vendors), view vendor bid responses to a bid request, grade vendor bid responses, submit questions to the vendor about the vendor bid response, request a re-quote from a vendor, request project interviews with vendors or resource interviews with potential resources (contractors) for a project, award the bid (project) to a particular vendor, assign resources for a project or place a bid request on hold.

Once the buyer has received one or more vendor bid responses to a particular bid request, the buyer can grade or otherwise compare the vendor bid responses in order to determine which vendor will get awarded the project. With the use of pre-established bid items in the (bid request and bid responses, all vendor bid responses have the same format, enabling efficient and effective grading and comparison of vendor bid responses. Therefore, prior to begin grading of the vendor bid responses, the buyer can select one or more bid items for grading purposes.

Figure 31:
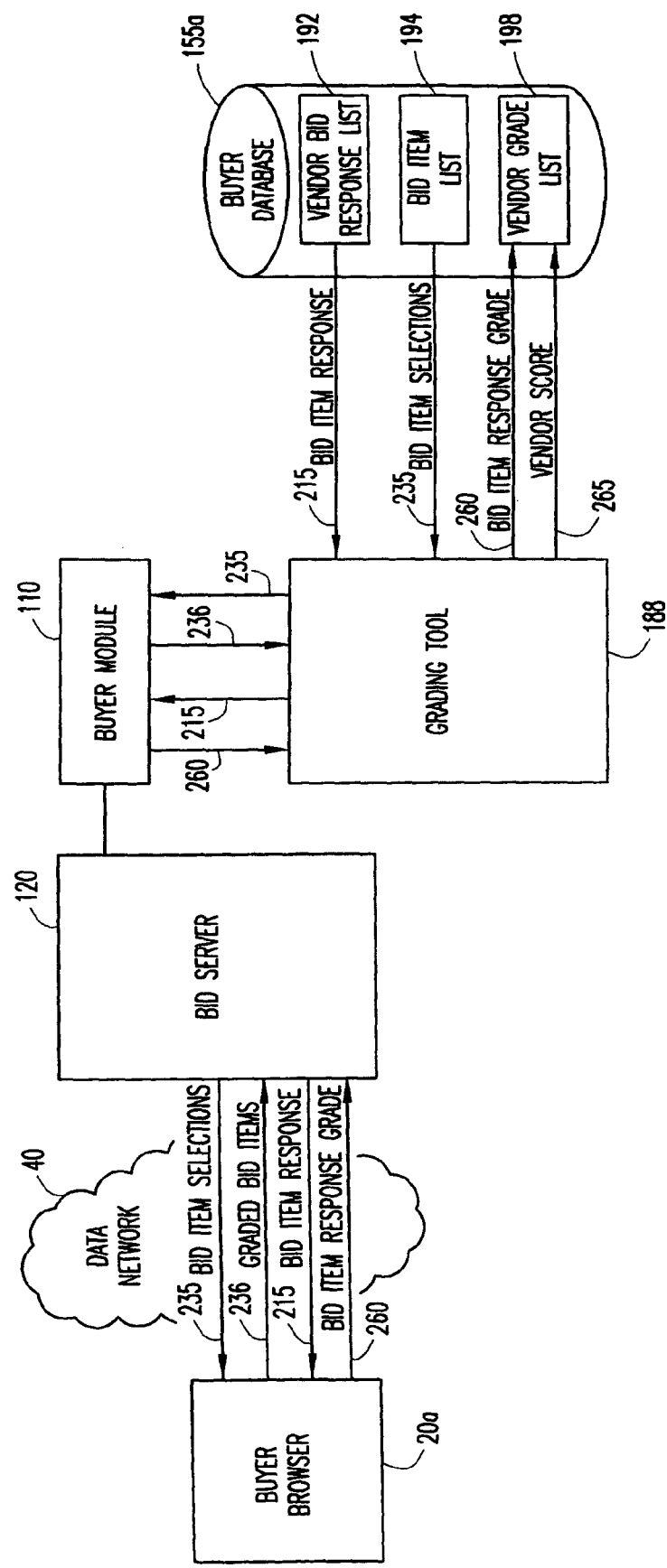
FIG. 31 is a data flow diagram illustrating the electronic facilitation of vendor bid response grading, in accordance with embodiments of the present invention.

Exemplary functionality for selecting graded bid items and grading vendor responses to the selected graded bid items is shown in FIG. 31. A grading tool 188 is illustrated in FIG. 31 for the selection of graded bid items and grading of vendor bid responses, in accordance with embodiments of the present invention. The grading tool 188 can include any hardware, software and/or firmware required to perform the functions of the tools and can be implemented within the web server 120 or an additional server (not shown).

At any time after the creation of the bid request, a grader (e.g. buyer user or project administrator user) responsible for grading vendor bid responses can access the grading tool 188 to select one or more bid item selections 235 from the bid request for grading purposes. The grading tool accesses the bid item list 194 stored in the database 155, retrieves the bid item selections 235 from the bid item list 194 that are included within the particular bid request identified by the grader and displays the bid item selections 235 to the grader via the buyer module 110, web server 120, data network 40 and buyer browser 20*a* to choose from. From the bid item selections 235, the grader can select one or more graded bid items 236 and provide a list of the graded bid items 236 to the grading tool 188.

Upon receipt of one or more vendor bid responses, the grading tool 188 can access a vendor bid response list 192 to retrieve the vendor response data 215 associated with one of the graded bid items 236 for one of the vendor bid responses in the list 192. The bid item response data 215 is displayed to the grader for grading purposes. Based on various factors (objective and subjective) regarding the quality and information included within the displayed bid item response data 215, the grader can assign a grade for that bid item response 215 and transmit a bid item response grade 260 to the grading tool 188.

The grading tool 188 further interfaces with the database 155 to store the bid item response grade 260 for the vendor in a vendor grades list 198 that contains the bid item response grades 260 for all graded bid items 236 for each of the vendor bid responses in the vendor bid response list 192. In addition, based on all of the bid item response grades 260 received by the grading tool 188 for all of the graded bid items 236 for a particular vendor bid response, the grading tool 188 can calculate an overall vendor score 265 for the particular vendor bid response and store the vendor score 265 in the vendor grades list 198.

Figures 32, 33:
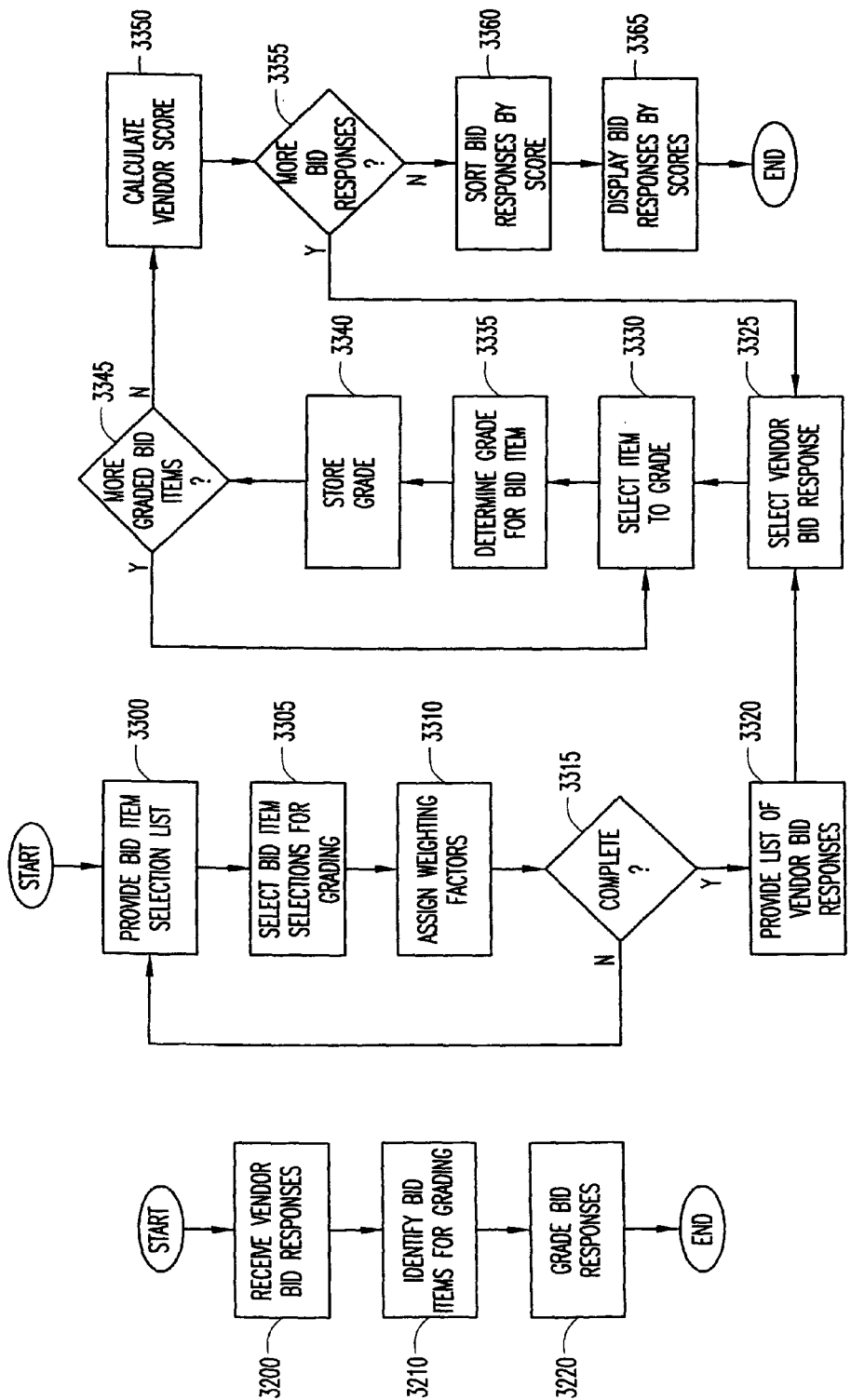
FIGS. 32 and 33 are flowcharts illustrating exemplary steps for grading vendor bid responses, in accordance with embodiments of the present invention.

Exemplary steps for selecting graded bid items and grading vendor bid responses using the graded bid items are shown in FIGS. 32 and 33. The main processing steps performed for bid response grading are shown in FIG. 32. Upon receipt of vendor bid responses (step 3200), the bid item selections to be used for grading purposes are identified (step 3210). The bid item selections are associated with the bid request soliciting the vendor bid responses, and vendor bid response data is included within the bid item selections chosen for grading purposes. Using the vendor bid response data within the graded bid items, the vendor bid responses are graded (step 3220).

A more detailed grading process is shown in FIG. 33. After a bid request is created, a buyer user is provided a list of bid item selections associated with the bid request (step 3330). From the list of bid item selections, one or more graded bid items are chosen (step 3305), and each graded bid item may be assigned a weighting factor (e.g., a weighting percentage) (step 3310) to weigh certain responses more heavily than other responses in the final score. It should be noted that in some embodiments, the weighting factors can be equal, thereby eliminating the requirement that the buyer user enter a specific weighting factor. The weighting factors for all the graded bid items must be complete before the vendor bid responses can be graded (step 3315).

Once all of the graded bid items have been chosen and assigned a weighting factor, the grader is provided a list of vendor bid responses (step 3320) and selects one of the vendor bid responses for grading purposes (step 3325). Thereafter, the grader selects one of the graded bid items (step 3330) to grade the vendor bid response data included within the graded bid item (step 3335). The grader can grade the vendor bid response data using any mechanism available to the grader. In one embodiment, the grader can pre-establish grading criteria for a particular graded bid item to enable the system to automatically grade the vendor response data. For example, to grade pricing information, the grader can pre-assign grades to specific pricing ranges, and the system can automatically provide a grade for a pricing graded bid item based on the price submitted in the vendor bid response. In other embodiments, the grader can compare all of the vendor bid response data for a particular graded bid item initially before assigning grades based on the relative differences between the vendor bid response data. In still further embodiments, the grader can pre-establish a checklist or thresholds for each grade to be assigned to a particular graded bid item.

The grade assigned to the vendor response data for the graded bid item is stored in the database (step 3340), and the process is repeated for each graded bid item until the vendor response data included within each graded bid item for a particular vendor bid response is graded (step 3345). Once all of the grades have been completed, the system calculates the vendor's total score based on the individual grades assigned to each graded bid item (step 3350). For example, if the possible grades are A, B, C and D, the vendor score can be calculated by assigning four points for an A, three points for a B, two points for a C and one point for a D.

Each vendor bid response is graded in the same manner (step 3355) to enable the vendor scores to be sorted into descending order (step 3360) for display to the buyer user (step 3365). In addition to the total score, the grader can also be provided with the individual grades for the graded bid items to determine if any re-quotes are necessary. By providing the grader with the total scores and individual grades, the grader can visually determine which vendor had the highest overall score and which vendors had the highest grades for particular graded bid items in order to make a decision as to which vendor to award the project. However, it should be understood that other bid response comparison techniques can be used with the system of the present invention, instead of the specific grading and scoring described herein.

Figure 34B:
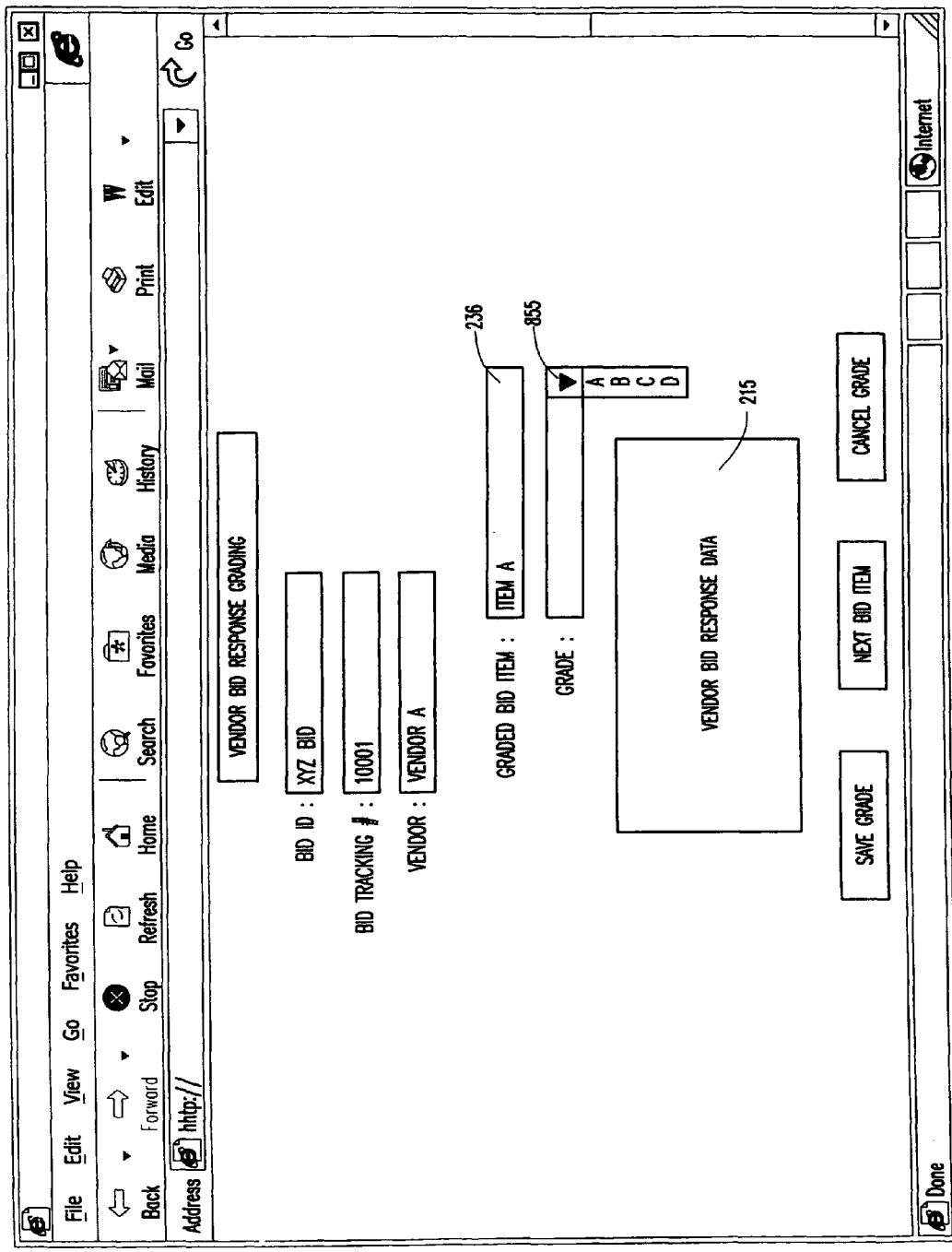

Screen shots of exemplary web pages 61 that can be displayed to the grader for selection of graded bid items and grading of vendor bid responses are shown in FIGS. 34A-34E. In FIG. 34A, the web page contains a list of bid item selections 235 for the grader to select from. For each of the selected graded bid items 236, the grader can also enter a weighting percentage 850 for that graded bid item 236. The grader can adjust the weighting percentages 850 based on pre-established criteria or personal preferences until the weighted percentage 850 total equals one-hundred percent. As discussed above, in other embodiments, all graded bid items 236 can be assigned equal weights, so that the weighting percentages 850 would not need to be displayed to or selected by the grader.

Figure 34C:
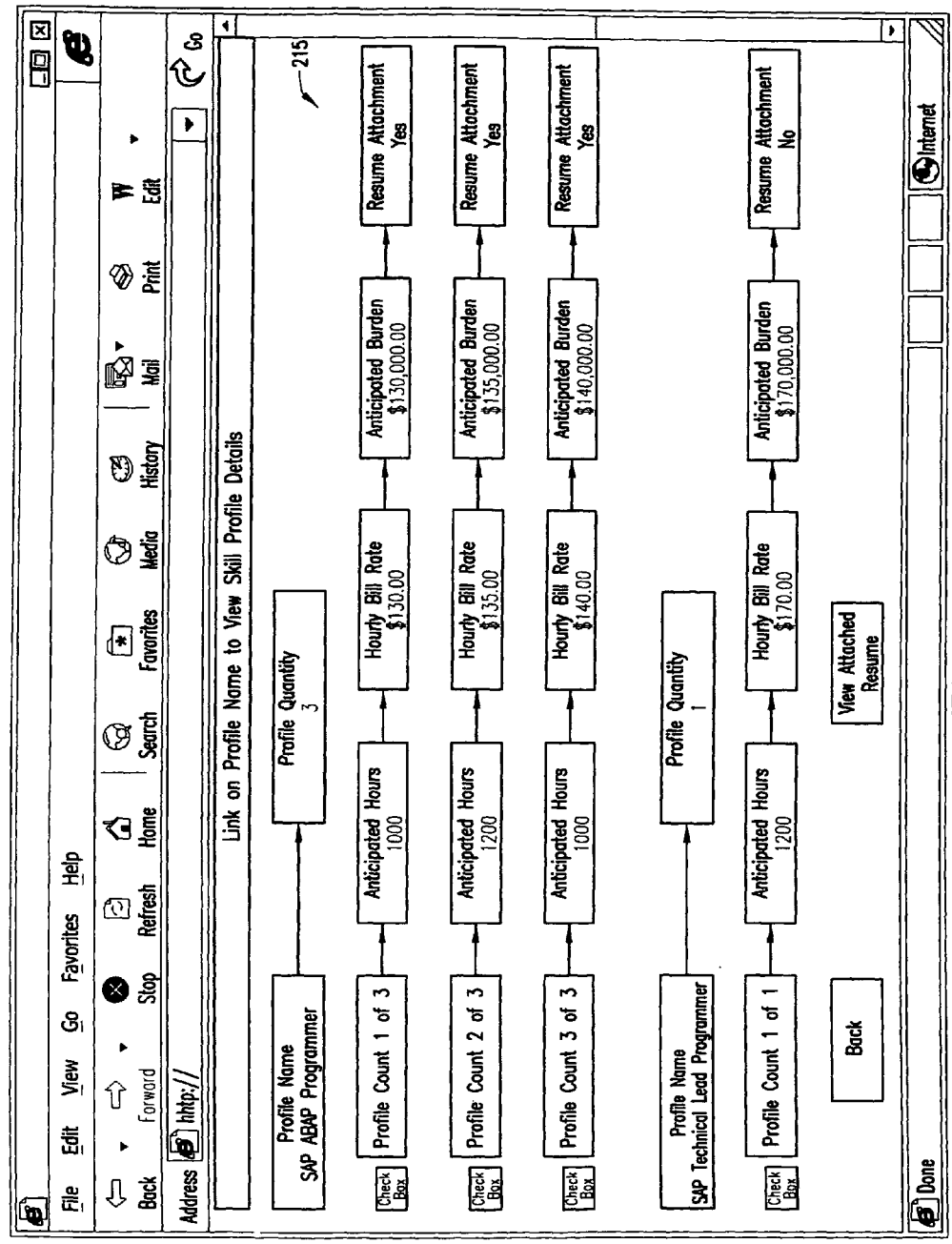

In order to grade vendor bid responses, as shown in FIG. 34B, the grader can be provided a web page listing the particular graded bid item 236 and either displaying the vendor bid response data 215 or providing a link to the vendor bid response data 215. For example, as shown in FIG. 34C, a link to the resource profile and associated resource pricing information can be provided into order to grade a particular graded bid item. Referring again to FIG. 34B, the grader can further be provided a prompt to enter the grade 855 for the vendor bid response data 215 associated with the graded bid item 236. In other embodiments, the grades 855 may be automatically assigned by the system, based on pre-established grading criteria.

Figure 34D:
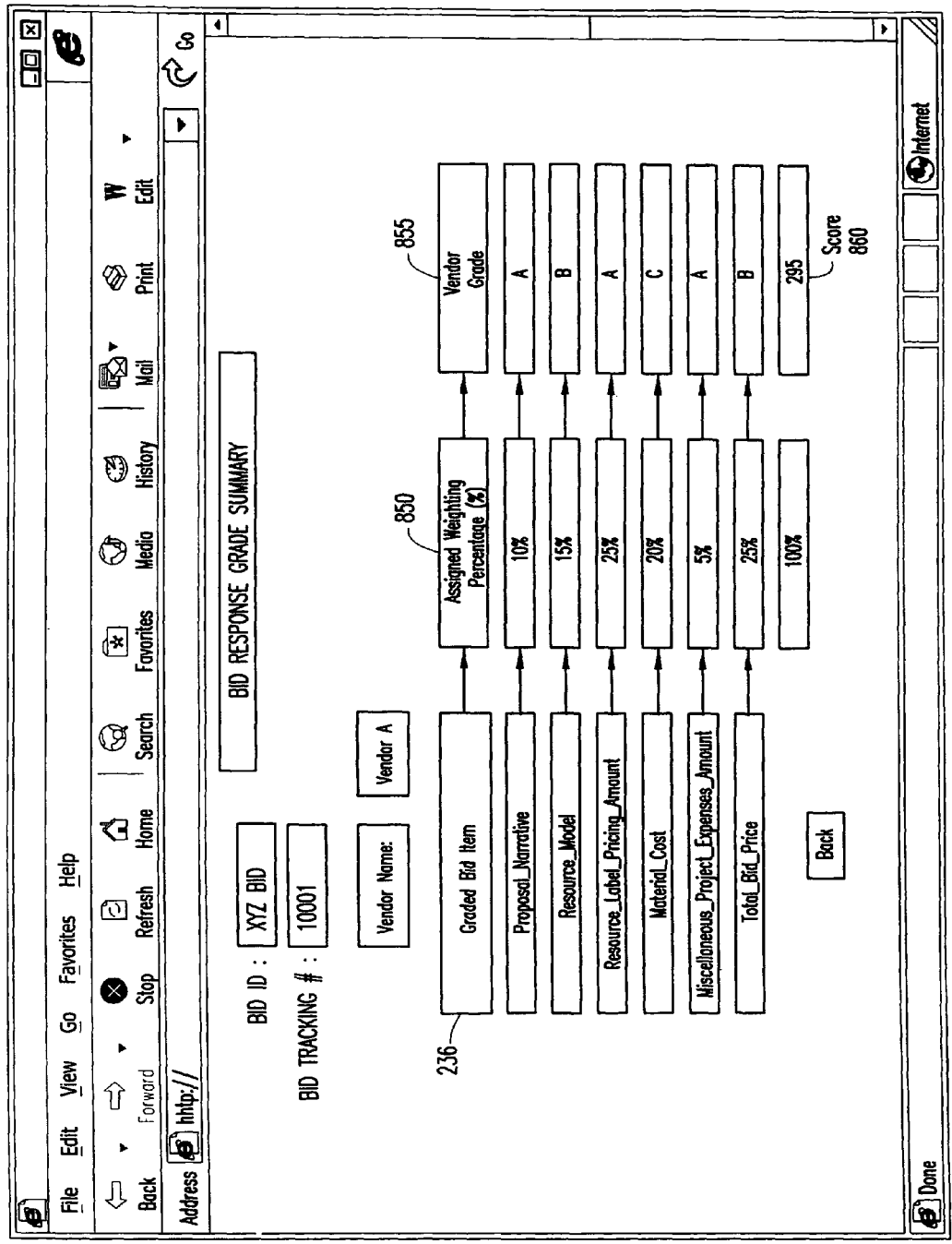
Figure 34E:
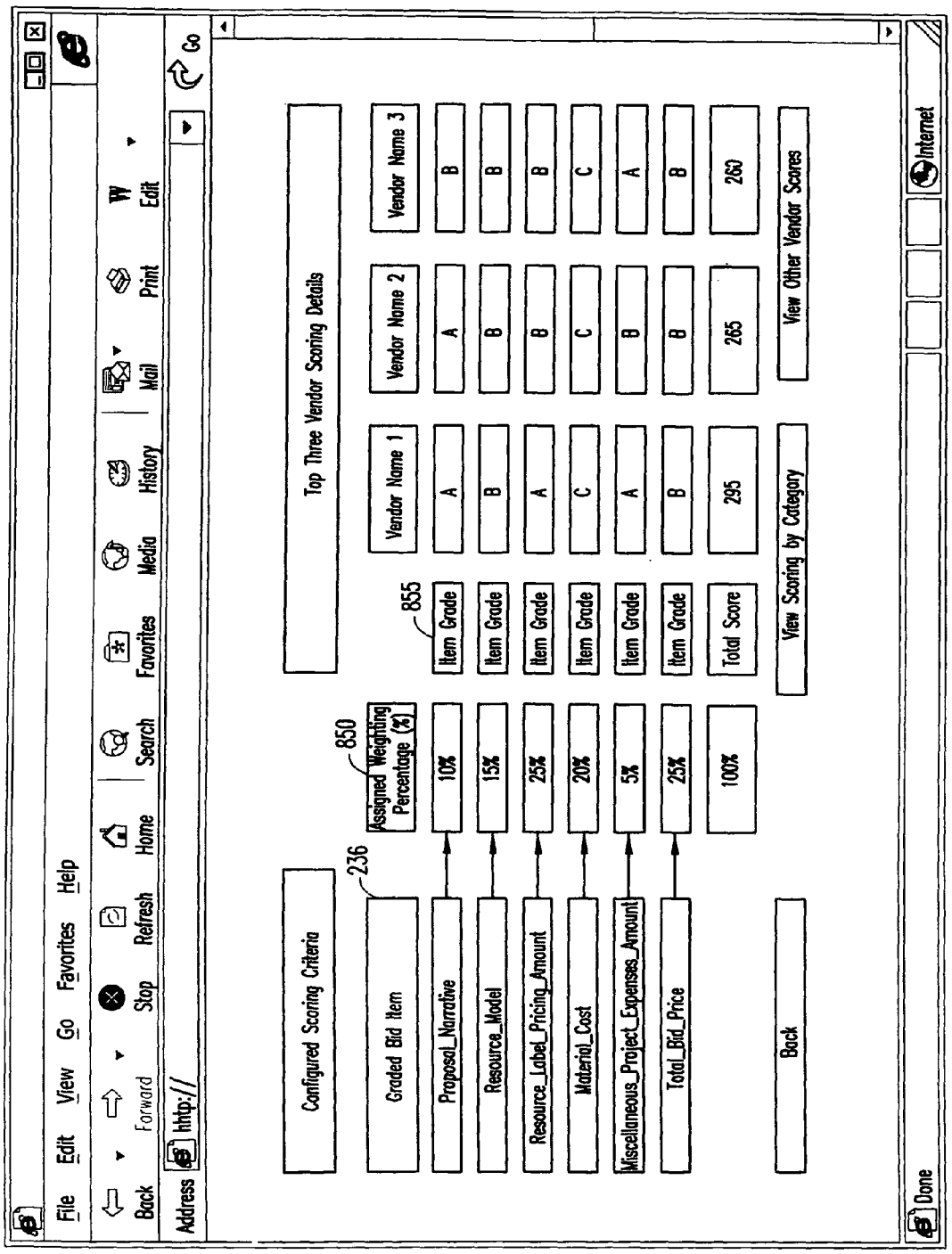

Once a vendor bid response has been graded, as shown in FIG. 34D, the grader can be provided a web page displaying all of the graded bid items 236, the weighting percentages 850 assigned to the graded bid items 236 and the vendor grade 855 assigned to each of the graded bid items 236 by the grader. In addition, the total vendor score 860 can also be displayed to enable the grader to determine the total quality of the vendor bid response. Referring now to FIG. 34E, vendor bid responses can be compared side-by-side based on the total vendor score 860 and individual grades 855 assigned to each of the graded bid items 236.

Examples of the data structures used for selecting the graded bid items and storing the vendor grades are shown in Tables 54-56 hereinbelow. The data structures are illustrated for simplicity as being organized in a table format, with each table including all of the fields necessary for displaying bid item selections to the buyer user to select from and storing grades and scores for vendor bid responses. The tables are related in a hierarchical and relational manner, as will be discussed in connection with FIG. 35.

Sample bid item selections that could be included in a bid request and associated vendor bid response are shown in Table 54 below. However, it should be understood that other information can be included, and the system is not limited to the specific information shown in Table 54. For each bid item selection, there is an indication of whether or not that bid item selection is gradable. For example, not all of the bid item selections may include vendor response data to grade. Therefore, only the gradable bid item selections are displayed to the buyer user to select from.

TABLE 54

Exemplary Vendor Listing of Potential Graded Bid Items (By Category)

| RFX_Category | RFX_Item | Default_Gradable_Item | AV_Response_Data_Type |
|---|---|---|---|
| Supplier_General_Information | Agree_To_Confidentiality_Terms | | Char |
| Supplier_General_Information | Intent_To_Respond | | Char |
| Supplier_General_Information | Company_History | | LongText |
| Supplier_General_Information | Competitive_Analysis | | LongText |
| Supplier_General_Information | Product/Services_Heritage_Review | | LongText |
| Supplier_General_Information | Product/Services_Strategy | | LongText |
| Supplier_General_Information | Technology_Vision | | LongText |
| Supplier_General_Information | Strategic_Technology_Partners | | AV Hyperlink to Sub-Table ASP |
| Supplier_General_Information | Track_Record | | AV Hyperlink to Sub-Table ASP |
| Supplier_General_Information | Project_Management_Philosophy | | LongText |
| Supplier_General_Information | PMI_Certified_FTEs | | LongText |
| Supplier_General_Information | Customer_References | | AV Hyperlink to Sub-Table ASP |
| Supplier_Project_Information | Proposal_Narrative | Y | LongText |
| Supplier_Project_Information | Project_Planning/Strategy | Y | LongText |
| Supplier_Project_Information | Statement_Of_Work_Acceptance | | Char |
| Supplier_Project_Information | Statement_Of_Work_Proposed_Changes | | LongText |
| Supplier_Project_Information | Project_Phasing | Y | AV Hyperlink to Sub-Table ASP |
| Supplier_Project_Information | Project_Phasing_Acceptance | | Char |
| Supplier_Project_Information | Resource_Model | Y | AV Hyperlink to Sub-Table ASP |
| Supplier_Project_Information | Knowledge_Transfer_Plan | Y | LongText |
| Supplier_Project_Information | Deployment_Plan | Y | LongText |
| Supplier_Project_Information | Customer_Acceptance_Model | Y | LongText |
| Supplier_Project_Information | Customer_Acceptance_Model_Agreement | | Char |
| Supplier_Project_Information | Customer_Acceptance_Model_Proposed_Changes | | LongText |
| Supplier_Project_Information | Non-Deliverable_Penalties_Acceptance | | Char |
| Supplier_Project_Information | Non-Deliverable_Penalties_Proposed_Changes | | LongText |
| Supplier_Project_Pricing | Resource_Labor_Pricing | | AV Hyperlink to Sub-Table ASP |
| Supplier_Project_Pricing | Resource_Labor_Pricing_Amount | Y | Currency |
| Supplier_Project_Pricing | Equipment/Tooling_Pricing_Comments | | LongText |
| Supplier_Project_Pricing | Materials_List | | AV Hyperlink to Sub-Table ASP |
| Supplier_Project_Pricing | Materials_Cost | Y | Currency |
| Supplier_Project_Pricing | Equipment/Tooling_Pricing_Comments | | Currency |
| Supplier_Project_Pricing | Physical_Site_Pricing_Comments | | LongText |
| Supplier_Project_Pricing | Physical_Site_Pricing_Amount | Y | Currency |
| Supplier_Project_Pricing | Project_Management_Premium_Comments | | LongText |
| Supplier_Project_Pricing | Project_Management_Premium_Amount | Y | Currency |
| Supplier_Project_Pricing | Intellectual_Property_Premium_Comments | | LongText |
| Supplier_Project_Pricing | Intellectual_Property_Premium_Amount | Y | Currency |
| Supplier_Project_Pricing | Miscellaneous_Project_Expenses_Comments | | LongText |
| Supplier_Project_Pricing | Miscellaneous_Project_Expenses_Amount | Y | Currency |
| Supplier_Project_Pricing | Anticipated_Margin | Y | Currency |
| Supplier_Project_Pricing | Total_Bid_Price | Y | Currency |
| Supplier_Resource_Expenses_Handling | Resource_Travel_Expense_Comments | | LongText |

TABLE 54-continued

Exemplary Vendor Listing of Potential Graded Bid Items (By Category)

| RFX_Category | RFX_Item | Default_Gradable_Item | AV_Response_Data_Type |
|---|---|---|---|
| Supplier_Resource_Expenses_Handling | Resource_Living_Expense_Comments | | LongText |
| Supplier_Resource_Expenses_Handling | Resource_Per_Diem_Comments | | LongText |
| Supplier_Resource_Expenses_Handling | Resource_Mileage_Expense_Comments | | LongText |
| Supplier_Resource_Expenses_Handling | Reimbersable_Miscellaneous_Expense_Comments | | LongText |
| Capital_Risk_Model | Capital_Risk_Model_Comments | | LongText |
| Capital_Risk_Model | Capital_Risk_Model_Amount | Y | Currency |
| Supplier_Rebate_Model_for_Non-deployed_Investment | Rebate_Model_for_non-deployed_investment | Y | LongText |
| Supplier_Payment_Release_Schedule | Supplier_Payment_Release_Schedule | | LongText |

Figure 35:
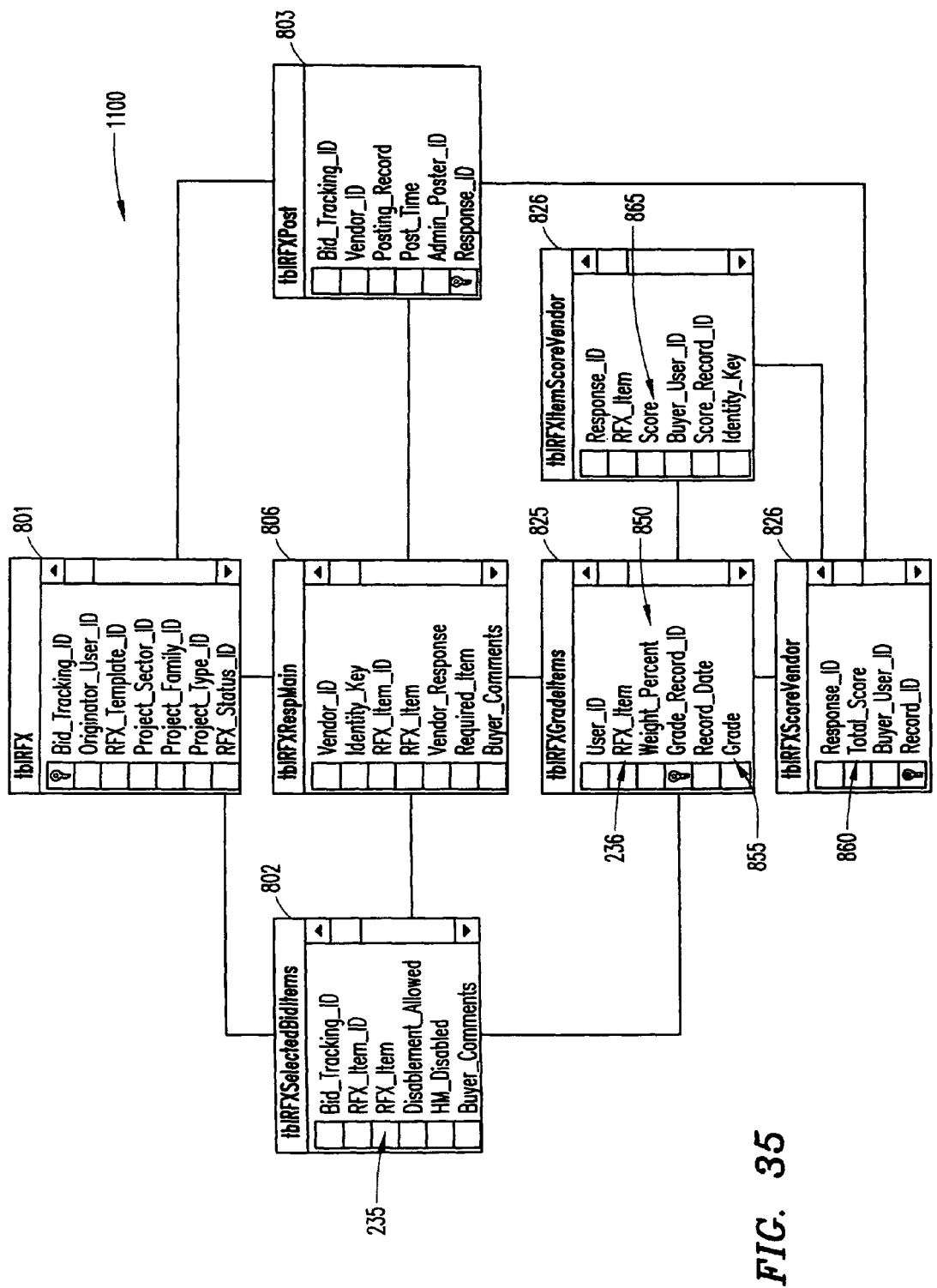
FIG. 35 is a database table views illustrating the interrelation between the bid request, vendor bid responses and grading of vendor bid responses, in accordance with embodiments of the present invention.

A separate grade is stored for each of the graded bid items, as shown in Table 55 below, which can be stored in the database table structure 1100 in table "tblRFXGradeItems" 825, as shown in FIG. 35. Along with the assigned grade 855 for a particular graded bid item 236, table "tblRFXGradeItems" 825 may also include the identity of the buyer user grader, the weighting percentage 850 assigned to the graded bid item 236 and the vendor bid response identifier associated with the grade 855. However, it should be understood that other information can be included, and the system is not limited to the specific information shown in Table 55. Each vendor grade 855 for each vendor is stored in a separate record in the table "tblRFXGradeItems" 825, with each record containing the fields shown below in Table 55. In addition, table "tblRFXGradeItems" 825 is tied to the table "tblRFXRespMain" 806, which is tied to table "tblRFX" 801, both of which are described above in connection with FIG. 29, in order to associate the vendor grade 855 to the vendor bid response and bid request. In addition, the table "tblRFXGradeItems" 825 is tied to the table "tblRFXSelectedBidItems" 802 to associate the vendor grade 855 to the particular bid item selection 235.

TABLE 55

Graded Bid Items Table (tblRFXGradeItems)

| Column Name | Data Type | Length |
|---|---|---|
| User_ID | Int | 4 |
| RFX_Item | Varchar | 50 |
| Weight_Percent | percent | 4 |
| Grade_Record_ID | int | 4 |
| Record_Date | datetime | 8 |
| Grade | char | 1 |
| Response_ID | int | 4 |

The calculated scores 865 for each of the vendor grades 855 for each bid item 235 can be stored as shown below in Table 56, which can be stored in the database in table "RFXItemScoreVendor" 826, as shown in FIG. 35. A separate record for each graded bid item for each vendor bid response is stored in table "tblRFXItemScoreVendor" 826, with each record containing the fields shown in Table 56. In addition, the total score 860 based on all of the vendor scores 865 stored in the table "tblRFXItemScoreVendor" 826 can also be stored as shown in Table 57 below, which can be stored in the database in table "tblRFXScoreVendor" 827, as shown in FIG. 35. A separate record for each vendor bid response is stored in table "tblRFXScoreVendor" 827, with each record containing the fields shown in Table 57.

The table "tblRFXItemScoreVendor" 826 is tied to the table "tblRFXGradeItems" 825 to associate each score 865 with the pertinent grade 855 for all of the graded bid items 236 for a particular vendor bid response. In addition, the table "tblRFXScoreVendor" 827 is tied to the table "tblRFXItemScoreVendor" 826 to associate all of the scores 865 for all of the graded bid items 236 for a particular vendor bid response with the total score 860 for that particular vendor bid response. Furthermore, table "tblRFXScoreVendor" 827 is tied to table "tblRFXPost" 803, which is described above in connection with FIG. 29, to update the table "tblRFXPost" with the vendor score 860.

TABLE 56

Vendor Item Scoring Table (tblRFXItemScoreVendor)

| Column Name | Data Type | Length |
|---|---|---|
| Response_ID | Int | 4 |
| RFX_Item | Int | 4 |
| Score | Numeric | 4 |
| Buyer_User_ID | Int | 4 |
| Score_Record_ID | Int | 4 |
| Identity_Key | Int | 4 |

TABLE 57

Vendor Scoring Table (tblRFXScoreVendor)

| Column Name | Data Type | Length |
|---|---|---|
| Response_ID | int | 4 |
| Total_Score | numeric | 9 |
| Buyer_User_ID | int | 4 |
| Score_Record_ID | int | 4 |
| Identity_Key | int | 4 |

After a vendor bid response is received and graded, the buyer user may provide the opportunity for a vendor to submit a re-quote on one or more graded bid items to improve the vendor's score. For example, a vendor that the buyer user typically chooses or that has high grades on other graded bid items may have a lower score than another vendor, and the buyer user may want to provide the vendor the opportunity to revise the vendor bid response data for the one or more graded bid items that have low grades.

Figure 36:
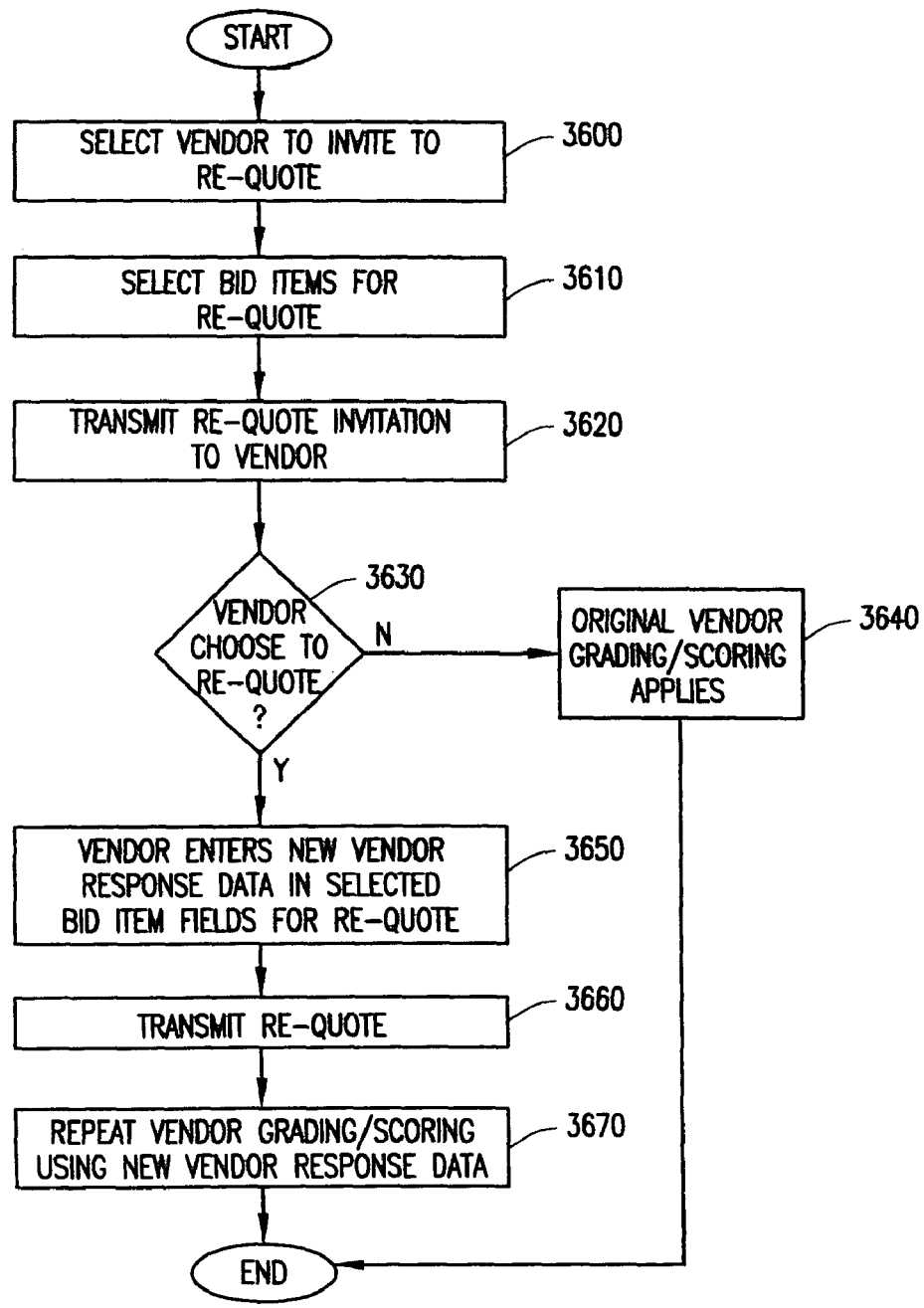
FIG. 36 is a flowchart illustrating a vendor re-quotation process based upon the vendor bid response grading, in accordance with embodiments of the present invention.

Exemplary steps for facilitating the re-quote process are shown in FIG. 36. When the grader becomes aware of one or more low grades for a particular vendor on one or more graded bid items, the grader can invite the vendor to re-quote on one or more selected graded bid items (steps 3600 and 3610). The invitation to re-quote (step 3620) may identify only the particular graded bid items that the vendor is allowed to re-quote on to prevent the vendor from re-quoting on any other graded bid items that the grader does not want to re-grade. For example, the re-quote can include a copy of the original vendor bid response and enable only those re-quoted bid items to be selected by the vendor user to input new vendor response data. The old vendor response data can be deleted or stored along with the new response data in the database for reference purposes. In addition, the re-quote invitation can indicate the vendor grade for each re-quoted bid item, along with the vendor ranking for each re-quoted bid item, and other similar information, such as the high and low vendor grades for the re-quoted bid item.

If the vendor chooses to not re-quote within a buyer-constrained time frame (step 3630), the original vendor grading and scoring applies to the vendor bid response (step 3640). However, if the vendor does re-quote on one or more of the re-quoted bid items (step 3630), the vendor user can enter new vendor response data into bid item fields for the selected re-quoted bid items (step 3650). Upon receipt of the re-quote (step 3660), the grader grades the re-quoted bid items using the new vendor response data and modifies the vendor score accordingly (step 3670).

Figure 37:
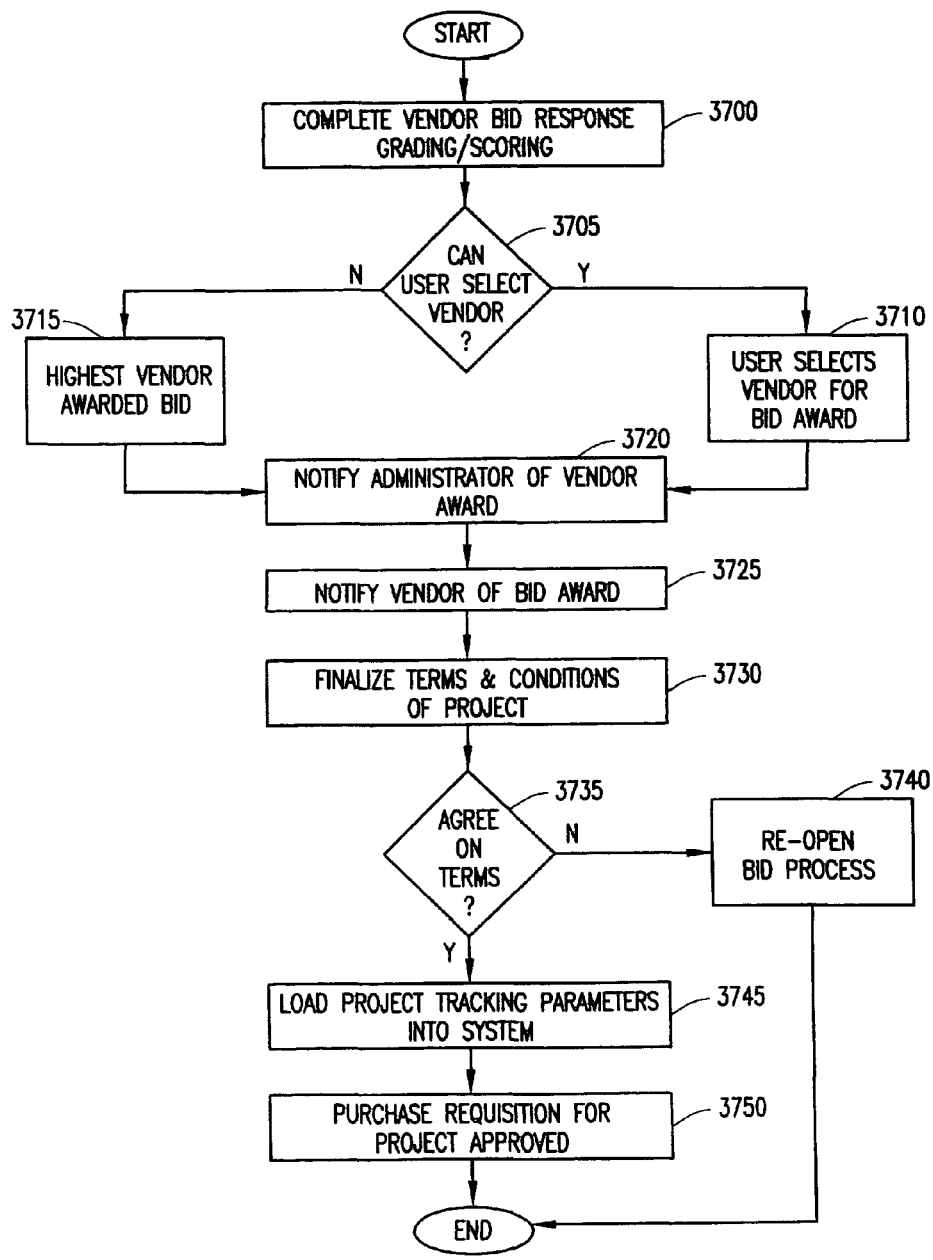
FIG. 37 is a flowchart illustrating exemplary steps in a project administration setup process, in which the project is awarded to a vendor and the terms and conditions of the project are finalized and entered into the computer system to track milestones and deliverables, in accordance with embodiments of the present invention.

Exemplary steps for awarding the bid and entering project tracking parameters are shown in FIG. 37. Once all of the vendor bid response grading and scoring is completed (step 3700), the bid can be awarded to one of the vendors. If the buyer user has the authority to select the vendor based on vendor score and other factors (e.g., personal preferences, knowledge of vendor reputation, knowledge of vendor availability, etc.) (step 3705), the buyer user can select the vendor for the project (step 3710). Otherwise, the vendor with the highest score is awarded the bid (step 3715).

Once the vendor for the project has been selected, the system notifies both the project administrator (step 3720) and the awarded vendor of the bid award (step 3725). Thereafter, the awarded vendor and buyer enter into negotiations to finalize the terms and conditions of the project, as conventionally done (step 3730). If the awarded vendor and buyer cannot agree on the terms and conditions of the project (step 3735), the buyer can re-open the bid process to select a new vendor based on existing vendor scores, based on new vendor bid responses or both (step 3740). However, if the terms and conditions are agreed to (step 3735), the buyer and awarded vendor can load various project tracking parameters into the system (step 3745), such as the project start date, project end date, anticipated project expenditure (requisition amount), assigned resources, project phasing schedule, project payment release schedule, project deliverables, project materials and project expenses to create a purchase requisition for the project. It should be understood that additional project tracking parameters can be loaded into the system to track the performance of the project, and the system is not limited to the project tracking parameters described herein. Once the purchase requisition for the project is approved by the appropriate approval users for the project administrator and the vendor (step 3750), the project can begin.

Figure 40:
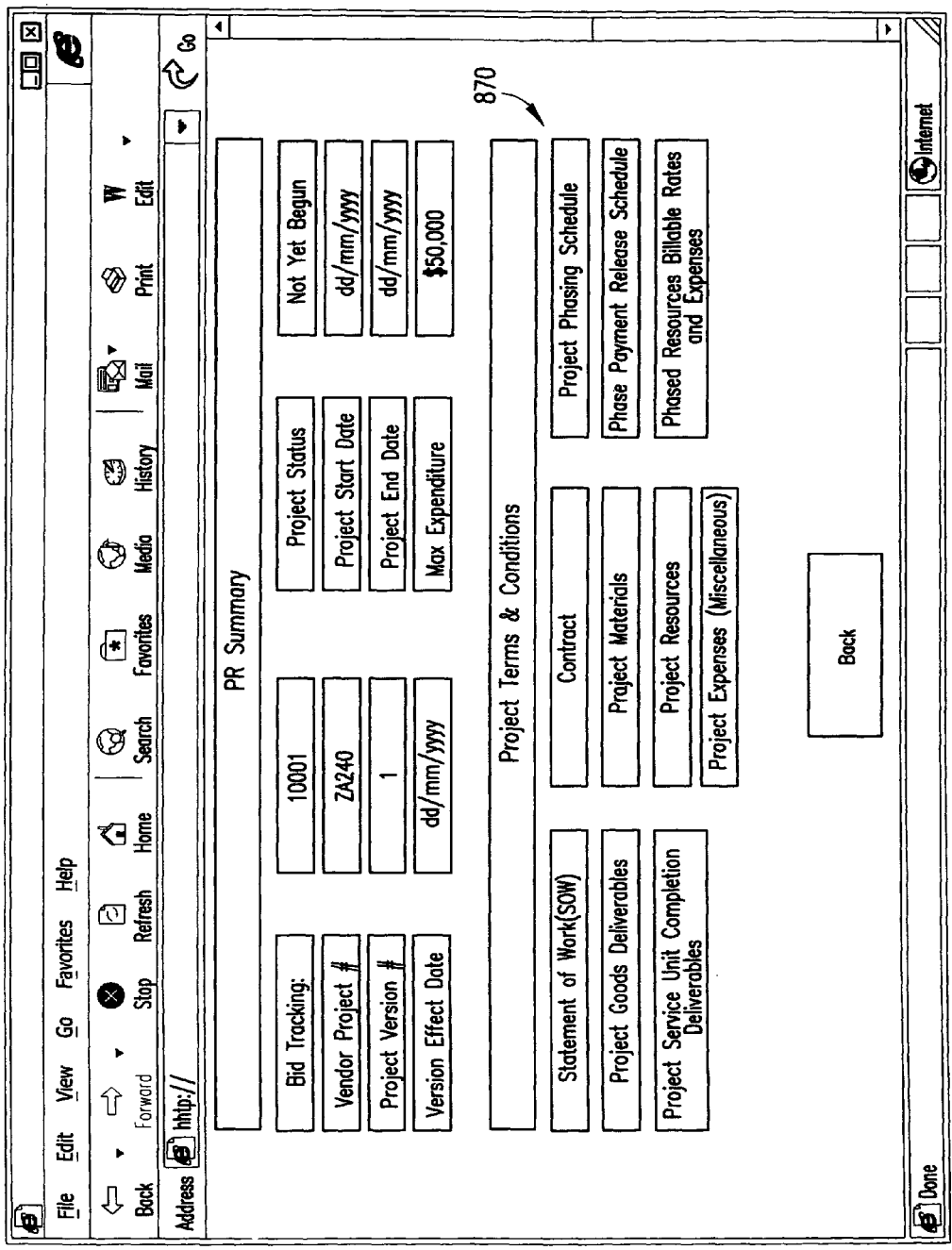
FIG. 40 is a screen shot illustrating exemplary vendor project administration features.

Screen shots of exemplary web pages 61 for the project administrator and vendor to load project tracking parameters 870 into the system are shown in FIGS. 39 and 40. For the project administrator, as shown in FIG. 39, various requisition information can be entered into the system, such as the purchase requisition create date, purchase requisition status (which can be updated automatically by the system), the purchase requisition amount, purchase requisition currency (e.g., U.S. dollars), project start date and project end date. In addition, the project administrator can also enter into the system various project terms and conditions, such as the statement of work, project goods and services deliverables, project contract, project materials, assigned project resources and billable rates, project expenses, project phasing schedule and project payment release schedule. Furthermore, the project administrator can assign administrative users to various administrative user roles that have not already been assigned for the project. Moreover, other financial project tracking parameters applicable to the project can also be entered into the system, such as account assignments, ledger codes, cost center codes, project codes, tax codes and accounting plants.

As shown in FIG. 40, the vendor can access the buyer-entered data to modify previously entered project tracking parameters 870 in the system and/or enter new project tracking parameters 870 into the system as the project administrator. For example, the vendor can enter one or more of the project terms and conditions discussed above. The parties can agree on who is going to enter the project tracking parameters 870, or both parties can enter and/or modify the project tracking parameters 870, and the system can provide notification to both parties if any changes are made. It should be understood that other project tracking parameters can be inserted into the system, and the system is not limited to those project tacking parameters shown in FIGS. 39 and 40.

During the final negotiation, the buyer may request the vendor to submit resumes of resource candidates (actual contractors) for the buyer to approve to ensure that the resource profile positions included in the vendor bid response are filled by actual candidates having the resource profiles. Exemplary data structures for the submission of resource candidates and the review of resource candidates are shown in Tables 58 and 59 below.

Table 58 below illustrates sample resource candidate information that can be submitted for each resource candidate selected by the vendor for a resource profile position in the project. For example, the resource candidate information can include the bid tracking number of the particular bid (bid request and bid response) associated with the resource candidate, the identity of the resource profile for the resource candidate, personal resource candidate information, vendor information, the resume of the resource candidate and the status of the resource candidate submittal. Table 59 illustrates various resource submittal status information that can be included in Table 58. However, it should be understood that other information can be included, and the system is not limited to the specific information shown in Table 58.

TABLE 58

Exemplary Resource Submittal Table (db structure view)

| Column Name | Data Type | Length |
| --- | --- | --- |
| Submittal_ID | int | 4 |
| Bid_Tracking_ID | int | 4 |
| RFX_Resource_Profile_ID | int | 4 |
| Profile_ID | int | 4 |
| Candidate_ID | int | 4 |

TABLE 58-continued

Exemplary Resource Submittal Table (db structure view)

| Column Name | Data Type | Length |
|---|---|---|
| First_Name | varchar | 50 |
| Last_Name | varchar | 50 |
| Middle_Name | varchar | 50 |
| Name_Suffix | varchar | 10 |
| Citizenship_Country1 | int | 4 |
| Citizenship_Country2 | int | 4 |
| Authorized_in_Work_Country | char | 1 |
| Authorization_Description | varchar | 500 |
| Resume_Attachment | char | 1 |
| Vendor_ID | int | 4 |
| Vendor_Contact_Name | varchar | 100 |
| Vendor_Contact_Phone | varchar | 50 |
| Vendor_Contact_Email | varchar | 100 |
| Record_Date | datetime | 8 |
| Submittal_Status_ID | int | 4 |

TABLE 59

Exemplary Resource Submittal Status Table (data view)

| Submittal_Status_ID | Submittal_Status | Display_Value |
|---|---|---|
| 1 | New | Being_Reviewed_by_Admin |
| 2 | On_Hold_by_Admin | Admin_Temporary_Hold |
| 3 | Declined_by_Admin | Candidate_Declined_by_Admin |
| 4 | Submitted_to_Buyer | Forwarded_for_Buyer_Review |
| 5 | Declined_by_Buyer | Candidate_Declined_by_Buyer |
| 6 | Interview_Requested | Interview_Requested |
| 7 | Interview_Scheduled | Interview_Scheduled |
| 8 | Interview_Conducted | Interview_Conducted |
| 9 | Offer_Tendered | Buyer_Offer_Tendered |
| 10 | Offer_Accepted | Vendor_Offer_Accepted |
| 11 | Candidate_Engaged | Candidate_Assigned_To_Order |
| 12 | On_Hold_by_Buyer | Buyer_Temporary_Hold |
| 13 | Withdrawn | No_Longer_Available |

Figure 38:
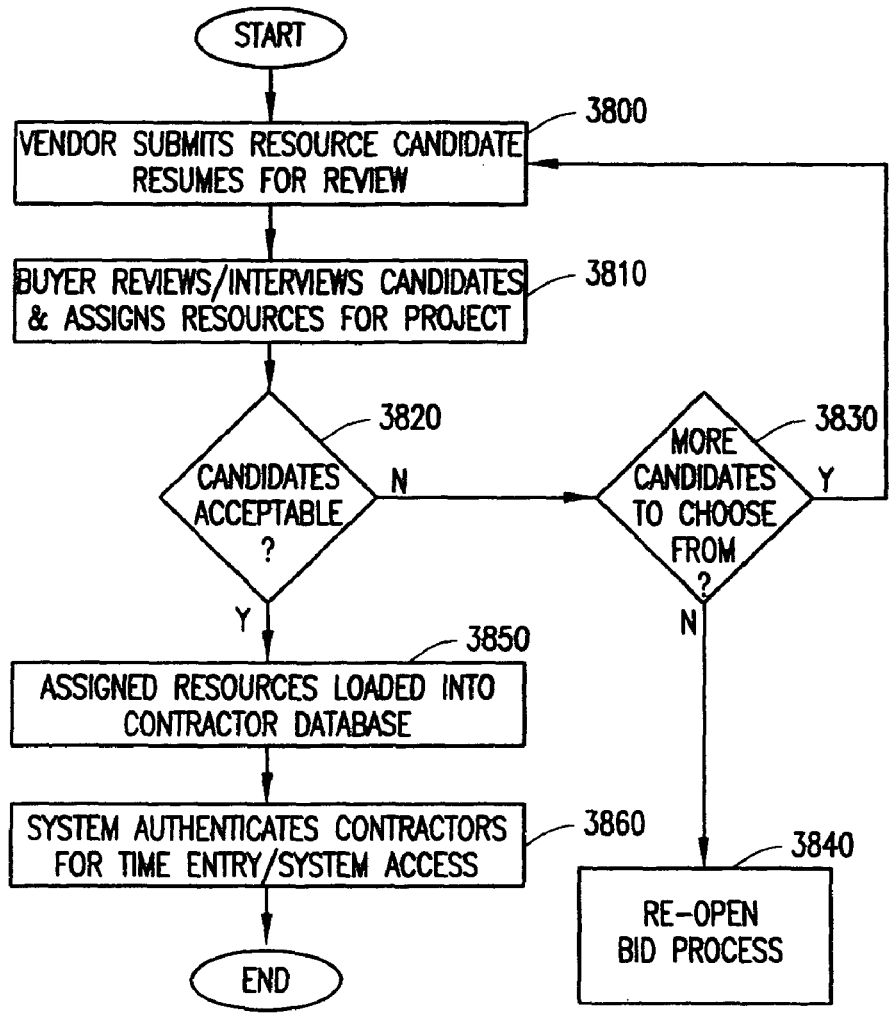
FIG. 38 is a flowchart illustrating exemplary steps for approval of assigned resources to a project, in accordance with embodiments of the present invention.

Exemplary steps for approving resource candidates are shown in FIG. 38. For each resource profile included in the vendor bid response, the vendor submits a resume of a potential resource candidate for the resource profile position (step 3800). The buyer reviews all of the resumes and assigns qualified resource candidates to the resource profile positions (step 3810).

If one or more of the resource candidates is not acceptable (e.g., the resume does not indicate that the resource candidate has the requisite skills for the resource profile) (step 3820), and there are no other acceptable candidates for the resource profile position (step 3830), the buyer can re-open the bid process to secure another vendor for the project that can provide the necessary resources (step 3840). However, if all resource profile positions can be filled by qualified resource candidates, the buyer and/or vendor enters resource information associated with each of the assigned resource candidates (contractors) into the contractor database (step 3850). For example, personal information concerning the contractor, such as the contractor name, address, telephone numbers and employee number, can be entered into the contractor database. In addition, specific project-related contractor information, such as the total number of authorized billable hours, billable rate, the total amount and type of expenses authorized and any agreements or documents that the contractor needs to execute or provide prior to beginning work, can be entered into the contractor database.

Once the contractor information is entered, the system can authenticate the contractor for time keeping and system access purposes (step 3860). For example, the system can provide a user name and password to the contractor for system log-in and authentication purposes. In addition, the system can require the contractor to execute one or more agreements (e.g., by acknowledging the terms of the agreements on-line) and/or provide one or more documents before being allowed access to the time keeping system.

Figure 42:
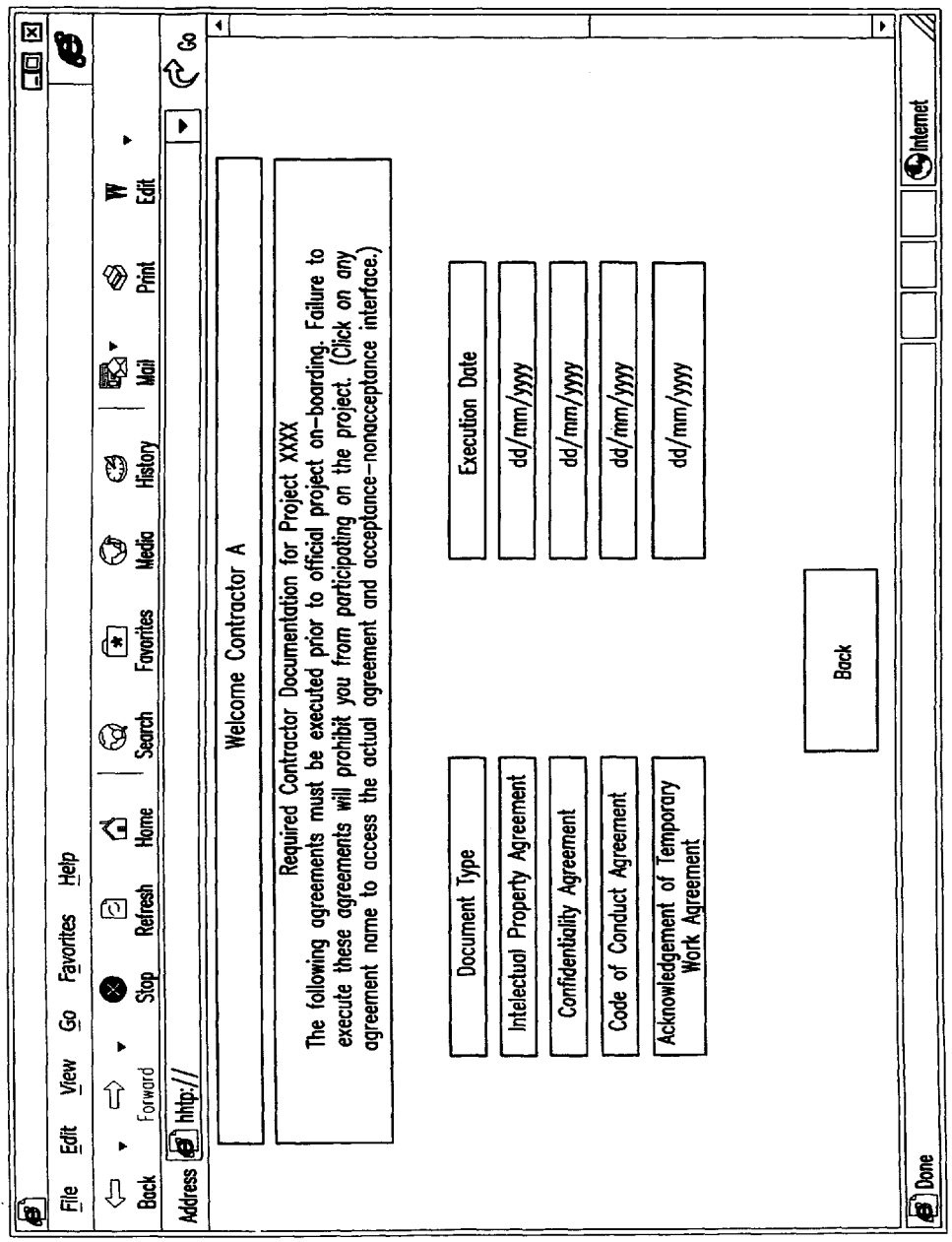
FIG. 42 is a screen shot illustrating the types of liability issues that can be managed by the computer system of the present invention.

A screen shot of an exemplary web page 61 displayed to a contractor upon initial log-in and authentication is shown in FIG. 42. The web page lists several documents that must be executed before the contractor can begin working on the project. For example, the contractor may need to sign an Intellectual Property agreement, a Confidentiality agreement, a Code-of-Conduct agreement and an Acknowledgement of Temporary Work agreement. By clicking on each of the listed documents, a web page showing the agreement can be displayed to the contractor and the contractor can click on an acceptance button to execute the agreement.

Exemplary database structures for storing contractor information and ensuring that relevant documents are obtained from the contractor or agreed to by the contractor are shown in Tables 60-63 below. Table 60 lists various sample documents that either need to be obtained from the contractor or that the contractor needs to execute at some point during the project. Table 60 also lists the time constraints for obtaining or executing such documents. Table 61 lists the contractor information, such as the identity of the contractor, the number of billable hours authorized, the amount of expenses authorized, the execution date of various documents and the contractor type. Table 62 lists the particular document and identifies whether the contractor has executed or provided that document and the date of such execution or provision. It should be understood that a separate record for each document is stored having the format of Table 62. Table 63 illustrates various exemplary information identifying the type of contractors, such as the number of days the contractor has and has not worked for the buyer. However, it should be understood that other information can be included, and the system is not limited to the specific information shown in Tables 60-63.

TABLE 60

Exemplary Contractor Documents Table

| Non-Employee_Document_ID | Document_Description | Due_Diligence_Method | Time_Constraint |
|---|---|---|---|
| 1 | Confidentiality Agreement | Electronic Challenge/Acknowledgment | Project_Duration |
| 2 | Intellectual Property Rights Agreement | Electronic Challenge/Acknowledgment | Project_Duration |
| 3 | Code of Conduct Agreement | Electronic Challenge/Acknowledgment | Project_Duration |
| 4 | Temporary Work Assignment Agreement | Electronic Challenge/Acknowledgment | Project_Duration |
| 5 | Commercial Drivers License (CDL) | Physical Copy/Purchasing Database Approval | License_Defined |
| 6 | Drug Test Documentation | Physical Copy/Purchasing Database Approval | 6 months |
| 7 | USA Military Clearance | Physical Copy/Purchasing Database Approval | Clearance Defined |
| 8 | Bonded | Physical Copy/Purchasing Database Approval | Notary Defined |
| 9 | USA Technology Export Compliant Citizen | Physical Copy/Purchasing Database Approval | Project_Duration |
| 10 | Independent Contractor Qualified | Physical Copy/Purchasing Database Approval | Project_Duration |
| 11 | W-2 Verification | Physical Copy/Purchasing Database Approval | 6 months |
| 12 | Certified Union Member | Physical Copy/Purchasing Database Approval | Certification Defined |
| 13 | Right to Work Country | Physical Copy/Purchasing Database Approval | Project_Duration |

TABLE 61

Exemplary Contractor Table

| Column Name | Data Type | Length |
|---|---|---|
| Requistion_ID | int | 4 |
| Buyer_PO_# | varchar | 20 |
| Current_Status_ID | int | 4 |
| Contractor_ID | int | 4 |
| Time_Keeping_Only | char | 1 |
| Billable_Hours_Authorized | int | 4 |
| Expenses_Authorized | money | 8 |
| Vendor_ID | int | 4 |
| User_ID | int | 4 |
| Record_ID | int | 4 |
| IP_Agreement_Date | datetime | 8 |
| ATW_Agreement | datetime | 8 |
| Confidentiality_Agreement | datetime | 8 |
| Drug_Screen | datetime | 8 |
| Code_Of_Conduct | datetime | 8 |
| Contractor_Type | int | 4 |
| Profile_ID | int | 4 |

TABLE 62

Exemplary Contractor Execution Dates Table

| Column Name | Data Type | Length |
|---|---|---|
| Contractor_ID | int | 4 |
| Non-Employee_Liability_Issue_ID | int | 4 |
| Agreement_Executed | char | 1 |
| Agreement_Execution_Date | datetime | |
| Assessment_Complete_Date | datetime | 1 |
| Assessment_Disposition | char | 1 |
| Assessment_User_ID | int | 4 |
| Tickler_Date | datetime | |

TABLE 63

Exemplary ContractorTypes Table (db structure view)

| Column Name | Data Type | Length |
|---|---|---|
| Contractor_Type_ID | Int | 4 |
| Contractor_Type | Varchar | 50 |
| Notes | Varchar | 500 |
| Tenure_Days | Numeric | 9 |
| Separation_Days | Numeric | 9 |

Examples of the data structures used for storing the project tracking parameters are shown in Tables 64-79 hereinbelow. The data structures are illustrated for simplicity as being organized in a table format, with each table including all of the fields necessary for tracking the performance of the project. The tables are related in a hierarchical and relational manner, as will be discussed in connection with FIG. 41.

Figure 41:
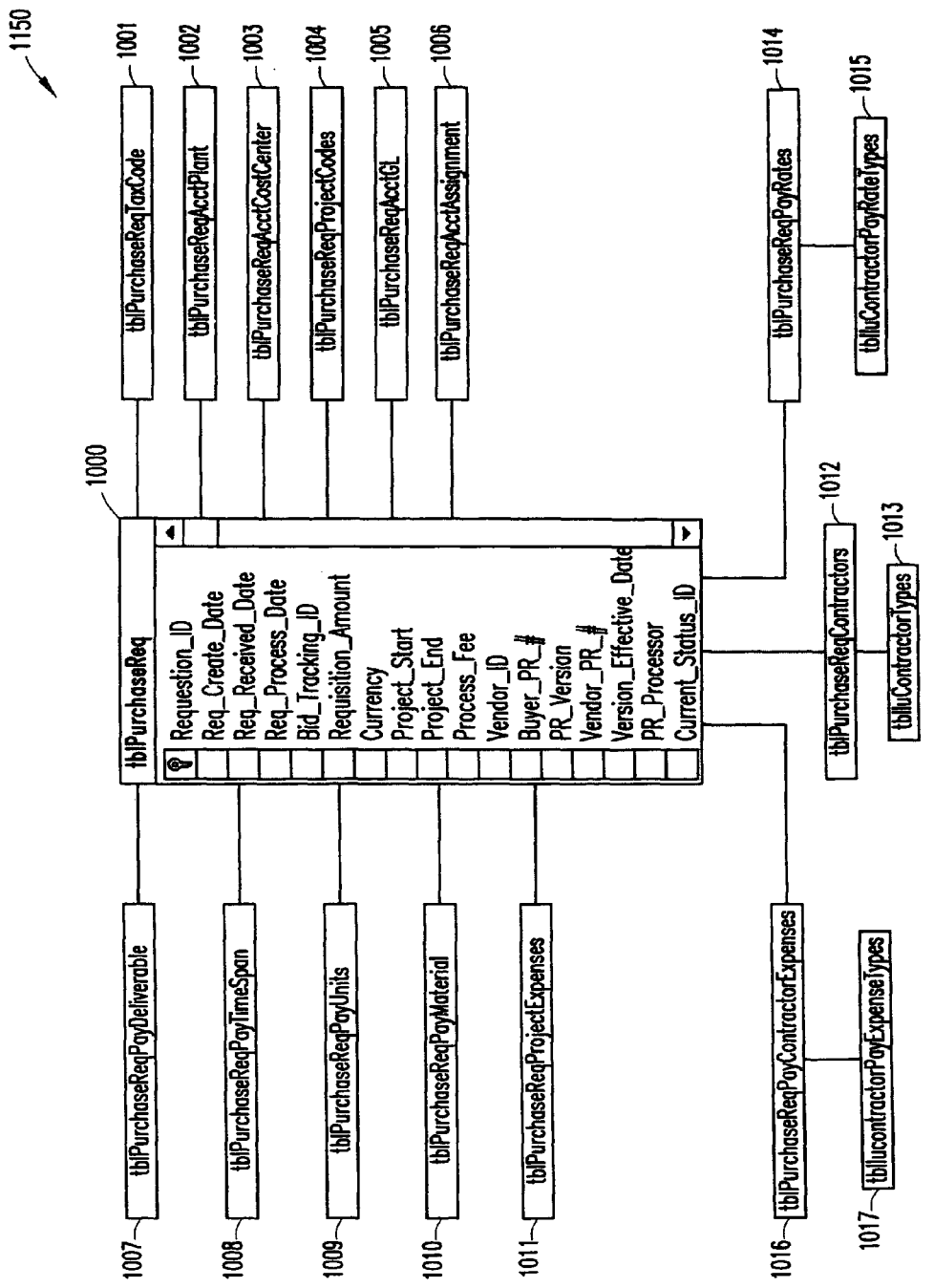
FIG. 41 is a database table view illustrating various project administration components handled by the computer system of the present invention.

Table 64 below illustrates sample general purchase requisition information, which can be stored in the database in table "tblPurchaseReq" 1000, as shown in FIG. 41. For example, such general purchase information can include the identity assigned to the purchase requisition by the system, the buyer and the vendor, the requisition create date, the requisition amount, the bid tracking number for the bid (bid request and bid response) associated with the purchase requisition, the project start and end dates, along with any other pertinent purchase requisition information. However, it should be understood that other information can be included, and the system is not limited to the specific information shown in Table 64. Referring now to the database table structure 1150 in FIG. 41, table "tblPurchaseReq" 1000 is shown tied to table "tblPurchaseReqContractors" 1012 and table "tblluContractorTypes" 1013, which include information in the data structure format corresponding to Tables 61 and 63 above, respectively, to associate the assigned contractors to the purchase requisition.

TABLE 64 tblPurchaseReq

| Column Name | Data Type | Length |
|---|---|---|
| Requisition_ID | int | 4 |
| Req_Created_Date | datetime | 8 |
| Req_Received_Date | datetime | 8 |
| Req_Process_Date | datetime | 8 |
| Bid_Tracking_ID | int | 4 |
| Requistion_Amount | money | 8 |
| Currency | int | 4 |
| Project_Start | datetime | 8 |
| Project_End | datetime | 8 |
| Process_Fee | numeric | 9 |
| Vendor_ID | int | 4 |
| Buyer_PR_# | varchar | 20 |
| PR_Version | numeric | 9 |
| Vendor_PR_# | varchar | 20 |
| Version_Effective_Date | datetime | 8 |
| Req_Processor | int | 4 |
| Current_Status_ID | int | 4 |

Tables 65-70 below illustrate sample specific purchase requisition information associated with tax codes, account plants, cost centers, project codes, account assignment and other similar buyer specific purchase requisition information, all of which can be stored in the database in respective tables "tblPurchaseReqTaxCode" 1001, "tblPurchaseReqAcctPlant" 1002, "tblPuchaseReqAcctCostCenter" 1003, "tblPurchaseReqProjectCodes" 1004, "tblPurchaseReqAcctGL" 1005 and "tblPurchaseReqAcctAssignment" 1006, as shown in FIG. 41. However, it should be understood that additional tables and information related to the purchase requisition can be included, depending on the purchase requisition requirements. Tables "tblPurchaseReqTaxCode" 1001, "tblPurchaseReqAcctPlant" 1002, "tblPuchaseReqAcctCostCenter" 1003, "tblPurchaseReqProjectCodes" 1004, "tblPurchaseReqAcctGL" 1005 and "tblPurchaseReqAcctAssignment" 1006 are tied to the table "tblPurchaseReq" 1000 to associate the specific purchase requisition information with the general purchase requisition information.

TABLE 65 tblPurchaseReqTaxCodes

| Column Name | Data Type | Length |
|---|---|---|
| Requisition_ID | int | 4 |
| Buyer_PR_# | varchar | 20 |
| Tax_Code | varchar | 10 |
| Current_Status_ID | int | 4 |
| Record_ID | int | 4 |

TABLE 66 tblPurchaseReqAcctPlant

| Column Name | Data Type | Length |
|---|---|---|
| Requisition_ID | int | 4 |
| Buyer_PR_# | varchar | 20 |
| Accounting_Plant | varchar | 10 |
| Record_ID | int | 4 |
| Current_Status_ID | int | 4 |

TABLE 67 tblPurchaseReqAcctCostCenter

| Column Name | Data Type | Length |
|---|---|---|
| Requisition_ID | int | 4 |
| [Billable_Dept/Cost_Center] | nvarchar | 10 |
| Buyer_PR_# | varchar | 20 |
| Record_ID | int | 4 |
| Current_Status_ID | int | 4 |

TABLE 68 tblPurchaseReqProjectCodes

| Column Name | Data Type | Length |
|---|---|---|
| Purchase_Req_ID | int | 4 |
| Buyer_PR_# | varchar | 20 |
| Project_Code | varchar | 20 |
| [Billable_Dept/Cost_Center] | nvarchar | 20 |
| Record_ID | int | 4 |
| Current_Status_ID | int | 4 |

TABLE 69 tblPurchaseReqAcctGL

| Column Name | Data Type | Length |
|---|---|---|
| Requisition_ID | int | 4 |
| Buyer_PR_# | varchar | 20 |
| G_L_Account | varchar | 20 |
| Record_ID | int | 4 |
| Current_Status_ID | int | 4 |

TABLE 70 tblPurchaseReqAcctAssignment

| Column Name | Data Type | Length |
|---|---|---|
| Requisition_ID | int | 4 |
| Buyer_PR_# | varchar | 20 |
| Account_Assignment | varchar | 10 |
| Current_Status_ID | int | 4 |
| Record_ID | int | 4 |

Tables 71-75 below illustrate sample requisition payment information related to the purchase requisition. For example, such requisition payment information can include payment amounts based on project deliverables (e.g., goods and services delivered at the end of the project or during phases of the project), payment amounts based on time frames, payment amounts based on the number of units completed, payment amounts based on project materials and payment amounts based on project expenses. In FIG. 41, the requisition payment information is shown as stored in the database in tables "tblPurchaseReqPayDeliverable" 1007, "tblPurchaseReqPayTimeSpan" 1008, "tblPurchaseReqPayUnits" 1009, "tblPurchaseReqPayMaterials" 1010 and "tblPurchaseReqPayProjectExpenses" 1011. Each of the tables "tblPurchaseReqPayDeliverable" 1007, "tblPurchaseReqPayTimeSpan" 1008, "tblPurchaseReqPayUnits" 1009, "tblPurchaseReqPayMaterials" 1010 and "tblPurchaseReqPayProjectExpenses" 1011 are shown tied to table "tblPurchaseReq" to associate the payment information with the general purchase requisition information.

It should be understood that additional tables or information may be included, depending on the purchase requisition requirements. In addition, it should be understood that one or more of the payment tables can be included, depending on the project. Furthermore, it should be understood that a separate record for each payment amount is included having the format of one of Tables 71-75 below.

TABLE 71

Exemplary tblPurchaseReqPayDeliverable (db structure view)

| Column Name | Data Type | Length |
|---|---|---|
| Requisition_ID | int | 4 |
| Buyer_PR_# | varchar | 20 |
| Deliverable_Description | varchar | 1000 |
| Anticipated_Completion_Date | datetime | 8 |
| Payment_Amount | money | 8 |
| Partial_Payment_Authorized | char | 1 |
| Current_Status_ID | int | 4 |
| Vendor_ID | int | 4 |
| User_ID | int | 4 |
| Record_ID | int | 4 |
| Record_Date | datetime | 8 |

TABLE 72

Exemplary tblPurchaseReqPayTimeSpan (db structure view)

| Column Name | Data Type | Length |
|---|---|---|
| Requisition_ID | int | 4 |
| Buyer_PR_# | varchar | 20 |
| Current_Status_ID | int | 4 |
| Work_Start_Date | datetime | 8 |
| Payment_Release_Date | Datetime | 8 |
| Payment_Amount | Money | 8 |
| Vendor_ID | Int | 4 |
| User_ID | Int | 4 |
| Record_ID | Int | 4 |

TABLE 73

Exemplary tblPurchaseReqPayUnits (db structure view)

| Column Name | Data Type | Length |
|---|---|---|
| Requisition_ID | int | 4 |
| Buyer_PR_# | varchar | 20 |
| Current_Status_ID | int | 4 |
| Unit_Completion_Description | varchar | 1000 |
| Unit_Count | numeric | 9 |
| Unit_Cost | money | 8 |
| Partial_Payment_Authorized | char | 1 |
| Vendor_ID | int | 4 |
| User_ID | int | 4 |
| Record_ID | int | 4 |

TABLE 74

Exemplary tblPurchaseReqPayMaterials (db structure view)

| Column Name | Data Type | Length |
|---|---|---|
| Requisition_ID | Int | 4 |
| Buyer_PR_# | Varchar | 20 |
| Vendor_ID | int | 4 |
| Material_Name | varchar | 100 |
| Material_Description | varchar | 500 |
| Material_Manufacturer | varchar | 100 |
| Unit_Cost | money | 8 |
| Unit_Count | numeric | 9 |

TABLE 74-continued

Exemplary tblPurchaseReqPayMaterials (db structure view)

| Column Name | Data Type | Length |
|---|---|---|
| Line_Item_Cost | money | 8 |
| Currency_ID | int | 4 |
| Current_Status_ID | int | 4 |
| User_ID | int | 4 |
| Record_ID | int | 4 |
| Record_Date | datetime | 8 |

TABLE 75

Exemplary tblPurchaseReqPayProjectExpenses (db structure view)

| Column Name | Data Type | Length |
|---|---|---|
| Requisition_ID | int | 4 |
| Buyer_PR_# | varchar | 20 |
| Project_Expense_Description | varchar | 500 |
| Maximum_Threshold | money | 8 |
| Currency_ID | int | 4 |
| User_ID | int | 4 |
| Vendor_ID | int | 4 |
| Current_Status_ID | int | 4 |
| Record_ID | int | 4 |
| Record_Date | datetime | 8 |

Tables 77 and 77 below illustrate sample information associated with the pay rates for contractors assigned to the purchase requisition. For example, the contractor pay rate information can indicate the type of pay (e.g., hourly, fixed, overtime, etc.) and the pay rate amount (e.g., billable rate per hour, billable rate per overtime hour, billable amount). The pay rate information can be stored in the database in tables "tblPurchaseReqPayRates" 1014 and "tblluContractorPayRateTypes" 1015, which are shown in FIG. 41 tied to table "tblPurchaseReq" 1000 to associate the pay rate information with the purchase requisition. It should be understood that a separate pay rate record for each pay rate type of each contractor can be stored in table "tblPurchaseReqPayRates" 1014. It should further be understood that additional tables or information can be included, depending on the purchase requisition requirements.

TABLE 76 tblPurchaseReqPayRates (db structure view)

| Column Name | Data Type | Length |
|---|---|---|
| Requisition_ID | int | 4 |
| Buyer_PR_# | varchar | 20 |
| Current_Status_ID | int | 4 |
| Contractor_ID | int | 4 |
| Pay_Rate_Type | int | 4 |
| Pay_Rate | money | 8 |
| Currency_ID | int | 4 |
| User_ID | int | 4 |
| Vendor_ID | int | 4 |
| Record_ID | int | 4 |

TABLE 77 tblluContractorPayRateTypes (db structure view)

| Column Name | Data Type | Length |
|---|---|---|
| Hour_Type_ID | Int | 4 |
| Hour_Type_Description | varchar | 50 |

Tables 78 and 79 below illustrate sample payment information associated with the contractor expenses for contractors assigned to the purchase requisition. For example, the contractor expense information can indicate the type of expense and the maximum amount allocated for the expense. The contractor expense information can be stored in the database in tables "tblPurchaseReqPayContractorExpenses" 1016 and "tblluContractorPayExpenseTypes" 1017, which are shown in FIG. 41 tied to table "tblPurchaseReq" 1000 to associate the contractor expense information with the purchase requisition. It should be understood that a separate contractor expense record for each contractor expense type of each contractor can be stored in table "tblPurchaseReqPayContractorExpenses" 1016. It should further be understood that additional tables or information can be included, depending on the purchase requisition requirements.

TABLE 78 tblPurchaseReqPayContractorExpenses (db structure view)

| Column Name | Data Type | Length |
| --- | --- | --- |
| Requisition_ID | int | 4 |
| Buyer_PR_# | varchar | 20 |
| Current_Status_ID | int | 4 |
| Contractor_ID | int | 4 |
| Expense_Type_ID | int | 4 |
| Maximum_Threshold | money | 8 |
| Currency_ID | int | 4 |
| User_ID | int | 4 |
| Vendor_ID | int | 4 |
| Record_ID | int | 4 |

TABLE 79 tblluContractorPayExpenseTypes (db structure view)

| Column Name | Data Type | Length |
| --- | --- | --- |
| Contractor_Expense_Type_ID | Int | 4 |
| Contractor_Expense_Type | varchar | 50 |

Post-Bid Activity

Once the project has begun, the project administrator (or buyer) can monitor the progress of the project using a time keeping system, in which contractors enter time into time cards for project work performed. The time cards can be stored to assess project performance for requisition payment information and/or to generate payment vouchers based on time worked, depending on the requisition payment information. For example, if the requisition payment amount was based, at least in part, on an anticipated number of billable hours of a particular contractor at a particular pay rate, and the contractor completed the project under the anticipated number of billable hours, the project administrator and vendor may be able to re-negotiate the requisition payment amount that was initially set for payment based on deliverables, time frames or units.

Figure 43:
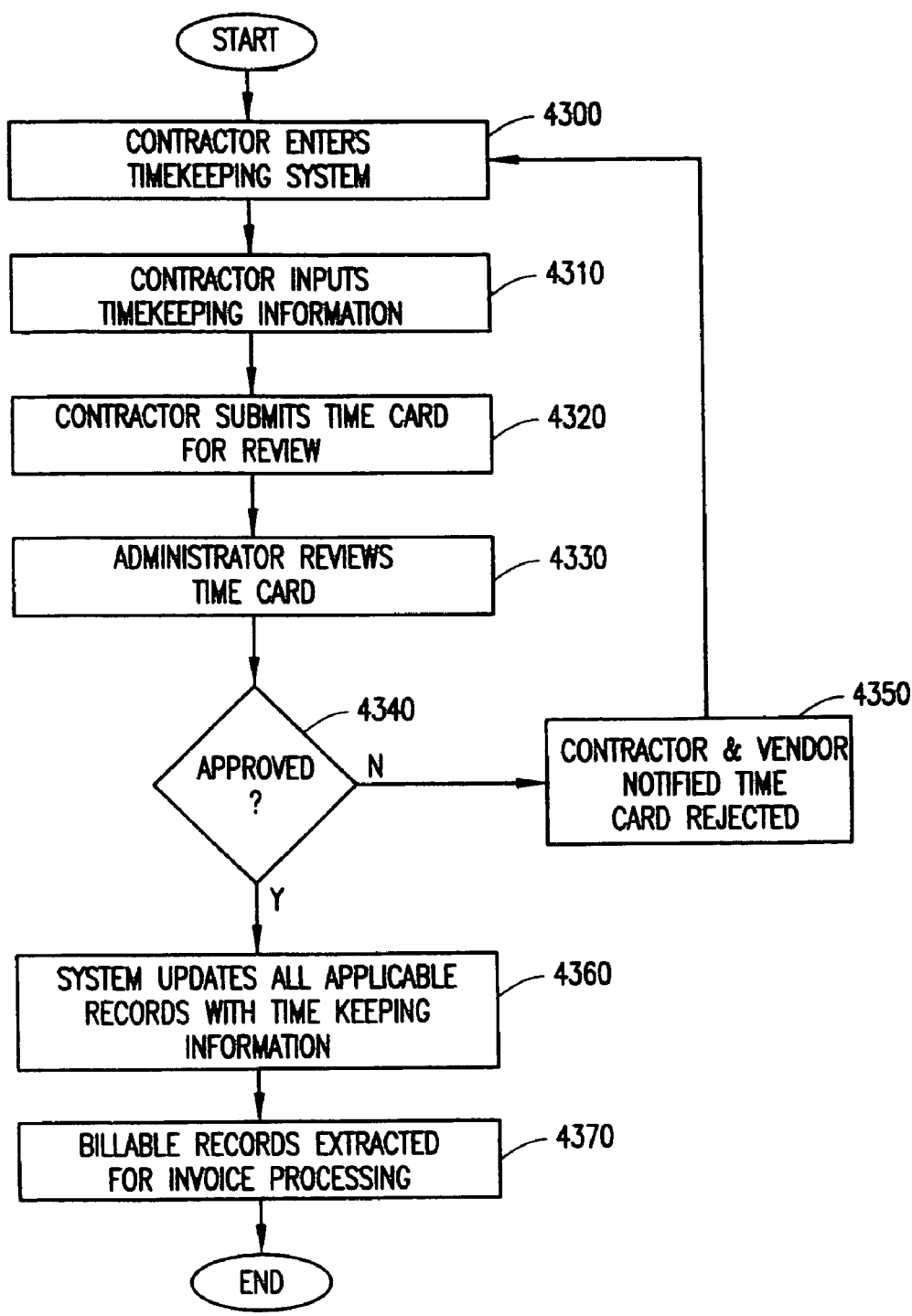
FIG. 43 is a flowchart illustrating exemplary steps for entering contractor time for a project, in accordance with embodiments of the present invention.

Referring now to FIG. 43, there are illustrated exemplary steps for implementing a time keeping system within the system of the present invention. After the contractor has completed all necessary documentation and is authorized to enter the time keeping system, the contractor can enter the time keeping system (step 4300) to input time keeping information (step 4310) associated with the number of hours worked by the contractor into a time card (e.g., a time keeping record for the contractor). The time keeping information can be entered at any time the time keeping system is accessible. For example, the time keeping system can be accessible only at specific times (e.g., the end of the week, the beginning of week, etc.) as determined by the project administrator or during times that the time keeping system is not off-line.

Once the contractor has entered the time keeping information into the time card, the time card is provided to the project administrator (step 4325) for review and approval (step 4330). If the time card is not approved (step 4340), the contractor and vendor are notified of the time card rejection (step 4350) and the contractor is instructed to access the time keeping system to modify the time card (step 4300). For example, if the contractor has not completely filled out the time card, the time keeping information (e.g., number of hours) entered into the time card is out of the normal or unreasonable or the project administrator has knowledge that the time keeping information is incorrect, the time card may be rejected. If the time card is approved (step 4340), all applicable records within the system are updated with the time keeping information (step 4360) and any payable vouchers associated with the time keeping information are extracted for invoice processing (step 4370). For example, if requisition payment is based on the number of hours worked within a particular time frame, a payable voucher may need to be generated based on the time keeping information entered by the contractor.

Figure 44:
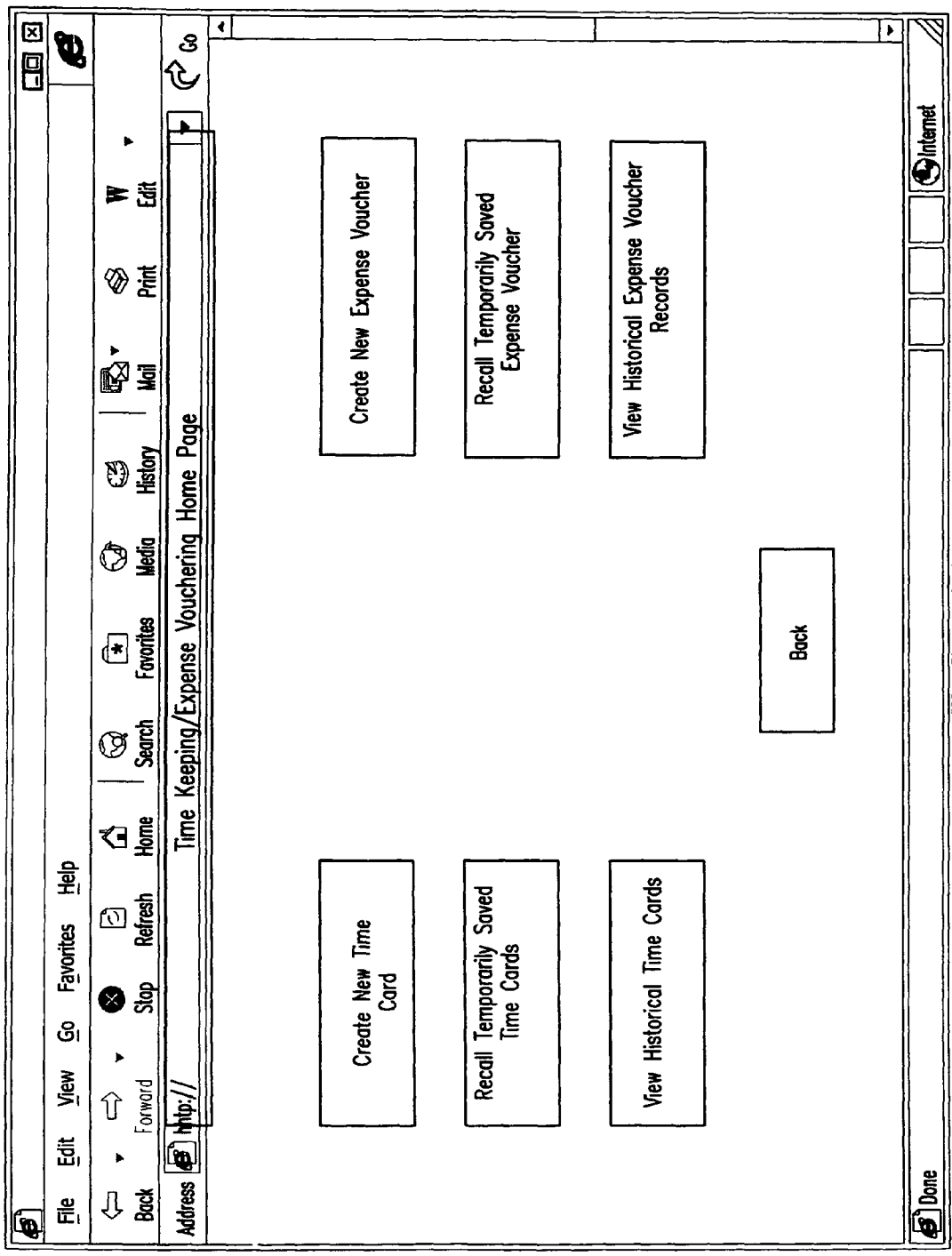
Figure 45:
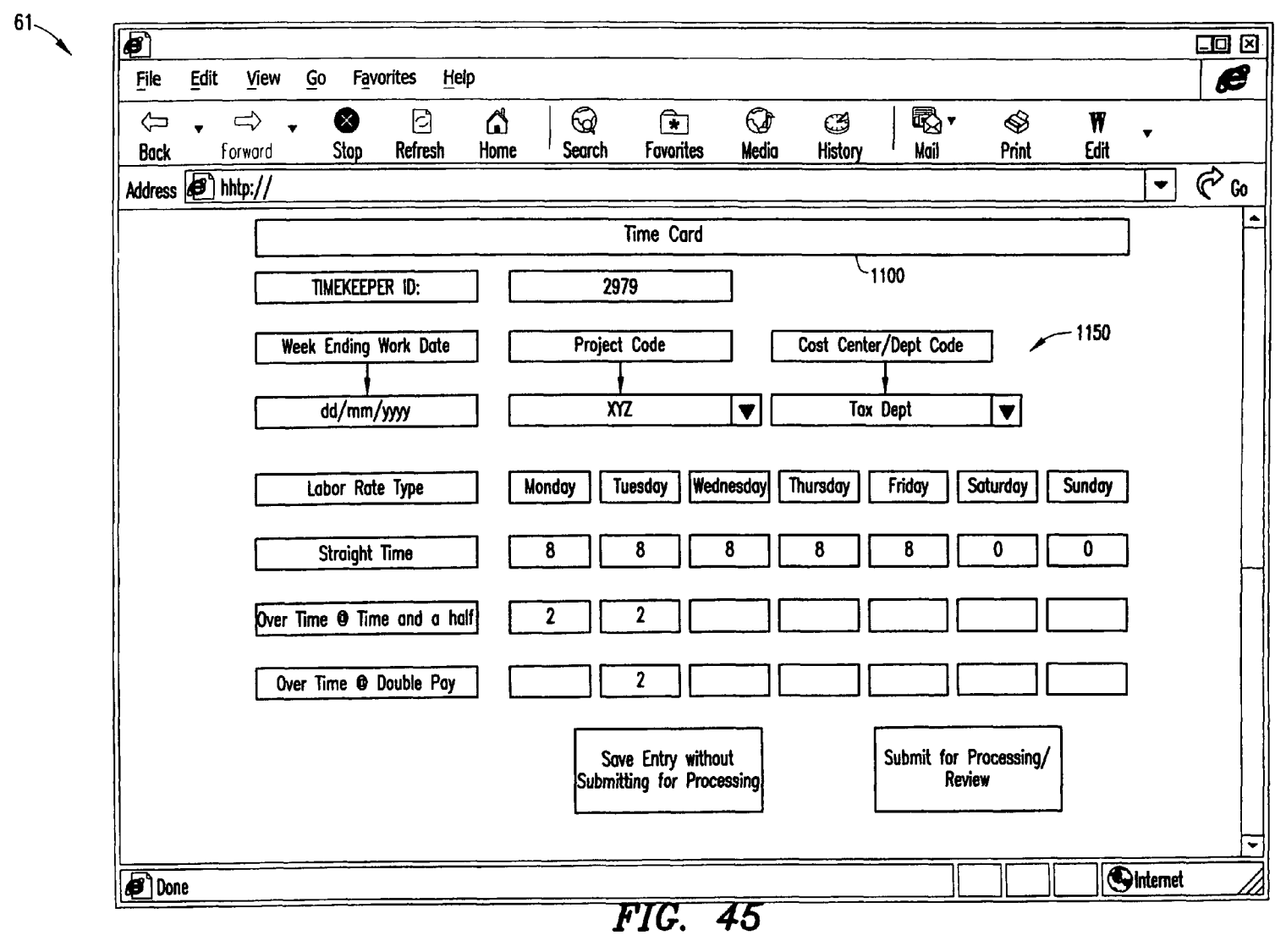

Screen shots of exemplary web pages 61 provided to the contractor through the time keeping system are shown in FIGS. 44 and 45. A sample time keeping system home page is illustrated in FIG. 44. From the home web page, the contractor can create a new time card, recall temporarily saved time cards for completion purposes or view previously submitted time cards. In addition, if the contractor is allowed to enter contractor expenses (depending on the purchase requisition), the contractor can create a new expense voucher, recall a temporarily saved expense voucher for completion or view previously submitted expense vouchers.

To create a new time card (or complete a temporarily saved time card), as shown in FIG. 45, the contractor can enter various time keeping information 1150 into the time card 1100. For example, the contractor can enter the week ending work date, project code for the project and cost center responsible for payment. In addition, the contractor can enter the number of regular hours worked each day and the number of overtime hours worked each day (at each overtime pay rate). It should be understood that other time keeping information can also be entered by the contractor, and the system is not limited to the particular time keeping information shown in FIG. 45.

Figure 46:
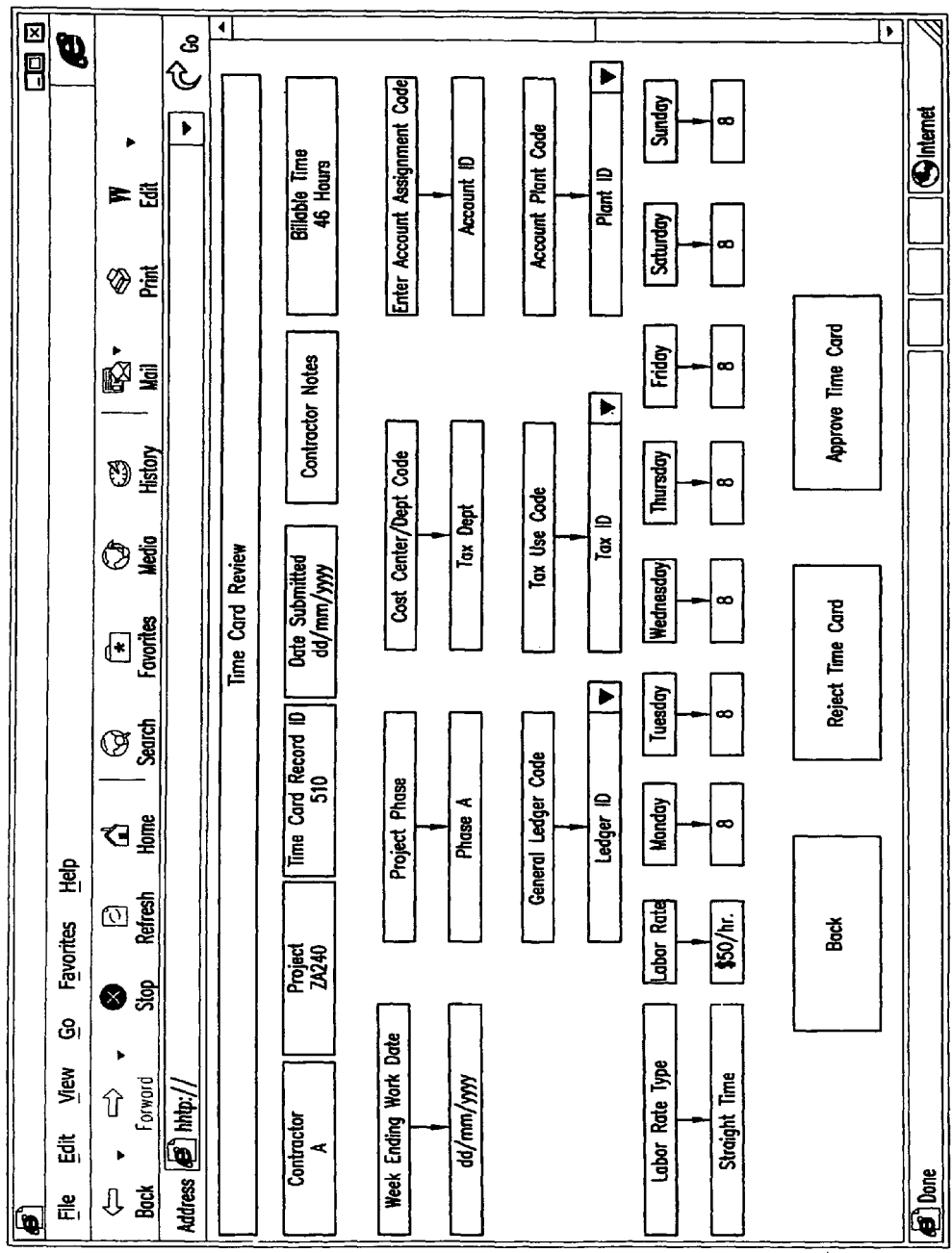

A screen shot of a sample web page 61 displayed to the project administrator for review of the submitted time card is shown in FIG. 46. In addition to the entered time keeping information, the project administrator may also be provided with other pertinent purchase requisition information associated with the time card, such as the current project phase, general ledger code, tax use code, account assignment code and account plant code. Based on the displayed time keeping information, the project administrator can either reject the time card or approve the time card. If the project administrator rejects the time card, a pop-up window can be displayed for the project administrator to provide a reason for time card rejection. It should be understood that other information can be displayed to the project administrator for time card approval purposes, and the system is not limited to the specific information shown in FIG. 46.

Exemplary database structures for storing the time cards and contractor expense vouchers are shown in Tables 80-83 below. The data structures are illustrated for simplicity as being organized in a table format, with each table including all of the fields necessary for storing time cards and contractor expense vouchers. The tables are related in a hierarchical and relational manner with other tables stored in the database, as will be discussed in connection with FIG. 47.

Figure 47:
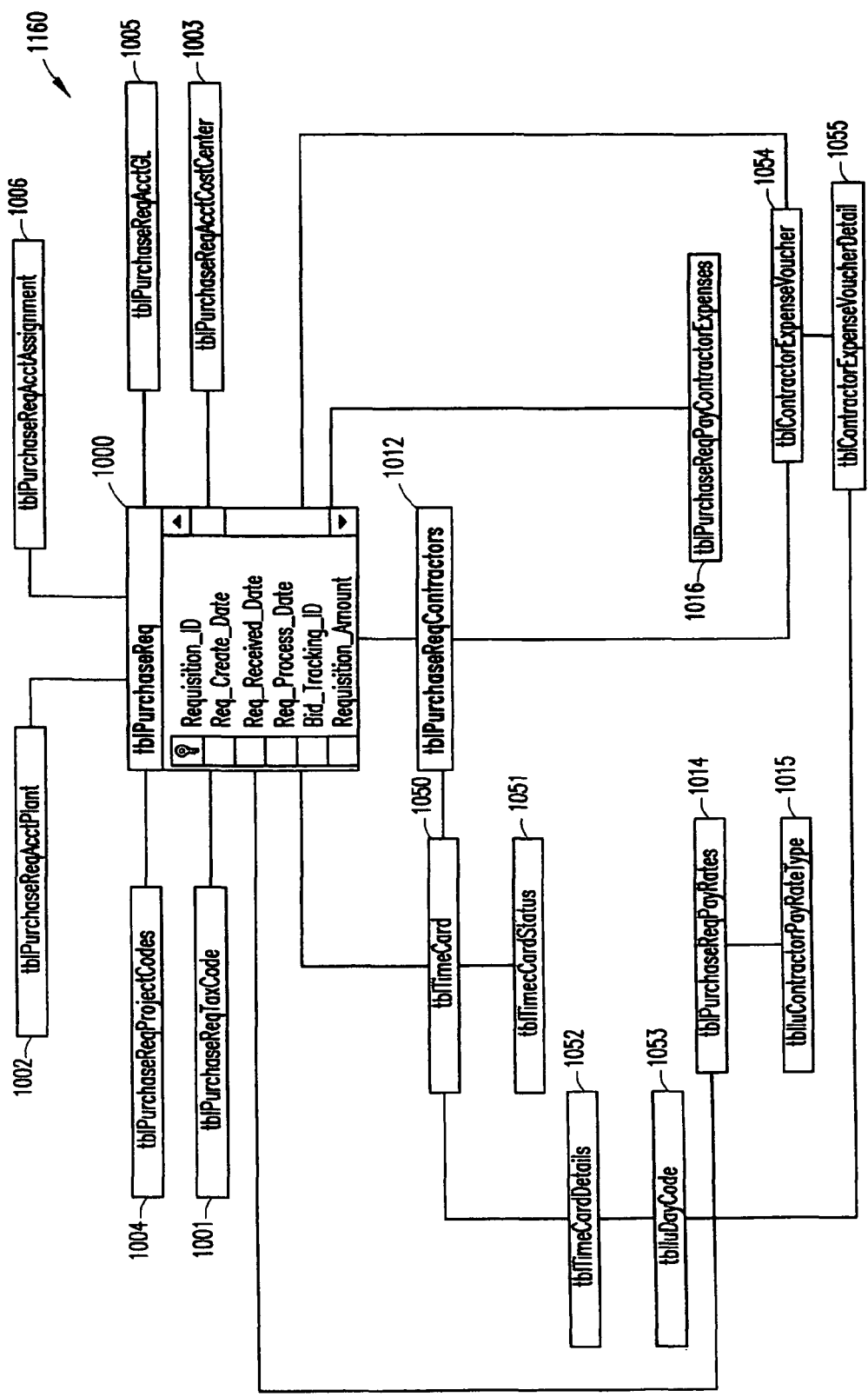
FIG. 47 is a database table view illustrating the tracking of project deliverables and vouchering, in accordance with embodiments of the present invention.

Table 80 below illustrates sample general time keeping information, which can be stored in the database table structure 1160 in table "tblTimeCard" 1050, as shown in FIG. 47. For example, the time keeping information can include the time card identifier, the associated purchase requisition identifier, the contractor identifier, the vendor identifier, an indication of whether or not the time entered is billable time for generation of a billing record, the week ending date associated with the time card, the creation date, the review date and an indication of whether or not the time card has been approved. However, it should be understood that other information can be included, and the system is not limited to the specific information shown in Table 80. Table "tblTimeCard" 1050 is shown in FIG. 47 tied to table "tblPurchaseReqContractors" 1012, which is tied to table "tblPurchaseReq" 1000, both of which are discussed above in connection with FIG. 41, to associate the time card with the contractor and the purchase requisition. In addition, various other tables shown in FIG. 41 are illustrated in FIG. 47 to show the interrelation between the various purchase requisition tables and the time card and contractor expense voucher tables.

TABLE 80

Exemplary tblTimeCard (db structure view)

| Column Name | Data Type | Length |
| --- | --- | --- |
| Time_Card_ID | int | 4 |
| tcStatus_ID | int | 4 |
| Requisition_ID | int | 4 |
| Contractor_ID | int | 4 |
| Vendor_ID | int | 4 |
| Billable_Time | char | 1 |
| HM_Submitter_ID | int | 4 |
| Vendor_Submitter_ID | int | 4 |
| Reviewer_ID | int | 4 |
| Week_Ending_Date | datetime | 8 |
| Record_Create_Date | datetime | 8 |
| Last_Edit_Date | datetime | 8 |
| Submit_Date | datetime | 8 |
| Review_Date | datetime | 8 |
| Approval_Date | datetime | 8 |
| Date_Rejected | datetime | 8 |
| Contractor_Notes | varchar | 1000 |
| Client_Notes | varchar | 1000 |

The time card status identifier stored in the table "tblTimeCard" 1050 can be selected from a table "tblluTimeCardStatus" 1051, which stores time card status types (e.g., temporarily saved, submitted, approved, rejected, etc.) and their associated time card status identifiers.

Table 81 illustrates sample detailed time keeping information, which can be stored in the database in table "tblTimeCardDetails" 1052, as shown in FIG. 47. For example, such detailed time keeping information can include the number of hours entered as worked on a particular day for a particular pay rate type, the pay rate associated with the pay rate type and other detailed time keeping information. Table "tblTimeCardDetails" 1052 is shown tied to table "tblTimeCard" 1050 to associate the detailed time keeping information with the general time keeping information. In addition, table "tblTimeCardDetails" 1052 is tied to table "tblluDayCode" 1053 to associate the day code stored in table "tblTimeCardDetails" 1052 with the particular day. It should be understood that a separate record in the format of Table 81 is stored in table "tblTimeCardDetails" 1052 for each pay rate type on each day for which the contractor enters time. It should further be understood that other tables and time keeping information can be included, and the system is not limited to the specific tables and time keeping information shown in FIG. 47.

TABLE 81

Exemplary tblTimeCardDetails (db structure view)

| Column Name | Data Type | Length |
| --- | --- | --- |
| Time_Card_ID | int | 4 |
| Record_ID | int | 4 |
| Pay_Rate_Type_ID | int | 4 |
| Day_Code | int | 4 |
| Quantity | float | 8 |
| Account_Assignment | varchar | 10 |
| [Billable_Dept/Cost_Center] | nvarchar | 10 |
| Accounting_Plant | varchar | 10 |
| Project_Code | varchar | 20 |
| Tax_Code | varchar | 10 |
| G_L_Account | varchar | 20 |
| Pay_Rate | money | 8 |

Table 82 below illustrates sample general contractor expense voucher information, which can be stored in the database in table "tblContractorExpenseVoucher" 1054, as shown in FIG. 47. For example, such general contractor expense voucher information can include the expense voucher identifier, the associated purchase requisition identifier, the contractor identifier, the vendor identifier, the week ending date associated with the expense voucher, the creation date, the review date and an indication of whether or not the expense voucher has been approved. However, it should be understood that other information can be included, and the system is not limited to the specific information shown in Table 82. Table "tblContractorExpenseVoucher" 1054 is shown tied to table "tblPurchaseReqContractors" 1012, which is tied to table "tblPurchaseReq" 1000, both of which are discussed above in connection with FIG. 41, to associate the contractor expense voucher with the particular contractor and the purchase requisition.

TABLE 82

Standard tblContractorExpenseVoucher (db structure view)

| Column Name | Data Type | Length |
| --- | --- | --- |
| Requisition_ID | int | 4 |
| Expense_Voucher_ID | int | 4 |
| tcStatus_ID | int | 4 |
| Contractor_ID | int | 4 |
| Vendor_ID | int | 4 |
| HM_Submitter_ID | int | 4 |
| Vendor_Submitter_ID | int | 4 |
| Approver_ID | int | 4 |
| Week_Ending_Date | datetime | 8 |
| Record_Create_Date | datetime | 8 |
| Last_Edit_Date | datetime | 8 |
| Submit_Date | datetime | 8 |
| Approval_Date | datetime | 8 |
| Date_Rejected | datetime | 8 |
| Contractor_Notes | varchar | 1000 |
| Client_Notes | varchar | 1000 |

Table 83 below illustrates sample detailed contractor expense voucher information, which can be stored in the database in table "tblContractorExpenseVoucherDetails" 1055, as shown in FIG. 47. For example, such detailed expense voucher information can include the expense amount of a particular expense type on a particular day and other detailed expense voucher information. Table "tblContractorExpenseVoucherDetails" 1055 is shown tied to table "tblContractorExpenseVoucher" 1054 to associate the detailed expense voucher information with the general expense voucher information. In addition, table "tblContractorExpenseVoucherDetails" 1055 is tied to table "tblluDayCode" 1053 to associated the day code stored in table "tblContractorExpenseVoucherDetails" 1055 with the particular day. It should be understood that a separate record in the format of Table 83 is stored in table "tblContractorExpenseVoucherDetails" 1055 for each type of expense on each day for which the contractor enters an amount. It should further be understood that other tables and contractor expense voucher information can be included, and the system is not limited to the specific tables and contractor expense voucher information shown in FIG. 47.

TABLE 83

Stardard tblContractorExpenseVoucherDetails (db structure view)

| Column Name | Data Type | Length |
|---|---|---|
| Expense_Voucher_ID | int | 4 |
| Record_ID | int | 4 |
| Expense_Type_ID | int | 4 |
| Day_Code | int | 4 |
| Expense_Amount | money | 8 |
| Account_Assignment | varchar | 10 |
| [Billable_Dept/Cost_Center] | varchar | 10 |
| Accounting_Plant | varchar | 10 |
| Project_Code | varchar | 20 |
| Tax_Code | varchar | 10 |
| G_L_Account | varchar | 20 |

Figure 48:
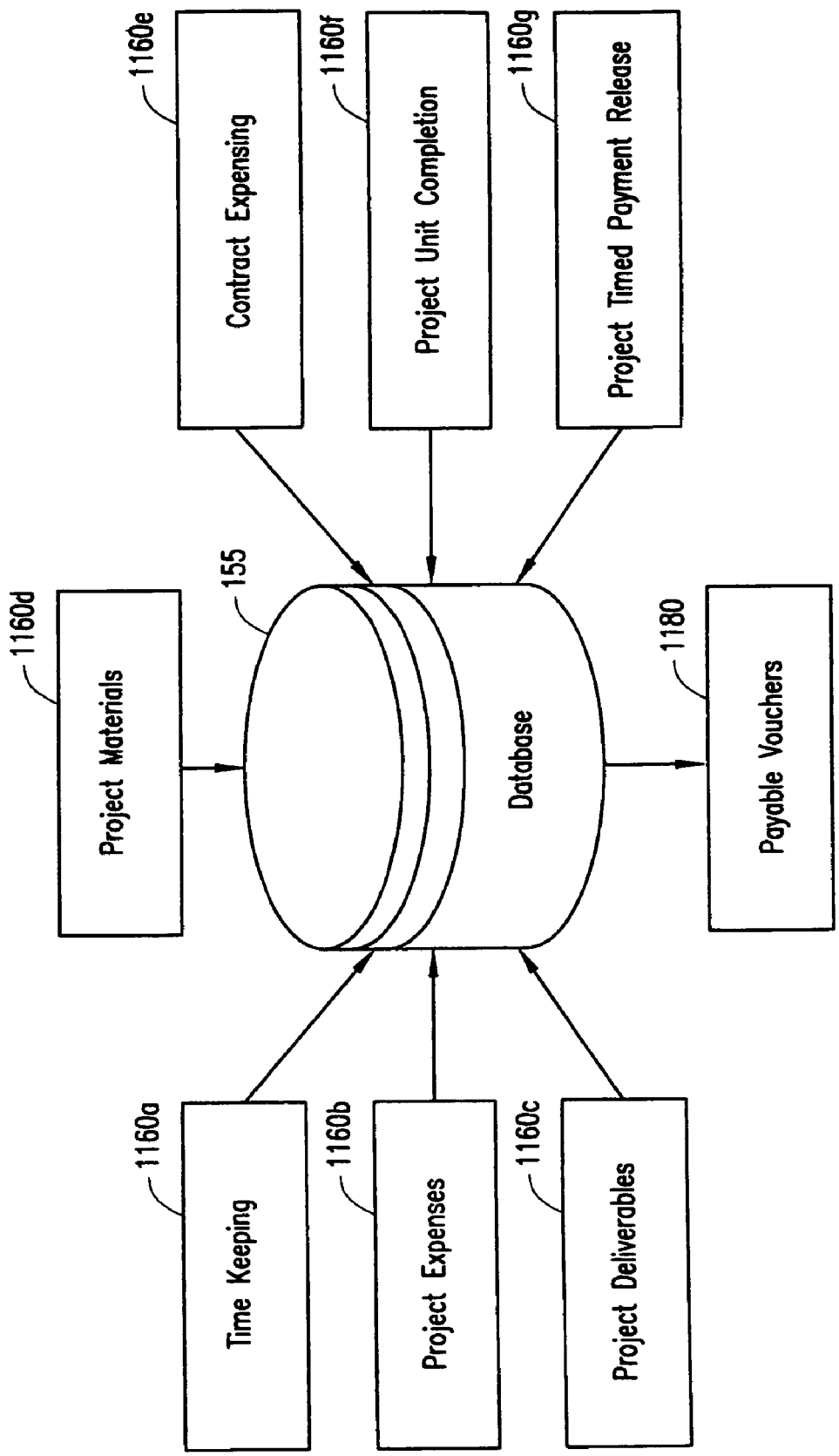
FIG. 48 illustrates the electronic facilitation of a payment vouchering process for submitting and approving payment vouchers and creating a payment voucher, in accordance with embodiments of the present invention.

Referring now to FIG. 48, there are a number of different types of voucher information 1160 that can be entered into the system and stored in the database 155 for generation of a payable voucher 1180 to be paid by the buyer or project administrator to the awarded vendor. For example, the voucher information 1160 can include time keeping voucher information 1160*a*, which includes the time keeping information 1150 (shown in FIG. 45 above) entered by the contractor and requisition payment information as determined by the entered project work tracking parameters 870 (shown in FIGS. 39 and 40 above) pertaining to the time keeping information. The voucher information can also include project expenses voucher information 1160*b*, project deliverables voucher information 1160*c*, project materials voucher information 1160*d*, contractor expensing voucher information 1160*e*, project unit completion voucher information 1160*f* and project timed payment release voucher information 1160*g*. The system can automatically generate payable vouchers 1180 based on voucher information 1160 previously entered in other contexts (e.g., project tracking parameters entry, time keeping entry, contractor expense entry and/or project expense entry), or the vendor or buyer/project administrator can generate payable vouchers 1180 and enter various applicable portions of the voucher information 1160 (e.g., unit completion entry or deliverable completion entry) into the payable vouchers 1180.

Figure 49:
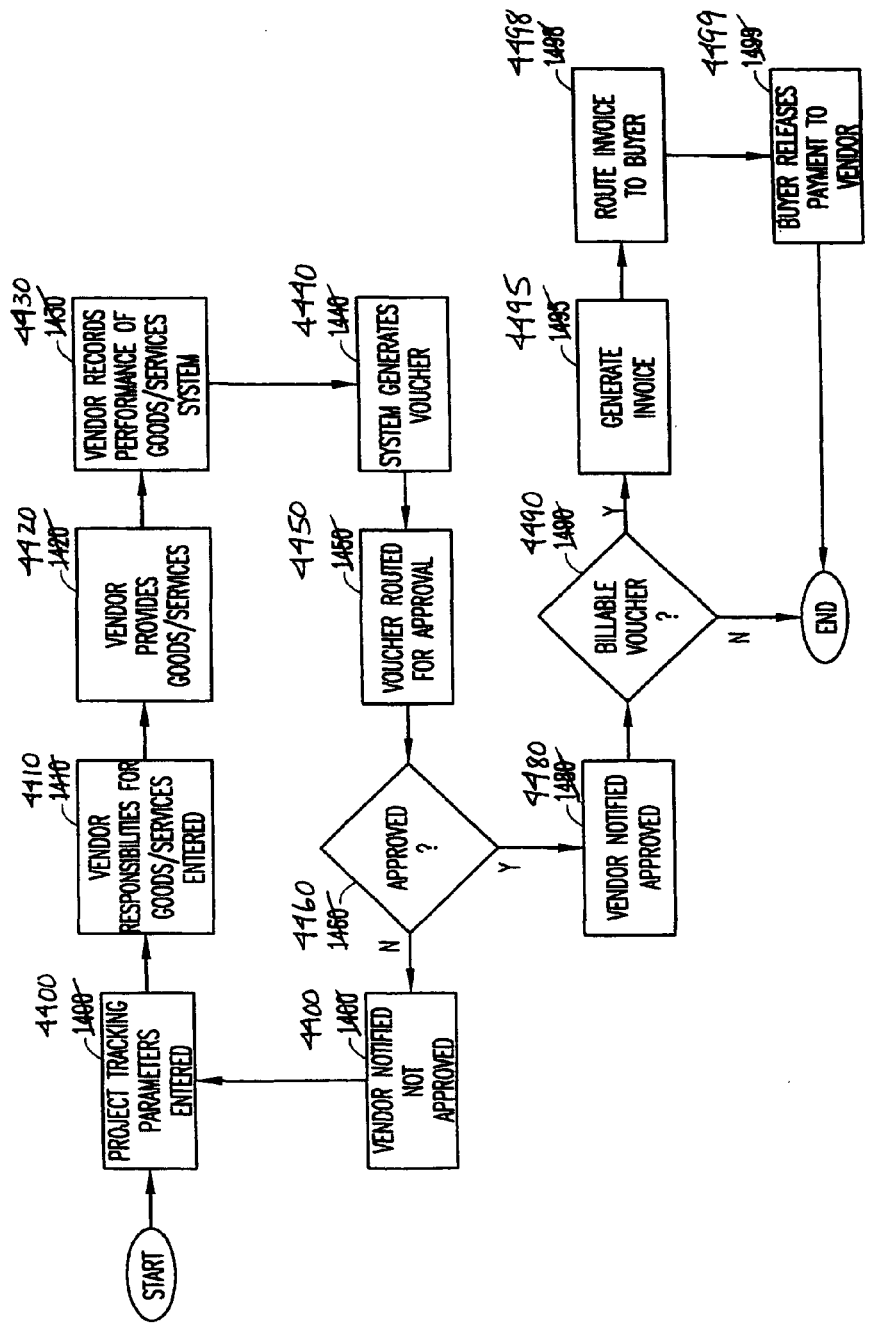
FIG. 49 is a flowchart illustrating a voucher payment process, in accordance with embodiments of the present invention.

Referring now to FIG. 49, exemplary steps involved in a voucher processing and payment system are illustrated. Initially, various project tracking parameters (e.g., purchase requisition information) are entered into the system (step 4400) and all vendor responsibilities for goods and services, both billable and non-billable are stored in the database (step 4410). When the vendor provides an authorized good or service (as determined by the entered vendor responsibilities) (step 4420), the vendor accesses the system to record the good or service performed and request payment for the good or service (step 4430). In other embodiments, payment may be automatically requested by the system at certain time intervals. the system generates a voucher based on the project tracking parameters and other voucher information (e.g., timekeeping information, expenses, materials, etc.) (step 4440) and routes the voucher to the appropriate buyer user or administrator user for approval of the voucher (step 4450).

If the voucher is not approved (step 4460), the vendor is notified and provided the option of re-submitting the voucher (step 4470). If the voucher is approved (step 4460), the vendor is notified of the approval of the voucher (step 4480). If the voucher is a billable voucher (step 4490), the voucher is processed for electronic invoicing based on prescribed scheduling (using system or buyer constraints) (step 4495). For example, the system can employ a batch process to collect all payment vouchers for the buyer (for one or more projects) approved during a pre-designated time period. All invoices can be generated in a format based on buyer specifications or in a system-defined format. The buyer receives the invoice(s) (step 4498) and releases payment of the invoice(s) to the vendor(s) via a pre-configured method (e.g., EFI, check, etc.) (step 4499).

Exemplary database structures for storing the voucher information in payable vouchers and generating a paid voucher record are shown in Tables 84-92 below. The data structures are illustrated for simplicity as being organized in a table format, with each table including all of the fields necessary for storing voucher information. The tables are related in a hierarchical and relational manner with other tables stored in the database, as will be discussed in connection with FIG. 50.

Figure 50:
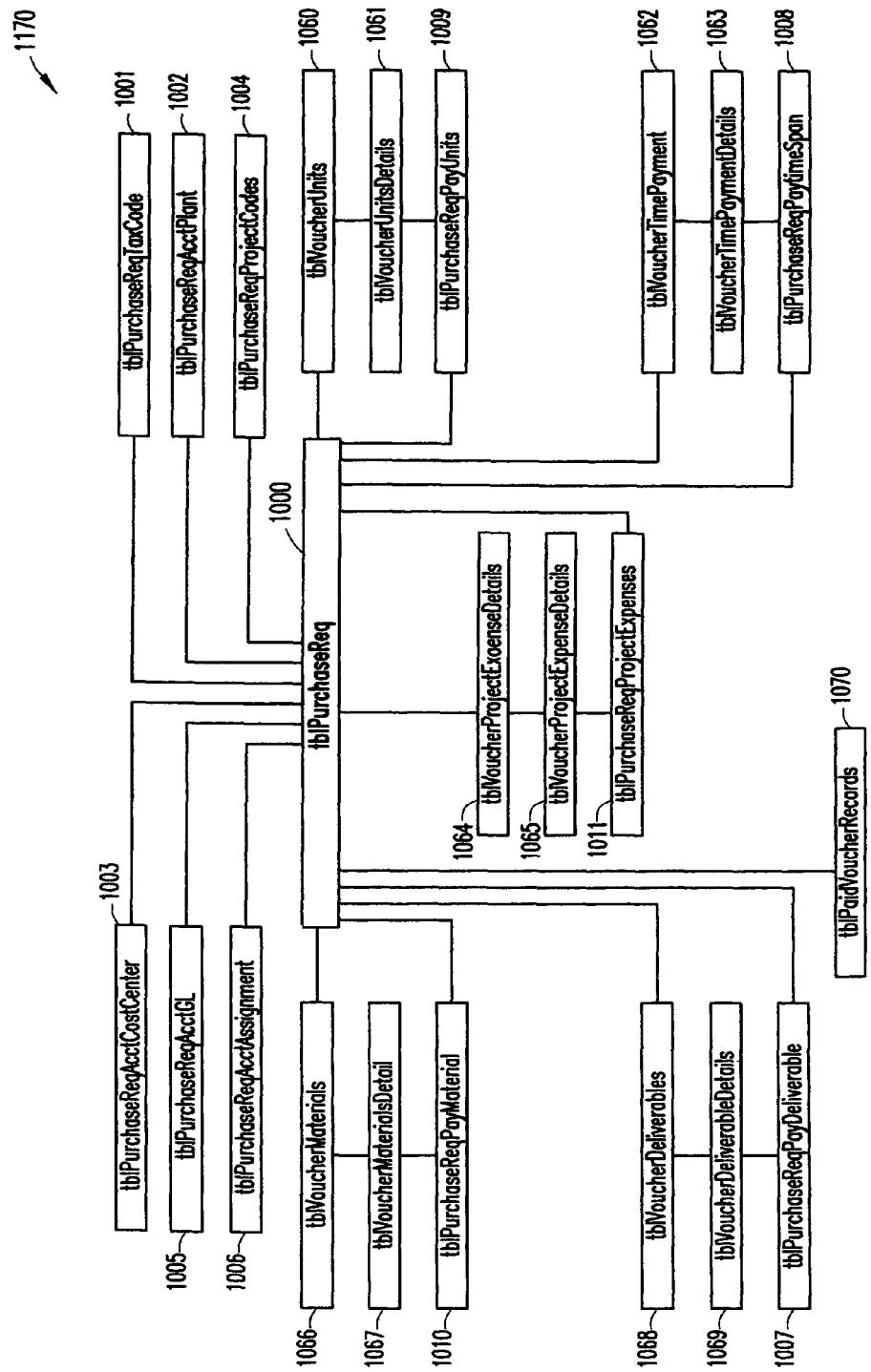
FIG. 50 is a database table view illustrating the generation of payable vouchers, in accordance with embodiments of the present invention.

Table 84 below illustrates sample general project unit completion voucher information, which can be stored in the database table structure 1170 in table "tblVoucherUnits" 1060, as shown in FIG. 50. For example, the general project unit completion voucher information can include the unit voucher identifier, the associated purchase requisition identifier, an indication of whether all time cards associated with the unit completion have been approved, the vendor identifier, the week ending date associated with the voucher information, the creation date, the review date and an indication of whether or not the voucher information has been approved. Table "tblVoucherUnits" 1060 is shown tied to table "tblPurchaseReq" 1000, which is discussed above in connection with FIG. 41, to associate the voucher information with the purchase requisition. In addition, various other tables shown in FIG. 41 are illustrated here in FIG. 50 to show the interrelation between the various purchase requisition tables and the voucher tables. It should be understood that a separate record in the format of Table 84 is stored in table "tblVoucherUnits" 1060 for each payable unit voucher.

Furthermore, although not shown, the table "tblContractorExpenseVoucher" 1054, shown in FIG. 47, is also considered a voucher table for generation of a payable voucher. It should be understood that other tables and voucher information can be included, and the system is not limited to the specific tables and voucher information shown in FIG. 50.

TABLE 84 tblVoucherUnits (db structure view)

| Column Name | Data Type | Length |
|---|---|---|
| Requisition_ID | int | 4 |
| Unit_Voucher_ID | int | 4 |
| tcStatus_ID | int | 4 |
| Vendor_ID | int | 4 |
| Week_Ending_Date | datetime | 8 |
| Record_Create_Date | datetime | 8 |
| Last_Edit_Date | datetime | 8 |
| Submit_Date | datetime | 8 |
| Approval_Date | datetime | 8 |
| Review_Date | datetime | 8 |
| Date_Rejected | datetime | 8 |
| Reviewer_ID | int | 4 |
| Vendor_Notes | varchar | 1000 |
| Buyer_Notes | varchar | 1000 |

Table 85 below illustrates sample detailed project unit completion voucher information, which can be stored in the database in table "tblVoucherUnitsDetails" 1061, as shown in FIG. 50. For example, such detailed project unit completion voucher information can include a description of the unit completion, the number of units authorized, the cost per unit, the number of units completed and other detailed project unit completion voucher information. Table "tblVoucherUnitsDetails" 1061 is shown tied to table "tblVoucherUnits" 1060 to associate the detailed project unit completion voucher information with the general project unit completion voucher information. In addition, table "tblVoucherUnitsDetails" 1061 is tied to table "tblPurchaseReqPayUnits" 1009 to associate the requisition unit payment information with the project unit completion voucher information.

It should be understood that a separate record in the format of Table 85 is stored in table "tblVoucherUnitsDetails" 1061 for each payable unit voucher. It should be further understood that other tables and project unit completion voucher information can be included, and the system is not limited to the specific tables and project unit completion voucher information shown in FIG. 50.

TABLE 85 tblVoucherUnitsDetails (db structure view)

| Column Name | Data Type | Length |
|---|---|---|
| Unit_Voucher_ID | int | 4 |
| puRecord_ID | int | 4 |
| Unit_Completion_Description | varchar | 1000 |
| Units_Authorized | numeric | 9 |
| Unit_Cost | money | 8 |
| Units_Completed | numeric | 9 |
| Line_Item_Cost | money | 8 |
| Account_Assignment | varchar | 10 |
| [Billable_Dept/Cost_Center] | nvarchar | 10 |
| Accounting_Plant | varchar | 10 |
| Project_Code | varchar | 20 |
| Tax_Code | varchar | 10 |
| G_L_Account | varchar | 20 |
| Record_ID | int | 4 |

Table 86 below illustrates sample general time completion voucher information, which can be stored in the database in table "tblVoucherTimePayment" 1062, as shown in FIG. 50. For example, the general time completion voucher information can include the time voucher identifier, the associated purchase requisition identifier, an indication of whether all time cards associated with the time completion have been approved, the vendor identifier, the week ending date associated with the voucher information, the creation date, the review date and an indication of whether or not the voucher information has been approved. Table "tblVoucherTimePayment" 1062 is shown tied to table "tblPurchaseReq" 1000, which is discussed above in connection with FIG. 41, to associate the voucher information with the purchase requisition. It should be understood that a separate record in the format of Table 86 is stored in table "tblVoucherTimePayment" 1062 for each payable time voucher.

TABLE 86 tblVoucherTimePayment (db structure view)

| Column Name | Data Type | Length |
|---|---|---|
| Requisition_ID | int | 4 |
| Time_Pay_Voucher_ID | int | 4 |
| tcStatus_ID | int | 4 |
| Vendor_ID | int | 4 |
| Week_Ending_Date | datetime | 8 |
| Record_Create_Date | datetime | 8 |
| Last_Edit_Date | datetime | 8 |
| Approval_Date | datetime | 8 |
| Date_Rejected | datetime | 8 |
| Review_ID | int | 4 |
| Vendor_Notes | varchar | 1000 |
| Buyer_Notes | varchar | 1000 |

Table 87 below illustrates sample detailed time completion voucher information, which can be stored in the database in table "tblVoucherTimePaymentDetails" 1063, as shown in FIG. 50. For example, such detailed time completion voucher information can include the work start date, payment release date, payment amount and other detailed time completion voucher information. Table "tblVoucherTimeCompletionDetails" 1063 is shown tied to table "tblVoucherTimePayment" 1062 to associate the detailed time completion voucher information with the general time completion voucher information. In addition, table "tblVoucherTimePaymentDetails" 1063 is tied to table "tblPurchaseReqPayTimeSpan" 1008 to associate the requisition time payment information with the time completion voucher information.

It should be understood that a separate record in the format of Table 87 is stored in table "tblVoucherTimePaymentDetails" 1063 for each payable unit voucher. It should further be understood that other tables and time completion voucher information can be included, and the system is not limited to the specific tables and time completion voucher information shown in FIG. 50.

TABLE 87 tblVoucherTimePaymentDetails (db structure view)

| Column Name | Data Type | Length |
|---|---|---|
| Time_Pay_Voucher_ID | int | 4 |
| pptRecord_ID | int | 4 |
| Work_Start_Date | datetime | 8 |
| Payment_Release_Date | datetime | 8 |
| Payment_Amount | money | 8 |
| Account_Assignment | varchar | 10 |
| [Billable_Dept/Cost_Center] | nvarchar | 10 |
| Accounting_Plant | varchar | 10 |
| Project_Code | varchar | 20 |
| Tax_Code | varchar | 10 |
| G_L_Account | varchar | 20 |
| Record_ID | int | 4 |

Table 88 below illustrates sample general project expense voucher information, which can be stored in the database in table "tblVoucherProjectExpense" 1064, as shown in FIG. 50. For example, the general project expense voucher information can include the project expense voucher identifier, the associated purchase requisition identifier, an indication of whether all time cards associated with the project expense (if any) have been approved, the vendor identifier, the week ending date associated with the voucher information, the creation date, the review date and an indication of whether or not the voucher information has been approved. Table "tblVoucherProjectExpense" 1064 is shown tied to table "tblPurchaseReq" 1000, which is discussed above in connection with FIG. 41, to associate the voucher information with the purchase requisition. It should be understood that a separate record in the format of Table 88 is stored in table "tblVoucherProjectExpense" 1064 for each payable project expense voucher.

TABLE 88 tblVoucherProjectExpense (db structure view)

| Column Name | Data Type | Length |
|---|---|---|
| Requisition_ID | int | 4 |
| Project_Expense_Voucher_ID | int | 4 |
| tcStatus_ID | int | 4 |
| Vendor_ID | int | 4 |
| Week_Ending_Date | datetime | 8 |
| Record_Create_Date | datetime | 8 |
| Last_Edit_Date | datetime | 8 |
| Submit_Date | datetime | 8 |
| Approval_Date | datetime | 8 |
| Date_Rejected | datetime | 8 |
| Reviewer_ID | int | 4 |
| Vendor_Notes | varchar | 1000 |
| Buyer_Notes | varchar | 1000 |

Table 89 below illustrates sample detailed project expense voucher information, which can be stored in the database in table "tblVoucherProjectExpenseDetails" 1065, as shown in FIG. 50. For example, such detailed project expense voucher information can include the date the expense was incurred, a description of the project expense, the amount of the project expense and other detailed project expense voucher information. Table "tblVoucherProjectExpenseDetails" 1065 is shown tied to table "tblVoucherProjectExpense" 1064 to associate the detailed project expense voucher information with the general project expense voucher information. In addition, table "tblVoucherProjectExpenseDetails" 1065 is tied to table "tblPurchaseReqPayProjectExpense" 1011 to associate the requisition project expense payment information with the project expense voucher information.

It should be understood that a separate record in the format of Table 89 is stored in table "tblVoucherProjectExpenseDetails" 1065 for each payable project expense voucher. It should further be understood that other tables and project expense voucher information can be included, and the system is not limited to the specific tables and project expense voucher information shown in FIG. 50.

TABLE 89 tblVoucherProjectExpenseDetails (db structure view)

| Column Name | Data Type | Length |
|---|---|---|
| Project_Expense_Voucher_ID | int | 4 |
| Expense_Incurred_Date | datetime | 8 |
| ppeRecord_ID | int | 4 |
| Project_Expense_Description | varchar | 500 |
| Project_Expense_Amount | money | 8 |

TABLE 89-continued tblVoucherProjectExpenseDetails (db structure view)

| Column Name | Data Type | Length |
|---|---|---|
| Account_Assignment | varchar | 10 |
| [Billable_Dept/Cost_Center] | nvarchar | 10 |
| Accounting_Plant | varchar | 10 |
| Project_Code | varchar | 20 |
| Tax_Code | varchar | 10 |
| G_L_Account | varchar | 20 |
| Record_ID | int | 4 |

Table 90 below illustrates sample general material voucher information, which can be stored in the database in table "tblVoucherMaterials" 1066, as shown in FIG. 50. For example, the general material voucher information can include the material voucher identifier, the associated purchase requisition identifier, an indication of whether all time cards associated with the material (if any) have been approved, the vendor identifier, the week ending date associated with the voucher information, the creation date, the review date and an indication of whether or not the voucher information has been approved. Table "tblVoucherMaterials" 1066 is shown tied to table "tblPurchaseReq" 1000, which is discussed above in connection with FIG. 41, to associate the voucher information with the purchase requisition. It should be understood that a separate record in the format of Table 90 is stored in table "tblVoucherMaterial" 1066 for each payable material voucher.

TABLE 90 tblVoucherMaterials (db structure view)

| Column Name | Data Type | Length |
|---|---|---|
| Reqisition_ID | int | 4 |
| Material_Voucher_ID | int | 4 |
| tcStatus_ID | int | 4 |
| Vendor_ID | int | 4 |
| Week_Ending_Date | datetime | 8 |
| Record_Create_Date | datetime | 8 |
| Last_Edit_Date | datetime | 8 |
| Submit_Date | datetime | 8 |
| Approved_Date | datetime | 8 |
| Reviewed_Date | datetime | 8 |
| Date_Rejected | datetime | 8 |
| Reviewer_ID | int | 4 |
| Vendor_Notes | varchar | 1000 |
| Buyer_Notes | varchar | 1000 |

Table 91 below illustrates sample detailed material voucher information, which can be stored in the database in table "tblVoucherMaterialDetails" 1067, as shown in FIG. 50. For example, such detailed material voucher information can include the date the material expense was incurred, the name of the material, a description of the material, the number of units of material purchased, the cost per unit of material and other detailed project expense voucher information. Table "tblVoucherMaterialsDetails" 1067 is shown tied to table "tblVoucherMaterials" 1066 to associate the detailed material voucher information with the general material voucher information. In addition, table "tblVoucherMaterialsDetails" 1067 is tied to table "tblPurchaseReqPayMaterials" 1010 to associate the requisition material payment information with the material voucher information.

It should be understood that a separate record in the format of Table 91 is stored in table "tblVoucherMaterialsDetails" 1067 for each payable material voucher. It should further be understood that other tables and material voucher information can be included, and the system is not limited to the specific tables and material voucher information shown in FIG. 49.

TABLE 91 tblVoucherMaterialsDetails (db structure view)

| Column Name | Data Type | Length |
|---|---|---|
| Material_Voucher_ID | int | 4 |
| Expense_Incurred_Date | datetime | 8 |
| ppmRecord_ID | int | 4 |
| Material_Name | varchar | 100 |
| Material_Description | varchar | 500 |
| Unit_Count | numeric | 9 |
| Unit_Cost | money | 8 |
| Line_Item_Cost | money | 8 |
| [Billable_Dept/Cost_Center] | nvarchar | 10 |
| Accounting_Plant | varchar | 10 |
| Project_Code | varchar | 20 |
| Tax_Code | varchar | 1- |
| G_L_Account | varchar | 20 |
| Record_ID | int | 4 |

Table 92 below illustrates sample general deliverables voucher information, which can be stored in the database table "tblVoucherDeliverables" 1068, as shown in FIG. 50. For example, the general deliverables voucher information can include the deliverables voucher identifier, the associated purchase requisition identifier, an indication of whether all time cards associated with the deliverables (if any) have been approved, the vendor identifier, the week ending date associated with the voucher information, the creation date, the review date and an indication of whether or not the voucher information has been approved. Table "tblVoucherDeliverables" 1068 is shown tied to table "tblPurchaseReq" 1000, which is discussed above in connection with FIG. 41, to associate the voucher information with the purchase requisition. It should be understood that a separate record in the format of Table 92 is stored in table "tblVoucherDeliverables" 1068 for each payable deliverables voucher. However, it should be understood that other information can be included, and the system is not limited to the specific information shown in Table 92.

TABLE 92 tblVoucherDeliverables (db structure view)

| Column Name | Data Type | Length |
|---|---|---|
| Requisition_ID | int | 4 |
| Deliverable_Voucher_ID | int | 4 |
| tcStatus_ID | int | 4 |
| Vendor_ID | int | 4 |
| Week_Ending_ID | datetime | 8 |
| Record_Create_Date | datetime | 8 |
| Last_Edit_Date | datetime | 8 |
| Submit_Date | datetime | 8 |
| Approval_Date | datetime | 8 |
| Review_Date | datetime | 8 |
| Date_Rejected | datetime | 8 |
| Reviewer_ID | int | 4 |
| Vendor_Notes | varchar | 1000 |
| Buyer_Notes | varchar | 1000 |

Table 93 below illustrates sample detailed deliverables voucher information, which can be stored in the database in table "tblVoucherDeliverablesDetails" 1069, as shown in FIG. 50. For example, such detailed deliverables voucher information can include a description of the deliverable, the anticipated completion date of the deliverable, the actual completion date of the deliverable, the payment amount requested and other detailed deliverables voucher information. Table "tblVoucherDeliverablesDetails" 1069 is shown tied to table "tblVoucherDeliverables" 1068 to associate the detailed deliverables voucher information with the general deliverables voucher information. In addition, table "tblVoucherDeliverablesDetails" 1069 is tied to table "tblPurchaseReqPayDeliverables" 1007 to associate the requisition deliverables payment information with the deliverables voucher information.

It should be understood that a separate record in the format of Table 93 is stored in table "tblVoucherDeliverablesDetails" 1069 for each payable deliverables voucher. It should further be understood that other tables and deliverables voucher information can be included, and the system is not limited to the specific tables and deliverables voucher information shown in FIG. 50.

TABLE 93 tblVoucherDeliverableExpenseDetails (db structure view)

| Column Name | Data Type | Length |
|---|---|---|
| Deliverable_Vendor_ID | int | 4 |
| ppdRecord_ID | int | 4 |
| Deliverable_Description | varchar | 1000 |
| Anticipated_Completion_Date | datetime | 8 |
| Actual_Completion_Date | datetime | 8 |
| Payment_Amount_Requested | money | 8 |
| Account_Assignment | varchar | 10 |
| [Billable_Dept/Cost_Center] | nvarchar | 10 |
| Accounting_Plant | varchar | 10 |
| Project_Code | varchar | 20 |
| Tax_Code | varchar | 10 |
| G_L_Account | varchar | 20 |
| Record_ID | int | 4 |

Table 94 below illustrates sample paid voucher information, which can be stored in the database as table "tblPaidVoucherRecords" 1070, as shown in FIG. 50. For example, such paid voucher information can include the invoice number, purchase requisition identities assigned by the buyer and vendor, the voucher approval date, the name of the approver, the type of voucher (e.g., time card, contractor expense, project expense, deliverable, time completion or unit completion) and associated voucher identifier, the invoice amount, the payment date and other paid voucher information.

Table "tblPaidVoucherRecords" 1070 is shown tied to table "tblPurchaseReq" 1000, which is discussed above in connection with FIG. 41, to associate the paid voucher information with the purchase requisition. It should be understood that a separate record in the format of Table 94 is stored in table "tblPaidVoucherRecords" 1070 for each paid voucher. However, it should be understood that other information can be included, and the system is not limited to the specific information shown in Table 94.

TABLE 94

Exemplary tblPaidVoucherRecords (db structure view)

| Column Name | Data Type | Length |
|---|---|---|
| Invoice_ID | int | 4 |
| Buyer_PR_# | varchar | 20 |
| PR_Version | numeric | 9 |
| Vendor_PR_# | varchar | 20 |
| Approval_Date | datetime | 8 |
| Approver_Name | varchar | 100 |

TABLE 94-continued

Exemplary tblPaidVoucherRecords (db structure view)

| Column Name | Data Type | Length |
|---|---|---|
| Approver_Employee_ID | nvarchar | 10 |
| Time_Card_ID | int | 4 |
| Expense_Voucher_ID | int | 4 |
| Material_Voucher_ID | int | 4 |
| Project_Expense_Voucher_ID | int | 4 |
| Deliverable_Voucher_ID | int | 4 |
| Time_Pay_Voucher_ID | int | 4 |
| Unit_Voucher_ID | int | 4 |
| Invoice_Amount | money | 8 |
| Account_Assignment | varchar | 10 |
| [Billable_Dept/Cost_Center] | varchar | 10 |
| Accounting_Plant | varchar | 10 |
| Project_Code | varchar | 20 |
| Tax_Code | varchar | 10 |
| G_L_Account | varchar | 20 |
| Currency_ID | int | 4 |
| File_Extract_Date | datetime | 8 |
| EDI_File_Transmission_Date | datetime | 8 |
| Buyer_Check_Register_Date | datetime | 8 |
| Vendor_Payment_Date | datetime | 8 |
| Vendor_AP_Register_# | varchar | 20 |
| Vendor_Check_# | varchar | 25 |
| Vendor_Check_Issuance_Date | datetime | 8 |
| Record_ID | int | 4 |

Figure 51:
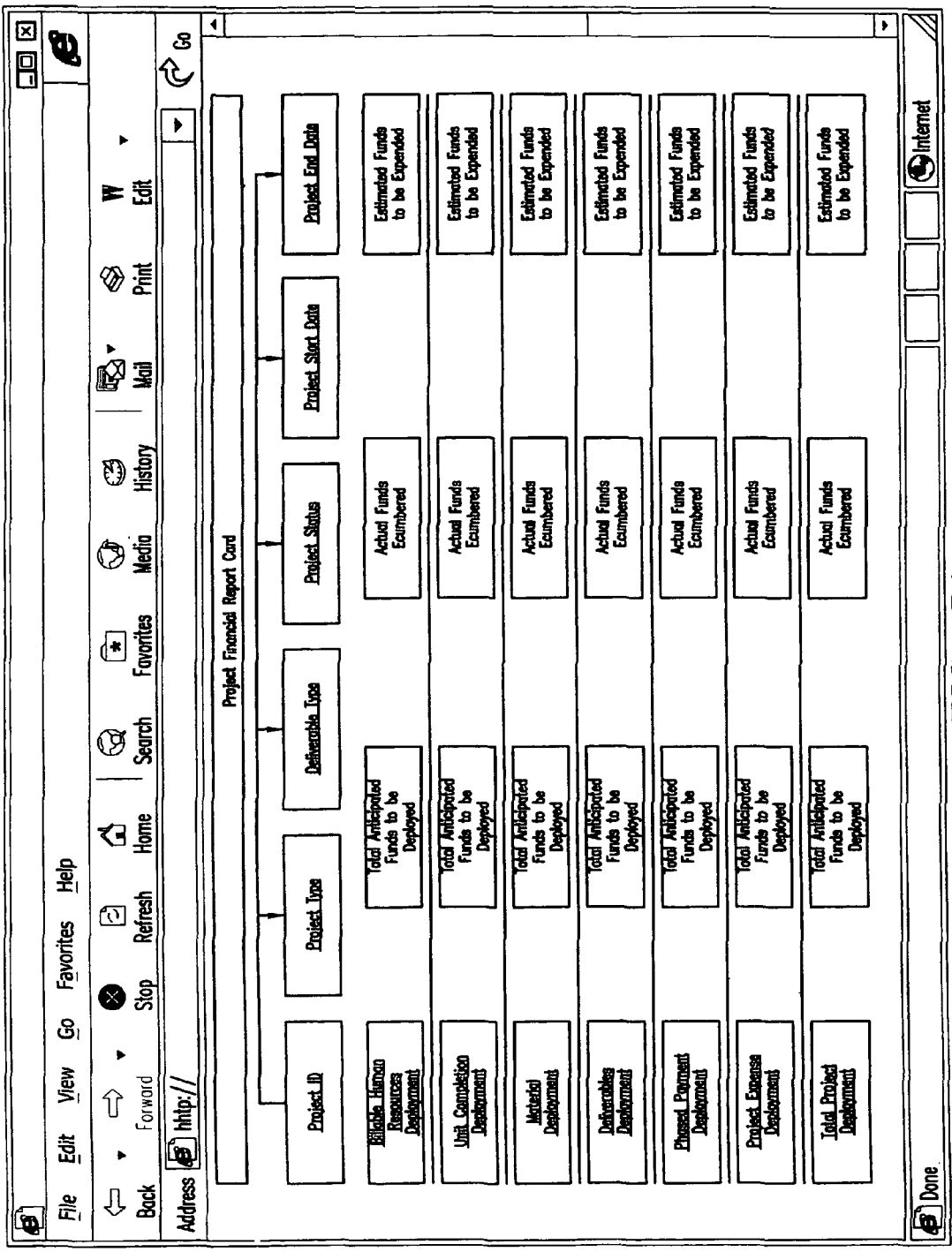
FIG. 51 is a screen shot illustrating project financial data.

Referring now to FIG. 51, there is illustrated a screen shot of an exemplary web page 61 showing the financial status of the project. This web page may be accessible in one or more formats to the buyer, vendor and/or administrator, depending upon system constraints. As can be seen in FIG. 51, the different types of payment vouchers, and the estimated amount for each of the payment vouchers can be displayed. In addition, the actual amount expended for each of the payment voucher types and the estimated additional funds to be expended for each of the payment voucher types can also be tracked. In this way, the buyer, vendor and/or administrator can maintain a working knowledge of the project performance from a financial perspective. However, it should be understood that other financial information can be displayed instead of or in addition to the specific financial information shown in FIG. 51. Furthermore, it should be understood that other project tracking information (in lieu of or in addition to financial information) can be displayed depending on the buyer, vendor, administrator and/or system configuration.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

We claim:

1. A project-work risk-management documentation method comprising:
    configuring an electronic temporary-laborer risk-management document library;
    wherein the step of configuring the temporary-laborer risk-management document library comprises:
        specifying a plurality of temporary-laborer risk-management documentation types, the plurality of documentation types being representative of documents that may need to be executed or provided by a temporary laborer;
        specifying a plurality of temporary-laborer types such that a temporary laborer is classified into a single one of the plurality of temporary-laborer types; and
        mapping the plurality of temporary-laborer types to the plurality of temporary-laborer risk-management documentation types to determine, for each temporary-laborer type, which ones of the plurality of document types must be provided or executed by temporary laborers belonging to the temporary-laborer type;
    configuring a plurality of bid templates according to at least one project services type, the plurality of bid templates being usable for creation of buyer bid requests;
    wherein the configured plurality of bid templates comprise a plurality of pre-specified bid items associated with specific types of information to be solicited from a vendor, the plurality of pre-specified bid items comprising the specified plurality of temporary-laborer types and the plurality of temporary-laborer risk-management documentation types mapped to the specified plurality of temporary-laborer types;
    responsive to a bid request for a particular project based on a particular bid template in the plurality of bid templates, receiving, from a vendor, a temporary-laborer record corresponding to at least one of the plurality of pre-specified bid items, the temporary-laborer record representing a particular temporary laborer who is to be engaged for the particular project, the particular temporary laborer being of at least one temporary-laborer type from the plurality of temporary-laborer types;
    wherein receipt of the temporary-laborer record is conditioned on approval by at least one pre-configured approver, the approval being based, at least in part, on a pre-defined appropriate vendor response to at least one bid item of the particular bid template;
    receiving at least one temporary-laborer document from the particular temporary laborer, the temporary-laborer document corresponding to a documentation type mapped to the at least one temporary-laborer type in the mapping step and included as at least one of the plurality of pre-specified bid items;
    administering a temporary-laborer agreement from the risk-management document library to the particular temporary laborer, the temporary-laborer agreement being mapped to the temporary-laborer type in the mapping step; and
    wherein the step of configuring the temporary-laborer risk-management document library, the step of configuring the plurality of bid templates, the providing step, and the administering step are implemented by a computer system.

2. The method of claim 1, wherein the at least one pre-configured approver is pre-defined according to user roles and characteristics of the at least one bid item on which approval is based.

3. The method of claim 1, wherein the step of specifying risk-management temporary laborer documentation types comprises: defining bid-template-based temporary-laborer executable agreements; and
    configuring bid-template-based temporary laborer executable agreement content.

4. The method of claim 1, wherein the step of providing the at least one temporary-laborer document comprises providing pre-defined bid-template-based agreement and documentation requirements to a temporary laborer in accordance with the mapping of temporary-laborer types to temporary-laborer documentation types.

5. The method of claim 4, further comprising:
   verifying that each of a plurality of documents of the provided pre-defined bid-template-based agreement and documentation requirements has been properly executed;
   storing data regarding the effective date of each of the plurality of documents; and
   setting a tickler date for any of the plurality of documents that will need to be renewed in the future.

6. The method of claim 1, wherein the step of administering the temporary-laborer agreement comprises:
   systematically storing and tracking temporary-laborer resource-documentation transactional data; and
   based on the stored and tracked temporary-laborer resource-documentation transactional data, periodically determining whether temporary-laborer resource-documentation requirements are being met.

7. The method of claim 6, wherein the storing and tracking step comprises administering temporary-laborer resource system access and right-to-work permission based on the determining step indicating that a previously provided temporary-laborer document is no longer valid or needs to be renewed.

8. The method of claim 1, wherein:
   the project services type comprises at least one of consulting, staff supplementation, and project services; and
   bid items included within a given bid template of the plurality of bid templates are selected in light of the project services type applicable to the given bid template.

9. The method of claim 1, wherein the plurality of prespecified bid items comprise at least one mandatory bid item that comprises at least a project-services-type identifier.

10. The method of claim 1, wherein, provided pre-defined approvals are obtained, any bid item may be added to or removed by a buyer soliciting bids using a bid template of the plurality of bid templates.

11. The method of claim 1, wherein the project services type is selected by the buyer from a pre-established plurality of project services types.

12. The method of claim 1, wherein the project services type is selected from the group consisting of consulting, staff supplementation, and project services.

13. The method of claim 12, wherein each bid template is segmented into a plurality of project sector types, the plurality of project sector types defining a technical or professional discipline of project work to be performed pursuant to the bid template.

14. The method of claim 13, wherein each project sector type is segmented into a plurality of project family types, the plurality of project family types for each project sector type comprising a plurality of the following:
   enterprise-resource solutions;
   e-business solutions;
   telecommunications;
   technical-integration solutions;
   network-management solutions;
   custom software development;
   business-strategy/planning solutions;
   human-resource solutions;
   audit/assurance solutions;
   financial advisory solutions;
   tax solutions;
   risk-management solutions;
   real-estate services;
   legal services;
   engineering services;
   building/construction services; and
   product development.

15. The method of claim 1, wherein at least one of the plurality of bid items contains displayed default data.

16. The method of claim 1, wherein the plurality of pre-specified bid items are included within a given configured bid template according to project services type, project sector type and project family type.

17. A project-work risk-management documentation method comprising:
   configuring an electronic temporary-laborer risk-management document library;
   wherein the step of configuring the temporary-laborer risk-management document library comprises:
      specifying a plurality of temporary-laborer risk-management documentation types, the plurality of documentation types being representative of documents that may need to be executed by a temporary laborer;
      specifying a plurality of temporary-laborer types such that a temporary laborer is classified into a single one of the plurality of temporary-laborer types; and
      mapping the plurality of temporary-laborer types to the plurality of temporary-laborer risk-management documentation types to determine, for each temporary-laborer type, which ones of the plurality of document types must be executed by temporary laborers belonging to the temporary-laborer type;
   configuring a plurality of bid templates according to at least one project services type, the plurality of bid templates being usable for creation of buyer bid requests;
   wherein the configured plurality of bid templates comprise a plurality of pre-specified bid items associated with specific types of information to be solicited from a vendor, the plurality of pre-specified bid items comprising the specified plurality of temporary-laborer types and the plurality of temporary-laborer risk-management documentation types mapped to the specified plurality of temporary-laborer types;
   responsive to a bid request for a particular project based on a particular bid template in the plurality of bid templates, receiving, from a vendor, a temporary-laborer record corresponding to at least one of the plurality of pre-specified bid items, the temporary-laborer record representing a particular temporary laborer who is to be engaged for the particular project, the particular temporary laborer being of at least one temporary-laborer type from the plurality of temporary-laborer types;
   wherein receipt of the temporary-laborer record is conditioned on approval by at least one pre-configured approver, the approval being based, at least in part, on a pre-defined appropriate vendor response to at least one bid item of the particular bid template;
   receiving at least one temporary-laborer document from the particular temporary laborer, the temporary-laborer document corresponding to a documentation type mapped to the at least one temporary-laborer type in the mapping step and included as at least one of the plurality of pre-specified bid items;
   administering a temporary-laborer agreement from the risk-management document library to the particular temporary laborer, the temporary-laborer agreement being mapped to the temporary-laborer type in the mapping step; and
   wherein the step of configuring the temporary-laborer risk-management document library, the step of configuring the plurality of bid templates, the providing step, and the administering step are implemented by a computer system.

* * * * *